US009754419B2

(12) United States Patent
Petrovskaya et al.

(10) Patent No.: US 9,754,419 B2
(45) Date of Patent: Sep. 5, 2017

(54) SYSTEMS AND METHODS FOR AUGMENTED REALITY PREPARATION, PROCESSING, AND APPLICATION

(71) Applicant: Eonite Perception Inc., Palo Alto, CA (US)

(72) Inventors: Anna Petrovskaya, Los Altos, CA (US); Peter Varvak, Los Altos, CA (US)

(73) Assignee: Eonite Perception Inc., Palo Alto, CA (US)

( * ) Notice: Subject to any disclaimer, the term of this patent is extended or adjusted under 35 U.S.C. 154(b) by 0 days.

(21) Appl. No.: 14/941,448

(22) Filed: Nov. 13, 2015

(65) Prior Publication Data

US 2016/0148433 A1 May 26, 2016

Related U.S. Application Data

(60) Provisional application No. 62/080,400, filed on Nov. 16, 2014, provisional application No. 62/080,983, filed on Nov. 17, 2014.

(51) Int. Cl.
*G09G 5/00* (2006.01)
*G06T 19/00* (2011.01)
*G02B 7/36* (2006.01)
*G02B 27/01* (2006.01)
*G06T 7/77* (2017.01)

(52) U.S. Cl.
CPC ............. *G06T 19/006* (2013.01); *G02B 7/36* (2013.01); *G02B 27/01* (2013.01); *G06T 7/77* (2017.01); *G06T 2207/10028* (2013.01); *G06T 2207/20076* (2013.01); *G06T 2207/30244* (2013.01)

(58) Field of Classification Search
None
See application file for complete search history.

(56) References Cited

U.S. PATENT DOCUMENTS 5,832,212 A   11/1998  Cragun et al.
6,922,701 B1   7/2005  Ananian et al.
(Continued)

OTHER PUBLICATIONS

Anna Petrovskaya, "Towards Dependable Robotic Perception—A Dissertation Submitted to the Department of Computer Science and the Committee of Graduate Studies of Stanford University in Partial Fulfillment of the Requirements for the Degree of Doctor of Philosophy," Jun. 2011, 226 pages.

(Continued)

*Primary Examiner* — Peter Hoang

(57) ABSTRACT

Various of the disclosed embodiments provide systems and methods for acquiring and applying a depth determination of an environment in e.g., various augmented reality applications. A user may passively or actively scan a device (e.g., a tablet device, a mobile phone device, etc.) about the environment acquiring depth data for various regions. The system may integrate these scans into an internal three-dimensional model. This model may then be used in conjunction with subsequent data acquisitions to determine a device's location and orientation within the environment with high fidelity. In some embodiments, these determinations may be accomplished in real-time or near-real-time. Using the high-fidelity orientation and position determination, various augmented reality applications may then be possible using the same device used to acquire the depth data or a new device.

22 Claims, 63 Drawing Sheets

(56) References Cited

U.S. PATENT DOCUMENTS

| | | |
|---|---|---|
| 7,313,825 B2 | 12/2007 | Redlich et al. |
| 7,382,244 B1 | 6/2008 | Donovan et al. |
| 7,546,334 B2 | 6/2009 | Redlich et al. |
| 7,583,275 B2 | 9/2009 | Neumann et al. |
| 8,275,635 B2 | 9/2012 | Stivoric et al. |
| 8,521,128 B1 | 8/2013 | Welsh et al. |
| 8,620,532 B2 | 12/2013 | Curtis et al. |
| 8,839,121 B2 | 9/2014 | Bertolami et al. |
| 8,933,931 B2 | 1/2015 | Balan et al. |
| 9,124,635 B2 | 9/2015 | Robinson et al. |
| 9,304,970 B2 | 4/2016 | Wirola et al. |
| 2002/0013675 A1 | 1/2002 | Knoll et al. |
| 2004/0107356 A1 | 6/2004 | Shamoon et al. |
| 2005/0132070 A1 | 6/2005 | Redlich et al. |
| 2006/0238380 A1 | 10/2006 | Kimchi et al. |
| 2008/0195956 A1 | 8/2008 | Baron et al. |
| 2009/0047972 A1 | 2/2009 | Neeraj |
| 2009/0104585 A1 | 4/2009 | Diangelo et al. |
| 2009/0104686 A1 | 4/2009 | Lee et al. |
| 2010/0060632 A1 | 3/2010 | Lefevre et al. |
| 2010/0103196 A1 | 4/2010 | Kumar et al. |
| 2010/0166294 A1 | 7/2010 | Marrion et al. |
| 2010/0182340 A1 | 7/2010 | Bachelder et al. |
| 2011/0046925 A1 | 2/2011 | Bidard et al. |
| 2011/0102460 A1 | 5/2011 | Parker |
| 2011/0199479 A1 | 8/2011 | Waldman |
| 2011/0221771 A1 | 9/2011 | Cramer et al. |
| 2011/0313779 A1 | 12/2011 | Herzog et al. |
| 2012/0197439 A1 | 8/2012 | Wang et al. |
| 2012/0315884 A1 | 12/2012 | Forutanpour et al. |
| 2012/0329486 A1 | 12/2012 | Gits |
| 2013/0026224 A1 | 1/2013 | Ganick et al. |
| 2013/0042296 A1 | 2/2013 | Hastings et al. |
| 2013/0044130 A1 | 2/2013 | Geisner et al. |
| 2013/0101163 A1 | 4/2013 | Gupta et al. |
| 2013/0116968 A1 | 5/2013 | Wirola et al. |
| 2013/0129230 A1 | 5/2013 | Shotton et al. |
| 2013/0132477 A1 | 5/2013 | Bosworth |
| 2013/0132488 A1 | 5/2013 | Bosworth |
| 2013/0174213 A1 | 7/2013 | Liu et al. |
| 2013/0182891 A1 | 7/2013 | Ling |
| 2013/0222369 A1 | 8/2013 | Huston et al. |
| 2013/0242106 A1 | 9/2013 | Leppanen et al. |
| 2014/0002444 A1 | 1/2014 | Bennett et al. |
| 2014/0204077 A1 | 7/2014 | Kamuda et al. |
| 2014/0210710 A1 | 7/2014 | Shin et al. |
| 2014/0241614 A1 | 8/2014 | Lee et al. |
| 2014/0254934 A1 | 9/2014 | Laxminarayana Bhat et al. |
| 2014/0267234 A1 | 9/2014 | Hook et al. |
| 2014/0276242 A1 | 9/2014 | Chen et al. |
| 2014/0292645 A1 | 10/2014 | Tsurumi |
| 2014/0307798 A1 | 10/2014 | Taubman et al. |
| 2014/0323148 A1 | 10/2014 | Schmalstieg et al. |
| 2014/0324517 A1 | 10/2014 | Harris |
| 2014/0357290 A1 | 12/2014 | Grabner et al. |
| 2014/0368532 A1 | 12/2014 | Keane |
| 2015/0143459 A1 | 5/2015 | Molnar et al. |
| 2015/0204676 A1 | 7/2015 | Zhang et al. |
| 2015/0287246 A1 | 10/2015 | Huston et al. |
| 2015/0296170 A1 | 10/2015 | Farrell et al. |
| 2015/0332439 A1 | 11/2015 | Zhang et al. |
| 2016/0026253 A1 | 1/2016 | Bradski |
| 2016/0080642 A1 | 3/2016 | Jung et al. |
| 2016/0110560 A1 | 4/2016 | Forte et al. |
| 2016/0180590 A1 | 6/2016 | Kamhi |
| 2016/0335275 A1 | 11/2016 | Williams et al. |
| 2016/0335497 A1 | 11/2016 | Williams et al. |
| 2016/0335802 A1 | 11/2016 | Bradski |
| 2016/0337599 A1 | 11/2016 | Williams et al. |

OTHER PUBLICATIONS

Curless et al., "A Volumetric Method for Building Complex Models from Range Images," in proceedings of the 23rd annual Conference of Computer Graphics and Interactive Techniques, ACM, 1996, pp. 303-312.

W.E. Lorensen et al., "Marching Cubes: A High Resolution 3D Surface Construction Algorithm," ACM Siggraph Graphics, vol. 21, ACM, 1987, pp. 163-169.

International Search Report & Written Opinion, PCT/US2015/60744; Mailing Date: Feb. 2, 2016; 8 Pages.

U.S. Appl. No. 15/054,082, filed Feb. 25, 2016.

U.S. Appl. No. 15/406,642, filed Jan. 13, 2017.

U.S. Appl. No. 15/406,652, filed Jan. 13, 0217.

1  Input: initial camera pose $T_0$
2  foreach *new frame of data $D_t$* do
3   begin Prediction Step:
4    Compute the prediction $\overline{bel}_t$.
5    Let $T_t^- := MP(\overline{bel}_t)$ be the most likely pose.
6   end
7   begin Measurement Update:
8    Prepare model and data.
9    repeat starting with $T_t^{(0)} := T_t^-$, $bel_t^{(0)} := \overline{bel}_t$, and $i := 0$
10     Compute correspondences using the most recent estimate of the camera pose $T_t^{(i)}$. ⎫ E-STEP
11     Refine the estimate of belief $bel_t^{(i)}$ to obtain $bel_t^{(i+1)}$ assuming the correspondences are fixed. ⎫ M-STEP
12     Let $T_t^{(i+1)} := MP(bel_t^{(i+1)})$ and $i := i + 1$.
13    until *convergence*
14   end
15  Provide the new pose estimate $T_t := T_t^{(i)}$ to the mapper or the AR device.
16 end

*FIG. 21*

Example Scaling Series algorithm for belief estimation.

Input: $V_0$ - initial uncertainty region, $\mathcal{D}$ - data set, $M$ - number of particles per $\delta$-neighborhood, $\delta_*$ - terminal value of $\delta$.

1: $\delta_0 \leftarrow Radius(V_0)$
2: $zoom \leftarrow 2^{-1/dim X}$
3: $N \leftarrow \lceil \log_2(Volume(S_{\delta_0})/Volume(S_{\delta_*})) \rceil$
4: for $n = 1$ to $N$ do
5: $\quad \delta_n \leftarrow zoom \cdot \delta_{n-1}$
6: $\quad \tau_n \leftarrow (\delta_n/\delta_*)^2$
7: $\quad \overline{\mathcal{X}}_n \leftarrow Even\_Density\_Cover(V_{n-1}, M)$
8: $\quad \overline{\mathcal{W}}_n \leftarrow Importance\_Weights(\overline{\mathcal{X}}_n, \tau_n, \mathcal{D})$
9: $\quad \mathcal{X}_n \leftarrow Prune(\overline{\mathcal{X}}_n, \overline{\mathcal{W}}_n)$
10: $\quad V_n \leftarrow Union\_Delta\_Neighborhoods(\mathcal{X}_n, \delta_n)$
11: end for
12: $\mathcal{X} \leftarrow Even\_Density\_Cover(V_N, M)$
13: $\mathcal{W} \leftarrow Importance\_Weights(\mathcal{X}, 1, \mathcal{D})$

Output: $(\mathcal{X}, \mathcal{W})$ - a weighted particle set approximating the belief.

*FIG. 24*

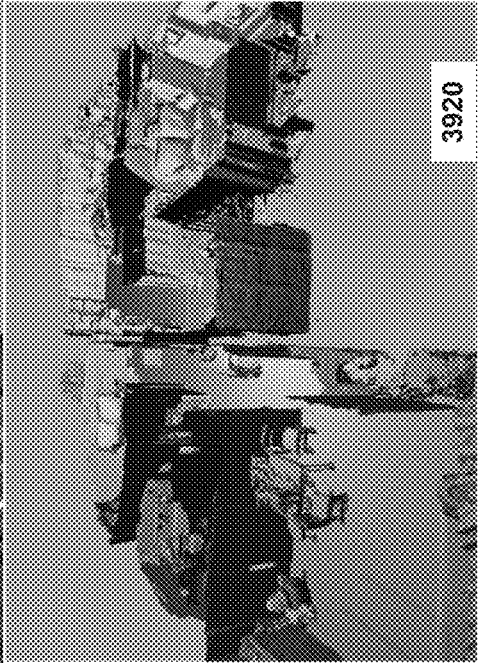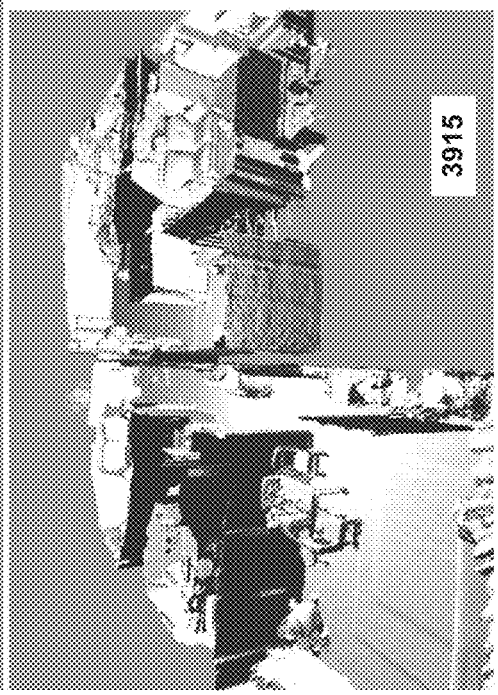
FIG. 39

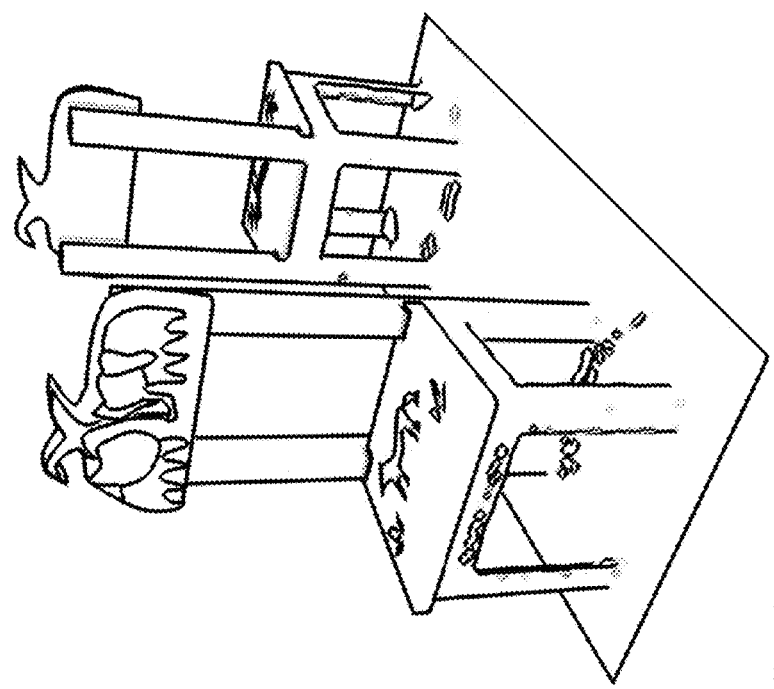
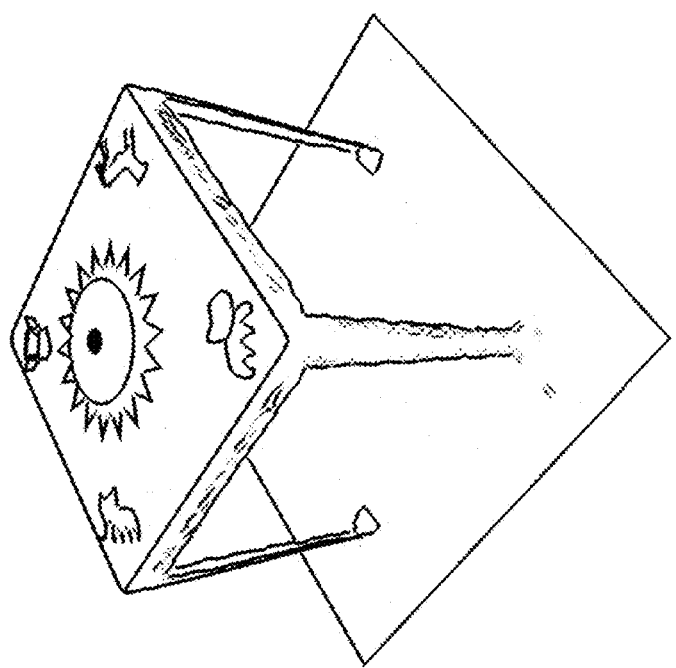
FIG. 40

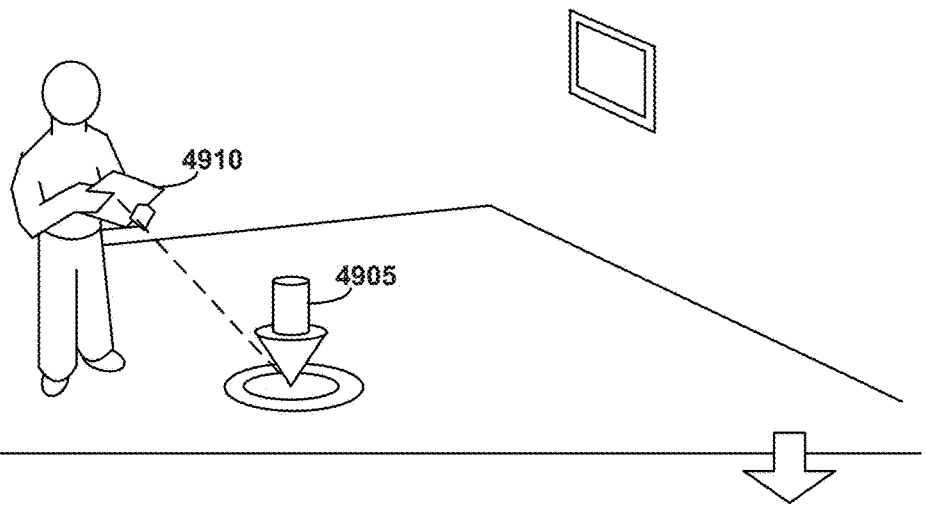
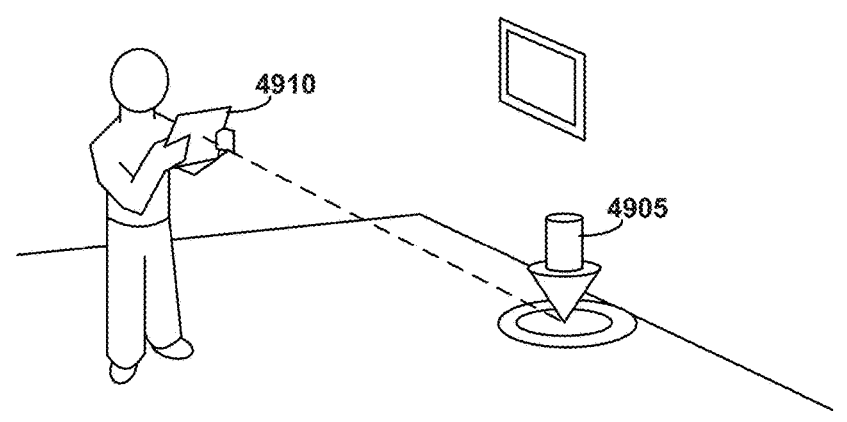
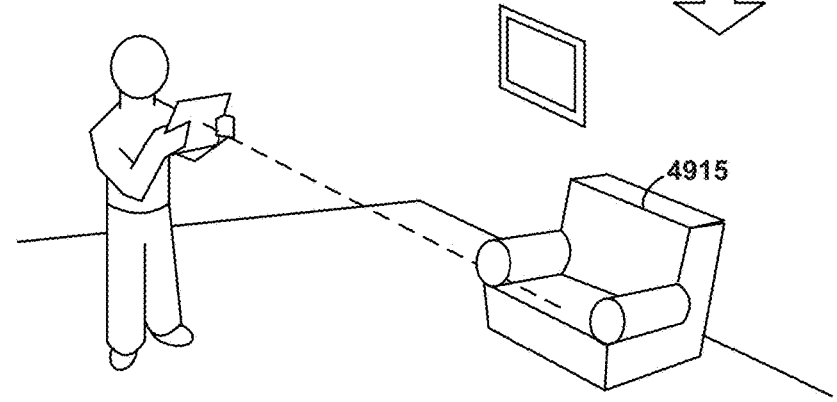
FIG. 49

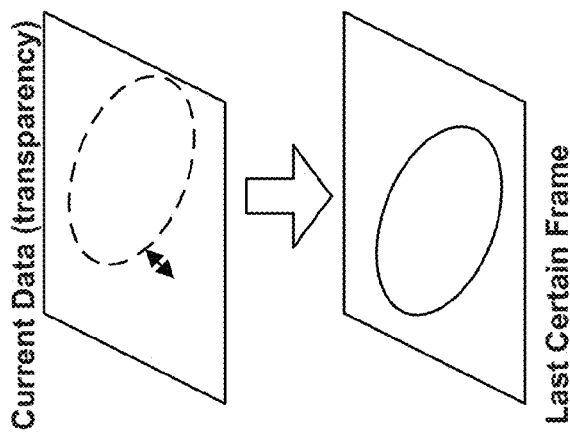
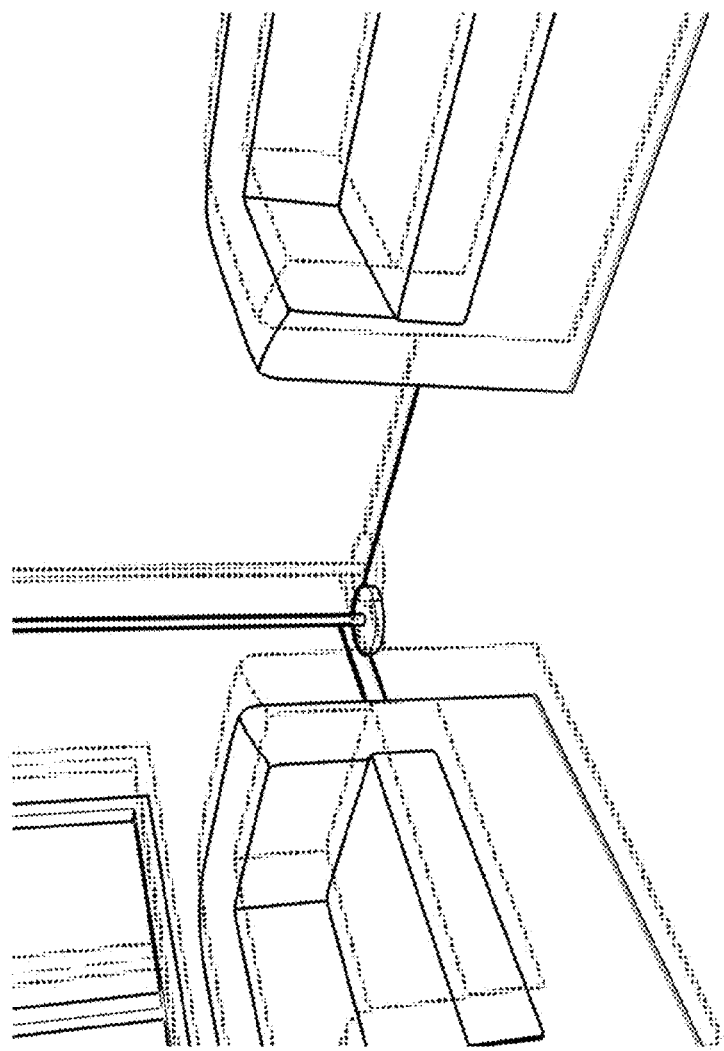
FIG. 62

SYSTEMS AND METHODS FOR AUGMENTED REALITY PREPARATION, PROCESSING, AND APPLICATION

CROSS-REFERENCE TO RELATED APPLICATIONS

This application claims the benefit of and priority to U.S. Provisional Patent Application 62/080,400, filed Nov. 16, 2014, entitled "SYSTEMS AND METHODS FOR AUGMENTED REALITY PREPARATION, PROCESSING, AND APPLICATION" and the benefit of and priority to U.S. Provisional Patent Application 62/080,983, filed Nov. 17, 2014, entitled "Persistent AR: Life-Like Augmented Reality", the contents of each of which are incorporated by reference herein in their entireties for all purposes.

BACKGROUND

Despite the realization of many new and exciting digital technologies, much of the digital world's power remains strictly divorced from physical reality. For example, while the Internet provides ready access to vast stores of information, that information is typically analyzed and assessed without direct reference to the real-world people and objects it may impact. Real world environments are instead indirectly reflected in digital data, a form generally unsuitable for interacting with that environment. Consequently, a user desiring to interface the digital and real-world realms must often convert real-world data into a form manageable by the digital system and vice versa. Measurements are taken by hand and compared with online listings before furniture is purchased. Conversations occur via awkward chat interfaces, forcing participants to adopt artificial protocols and greetings absent from any real-world interaction. Rather than technology adapting to the end user, end users regularly adapt to the technology, developing a facility for keyboards, mice, joysticks, touchscreens and other unnatural interfaces.

The digital-reality divide is not only experienced by end users, but is also felt by developers. For example, as video game designers have no ready means to identify a user's real-world environment, they design their games to be played exclusively within the artificial confines of the user device. Even sophisticated movie studios often resort to placing their actors in complicated and uncomfortable suits to motion capture real-world performances for subsequent manipulation at a digital console.

While some efforts have been made to provide an "augmented reality" (AR) experience, these past efforts typically require that the real-world environment be again adapted to the needs of the technology (rather than the other way around). For example, these applications may require the placement of a real-world beacon, pattern, texture, or physical marker on a surface which an imaging device can then recognize and project synthetic objects upon or in relation thereto. But, as with the methods described above, this approach again imposes demands upon the real-world rather than having the technology adapt to reality.

Ideally, a user or a developer should not adapt their behavior to their technology, but may instead passively and only semi-actively apply their technology in their day-to-day real world activities. Accordingly, there exists a need for systems and methods facilitating a less onerous approach to applying digital resources to real-world situations.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 21 is a pseudocode listing reflecting one possible Estimation Maximization algorithm as may be implemented in some embodiments;

FIG. 24 is a pseudocode listing reflecting one possible Scaling Series algorithm implementation as may be implemented in some embodiments;

FIG. 39 is an example 3D map created with a system implemented in accordance with some embodiments;

FIG. 40 is a pair of screenshots of 3D models taken of furniture using various of the disclosed embodiments;

FIG. 49 is a sequence of conceptual block diagrams illustrating a position of a furniture marker and furniture relative to an AR device as may be implemented in some embodiments;

FIG. 62 is a screenshot of a calibration transparency applied following a data connection disruption as may be implemented in accordance with some embodiments.

Figure 1:
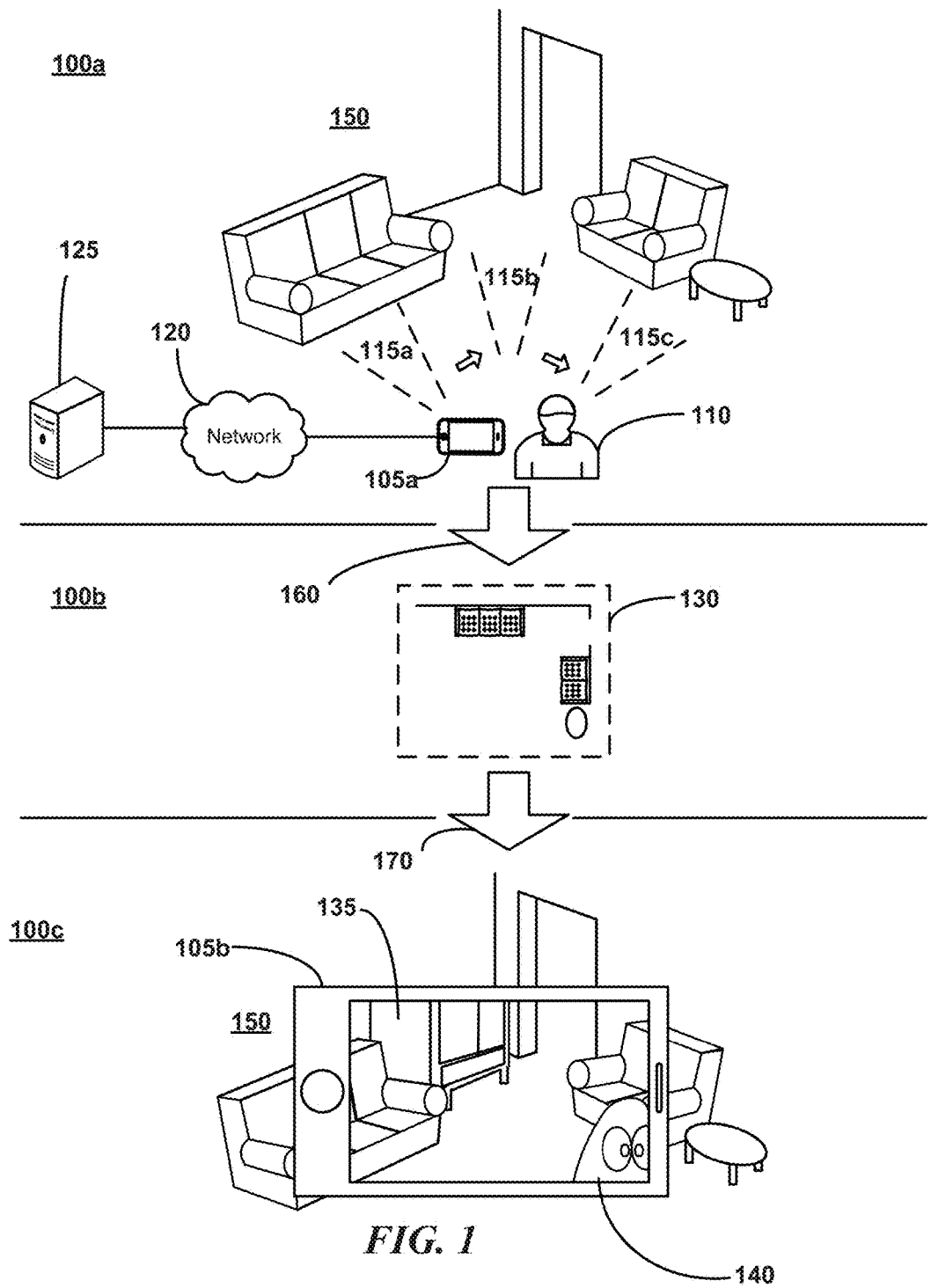
FIG. 1 is a block diagram illustrating an overview of environment data capture, model creation, and model application as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments.

DETAILED DESCRIPTION

Various of the disclosed embodiments provide systems and methods for acquiring and applying a depth determination of an environment in e.g., various augmented reality applications. A user may passively or actively scan a device (e.g., a tablet device, a mobile phone device, etc.) about the environment acquiring depth data for various regions. The system may integrate these scans into an internal three-dimensional model. This model may then be used in conjunction with subsequent data acquisitions to determine a device's location and orientation within the environment with high fidelity. In some embodiments, these determinations may be accomplished in real-time or near-real-time. Using the high-fidelity orientation and position determination, various augmented reality applications may then be possible using the same device used to acquire the depth data or a different device.

Using various of the disclosed embodiments, virtual objects may appear to exist persistently in space and time, just like real objects. For example, a user rotating 360 degrees in a room may encounter a real-world sofa and a virtual character at the same location with each rotation. In order to display these objects faithfully to the user, various embodiments determine: (a) how the camera (e.g., a depth capturing camera such as an RGBD sensor—one will recognize that some embodiments may employ a depth sensor without RGB capture capability) is positioned with respect to the model or some static reference coordinate system ("world coordinates"); and (b) the 3D shape of the surroundings, e.g., so that occlusions (of virtual objects by real, or vice versa) and shadows may be rendered properly. Problem (b) is a challenging problem and presumes in most instances that (a) is already solved. For example, in the past the movie industry has "solved" both (a) and (b) by embedding virtual content into a previously captured real video stream using a team of graphics artists. The artists must manually and laboriously modify the movie frame by frame, inserting images of virtual objects at the correct positions. The artists must draw shadows by hand, anticipate occluded portions of the virtual objects, and can consequently delay the development process by months or by years. In contrast, some of the disclosed embodiments can achieve the same or similar effects in real-time with a video stream as it is received.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

1. Overview—Example System Topology

Various embodiments present systems and methods to generate virtual objects in an augmented reality context (e.g., where a user holds a tablet, headpiece, head-mounted-display, or other device capable for capturing an image and presenting it on a screen, or capable of rendering in a user's field of view or projecting into a user's eyes, but more generally, in any situation wherein virtual images may be presented in a real-world context). These virtual objects may exist persistently in space and time in a fashion analogous to real objects. For example, as the user scans a room, the object may reappear in their field of view in a position and orientation similar to a real-world object.

FIG. 1 is a block diagram illustrating an overview of environment data capture, model creation, and model application as may occur in some embodiments. Initially 100a, a user 110, may scan a capture device 105a (illustrated here as a device similar to that depicted in FIG. 5) about an environment 150. The capture device 105a may include a depth sensor and may additionally include a camera for capturing photographic images (e.g., some suitable devices for various embodiments include a Kinect® sensor, a Senz3D® sensor, ASUS Xtion PRO®, etc.). Generally, a "camera" as referenced herein refers to a device able to capture depth and/or photographic images. As the user 110 moves the capture device 105a, the capture device 105a may acquire a plurality of depth frames 115a, 115b, 115c using the depth sensor. Each depth frame may provide depth values for each point in the capture device's 105a field of view. This raw data may be recorded on the capture device 105a into a data log (including, e.g., depth, RGB, and IMU data) as the user walks through and/or scans the environment 150. The data log may be a file stored on the capture device 105a. The capture device 105a may capture both shape and color information into a form suitable for storage in the log. In some embodiments, the capture device 105a may transmit the captured data directly to a remote system 125 (e.g., a laptop computer, or server, or virtual server in the "cloud", or multiple servers e.g. in the "cloud") across a network 120 (though depicted here as communicating across a network, one will recognize that a portable memory, e.g., a USB memory stick, may also be used). An application running on the capture device 105a or on a remote system 125 in communication with the capture device 105a via a network 120 may integrate 160 the frames in the data log to form a three-dimensional internal model representation 130 (e.g., one or more vertex meshes represented here in a top-down view 100b). This integration, also referred to as "mapping" herein, may be performed on the capture device 105a or on the remote device 125 or on a combination of the two. The capture device 105a may also acquire a photographic image with each depth frame, e.g., to generate textures for the map as described herein.

An augmented reality (AR) device 105b (which may be the same as the capture device 105b) may then use 170 the model 130 in conjunction with incoming depth frame data to present an augmented reality experience 100c. For example, a user may hold the AR device 105b in view of the environment 150. As real-time images are captured of the environment 150 and displayed on the AR device 105b, the AR system may supplement the images with virtual elements (the real-time images may be converted to a textured mesh in some embodiments as described herein). For example, here a virtual piece of furniture 135 appears behind a real-world sofa. Similarly, a virtual character 140 is presented in the scene as though it were standing in the real-world environment (rotating the device to the right and downward may bring the character fully into view). The AR device 105b may have more than one camera (e.g. to provide a stereoscopic experience) and the AR system 105b may modify each separate camera image mutatis mutandis (though the capture device 105a, e.g., may have had only one camera).

The model 130 may also be used in a standalone capacity, e.g., for creating a virtual world mimicking the real-world environment, or for performing measurements of the real-world environment independent of any augmented reality application. Though depicted here in a home environment, one will recognize that the same systems and methods may be applied in other settings, e.g., an office or industrial environments, inside an animal body, etc.

In order to display virtual objects (such as virtual piece of furniture 135 and virtual character 140) faithfully to the user, some embodiments establish: (a) how the camera(s) on the AR device 105b are positioned with respect to the model 130, or object, or some static reference coordinate system (referred to herein as "world coordinates"). Some embodiments also establish (b) the 3D shape of the surroundings, in order, e.g., for occlusions (of virtual objects by real objects, or vice versa) and shadows to be rendered properly (e.g., as depicted for virtual piece of furniture 135 in FIG. 1). Problem (a) is also referred to as the camera localization or pose estimation, e.g., determining position and orientation of the camera in 3D space.

Various of the disclosed embodiments present superior methods for resolving how the camera (eyes) are positioned with respect to the model or some static reference coordinate system ("world coordinates"). These embodiments provide superior accuracy of localization, which mitigate virtual object jitter and misplacement-undesirable artifacts that may destroy the illusion of a virtual object being positioned in real space. Whereas prior art devices often rely exclusively on special markers to avoid these issues, those markers need to be embedded in the environment, and thus, are often cumbersome to use. Such markers also restrict the scope of AR functions that may be performed.

In contrast to the existing AR solutions, many of the disclosed embodiments provide, e.g.: operation in real time; operation without user intervention; display of virtual objects in a correct location and without jitter; no modification of the environment or other cumbersome preparations; occlusions and shadows on-the-fly; presentation to a user in an easy-to-use package (e.g. smart phone, tablet, or goggles); can be produced at consumer-friendly prices; etc. One will recognize that some embodiments may present only some or none of these features.

Figure 2:
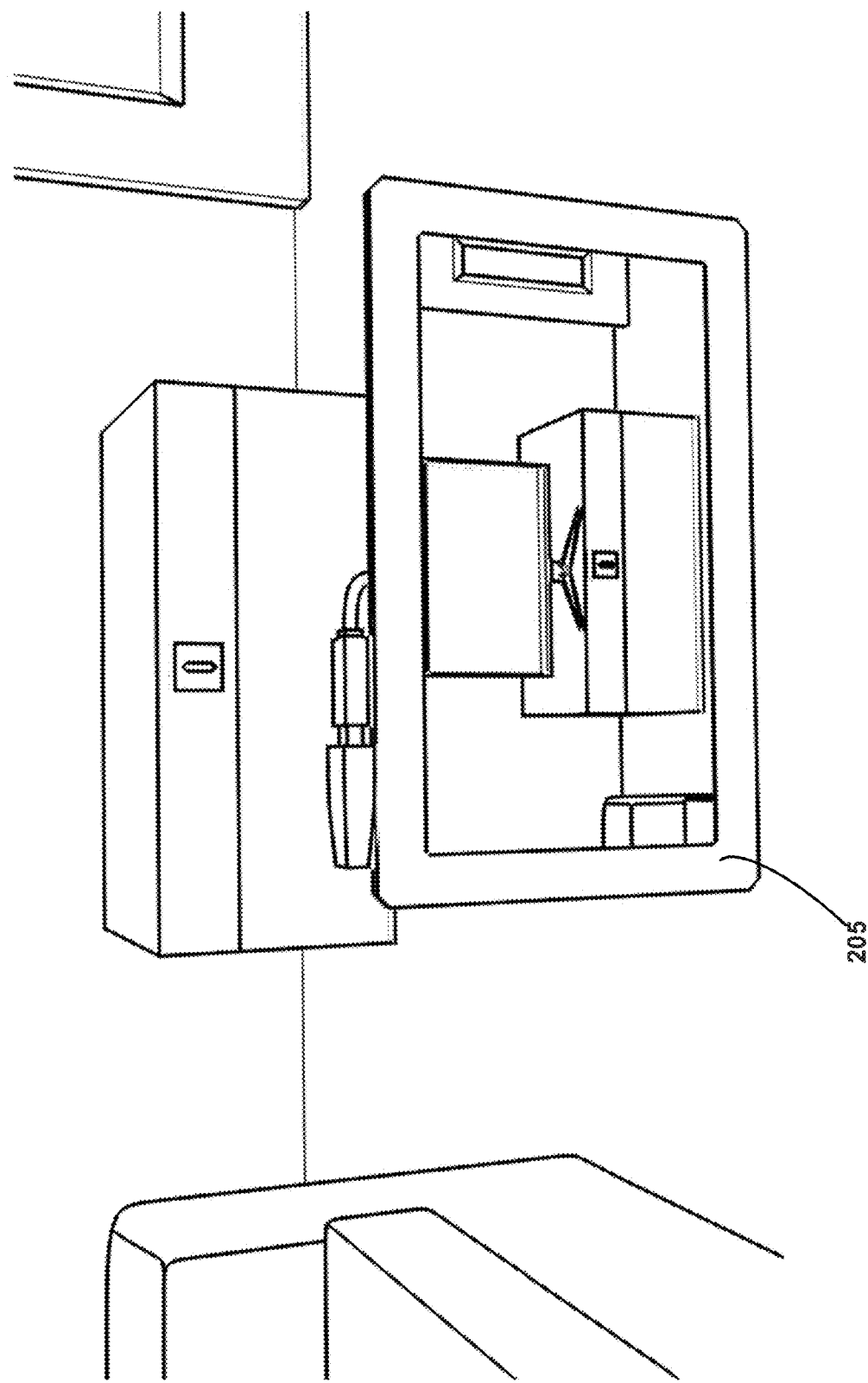
FIG. 2 is a photographic image of an example application, depicting a virtual television in a real-world environment, prepared in accordance with some embodiments.

As an example, FIG. 2 is a photograph of an embodiment in operation, wherein a virtual television playing a home video is depicted in an AR device 205 atop a real-world piece of furniture. The TV does not actually exist in the real-world, but a user viewing their surroundings with AR device 205, may not be able to distinguish between real and virtual objects around them.

Figure 3:
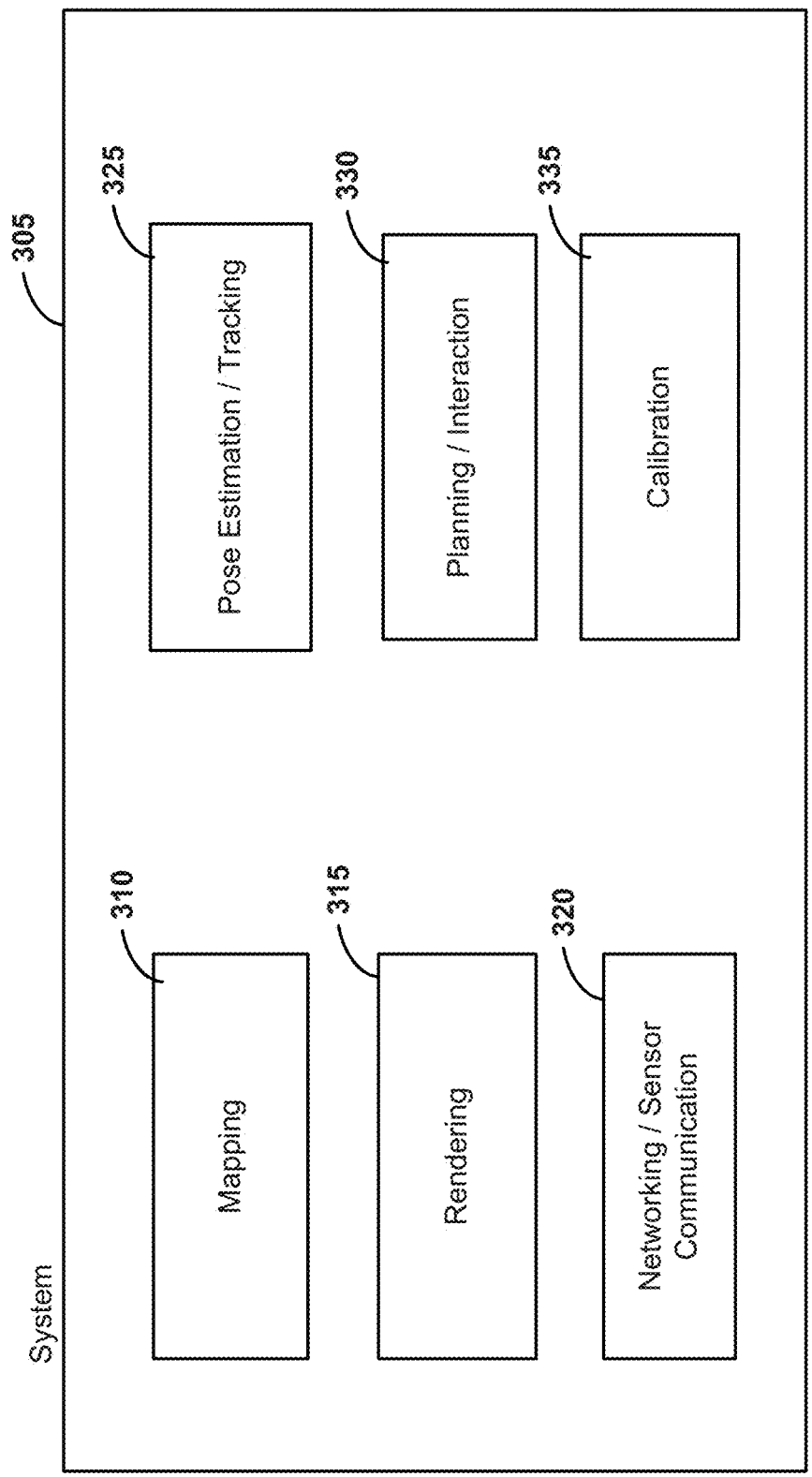
FIG. 3 is a block diagram of various components appearing in a system as may be implemented in some embodiments.

FIG. 3 is a block diagram of various components appearing in a capture and AR system as may be implemented in some embodiments (though the capture and AR systems may exist separately in some embodiments). These operational components may consist of the following sub-systems: mapping 310; pose estimation/tracking 325; rendering 315; planning/interaction 330; networking/sensor communication 320; and calibration 335. Though depicted here as components of a single overall system 305, one will recognize that the subcomponents may be separated into separate computer systems (e.g., servers in a "cloud" network), processing functions, and/or devices. For example, one system may comprise a capture device. A second system may receive the depth frames and position information form the capture device and implement a mapping component 310 to generate a model. A third system may then implement the remaining components. One will readily recognize alternative divisions of functionality. Additionally, some embodiments are exclusive to the functions and/or structures associated with one or more modules.

Similarly, though tracking is discussed herein with reference to a user device to facilitate explanation, one will recognize that some embodiments may implement applications using data captured and processed using the disclosed techniques in alternate form factors. As just one example, depth or other sensors may be placed about a user's house and a device for projecting images on a contact lens provided. Data captured using the disclosed techniques may then be used to produce an AR experience for the user by projecting the appropriate image onto the contact lens. Third party devices may capture the depth frames of a user's environment for mapping, while the user's personal device performs the AR functions. Accordingly, though components may be discussed together herein to facilitate understanding, one will understand that the described functionality may appear across different functional divisions and form factors.

2. Example Workflow Overview

Figure 4:
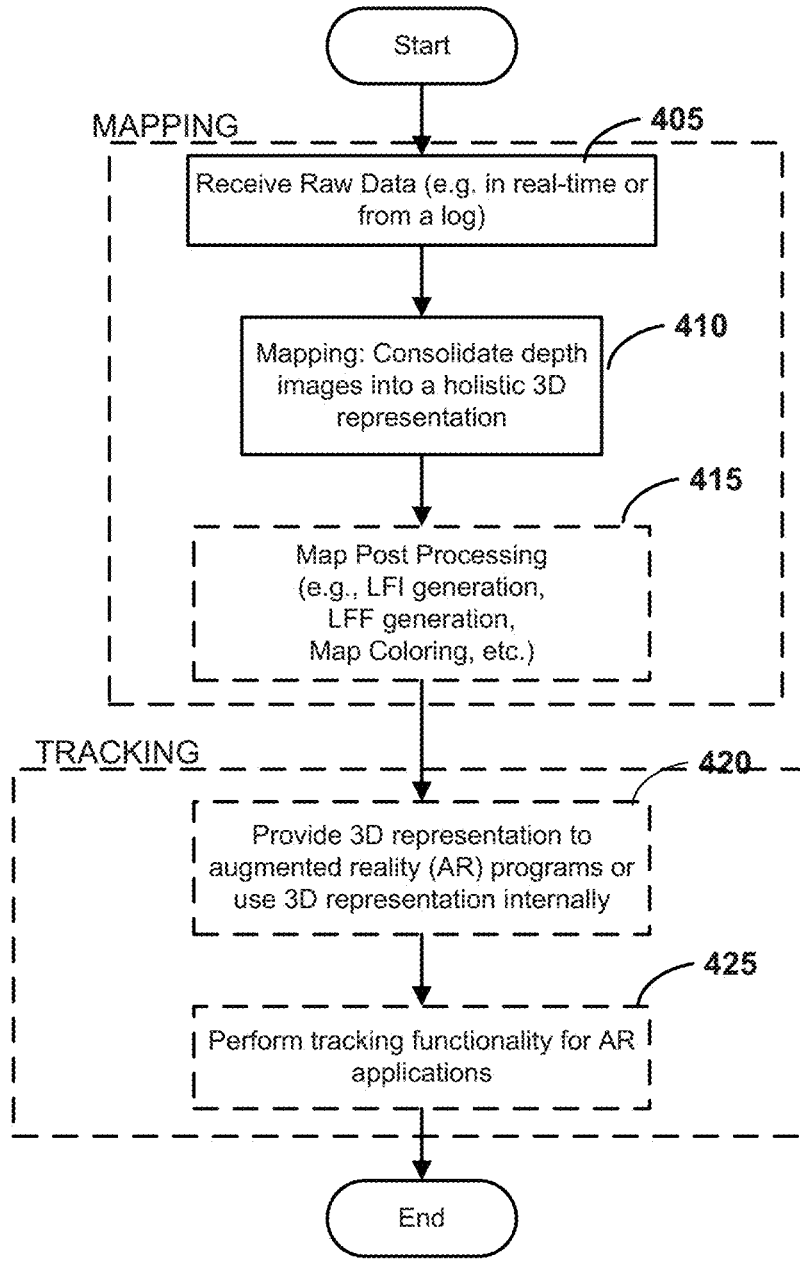
FIG. 4 is a flow diagram generally depicting an overview of various steps in a mapping and tracking process as may be implemented in some embodiments.

Many of the disclosed features are found in the system operations, which may appear as software, firmware, hardware, or a combination of two or more of these (e.g., the implementation could be done on-chip). The general processing and application pipeline may occur as depicted in FIG. 4. At block 405, a mapping system may receive the raw depth frame, image frame, and/or capture device orientation data (e.g., inertial measurement unit data including, e.g., acceleration, gyroscopic, magnetometer data, etc.). This data may be received from a log created by a capture device (previously), or in a real-time delivery from the capture device. The environment may be scanned by a user walking through the environment with the capture device. However, variations where a device moves itself or rotates itself (e.g., where the device is located on a robot or animal) to capture multiple depth frames will also be recognized. The capture device may record location information (accelerometer, and/or gyroscopic, and/or magnetometer, and/or GPS data, encoder data, etc.), a depth frame, and possibly a visual image frame with each capture.

At block 410, mapping generation operations may be performed using the acquired raw data. For example, a mapping system may generate a vertex mesh reflecting the environment based on depth data. In some embodiments, the resulting maps are represented as polygonal meshes with colored vertices or with textures (though other representations, e.g., voxels, will be readily recognized).

At block 415, the mapping system may also apply any desired post-processing operations, e.g., map coloring. Post processing may also involve the creation of data structures facilitating tracking as discussed in greater detail herein. For example, an LFI and an LFF representation of the map may be created (in some embodiments, only one or both of these representations are created and there is no separate vertex "map").

At block 420, the system may provide the 3D representation, e.g., the 3D vertex mesh and/or LFF and LFI structures, to an AR system. For example, a development toolkit may be provided to the AR developer, allowing them to access the 3D representation.

The AR developer's application may also have access to tracking routines at block 425. These tracking routines may allow the AR program to determine the pose of an AR device in the environment represented by the 3D representation. In some embodiments, the mapping sub-system produces 3D models ("maps") of the environment, which may be used during tracking. The generated maps may be highly detailed and accurate. As the user views the environment through the device, the tracking sub-system may compute the precise camera pose in real time. This pose, the 3D model, and other 3D data (e.g., virtual object models), may then be used by the rendering sub-system to display altered environment to the user in real time. Though tracking and mapping are depicted separately here, one will recognize that during tracking the capture frames may be used to perform mapping functions, e.g., to update or augment an existing map.

A planning and interaction sub-system may also use pose, model, and data to compute interactions between virtual and real-world object, to make decisions for virtual characters (e.g., plan trajectories), and to perform other virtual-real-world interactive functionality.

Example applications include: room organization (identifying and highlighting displaced items, e.g., for security, safety, or child development purposes); shopping (e.g., virtual placement to assess furniture before purchase); interior decorator/redecorator; remodeling (e.g., to virtually assess a change to an environment); video games (Real-Time Strategy, First-Person-Shooter, etc.); education (e.g., learning new languages by encountering words in relation to objects in the environment); etc.

3. Example Combined Capture and Augmented Reality Device

Figure 5:
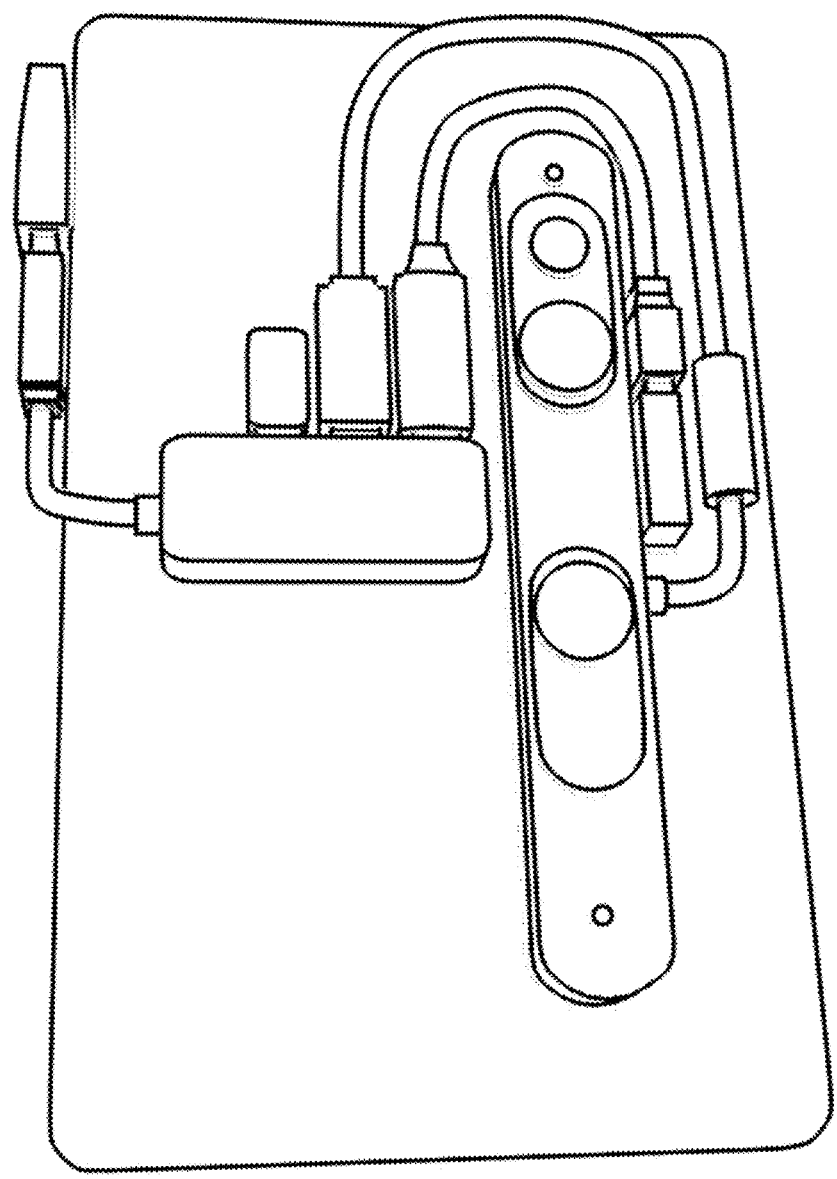
FIG. 5 is a photographic image of an example combined capture and AR device as may be implemented in some embodiments.

FIG. 5 is a photographic image of an example combined capture and AR device as may be implemented in some embodiments. Various embodiments may be implemented using consumer-grade off-the-shelf components. In some embodiments, the AR device consists of a tablet, to which an RGBD camera and optionally an IMU (e.g., as depicted in FIG. 5) have been attached. The camera and IMU may be available in embeddable form, and thus could be fitted inside a tablet in some embodiments. Hence, the device can take on multiple forms, e.g., a tablet, a head-mounted system (AR/VR helmet or goggles), a stand-alone device, or a smart phone. Various of the disclosed embodiments, or aspects thereof, may be implemented in software, hardware, and/or firmware (e.g., a system on a chip, an FPGA, etc.).

Figure 6:
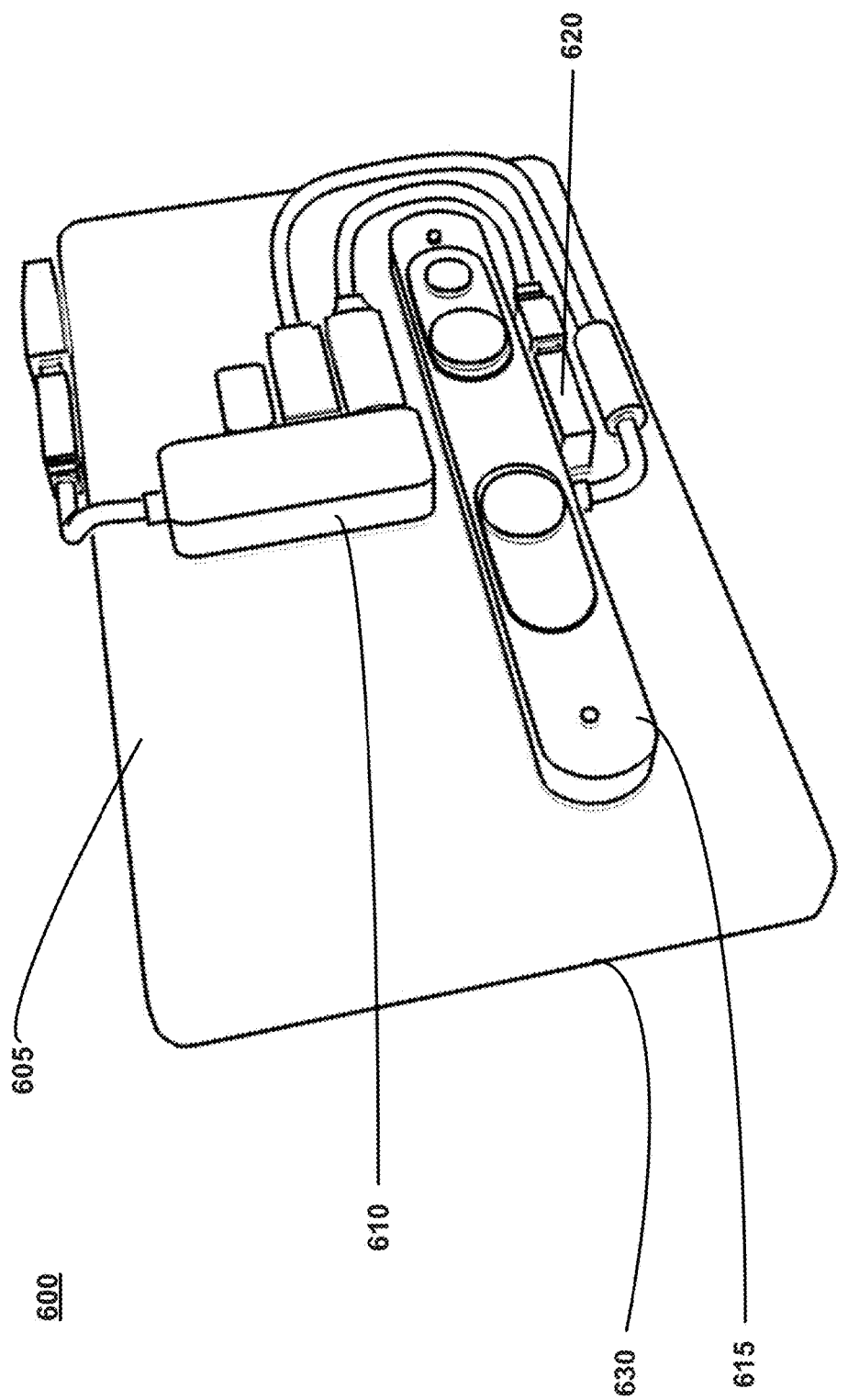
FIG. 6 is another perspective view of example capture and AR device of FIG. 5.

FIG. 6 is another perspective view of example capture and application device of FIG. 5. As depicted, the example device comprises a tablet personal computer 605, with the panel opposite the display attached to a USB hub 610, RGBD camera 615, and an Inertial Measurement Unit (IMU) 620. Though the IMU 620 and camera 615 are here depicted as separate from the tablet's 605 form factor, one will readily recognize variations wherein the IMU 620, camera 615, and tablet personal computer 605 comprise a single form factor. A touch-screen display 630 (not shown) may be provided on the opposing surface of the tablet.

In one example implementation, a Razer Edge Pro® Tablet may be used as the capture and/or AR device. An example RGBD Sensor used for capture and/or for AR may be an ASUS Xtion PRO LIVE® or a Primesense® camera. An example IMU sensor which may be used is a "VectorNav VN100" ®. This example configuration may also include a 4-port USB hub. For computations on a separate device, a Dell Alienware Laptop® (implementing, e.g., a Dual GeForce GTX 880m GPU) may be used.

As mentioned, the capture and AR device need not be the same device as depicted here. For example, a device without a display may be used to acquire the depth frame data. A head mounted display may be used as a combined capture and AR device, or as just one or the other.

4. Concept Summary for Some Embodiments

Figure 7:
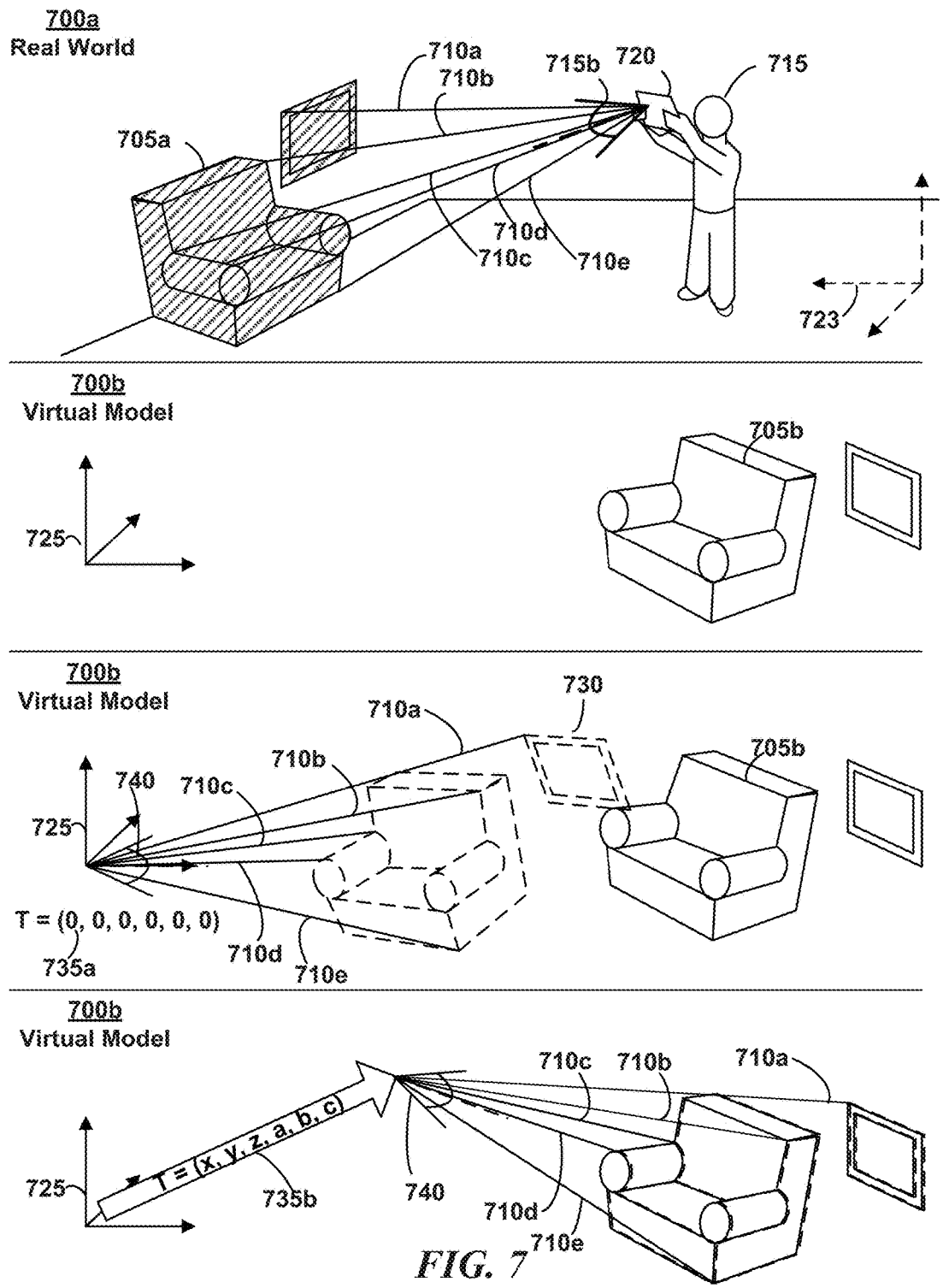
FIG. 7 is a conceptual block diagram illustrating a transform representation of a pose as used in some embodiments.

To facilitate an understanding of the terminology used in this disclosure, FIG. 7 is a conceptual block diagram illustrating a transform representation of a pose as used in some embodiments. Particularly, imagine a situation where a user 715 stood before a chair 705*a* in the real world 700*a*, held a capture device 720 above their head, and captured a depth frame having values 710*a-e* while looking down upon the chair 705*a*.

The user may have previously created, or be in the process of creating, a virtual model 700*b* of all, or a portion, of the real-world environment 700*a*. In this example, the virtual model already includes a virtual representation of the chair 705*b* (e.g., as a TSDF or vertex mesh) which corresponds to the real world chair 705*a*. The virtual representation 700*b* may be stored in a computer. The virtual model has an origin 725 relative to which objects, such as the chair 705*b* may be oriented. While there is no "central frame of reference" in the physical world to facilitate understanding, one may consider a "real-world" coordinate frame having an origin 723. Some embodiments may make a one-to-one correspondence between real-world coordinate frame 723 and virtual coordinate frame 725. Accordingly, they may each be referred to as a "world coordinate frame" variously herein. Thus, relative to the origin 725 of the virtual environment, the representation of the chair 705*b* may be located at the indicated position, which would correspond to where the real-world chair 705*a* is located in relation to the real-world coordinate origin 723 (one will recognize that the particular origin placement in this example is merely to facilitate understanding).

The system may seek to determine the pose of the capture device 720 relative to the world coordinate frame 723 when the depth frame having depth values 710a-e was captured (in some embodiments). This capture device pose may be estimated by fitting or aligning the depth data to the virtual model. To facilitate understanding, assume that the system naively may assume that the depth values 710a-e were generated when the capture device was at the origin 725, in an unrotated position. This may correspond to a naïve transform 735a of the depth values that involves no rotation or translation. As illustrated, this assumption would result in an incorrect alignment 730 of the depth values.

Thus, the system may seek to identify a more appropriate transform 735b of the depth values 710a-e. This improved transform 735b (a translation and/or rotation of the depth frame values 710a-e) will better reflect the position and orientation of the capture device 720 relative to the virtual coordinate frame 725, which would serve as an estimate of the transform between the pose of the device 720 and world coordinate frame 723, when the depth frame with values 710a-e was captured 700a. As the "transformation" represents the transformation between the pose 740 of the device 720 and the world coordinate frame 723 and 725, the terms "pose" and "transform" are used interchangeably herein.

Thus, though the icon 740 may be used herein to refer to a "pose", one will recognize that the "pose" may also be represented as a transform, e.g., relative to a world coordinate frame, or any other suitable coordinate frame. Camera poses may be represented by rigid transformations in 3D with respect to the world coordinate frame. A starting pose may be referred to as $T_0$ herein and a camera pose at time t by $T_t$.

Figure 8:
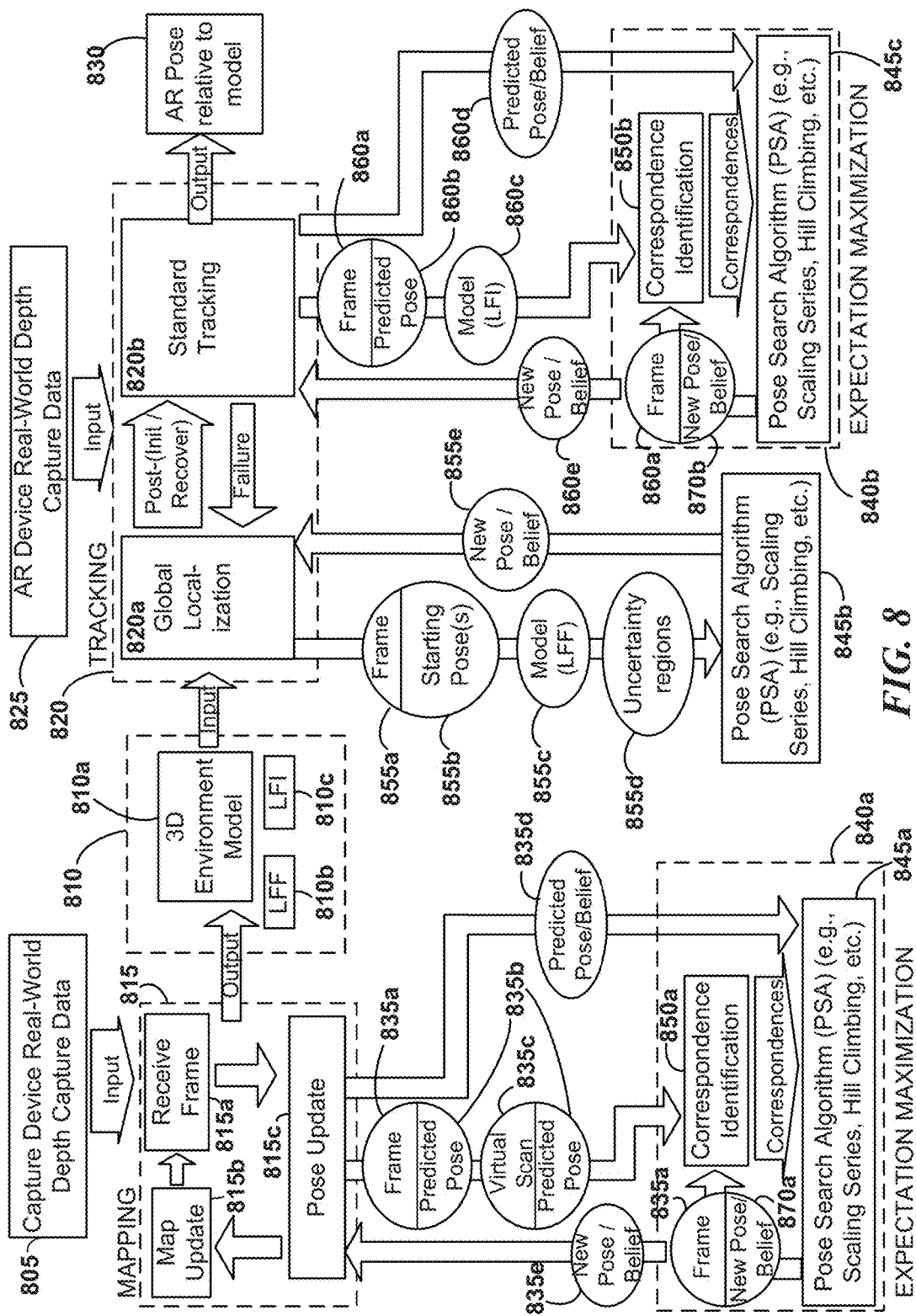
FIG. 8 is a conceptual block diagram of the relations between various concepts relevant to some embodiments.

FIG. 8 is a block diagram of the relations between various concepts relevant to some embodiments. Generally, at a high level, depth capture data 805 from a capture device may be provided in a log file or in real time to a mapping system 815. The mapping system may generate a plurality of outputs 810, e.g., a 3D model 810a (such as a vertex mesh) of the environment, an optimized LFF representation 810b, and an optimized LFI representation 810c (e.g., as described in greater detail herein, either initially or during post-processing).

These outputs 810 may be used by a tracking system 820. During an AR session, an AR device may provide real-world depth information 825 (e.g., a depth frame taken when the AR device is in some pose in the real world) to the tracking system 820. The tracking system 820 may then determine a pose of the AR device relative to the 3D model 810a corresponding to the AR device's real-world pose based upon the depth data 825. The tracking system 820 may provide this pose information as output 830 to the AR application.

Tracking system 820 may include a Global Localization system 820a and a Standard Tracking system 820b ("Standard" here referring to the frequently repeated character of some operations in some embodiments, rather than any preexisting standard of operation known in the art). The Global Localization system 820a may, e.g., be used to determine the AR device's pose relative to the model when the AR device is first used in the environment (e.g., when the first frame is received) or when the AR device is lost (e.g., when the user relocates the device more quickly than expected to a new pose, or if the sensor was covered or too close to an object for the sensor to receive appropriate depth data, or the data is misleading). One will recognize that Global Localization may be used for other purposes as described herein (e.g., for standard tracking operations, in instances where a dynamics model is unavailable, etc.). Following initialization, standard tracking operations may be performed in the Standard Tracking system 820b. These standard tracking operations may result in the generation of the AR pose data 830.

The Mapping system 815 may be composed of a Map Update process 815b and a Pose Update process 815c. The Pose Update process 815c and the Map Update process 815b may be applied iteratively as frame data 815a is considered (e.g., as frame data is pulled from a stored log or as the frames are generated at a capture device). The Map Update process 815b may construct a map representation (e.g., a TSDF representation) while the Pose Update process 815c determines a proper pose relative to the incomplete map at which to consider the incoming frame data 815a. The first Map Update may be performed from a default, or user-specified pose, rather than using the Pose Update determined pose.

Both the Mapping system 815 and the Tracking system 820 each may refer to a Pose Search Algorithm (PSA) 845a, 845b, 845c (Scaling Series is one example of a PSA, but other examples, e.g., Hill Climbing or Optimization Search will be recognized) to identify a new pose (e.g., a transform) 835e, 855e, 860e (also referred to as a "final pose" in various instances herein) which more correctly places the depth frame data with respect to the virtual representation (and, by correspondence, the correct position in the real-world coordinate frame). For example, the "predicted pose" 835b, 860b may be the system's initial, approximate pose (e.g., the most likely pose for the predicted belief as discussed in greater detail herein) for the frame data in the virtual environment. The PSA 845a, 845b, 845c may determine a more appropriate rotation and translation based on this estimate. Though depicted separately here, in some embodiments two or more of PSAs 845a, 845b, 845c may be the same PSA (and may be implemented using the same hardware/firmware/software). In some embodiments, the belief of the pose 835d and 835e may be a probability distribution, referred to herein as a "belief" (e.g., a distribution of probabilities across a corpus of candidate pose transforms). In some embodiments (e.g., where the PSA is a hill climber), the belief 835d and 835e may instead be represented by a single transform. This single transform may be the pose used to create the virtual scan 835c and the predicted pose for the frame 835a (for use by, e.g., correspondences). Where a probability distribution is used, e.g., the most likely candidate transform may be used as the pose to create the virtual scan 835c (e.g., if the belief is represented by a Gaussian probability distribution, the most likely pose would be the mean). As discussed herein, the belief may be represented by a particle system. When using a belief represented, e.g., by particles, samples, grids, or cells, it may be possible to select a single transform in many ways. For example, one could take the highest weighted particle (if weights are available), take the mean of some or all particles, use a Kernel Density Estimation to determine most likely pose, etc.), etc. Where poses are used directly, rather than derived from a belief, in some embodiments, the poses may be accompanied by "search regions" directing the PSA where and/or how to limit its search.

Similarly, the belief 860d used in Standard Tracking may also be represented by a single transform or distribution, and this transform, or the most likely candidate of the distribution, may also be used as the predicted pose 860b. In some embodiments (e.g., as discussed in greater detail herein below), the belief 835d and 835e may be represented as a collection of regions of possible poses and their likelihoods as derived, e.g., from a dynamics model (using IMU data, timestamps, etc.), or as determined by PSA.

The Pose Update process 815c and the Standard Tracking process 820b may apply the PSA 845a, 845c as part of an Expectation Maximization (EM) process 840a, 840b. The EM processes 840a, 840b may iteratively refine an intermediate belief and/or pose determination 870a, 870b (derived initially from the belief and/or predicted pose 835b, 835d, 860b, 860d—again the pose 835b is the same as, or derived from pose/belief 835d and pose 860b is the same as, or derived from pose/belief 860d) to determine a refined, final pose/belief to be returned 835e, 860e. The "expectation" refers to the correspondence identification process 850a, 850b which may determine correspondences between the frame data and the model data (either virtual scan 835c or the model 860c) using the most recent pose determination 870a, 870b. The "maximization" may refer to the application of the PSA 845a, 845c to identify a more refined belief and a more appropriate pose 870a, 870b with which to perform the correspondence. Hence, one "maximizes" (e.g., improves) the alignment of the depth data to the model given "expected" pose correspondences. Again, though they are depicted separately here the EM processes 840a, 840b may be the same, or implemented on the same device, in some embodiments.

In contrast to the EM systems, the Global Localization process 820a may refer directly to a PSA 845b without seeking an iteratively determined optimal fit or fixing the correspondences prior to running the PSA. This may be because Global Localization process 820a seeks to find the pose when considering large portions of the model—attempting to find a correspondence between the frame data and the model as a whole may be unuseful. As described in greater detail herein, an LFF data structure may already reflect relations between "corresponding" points.

With regard to the Pose Update process 815c, the Pose Update process 815c may generate a depth frame representation of the incomplete map construction called, herein, a virtual scan 835c. The virtual scan 835c may be generated from the perspective of a predicted pose 835b. Initially, the current frame depth data 835a may also be assumed to be taken at the predicted pose 835b (e.g., as the system in FIG. 7 naively assumed the data was taken at the origin, though the predicted pose 835b may be a much better estimate in many embodiments).

The virtual scan 835c, predicted pose 835b, and frame depth data 835a may be provided to the correspondence identification process 850a. The frame depth data 835a may be subsampled in some embodiments.

In some embodiments, any points/pixels contained in a "border" area (around the edge of the captured depth image, where the edge could be of some pixel width, e.g., constant, or some distance after skipping any part of the edge where there are no pixels containing depth data, etc.) may be filtered out, or removed from consideration, and hence not considered by the correspondence identification 850a process. This would reduce the amount of previously unseen "new data" appearing in a depth frame relative to a previously acquired and processed depth frames. Note that border filtering may be applied to the frame depth data during Correspondence Identification 850a during Pose Update 815c process, but need not be applied during Map Update 815b, or Standard Tracking Correspondence Identification 850b in some embodiments.

The process 850a may determine which depth values in the virtual scan 835c correspond to the depth values in the frame data 835a (as depth "values" correspond to "points" in space in accordance with their pixel position, the terms depth values and depth points may be used interchangeably herein). Given these correspondences, the PSA 845a may seek a pose (and refined belief in some embodiments) 835e for the frame data 835a that brings the corresponding points closer together.

The PSA 845a may use the predicted belief/pose to constrain its search. The determined pose 870a may then be used in the next correspondence determination to better identify corresponding depth points in the virtual scan 835c and in the frame data 835a. This process 840a may continue until a best resulting belief and determined pose 835e is generated. Note that the virtual scan 835c remains as a representation at the predicted pose 835b in each iteration, but the frame data 835a is reconsidered at the new most likely pose 870a during each EM iteration.

With regard to the Standard Tracking process 820b, some embodiments may generate a virtual scan 835c, and for some embodiments the Standard Tracking process 820b may, instead of generating a virtual scan, or in addition to creating a virtual scan, have access to a model of the environment, e.g., in an LFI representation 860c. A recently captured frame 860a, a predicted pose 860b, and the LFI representation 860c may be provided to the correspondence identification process 850b to identify points in the model 860c corresponding to the frame depth values 860a. The frame 860a may be subsampled in some embodiments. Given these correspondences, the PSA 845c may seek a pose (and in some embodiments, a refined belief) for the frame data 860a that brings the corresponding points closer together. Again, the PSA may make this determination with reference to the predicted pose/belief 860d. The determined pose 870b may then be used in the next correspondence determination to better identify depth values in the LFI representation 860c corresponding to the depth values in the frame data 860a. This process 840b may continue until a best determined pose/belief 860e is generated. Like the virtual scan, the LFI representation 860c does not change with each iteration.

With regard to the Global Localization process 820a, the Global Localization process 820a seeks to determine the AR device's pose relative to the entire model. As the model may be large, a low fidelity determination may be made by the Global Localization process 820a (and a subsequent high fidelity determination made later by the Standard Tracking process 820b). In some embodiments, the frame data may be subsampled for each of the Pose Update, Global Localization, and Standard Tracking operations, though the frame data may be subsampled to a greater degree for Global Localization as compared to Pose Update and Standard Tracking.

Global Localization process 820a may provide a frame 855a to the PSA 845b. When the AR device initializes, frame 855a may be the first frame captured. When the device is lost, or unsure of its pose, frame 855a may be the last viable frame that was captured. The frame 855a may be subsampled to speed the search process. The frame 855a may be associated with one or more "starting poses" 855b and uncertainty regions 855d. In some embodiments, the starting search poses 855b may have been determined when the model was generated (e.g., the Mapping system 815 may have identified rooms and placed a starting pose at the center of each room). The starting poses 855b may be considered sequentially or in parallel as discussed in greater detail herein by one or more PSA 845b instances. An LFF representation 855c of the model may also be provided to PSA 845b. A single uncertainty region 855d covering the entire model may be used in some embodiments, or multiple uncertainty regions 855d large enough such that the union of the starting poses with their corresponding uncertainty regions 855d will cover the entire model. The PSA 845b may identify a belief and a most likely pose 855e that relocates the frame data 855a to a position better matching the LFF model 855c data. Where multiple PSA instances are applied, e.g., in parallel (e.g., one instance for each starting pose), the Global Localization process 820a may select the best of the resulting poses 855e and, in some embodiments, the corresponding belief, or in other embodiments the combined belief.

One will recognize variations to the figure for various embodiments. For example, some embodiments do not apply Expectation Maximization for the Pose Update and Standard Tracking. In these instances, each of the Pose Update, Standard Tracking, and Global Localization may reference a PSA directly.

Figure 9:
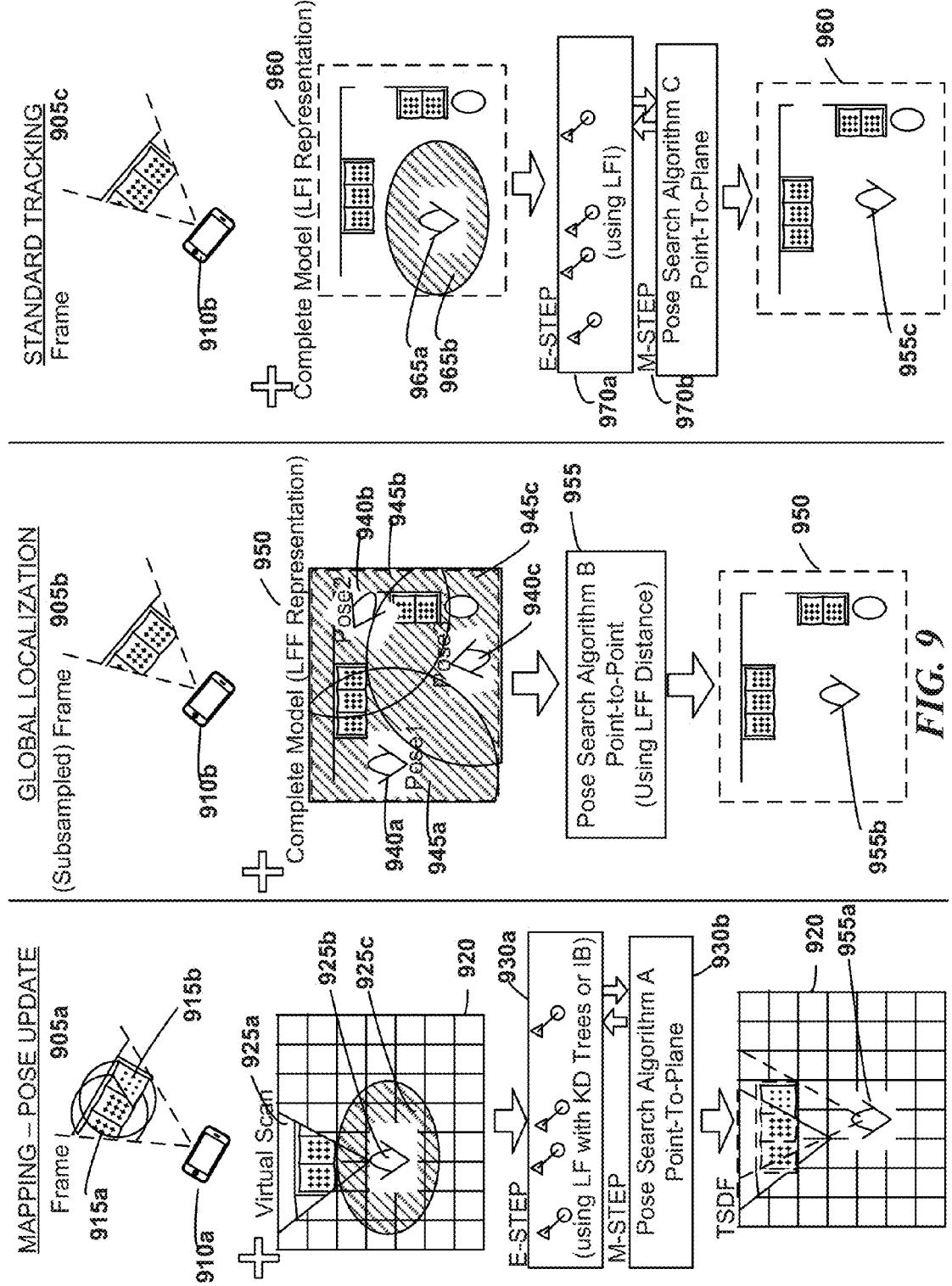
FIG. 9 is a series of inputs, configurations, and outputs as may be applied to a Pose Search Algorithm (PSA) for Mapping, Standard Tracking, and Global Localization, as may occur in some embodiments.

To facilitate a visual understanding of the Pose Update, Global Localization, and Standard Tracking's use of their respective PSAs, FIG. 9 reflects a series of inputs, outputs, and configurations as may be applied in some embodiments. With respect to the Pose Update in the Mapping process, a frame 905a of depth values in the field of view of a capture device 910a may be provided to an EM process comprising an E-step 930a (correspondence determination) and an M-Step 930b (application of the PSA to find an improved belief and its most likely pose). The frame 905a may include depth values 915a corresponding to previous captures which are now represented in an intermediate representation 920 (e.g., a TSDF structure described in greater detail herein), as well as new depth values 915b which are not yet represented in intermediate representation 920. In addition, a virtual scan 925a construction of the incomplete model 920 using a predicted pose 925b (which, e.g., could be the highest probability pose in the predicted belief 925c) may be provided to the EM process. In some embodiments, a predicted belief 925c may also be provided to the EM process, for example, to the PSA applied in the M-Step. The PSA 930b may apply a Point-to-Plane metric as described in greater detail herein to determine an updated belief and a most likely pose/transform. The correspondences may be implemented, e.g., using LF with KD-trees, or with IB. The EM process may then identify a final pose 955a relative to the incomplete model 920. The new data points in the data frame may then be used to supplement the incomplete model 920.

Global Localization may also provide a frame 905b from an AR device 910b (though the frame may be subsampled relative to frames 905a and 905c). The Global Localization system may also provide a plurality of starting poses 940a, 940b, 940c and corresponding uncertainty regions 945a, 945b, 945c which may together cover the entirety of the map model. The model 950 may be provided as an LFF representation which may be used in a Point-to-Point metric by the PSA 955 as described in greater detail herein. The PSA may then compute the resulting belief and use the most likely pose as a final pose 955b relative to the model 950.

With regard to Standard Tracking, Standard Tracking may also provide a frame 905c from an AR device 910b (e.g., a same device as was used for all or part of Global Localization) to an EM process comprising an E-step 970a (correspondence determination) and an M-Step 970b (application of the PSA to find an improved belief and pose). The Standard Tracking system may also provide a predicted belief 965b and its most likely pose as the predicted pose 965a to the EM process. The model may be provided as an LFI representation 960 to the EM-process. The EM-process may then identify a final belief and its most likely pose 955c relative to the model 960.

5. Mapping

Figure 10:
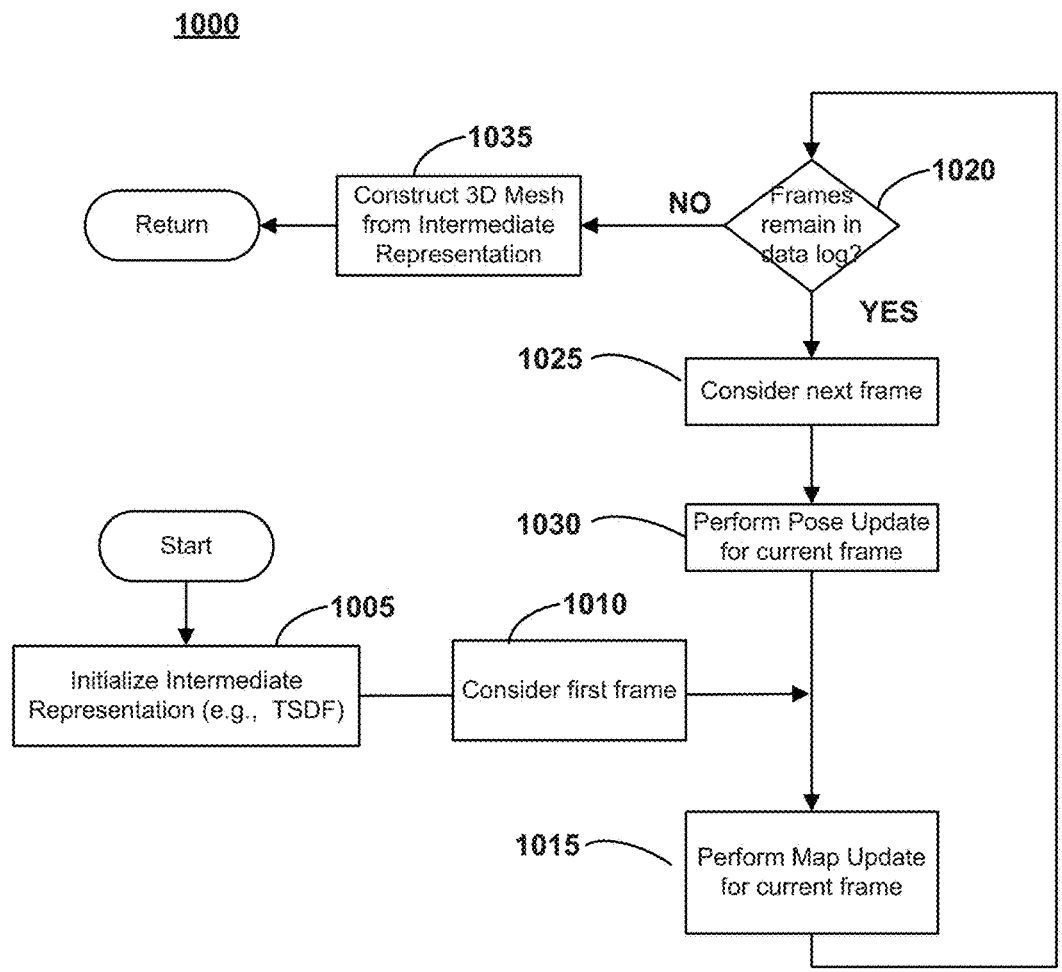
FIG. 10 is a flow diagram generally depicting various steps in a Mapping process to create a model of an environment (e.g., a Truncated Signed Distance Function (TSDF)-based representation) as may be implemented in some embodiments.

The Mapping system produces 3D models (maps) of the environment. The maps may be very accurate to facilitate subsequent operation. FIG. 10 is a flow diagram generally depicting an overview of various steps in a map creation process, e.g., as may occur at block 410 of FIG. 4. In some embodiments, the mapping system uses a Bayesian filter algorithm, e.g., a simultaneous mapping and tracking (SLAM) algorithm, which builds a map based on the camera's pose with respect to the environment. The SLAM method may perform estimation iteratively over the incoming depth frames. Each iteration may consist of a camera Pose Update (e.g., as depicted at block 1030) and a Map Update (e.g., as depicted at block 1015), though the first frame 1010 may be directly applied to the Map Update in the first instance as indicated.

In some embodiments, the mapping system may use an "intermediate" representation when generating the map and may convert this intermediate representation to a final form when finished. For example, in FIG. 10 the first frame 1010 may be, e.g., the first frame in a data log or a first frame as it is acquired real-time from a capture device. The intermediate representation may be, e.g., a truncated signed distance function (TSDF) data structure (though one will readily recognize other suitable data structures). However, for purposes of explanation, most of the examples described herein will be with respect to TSDF.

At block 1015, the system may perform a Map Update and update the internal representation, e.g., a TSDF representation, with a frame's data. Initially, all the lattice points in the TSDF (also referred to as "cells" or "cell corners" in some instances) may be initialized to a default value at block 1005. Applying the Map Update process may adjust some of the TSDF lattice points to reflect a frame's depth data. The details for these updates are described in greater detail herein, e.g., in the section with numerical identifier #7 and any corresponding subsections. In some embodiments, to assist with the first frame positioning, the IMU down vector (as measured, e.g., by accelerometers in the captured device) may be aligned with the Z axis. The floor plane may then be extracted using, e.g., techniques described below. The normal of the floor plane may then be aligned with the Z axis. Rotation around the Z axis as well as 3D translation can be adjusted manually if needed in some embodiments.

While frames remain to be considered at block 1020, the system may consider the next frame at block 1025. The system may then perform a Pose Update at block 1030. For example, during the initial Map Update at block 1015 the system may rely upon an arbitrary pose for applying the depth frame data to update the TSDF. During subsequent iterations, however, the incoming depth data should be aligned properly relative to the previous TSDF updates. Accordingly, the Pose Update 1030 can improve a camera pose estimate for this frame. The TSDF may then be updated at the Map Update 1015.

Once all, or a sufficient number (e.g., to complete a model), of frames have been considered at block 1020, at block 1035 the system may build a 3D mesh out of the TSDF representation, or construct other representations, such as an LFF and/or LFI as discussed in greater detail herein.

6. Mapping—Map Update—Graphical Overview

Figure 11:
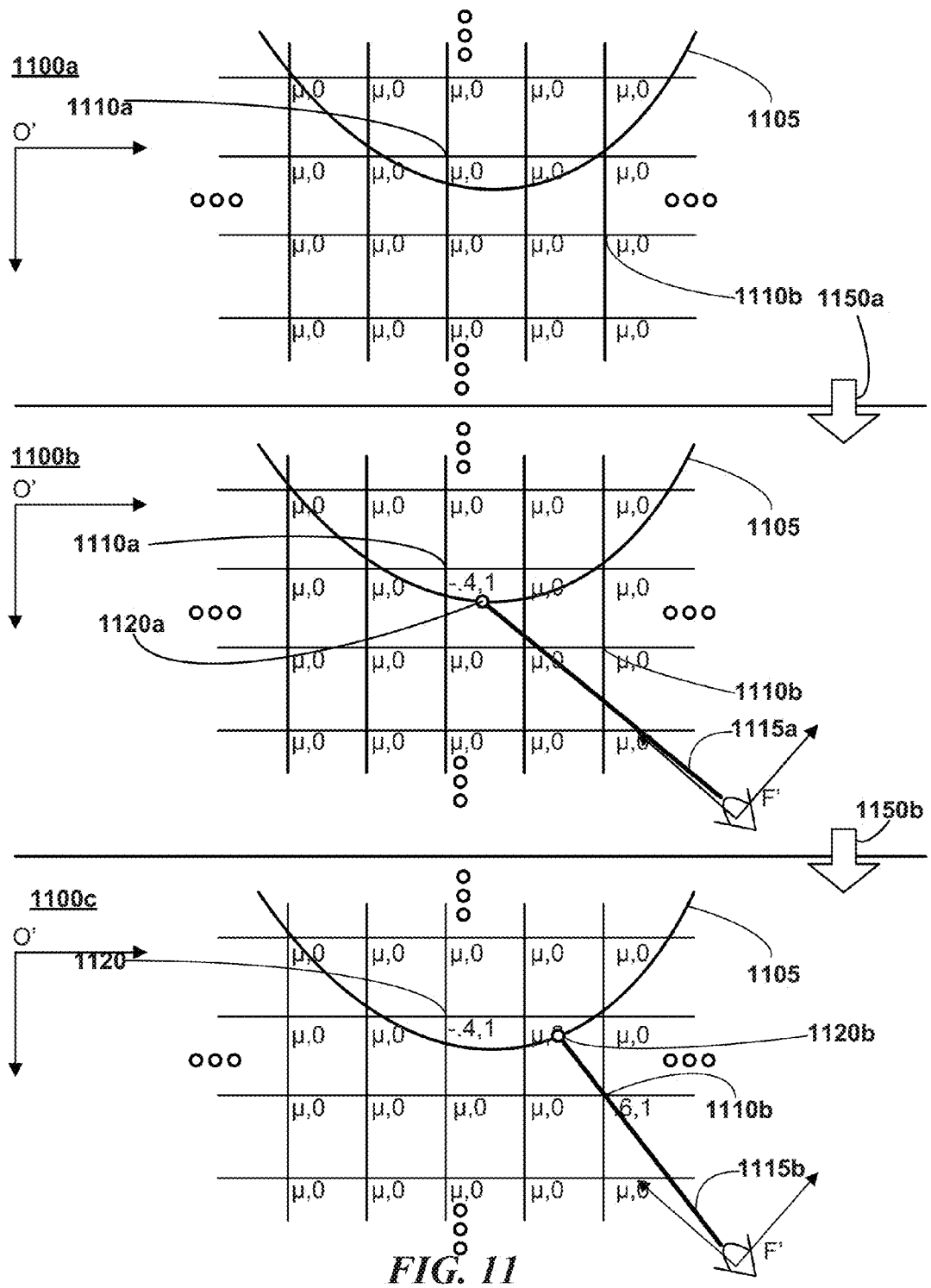
FIG. 11 is an exemplary two-dimensional grid depicting an idealized iterative TSDF creation procedure (e.g., in a Map Update) for purposes of explaining a higher-dimensional approach which may be applied in some embodiments.

FIG. 11 is a grid generally depicting an iterative TSDF creation procedure during the Map Update as may be applied in some embodiments. Though depicted here in two dimensions to facilitate understanding one will readily recognize the application mutatis mutandis in three dimensions. The TSDF is a 3D volumetric grid, where the value of each lattice point is the estimated signed distance d to the map surface. Details regarding an example implementation of a related TSDF structure may be found in B. Curless and M. Levoy, "A volumetric method for building complex models from range images," in Proceedings of the 23rd annual conference on Computer graphics and interactive techniques, pp. 303-312, ACM, 1996. Note that d can be negative for lattice points inside of objects and walls and positive for lattice points in free space. The distance may be truncated to a maximum value of μ. The distance may be computed as a rolling weighted average of distance measurements obtained from different frames of data. To facilitate this computation, each lattice point (e.g., each intersection point in the grid of FIG. 11) may store the cumulative weight w of all prior observations. The mapping system of various embodiments may initialize a TSDF structure prior to use, e.g., at block 1005.

At state 1100a the grid may include a plurality of "lattice points" (though other representations may be used, e.g., one could simply refer to the values as corners of cells) initialized with distance and weight values of μ and 0 respectively. The grid may correspond to a real world environment. In the real world, an object 1105 (e.g., a pillar) may overlap the grid intersections as indicated. For example, a lattice point 1110a may fall within the object 1105, but the lattice point 1110b may fall outside the object 1105.

As an example iteration of the Map Update, the Map Update may select a lattice point (e.g., point 1110a). The Map Update may then generate 1150a the TSDF configuration 1100b by updating the lattice point 1110a. For example, the Pose Update may have provided a transform for converting the pose F' at which the depth frame was captured to the coordinate system O' of the TSDF. By, e.g., applying the inverse of this transform to the lattice point 1110a one can then determine which pixel in the depth camera the lattice point 1110a falls into. A ray 1115a emanating from this pixel, as reflected by the depth value associated with the pixel, will be incident on the surface 1105 at the position 1120a. As indicated, because the lattice point 1110a is within the surface a negative distance may be determined (−0.4) from the position 1120a to the lattice point 1110a. The weight for the lattice point 1110a may be adjusted to 1 as indicated here, or to another value based upon the weighting variations discussed herein.

The system may then consider a next lattice point in the TSDF, e.g., the lattice point 1110b and generate 1150b the TSDF configuration 1100c by updating the lattice point 1110b. As indicated, a new ray 1115b corresponding to a new pixel and depth value 1120b may be determined to be closest to this lattice point 1110b (e.g., by applying the inverse of the transform T determined by the Pose Update to the lattice point). One will recognize that a same ray may be used to update some lattice points. Here, because the lattice point 1110b is outside the surface 1105, a positive distance (0.6) may be determined. A new weight (1) may also be calculated.

Thus, for each Map Update the system may iterate over all the TSDF lattice points, updating their values based upon the Pose Update transform and the frame depth values.

7. Mapping—Map Update—Flow Diagram

As mentioned, the TSDF is a 3D volumetric grid, where the value of each lattice point in the grid (or cell corner, in some embodiments the value of non-lattice points is the interpolated value from the surrounding lattice points) is the estimated signed distance d to the map surface (e.g., to the surface of an object). Note that d can be negative for lattice points inside of objects and walls and positive for lattice points in free space. The distance may be truncated to a maximum value of μ. The distance may be computed as a rolling weighted average of distance measurements obtained from different frames of data. To facilitate this computation, each lattice point (e.g., each intersection point in the grid of FIG. 11) may store the cumulative weight w of all prior observations. Then, given a new distance observation $d_{new}$ with weight $w_{new}$, the lattice point value can be updated as $$d = \frac{dw + d_{new}w_{new}}{w + w_{new}} \quad (1)$$

$$w = w + w_{new} \quad (2)$$

Initially, all the lattice points may be initialized with d=μ and w=0.

Figure 12:
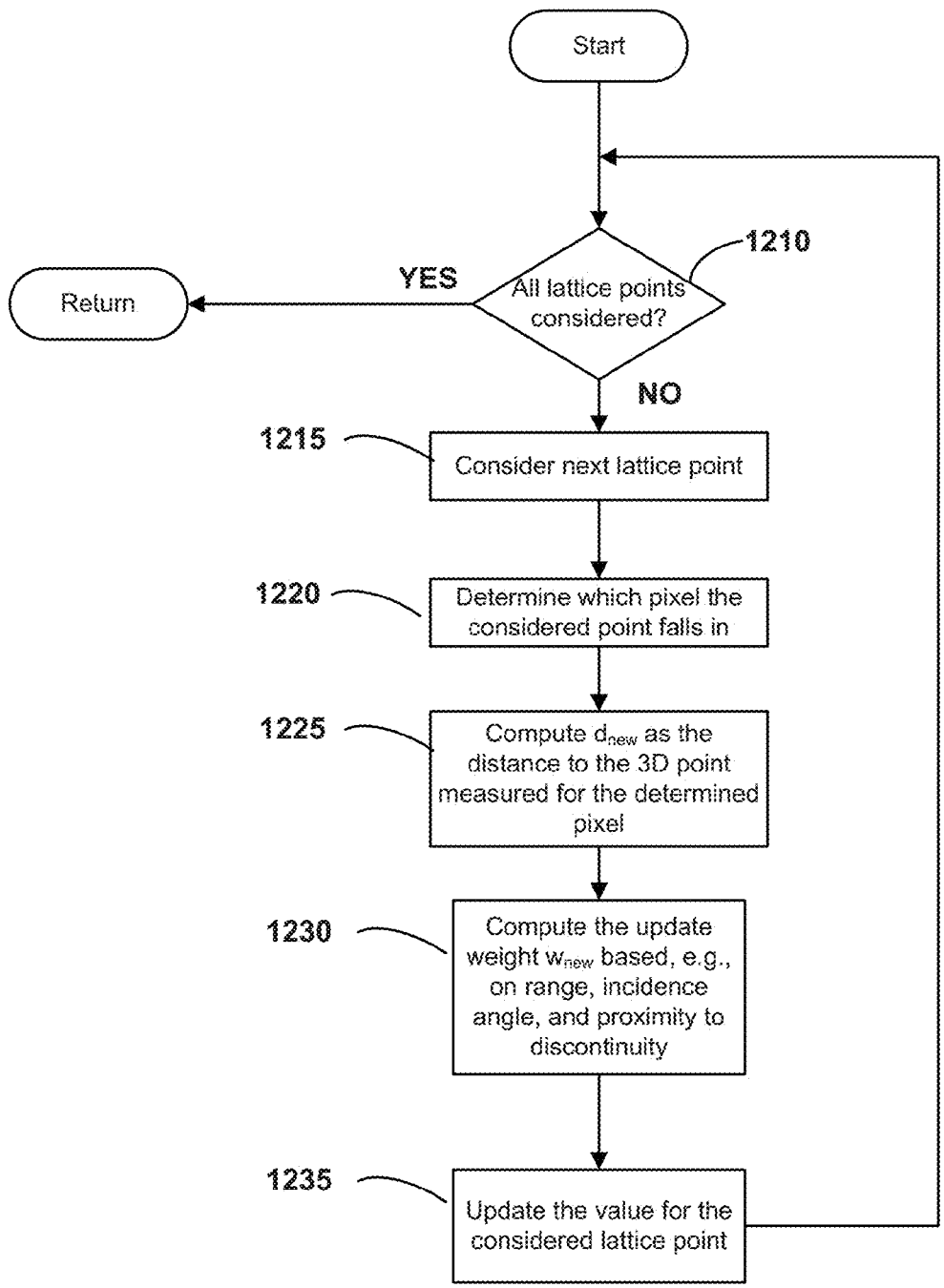
FIG. 12 is a flow diagram generally depicting various steps in a Map Update process for a TSDF creation procedure as may be implemented in some embodiments.

More explicitly, following the Pose Update in some embodiments, the TSDF may then be updated, e.g., as provided in FIG. 12. Given a frame of data F, the frame's 3D pose T (determined, e.g., via Pose Update or arbitrarily for the first frame), and a camera model (CM). The CM may take a 3D point in local camera coordinates and provide pixel coordinates for that point, representing which pixel the 3D point would fall into. The CM may also provide the opposite transformation, e.g., given a pixel and depth the CM can provide a 3D point in local camera coordinates. Using the CM the system may determine which pixel corresponds to a lattice point (e.g., determining the ray 1115a associated with the lattice point 1110a).

At block 1210, the system may determine if additional lattice points remain to be considered. If lattice points remain, the next lattice point may be considered at block 1215. At block 1220 the system may determine which pixel this lattice point corresponds to (e.g., which ray the depth value is associated with). At block 1225, the system may compute $d_{new}$ as the distance between the 3D point measured for this pixel and the camera origin, minus distance between the lattice point and the camera origin (e.g., the distance from 1110a to 1120a). If $d_{new}$ is greater than μ the $d_{new}$ may be truncated to a maximum value of μ. However, if it is less than −μ the lattice point may be considered occluded and the update for this lattice point is skipped. At block 1230, the system may compute the update weight $W_{new}$ based on range, incidence angle, and proximity to discontinuity. At block 1235, the system may update the value of the lattice point, e.g., using EQNs. 1 and 2.

To reduce computational burden, the system may first compute the update volume as the trapezoid in front of the camera. The trapezoid may cover the camera's field of view from minimum to maximum range. In this case, the system may need to loop only over the lattice points that fall within this update volume rather than the entire TSDF.

In some embodiments, to improve computation of $d_{new}$, the system may interpolate the value between neighboring pixels, while taking care not to interpolate across discontinuities. One update weight that may be used is $w_{new}:=1$ (e.g., as depicted in FIG. 11). This may give equal weight to all measurements. However, some embodiments employ improvements discussed in the following sections.

8. Mapping—Map Update—Weights

Various embodiments contemplate the updating of lattice point weights using a combination of one or more alternative weighting metrics, e.g., a "range weight", a "discontinuity weight", and an "incidence weight".

9. Mapping—Map Update—Weights—Range Weights

In many situations, the measurement error may increase with range. The system may determine a range weight as $w_{mg} := 1/r^2$, where r is the measured range (e.g., the depth value for a ray).

10. Mapping—Map Update—Weights—Discontinuity Weights

Due to sensor data warping and pose estimation errors, frame data may have more variance near range discontinuities. The mapping system may address these discontinuities by computing the discontinuity weight as $$w_{disc} = \frac{1}{1+s^2} \quad (3)$$

where s is the slope of range measurements between this pixel and pixels in a window of pre-defined width around the pixel. The slope between two pixels may be the difference in depth values divided by the pixel distance between the two pixels. The value s may be set to the maximum slope from the pixel to other pixels within a neighborhood of the pixel. Thus, pixels near a discontinuity may receive a low "discontinuity weight" while pixels further from a discontinuity may receive weights closer to 1 otherwise.

11. Mapping—Map Update—Weights—Incidence Weights

The Map Update system may also apply incidence weight, $w_{inc}$. The incidence weight may depend on the angle at which the ray of the pixel hits the surface. A higher incidence angle may result in a less accurate range measurement, and thus the lower the incidence weight. The weight can be computed as the dot product between the normalized ray vector $\vec{n}_{ray}$ and the surface normal $\vec{n}_{surf}$:

$$w_{inc} := \vec{n}_{surf} \cdot \vec{n}_{ray} \quad (4)$$

If the dot product is negative, the weight $w_{inc}$ may be set zero. For example, $$w_{inc} := \text{Max}(\vec{n}_{surf} \cdot \vec{n}_{ray}, 0) \quad (5)$$

12. Mapping—Map Update—Weights—Weight Integration

Other weights may be used in addition to the range, discontinuity, and incidence weights. Given a set of weights $\{w_i\}$ (including, e.g., range, discontinuity, and incidence weights) each with a corresponding importance $\{p_i\}$ (e.g., a real valued weighting between 0 and infinity), the cumulative update weight $w_{new}$ used in EQNs. 1 and 2 can be computed as $$w_{new} = \prod_i w_i^{p_i} \quad (6)$$

One will readily recognize variations to this approach. For example, in some embodiments, each weight may be scaled by multiplying by the corresponding importance $\{p_i\}$ and summed.

Map Updates can be parallelized in some embodiments, e.g., across multiple CPUs or across multiple compute units on a graphics processing unit (GPU), or multiple GPU units. Since each lattice point is updated independently of the other lattice points, some embodiments only need to split the full set of lattice points that need to be updated across multiple parallel computation threads.

13. Mapping—Mesh Construction

As mentioned, in some embodiments the intermediate representation may be the same as the final 3D representation. For example, a vertex representation may be both the intermediate and final representation. Where the intermediate representation is a TSDF representation, e.g., a final polygonal mesh representation may be created using the marching cubes algorithm (and/or an LFF and/or LFI representation). Given a TSDF, a polygonal mesh representation can be constructed using the marching cubes algorithm originally proposed by Lorensen in 1987. The marching cubes algorithm constructs the mesh by iterating over cubes whose corner points are successive TSDF lattice points (in one of the dimensions, e.g., x, y, or z) and checking if the cubes intersect the map surface (one will recognize that the "cube" and the lattice points may not have the same x, y, or z resolution, e.g., there may be a higher resolution on x and y than a lower resolution on z (height), etc.). Cubes that do intersect will have lattice points at the corners with different TSDF value signs (e.g., some positive and some negative). For each cube that intersects the surface, the mapping system may compute the intersection points on each edge of the cube between consecutive lattice points using, e.g., linear interpolation. The mapping system may then construct one or more triangular faces (or other polygons) to represent the intersection of the cube by the surface. The triangles applied for each type of intersection may be determined with reference to a table based on the edges intersecting the surface.

14. Mapping—Mesh Construction—Range Discontinuities

In some embodiments, the system may detect range discontinuities in the depth data during, e.g., mapping operations. Range discontinuities can be sharp transitions in the range to obstacles for neighboring pixels in the depth image. These discontinuities can be caused by object boundaries in the environment. When one pixel measures range to a close-up object, and the neighboring pixel just misses that object and measures range to the background, the difference in range can be very large.

To detect a range discontinuity, some embodiments compare the depth values of neighboring pixels. If the difference is greater than a threshold $k_{disc}$, then the system may identify a discontinuity. The value of $k_{disc}$ may depend on the noise properties of the specific RGBD sensor employed in the embodiment. For time-of-flight (TOF) cameras, $k_{disc}$ may remain constant. For projection cameras, $k_{disc}$ may be a function of the range to the scan point.

15. Mapping—Mesh Construction—Miscellaneous Techniques

A number of other techniques may be applied during mapping in some embodiments.

16. Mapping—Mesh Construction—Miscellaneous Techniques—Map Priors

As discussed herein, various embodiments will construct a new map "from scratch", but often it can be useful to update an existing map, e.g., to extend an existing map of a room into an adjacent corridor. In this case, instead of initializing the TSDF with the first captured frame's data, some embodiments may initialize the TSDF with a preexisting map. The first frame may now be positioned using global localization techniques discussed herein. Using this pose for the first frame, a regular Pose Update and Map Update may be performed with the first frame's data. Then, the Mapping system may proceed as before with subsequent frames.

17. Mapping—Mesh Construction—Miscellaneous Techniques—Plane Priors

In some embodiments, even when a map is being built "from scratch", prior information about the environment may be readily available. For example, most homes have a planar floor. This information can be captured by initializing the TSDF with a planar surface. The planar surface may help ensure that the resulting map will have a flat floor. In contrast to using a prior map, some embodiments will not use global localization to position the first frame when applying plane priors. Instead, the system may estimate the floor plane in the first frame using techniques described herein (e.g., in the section with numerical identifier #25 and any corresponding subsections). The system may then align the first frame's floor plane with the given prior plane. This may still leave several degrees of freedom unconstrained for the first frame's pose (e.g., the frame could be translated along the floor and rotated around the vertical). In some embodiments, these additional degrees of freedom can be adjusted by the user.

18. Mapping—Mesh Construction—Miscellaneous Techniques—Selective-Remapping

In some applications, the environment may change over time. However, many of the prior maps may still provide a good representation, though some parts may have changed. In these cases, it may be useful to re-map only the changed areas. In some embodiments, the system can re-initialize portions of less than all of a prior TSDF to be unknown space, thereby wiping out all information about the environment in these areas. The resulting TSDF can then be used as a map prior. In some embodiments, the portions selected for removal may be specified by a user, or may be identified based upon a comparison of new data with the old depth data.

Alternatively, some embodiments construct a mesh model out of a previous TSDF, removing some portions of the mesh, and, then, building a new TSDF from the resulting mesh. The first frame of a new data log may start in a known area, so that global localization techniques can be used to position it and seamlessly integrate new areas into an existing map.

19. Mapping—Mesh Construction—Miscellaneous Techniques—Data Driven Parameter Learning In some embodiments, the mapper uses a number of different parameters, e.g.: a desired grid resolution, a truncation distance, the contribution of different weighing components (as in EQN. 6), various parameters for pose estimation, etc. Changing the values of these parameters may affect the quality of the generated map, and it can be difficult to optimally set all of the parameters by hand.

Some embodiments employ data-driven parameter learning to improve the results of these systems. These embodiments may assume that the original map and camera trajectory for a given data log are known. The original map and trajectory are referred to as the "ground truth" herein. Then, the system may run the mapper (e.g., Map Update and Pose Update systems) with different parameter settings to determine which setting produces maps and trajectories closer to ground truth. The closeness can be measured, e.g., in terms of distances between camera poses (in ground truth vs. data log) as well as distances between mapped surfaces (e.g., the generated map and ground truth map).

The system may not know original map and trajectory for an actual data log and a method may be needed to generate a ground truth. In one approach, a lot of computational time and resources may be applied in an attempt to build as accurate map and trajectory as possible. This map and trajectory may then be treated as an estimate of ground truth. In another approach, the system may generate a synthetic data log based upon a given 3D mesh and trajectory of the camera. In this case, for each pose of the camera, the system may generate a virtual depth scan using a 3D model of the mesh, e.g., an OpenGL™ rendering of the 3D mesh model into the depth buffer and then reading back the depth values. The virtual depth scan generates a depth-based and may additionally generate a color representation of the frame data (e.g., in a form analogous to the frame of real-world data).

20. Mapping—Pose Update

As mentioned, a Pose Update (e.g., at block 1030) may better translate and orient a received frame in the system relative to an existing intermediate structure before attempting a Map Update. For example, the Pose Update may localize the incoming data frame. Given the previous belief $bel_{t-1}$ and camera pose $T_{t-1}$, the system may estimate the current belief $bel_t$ and camera pose $T_t$ at time t. First, the system may generate a predicted belief $\overline{bel}_t$ (e.g. by using the previous $bel_{t-1}$ and applying a dynamics model as described herein, by taking the previous pose $T_{t-1}$ and setting an uncertainty region around it, etc.), and the system may generate a predicted pose e.g., use the most likely pose from the predicted belief as the predicted pose. The system may then build a virtual depth scan of the TSDF from the predicted pose (or, in some embodiments, from the previous pose $T_{t-1}$) using, e.g., ray-tracing. Then, the new belief $bel_t$ and pose estimate $T_t$ may be inferred by aligning the new data to the virtual scan. A Pose Update may involve first positioning the depth data using the predicted pose and then determining the points on the map corresponding to each depth ray for the frame. Details of the alignment and inference process are described in greater detail elsewhere herein, e.g., in the section with numerical identifier #28 and any corresponding subsections. Aspects of the pose estimation may also be used in real-time AR operation.

21. Mapping—Pose Update—Example Graphical Virtual Scan Creation

Figure 13:
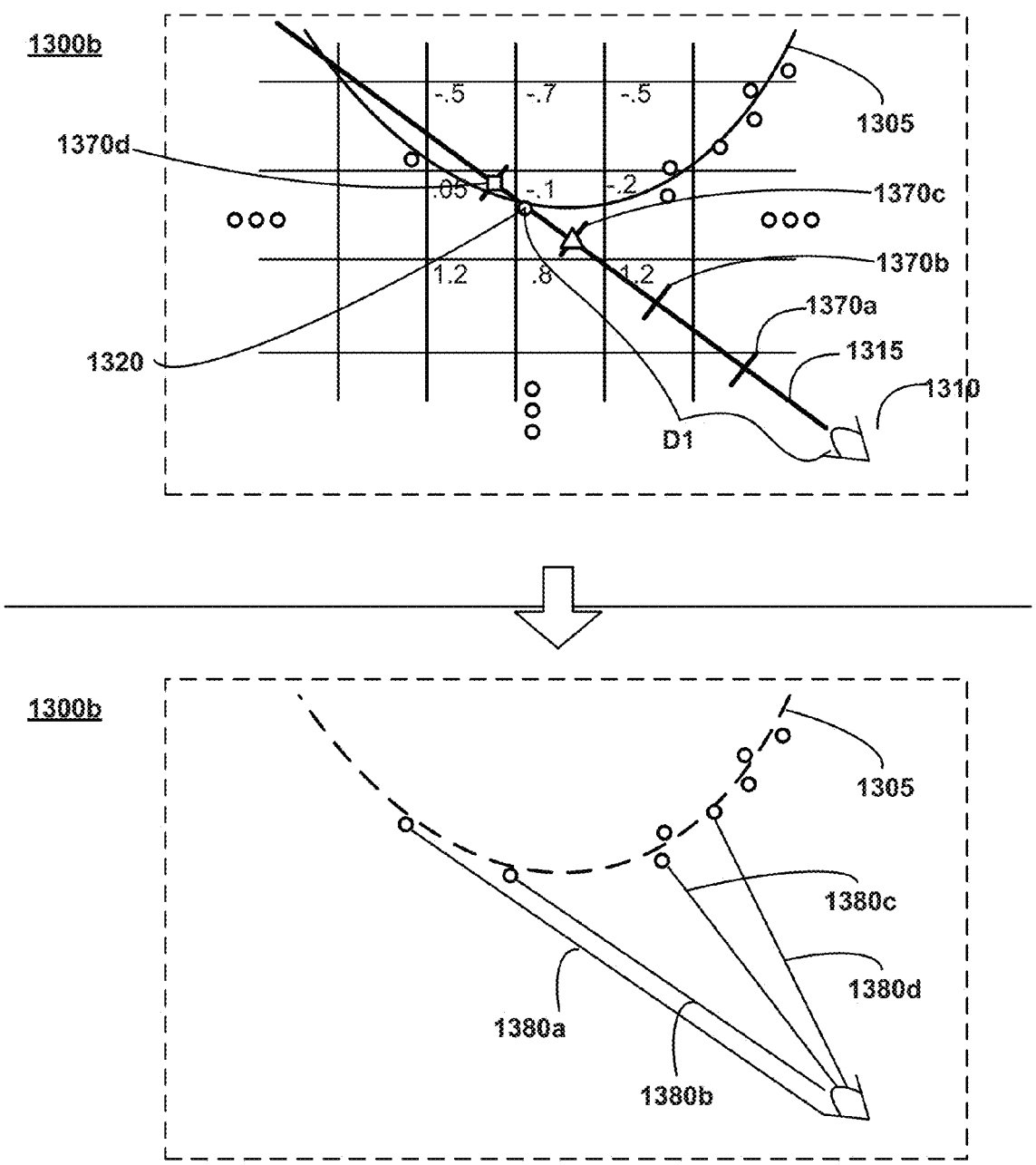
FIG. 13 is an exemplary two-dimensional representation of the creation of a Virtual Scan from a TSDF representation (e.g., in a Pose Update) for purposes of explaining a higher-dimensional approach which may be applied in some embodiments.

FIG. 13 is an exemplary two-dimensional representation of the creation of a Virtual Scan from a TSDF representation (e.g., in a Pose Update) for purposes of explaining a higher-dimensional approach which may be applied in some embodiments. Again, as depicted in situation 1300b an incomplete TSDF structure may include many lattice points with distance values reflecting the relation to a nearest surface 1305. The system may wish to generate a virtual scan relative to the hypothetical pose 1310 (e.g., a predicted pose based on a dynamics model, e.g., a consideration of past poses, the user's movement, etc.). The system may determine a plurality of rays corresponding to pixels in a capture device at this pose to consider. For one ray 1315, the system may walk along the ray 1315 at intervals 1370a, 1370b, 1370c, 1370d interpolating the nearest TSDF distance values (e.g., trilinear interpolation) at each point along the ray until the interpolated value's sign changes.

For example, the interpolated values at intervals 1370a, 1370b, 1370c may all be positive, but the interpolated value at 1370d may be negative. In some embodiments, the point at the first negative interval may be returned. But in some embodiments, positions corresponding to the first negative interval 1370d and the last positive interval 1370c may be interpolated between (e.g., based upon their distance values) to determine an interpolated position 1320 closer to the object's 1305 surface (corresponding to a depth D1). Accordingly, the Pose Update system may determine that the Virtual Scan will include a new depth value corresponding to the point 1320. The depth values, e.g., 1380a, 1380b,

1380*c*, 1380*d*, may then be organized into a "pseudoframe" Virtual Scan of the TSDF for comparison with a real frame depth data, e.g., when determining correspondences.

Figure 14:
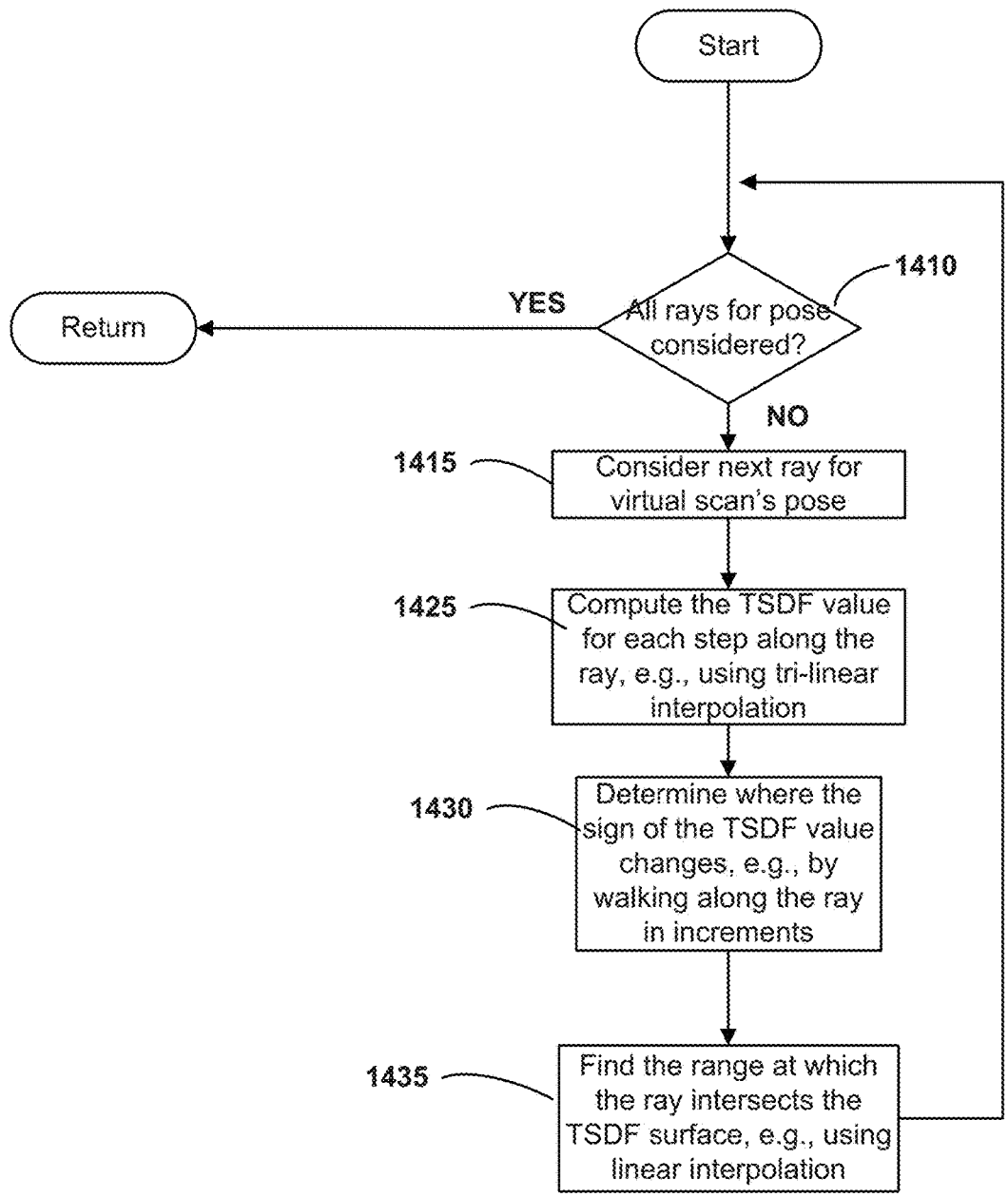
FIG. 14 is a flow diagram depicting an example process for creating a Virtual Scan (e.g. in a Pose Update) as may be implemented in some embodiments.

FIG. 14 is a flow diagram generally depicting various steps in the creation of a virtual scan as may be implemented in some embodiments (e.g., as may occur in block 1030). An example virtual scan generation technique may proceed as follows. Given a pose T of the camera and the camera model CM, the system may build a virtual scan by ray-tracing on the TSDF with one ray per each pixel of the scan. The system may perform blocks 1415, 1425, 1430, and 1435 until all rays desired for generation of the Virtual Scan are considered at block 1410.

At block 1425, the system may compute TSDF distance values (e.g., trilinear interpolate values) at each step (e.g., steps 1370*a*, 1370*b*, etc.). At block 1430, the system may determine where along the ray the sign of the TSDF value changed (e.g., step 1370*d*).

At block 1435, the system may use linear interpolation to find the range at which the ray intersects the TSDF. For example, the system may linearly interpolate between the points associated with steps 1370*c* and 1370*d* to find a better approximation of the boundary of surface 1305 (rather than just take the point associated with step 1370*d* in FIG. 13). Each virtual range measurement (e.g., including measurements 1380*a*-*c*) may then be converted into a 3D point using the camera model CM and the collection of these 3D points and/or their depth values may constitute the "virtual scan".

Note that ray-tracing computations for one ray may be independent of the computations for another. Hence, Virtual Scan generation can be parallelized, e.g., across multiple computation threads by assigning a subset of rays to be processed to each thread in some embodiments.

22. Mapping—Map Post-Processing

While the 3D mesh model captures a lot of information about the environment, it is often useful to further deduce some important properties of the environment. For example, is it useful to know where the floor and walls are, and what surfaces are walkable.

23. Mapping—Post Processing—Map Coloring

Once the mesh model is built (or at least sufficiently partially built to being post processing) post processing operations such as map coloring may proceed in a way similar to the Mapping System. A vertex mesh representation rather than the TSDF data structure may be used. Map coloring may be used to apply texture data to the mesh. The mesh can consist of vertices (points) and faces (triangles). For each vertex, a weighted average of color c, which can be an RGB triplet, and cumulative weight of all prior observations w, may be maintained. Since frame poses have already been estimated by the mapper, they can be re-used.

Figure 15:
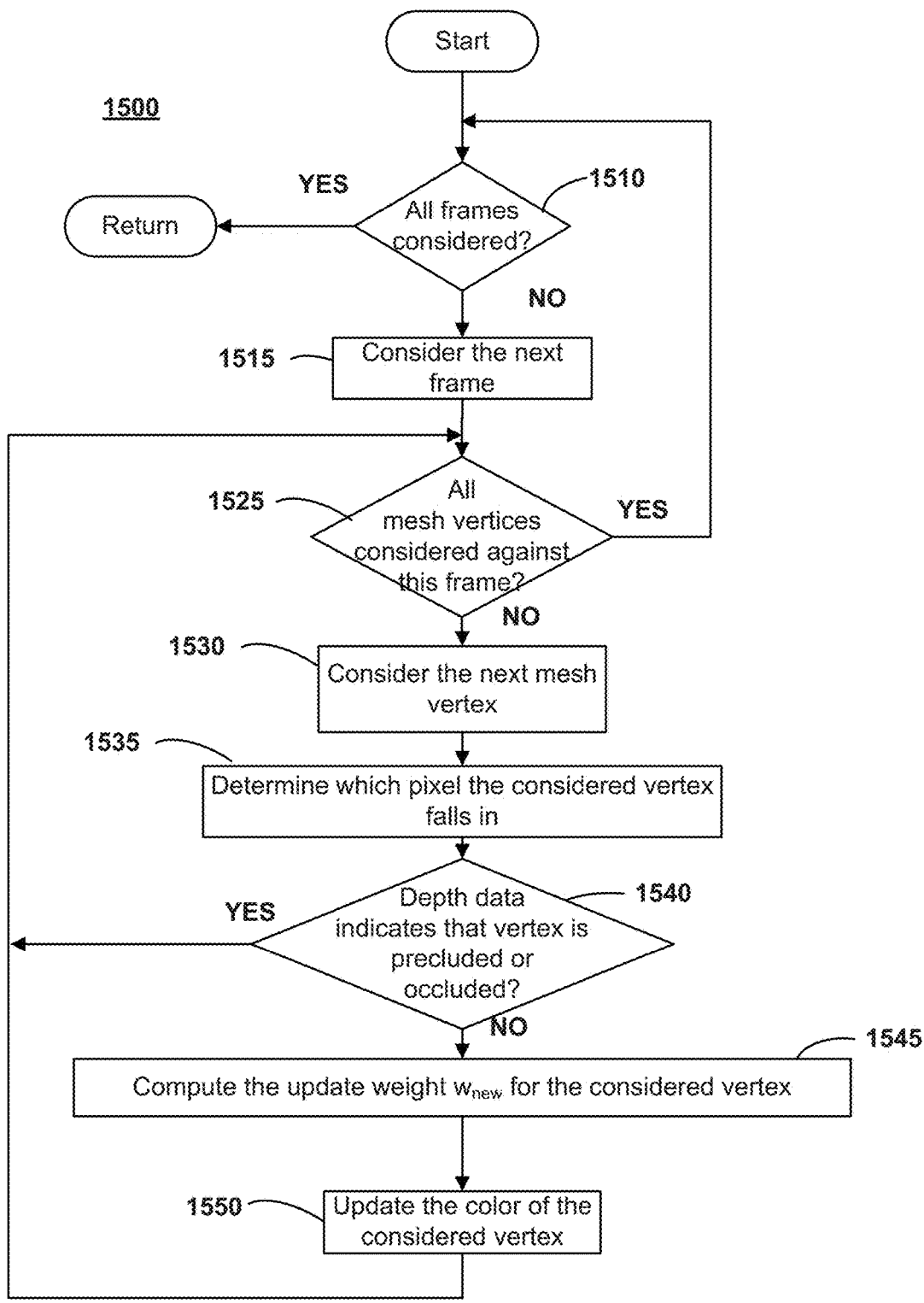
FIG. 15 is a flow diagram generally depicting various steps in a map coloring process as may be implemented in some embodiments.

FIG. 15 is a flow diagram generally depicting various steps in a map coloring process as may be implemented in some embodiments. At block 1510, the system may consider whether all the frames have been processed. If frames remain, at block 1515 the next frame may be considered. For this frame, the map coloring system may then determine if all the mesh vertices have been considered at block 1525. If vertices remain, then at block 1530 the next vertex may be considered. In some embodiments, the system may compute an update volume for each data frame and skip color updates for mesh vertices outside of the update volume (e.g., outside a trapezoid).

At block 1535, the system may compute which pixel this vertex falls in using the camera model CM and a pose for this frame. For example, given an RGB image corresponding to a depth frame capture, the system may identify a pose corresponding to the frame data in the world coordinate frame, e.g. by using the pose the mapping system produced for this frame. The system may use the pose produced by the mapping system for this frame to determine coordinates for the vertex in the camera coordinate system. The camera model CM may be used to determine which pixel the vertex falls into (if the vertex does not fall into a pixel it may be skipped, though many pixels will correspond to vertices when a trapezoid is applied as described herein to reduce the computational burden). The system may determine at block 1535 which RGB value corresponds to a vertex under consideration.

At block 1540, the system may compare the range to vertex with the measured range, e.g., to determine if the depth taken with the RGB image suggests that the vertex under consideration is occluded or otherwise not visible. For example, the vertex under consideration may fall behind another object (e.g., be occluded) relative to the pose at which the RGB image was taken (e.g., the range may be determined as a threshold of the absolute difference). If so, the vertex color should not be updated. Similarly, the sensor data may be bad, and the vertex may be "precluded" in that the depth value is far past the vertex's position, suggesting that the data is bad and should be ignored.

At block 1545, the system may compute the update weight $w_{new}$. At block 1550, the system may update the vertex color, e.g., using the following equations:

$$c = \frac{cw + c_{new} w_{new}}{w + w_{new}} \quad (7)$$

$$w = w + w_{new} \quad (8)$$

where c may be an (r, g, b) tuple, which may be stored as floating point, rather than byte, values.

At block 1540, if the measured range is far from the range-to-vertex (e.g., by more than µ), the mapping system may classify the vertex as unsuitable and the update may accordingly be skipped. As before, the update weight $w_{new}$ can be computed as a combination of the range weight $w_{mg}$, the discontinuity weight $w_{disc}$, and the incidence weight $w_{inc}$. In addition, some embodiments also add a motion blur weight component $W_{blur} = 1/\delta_{pix}$, where $\delta_{pix}$ is the maximum pixel distance this vertex has moved either from prior to current frame or from current to next frame.

The value of $\delta_{pix}$ may be capped from below by some constant. Hence, the more this vertex moved in the camera image, the smaller the motion blur weight. Prior to coloring the mesh, some embodiments prune out triangles whose surface area is too small and compute smooth per-vertex normals for use with incidence angles. Some embodiments can compute smooth per-vertex normals by, e.g., adding up all the normals of all the triangles that contain this vertex as one of the corners, and then normalizing the sum. The result may then be used as the smooth normal for this vertex.

24. Mapping—Map Post-Processing—Mesh Unwrapping

The colored 3D mesh constructed in accordance with the "Map Coloring" described herein may have per-vertex colors. Some tools (e.g., MeshLab™) are able to handle such meshes, but many tools (e.g., many game engines) require textured meshes.

In a textured mesh, the color information is represented by a 2D color image called a "texture". Each mesh vertex has texture coordinates (u,v), which represents a pixel of the 2D texture image. Colors drawn on each triangular face of the mesh may be taken from the texture triangle defined by the texture coordinates of the face vertices. The process of assigning texture coordinates to all mesh vertices is called "mesh unwrapping" as it "unwraps" the 3D mesh onto the plane of the 2D texture.

To unwrap the mesh, some embodiments categorize the mesh vertices into six classes, one for each axis in both directions: x, y, z. Each vertex may be categorized based on whichever axis direction the vertex normal is closest to. The system may then split the vertices into connected components based upon the class categorization. To build a component, the system may begin with some (previously unassigned) vertex and create a new component with just this vertex. The system may then consider all faces involving this vertex. Vertices adjacent to this vertex in some face may be considered its neighbors. The system may then add all of the vertex neighbors with the same class categorization to the same component. The system may then repeat this process for all the neighbors of the newly added vertices.

Figure 16:
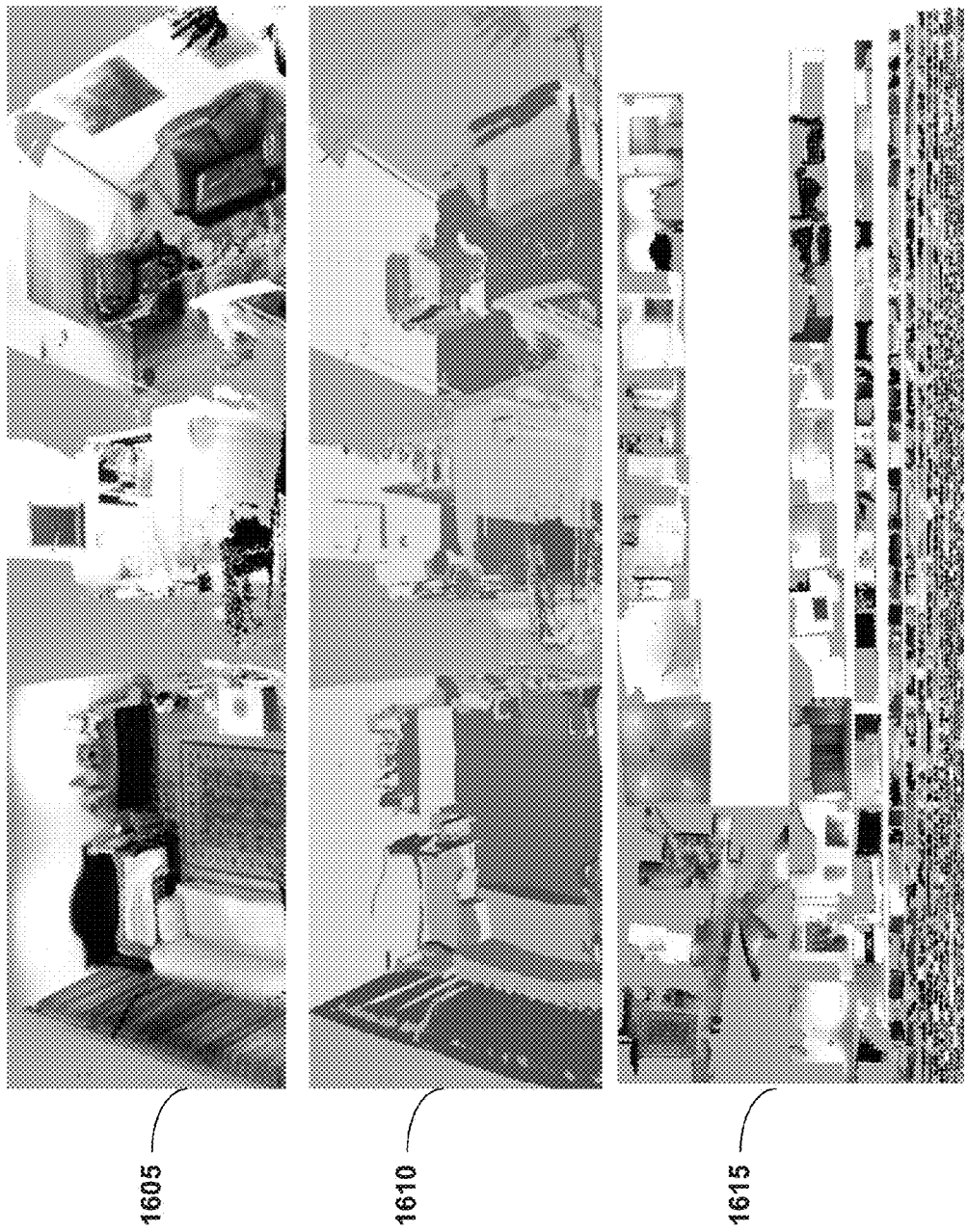
FIG. 16 is a collection of screenshots of 3D meshes and corresponding textures as may be generated in accordance with some embodiments.

Once the components are built, the system may project each component along its associated axis onto a 2D image plane. This projection may then become the image texture for this component. In some embodiments, the system may then pack textures of all components onto a single 2D image as tightly as possible and obtain the texture for the entire mesh (e.g., a texture image of 4096×4096 pixels). If the component textures do not fit onto one such image, then multiple texture images may be used. FIG. 16 is a collection of screenshots of 3D meshes and corresponding textures as may be generated in accordance with some embodiments. A textured vertex mesh model is shown in screenshot 1605. Screenshot 1610 indicates, via coloring, which class each vertex is assigned to (e.g., most vertices on the floor are associated with a purple coloring). Screenshot 1615 depicts the resulting 2D generated texture image.

25. Mapping—Map Post-Processing—Planes and Floor Extraction

A lot of useful knowledge about the environment can be obtained in some embodiments by extracting large planar surfaces. In some instances, the largest planar surface facing up will be the floor and largest planar surface facing down will be the ceiling. Walls may be identified as large vertical planar surfaces. One way to extract the planes from the mesh, in some embodiments, is to use the directional components described herein for mesh unwrapping. For each large enough component, the system may fit a plane to the vertices using decomposition technique, e.g., Principal Component Analysis (PCA).

The average deviation of the points from the plane may serve as a non-planarity score. Components with a non-planarity score below a certain threshold can be considered planar. For example, the largest such component aligned with +z axis may be identified as the floor. A similar technique can be used to extract planar surfaces from a depth scan. In this case, there may be no faces. Instead, neighbors of a scan point may be the scan points of the adjacent pixels (though some embodiments are careful not to cross depth discontinuity boundaries). Provided that the orientation of the camera in world coordinates is approximately known (e.g., from the IMU, or by having asked the user to point the camera down, or alternatively forward, etc.), the largest planar +z component may be identified as the floor. Some embodiments use this technique to extract the floor plane for the plane priors for example, as discussed in the section with numerical identifier #17 and any corresponding subsections 26. Pose Estimation The Expectation Maximization systems and PSAs specifically may be used to estimate the belief of the pose (e.g., position and orientation) of the camera relative to the model of the environment. Pose estimation may be performed during mapping as part of the "Pose Update" process to align the incoming data properly to the 3D model. Pose estimation may also be used during an AR application, to determine the current device's pose relative to the world coordinate frame (e.g., in Standard Tracking and Global Localization).

The pose estimation sub-system may include PSA and/or EM components and may be responsible for estimating the belief of the pose (i.e., position and orientation) of the camera at a given point in time (this can be used both for mapping and tracking as discussed herein). The pose can be represented by a rigid transformation $T_t$ from local camera frame to the world coordinate frame. As discussed, some embodiments address two types of pose estimation problems: (a) pose tracking when a good prior estimate of the camera pose is available, and (b) global localization when prior camera pose is unknown (or very uncertain). Tracking may be performed for each data frame in real-time during regular operation of the AR device. Tracking may also be performed during mapping for each frame in the data log. In contrast, global localization need not be performed during mapping. Global Localization may be performed to initialize the tracker at the beginning of regular AR operation or whenever the tracker gets lost.

27. Pose Estimation—State Representation and Measurement Units

Since the belief $bel_t$ is a very complex, unsmooth function, it may not be represented in closed form in some embodiments. Instead, in some embodiments this function is estimated by point values using a particle filter algorithm. However, particle filters are exponential in the number of parameters that need to be estimated. In most embodiments, at least six parameters may be used to estimate a rigid body in 3D space. To save computational expense, various embodiments employ an advanced particle filter called Scaling Series. The Scaling Series can represent the belief by a set of weighted broad particles, where each particle stores, e.g., a point in 6D® parameter space, an uncertainty region around it, and an importance weight.

Generally, during pose estimation, the "state" can be represented as the unknown random variable to be estimated. In some embodiments, the state is modeled as a random variable to account, e.g., for sensor error, and other minor variations between data captures. In various embodiments, the state is the pose T of the camera. Since all point-wise estimation algorithms are exponential in the number of parameters, various embodiments seek to represent the state with as few parameters as possible. Accordingly, the pose may be represented as $T:=(x, y, z, a, b, c)$, where $(x, y, z)$ are the Cartesian coordinates and $(a, b, c)$ is the rotation in Rodrigues representation (e.g., axis times angle, where angle is between 0 and $\pi$). One will readily recognize alternative representations (e.g., polar, spherical, cylindrical, Euler angles, quaternions, matrices, etc.) and understand that the example provided here is merely one possible instance. As T is a rigid transformation in this framework, T(p) is used herein to represent the result of applying the transformation T to a 3D point p. While the search or inference algorithm (e.g. Scaling Series) may keep track of the state in one representation (such as $(x, y, z, a, b, c)$), one will readily recognize, that when the transform needs to be applied or composed (e.g. when computing the probability of a particular particle) the transform can be converted into another form (e.g. matrices) which may be used to perform those operations potentially much quicker; additionally, it is also possible to keep track of the transform in several forms at once, updating all of them when needed, and using whichever form is fastest for particular operation.

Figure 17:
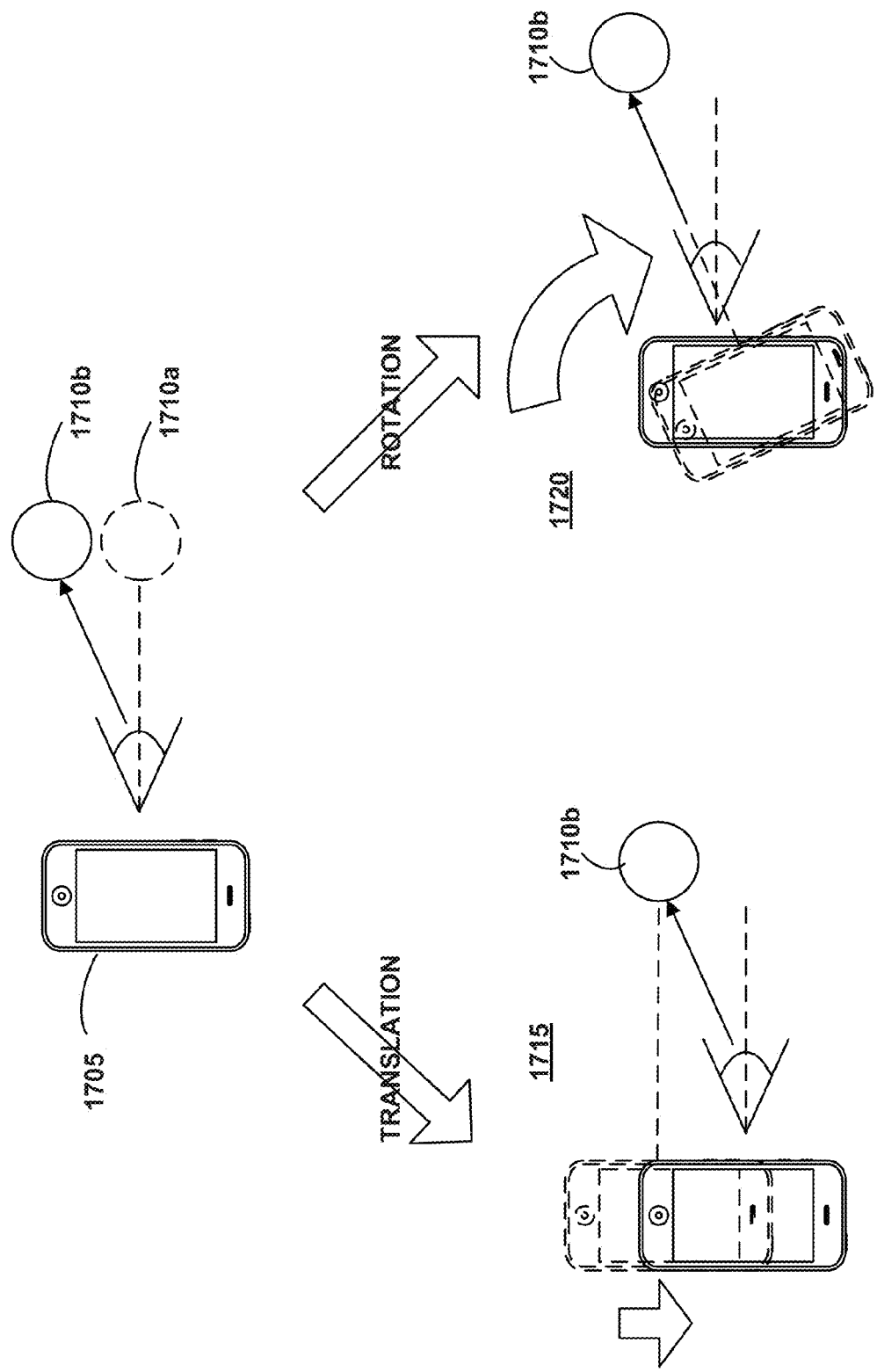
FIG. 17 is a series of block diagrams illustrating relation between rotation and distance as may be relevant in some embodiments.

Some embodiments use meters (m) for Cartesian coordinates and radians (rad) for rotation angles. One will readily recognize alternative representations (e.g., centimeters, feet, inches, millimeters, degrees, etc.) and understand that the example provided here is merely one possible instance. However, when speaking of rigid transformation, it may be convenient to use a single measurement unit encompassing both position and rotation. For example, FIG. 17 is a series of block diagrams illustrating relation between rotation and distance as may be relevant in some embodiments. A capture device 1705 may have expected to see an object at the position 1710a but has instead found it at the position 1710b. This disparity can be attributed to rotation, translation, or a combination of the two of the capture pose. For example, the capture device 1705 could be translated 1715 a distance to result in the object appearing at position 1710b. Alternatively, the capture device 1705 may instead have been rotated 1720 to achieve the same result. Rather than reflect this disparity with the entire range of possible translations and rotations that may cause it, some embodiments employ a unit of measurement reflecting both rotation and translation.

Particularly, some embodiments equate 1 meter to 1 radian to facilitate the conversion of a small translation to a small rotation and vice-versa. The resulting unit is referred to herein as meters-and-radians (MAR-1). The MAR-1 may be used as a metric for normalizing error (attributable, e.g., to one or both of translation and/or rotation). In other words, a transformation of length 1 MAR-1 is a unit vector in the 6D parameter space. MARs may provide a good approximation for how motion in the 6D parameter space affects motion in the world 3D space. For example, if a transformation of length 1 MAR-1 is applied to a camera, it will move a point located 1 meter in front of the camera by approximately 1 meter whether by translation, rotation, or combination of the two (e.g., at the offset depicted in FIG. 17). Thus, camera jitter of 1 MAR-1 will displace close-up virtual objects by approximately 1 meter in world coordinates. MARs may be used during EM to determine when convergence has occurred (e.g., when successive transforms generated by the PSA remain within threshold MARs of one another).

More generally, the system may seek to determine the effect of camera jitter on objects a distance R away from the camera (rather than just 1 meter). This may be useful for mapping in different environment (e.g., mapping in an enclosure, such as the human body, may involve an object distance from the camera on the order of millimeters, where mapping a stadium may have an object distance from the camera on the order of dozens of meters). Some embodiments convert a small rotation to a small displacement by multiplying the rotation by a rotation-to-position coefficient, which comes out to be approximately R. Intuitively, for example, imagine holding a fishing pole of length R with an object suspended at the very end of it. If you turn the pole by a small angle $\alpha$ then trigonometric computations can show that the object will be displaced by a distance of approximately $R*\alpha$ (where $\alpha$ is in radians). The resulting unit is referred to herein as a "MAR-R". With this notation, the above conversion of 1 meter to 1 radian will be written as MAR-1. Where reference is made herein to "MARs" without specifying R, one will recognize that the R used for the MARs will depend on the context (and may be, e.g., R=1).

Note that if R does not equal 1 meter, a 6D vector of length 1 MAR-R is no longer a unit vector in the 6D parameter space using a Euclidean metric. Accordingly, some embodiments use a Mahalonobis distance, which will take the rotation-to-position coefficients into account so that a vector of length of 1 MAR-R will have a unit Mahalonobis length. The Mahalonobis distance $d_M$ between two vectors $\vec{u}=\{u_i\}$ and $\vec{v}=\{v_i\}$ is computed in some embodiments as $$d_M(\vec{u}, \vec{v}) := \sqrt{\sum_i \lambda_i^2 (u_i - v_i)^2} \quad (9)$$

where $\{\lambda_i\}$ are the Mahalonobis coefficients. In some embodiments, for a state vector of (x, y, z, a, b, c), we have $\lambda_x, \lambda_y, \lambda_z$ all set to 1 and $\lambda_a, \lambda_b, \lambda_c$ all set to R. Additionally, in some embodiments, to determine a distance between two transforms $T_a$ and $T_b$, instead of using $d_M(T_a, T_b)$ the system may use $d_M(T_a^{-1}*T_b, I)$ where I is the identity transform (0, 0, 0, 0, 0, 0), this would prevent the issues around where rotation wraps (e.g., a radians around (x, y, z) axis is equivalent to $2\pi - \alpha$ radians around the (-x, -y, -z) axis). Thus, two very similar transforms that differ near a wrap boundary (from different sides) may thus correspond to 6D representation vectors that are very far apart. By computing $T_a^{-1}*T_b$ one may generate a transform C from $T_a$ to $T_b$. The magnitude of C (in MAR-R) may provide a good estimate of how close $T_a$ and $T_b$ are.

28. Pose Estimation—Pose Tracking

Figure 18:
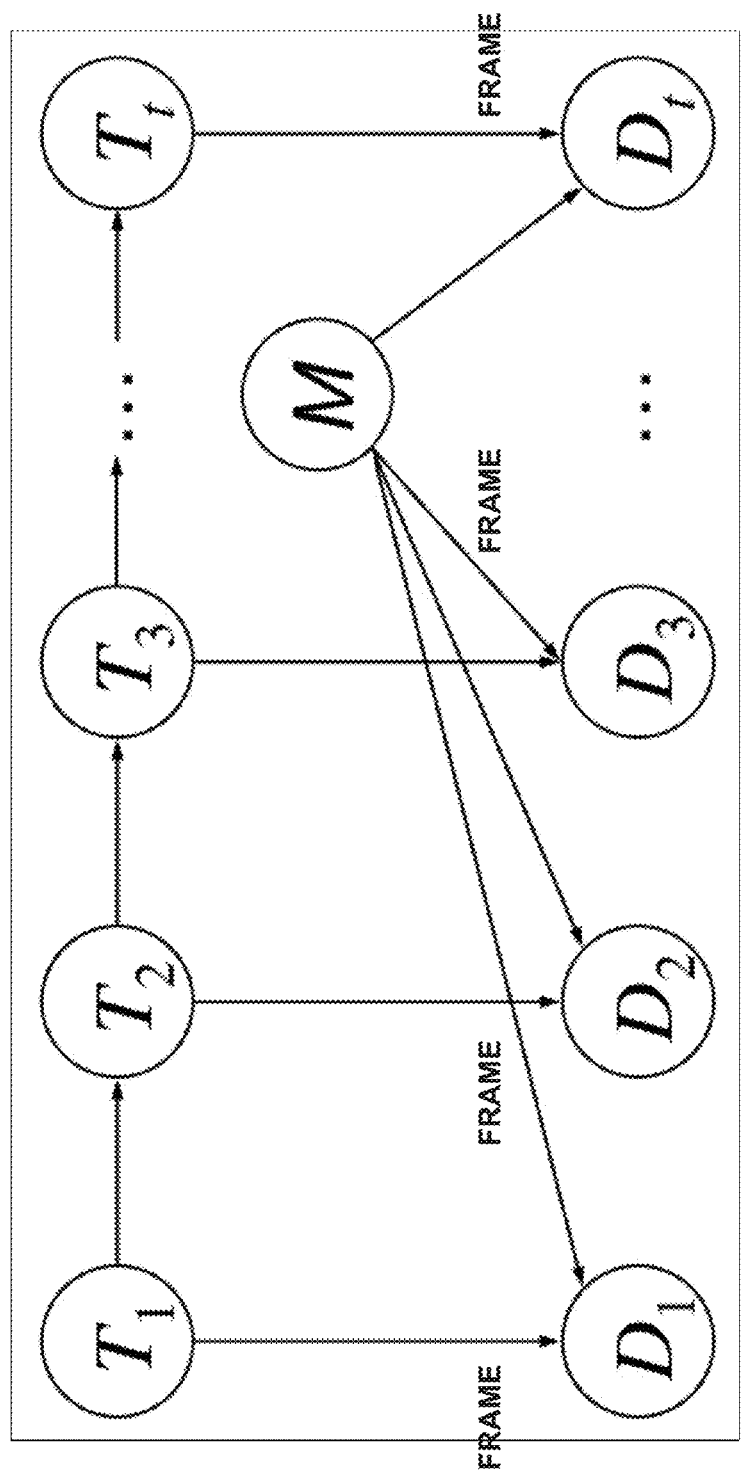
FIG. 18 is a block diagram of a dynamic Bayesian network as may be used in accordance with some embodiments.

In some embodiments, pose tracking can be modeled as a Bayesian process in which the camera pose $T_t$ changes over time due to camera motion. FIG. 18 is a block diagram of a dynamic Bayesian network as may be used in accordance with some embodiments. At each time step t the pose estimation system may obtain a new sensor measurement $D_t$ from the RGBD camera (or any other suitable sensor as discussed herein), e.g., a frame of depth data. Here M represents the environment and $T_1, T_2$, etc. the camera poses in the environment at the time when the depth data $D_1, D_2$, etc. were taken. $T_1, T_2$, etc. are unknown (e.g., unobserved), whereas $D_1, D_2$, etc. are known (e.g., observed). During Standard Tracking, M may be considered known (e.g., represented by the previously built model of the environment). During mapping, the map M may be an unknown alongside $T_1, T_2$, etc., but unlike the camera pose, the map does not change over time. The system may seek to estimate poses $T_1, T_2$, etc., (and possibly estimate M) based on the depth data $D_1, D_2$, etc. Due to sensor noise and modeling imprecision, the system may not be able to determine the camera pose with absolute certainty. Instead, the uncertain knowledge of the camera's pose may be described by a probability distribution called the Bayesian "belief" at a given time, $bel_t$.

$$bel_t := p(T_t | D_1, \ldots, D_t) \quad (10)$$

Figure 19:
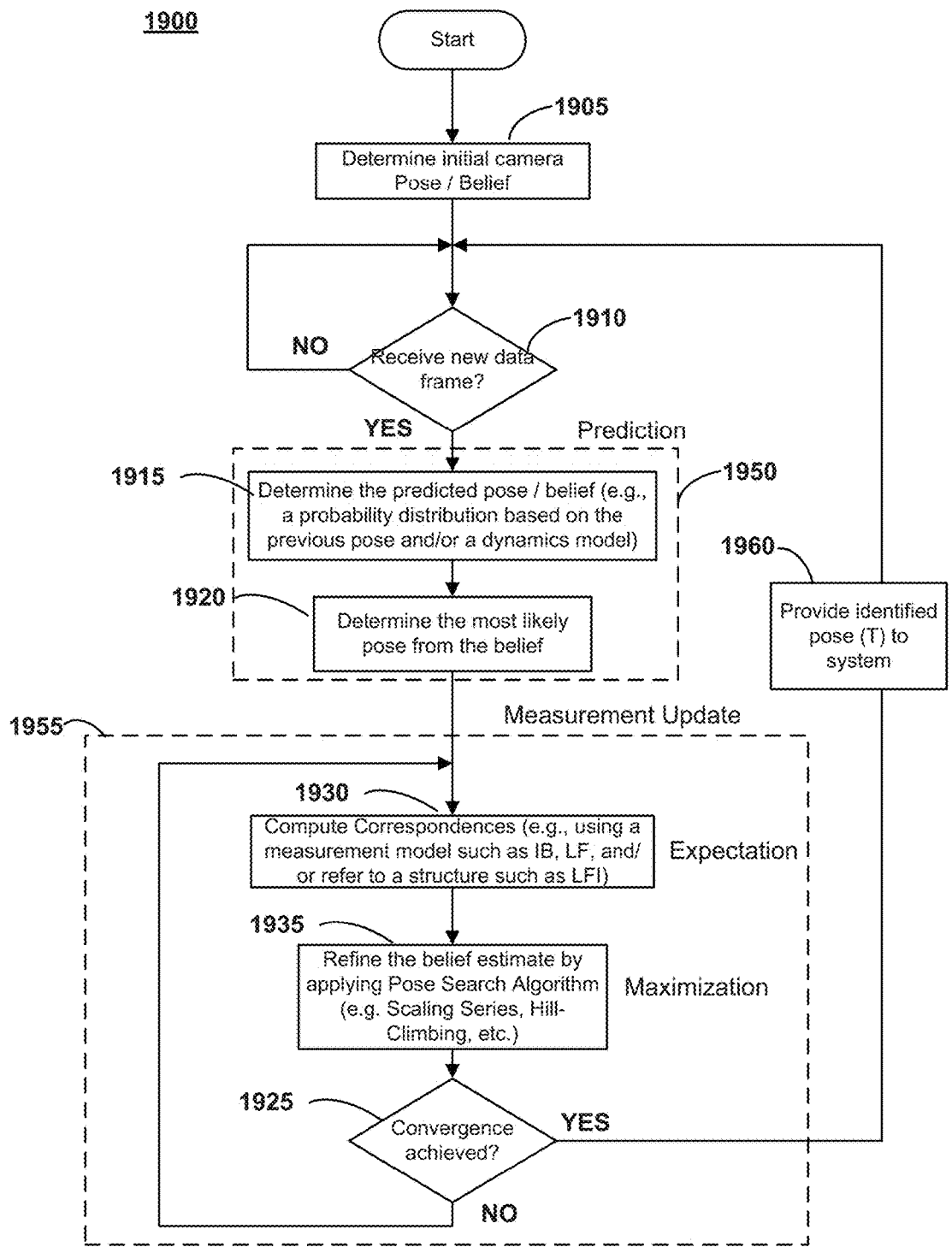
FIG. 19 is a flow diagram generally depicting a summary of an Estimation Maximization algorithm (e.g., for tracking) as may be implemented in some embodiments.
Figure 20:
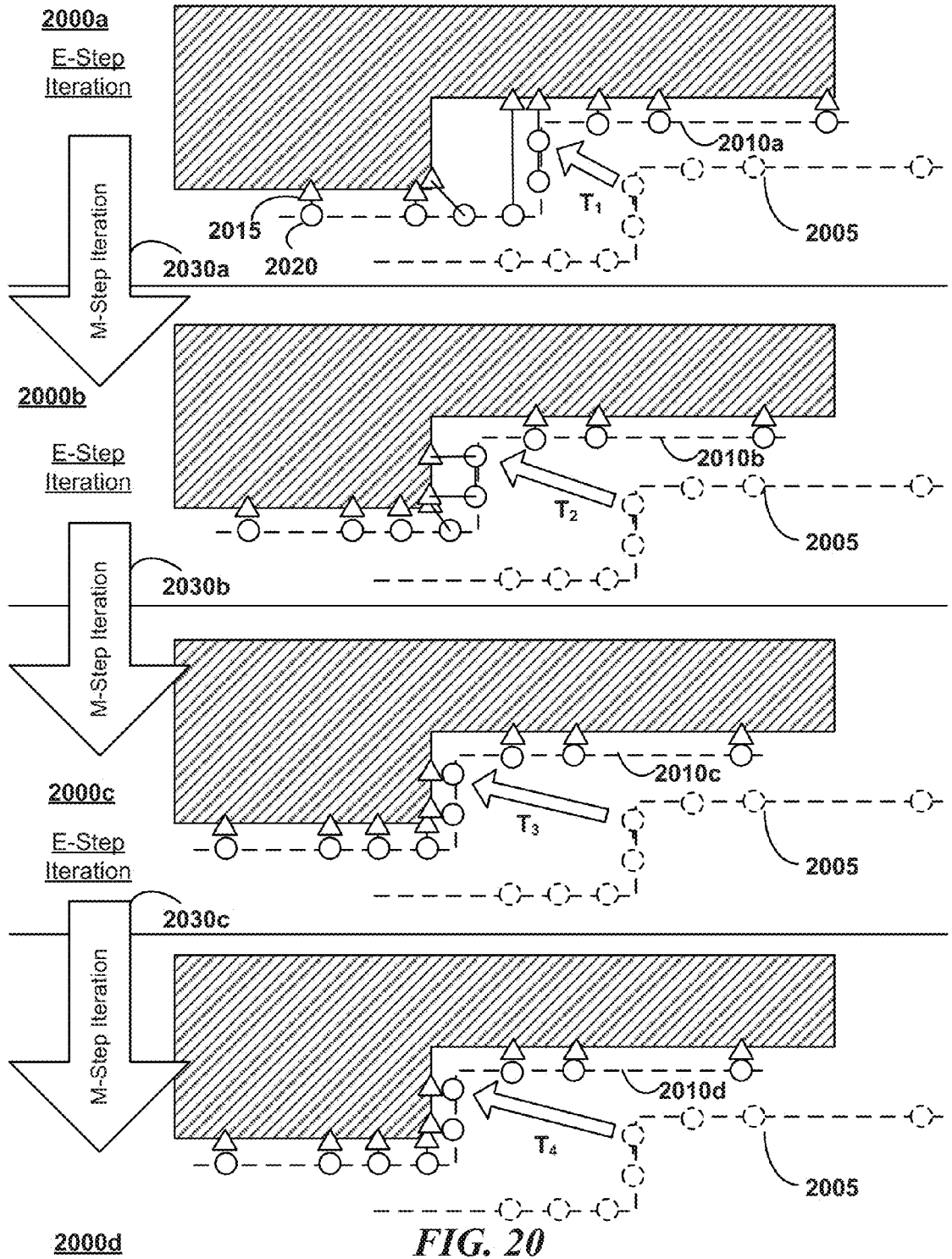
FIG. 20 is a block diagram generally depicting an iterative convergence procedure during Estimation Maximization as may be applied in some embodiments.

This probabilistic approach may have the advantage of computing the optimal solution given all the available data, while also properly taking into account sensor noise and modeling uncertainties. The belief may be estimated recursively using the Bayesian recursion formula $$bel_t = \eta p(D_t | T_t) \int p(T_t | T_{t-1}) bel_{t-1} dT_{t-1} \quad (11)$$

where $\eta$ is a normalization constant and $bel_{t-1}$ is the belief at the prior time step t−1. From here on, the term $\eta$ is used to denote the normalization constant. Its value will be different between different equations, but such that the right-hand side of that particular equation integrates to one. The first probability term $p(D_t|T_t)$ is referred to herein as the measurement model, a probabilistic statement that describes how the sensor measurements are taken. The second probability term $p(T_t|T_{t-1})$ is the dynamics model, a probabilistic statement that describes how the camera can move (which may, e.g., consider how fast a human being could move a device, past poses, IMU data, etc.). The Bayesian filter estimates the belief by iterating Prediction and Measurement for each time step t. FIG. 19 is a flow diagram generally depicting a summary of a tracking algorithm as may be implemented in some embodiments. For example, FIG. 19 may reflect the combined operations of the Pose Update process 815*c* and EM process 840*a* or the combined operations of the Standard Tracking process 820*b* and EM process 840*b*. FIG. 20 is a block diagram generally depicting an iterative fitting procedure as may be applied in some embodiments. FIG. 21 is a pseudocode listing reflecting one possible tracking algorithm as may be implemented in some embodiments.

Initially, the system may receive a first camera pose and/or belief at block 1905. This may be an arbitrary, default assumption. In some embodiments, if Standard Tracking is just starting, then it may receive this initial pose and/or belief as the pose and/or belief generated by Global Localization. As new data frames are received at block 1910 the system may update the pose and/or belief estimates.

In Prediction, generally corresponding to blocks of group 1950 in FIG. 19, the system may determine the predicted belief based on, e.g., a frame timestamp, IMU data, (block 1915) and determine the most likely pose (block 1920). Prediction may be part of Pose Update process 815*c* or Standard Tracking process 820*b*. For example, the system may use a dynamics model, and compute the integral term from EQN. 11, also referred to as the Bayesian prediction $$\overline{bel}_t = \eta \int p(T_t|T_{t-1}) bel_{t-1} dT_{t-1} \quad (12)$$

This term may reflect the prediction of the camera pose given all the prior measurements, except the very last one. In other words, $$\overline{bel}_t = p(T_t|D_1, D_2, \ldots, D_{t-1}) \quad (13)$$

These steps may generally correspond to the example of lines 3-4 in FIG. 21. $MP(\overline{bel}_t)$ denotes the maximum-a-posteriori of $bel_t$, e.g., the most likely pose of the camera based on the prediction belief $\overline{bel}_t$.

At the Measurement Update, generally corresponding the blocks of group 1955, if convergence has not yet been achieved (block 1925), the system may determine the correspondences (block 1930) and refine the belief estimate (block 1935) (e.g., determine an improved transform for the pose). These steps may generally correspond to lines 7-12 in FIG. 21. The Measurement Update 1955 may generally correspond to EM process 840*a* or EM process 840*b*. The system may compute the resulting belief $bel_t$ for the time step by incorporating the latest measurement $D_t$ using the measurement model $p(D_t|T_t)$. Once convergence has been achieved (e.g., a comparison of the MAR difference between successive transforms is below a threshold, some number of iterations have been performed, etc.) the Measurement Update process may provide the most recent belief and pose 1960 to the requesting system (e.g., the Pose Update process or the Standard Tracking process).

An example of convergence is graphically presented in the block diagram of FIG. 20. The depth values associated with a frame relative to an untranslated, unrotated pose at the origin may result in the depth value positioning at location 2005. A Prediction step 1950 may generate a belief with a most likely transform/pose $T_1$ relocating the depth values to the position 2010*a*. Correspondences may then be determined in the E-Step 2000*a* using, e.g., LF with KD-Trees, IB, or LFI models. For example, the depth value 2020 may be determined to correspond with a point 2015 on the surface of an object. The system may provide these correspondences, e.g., to a PSA in the next M-step iteration 2030*a*.

The M-Step 2030*a* may produce a new belief with a most likely transform/pose $T_2$ which relocates the depth values to the position 2010*b*, which may be used by the second EM iteration to generate a second set of correspondences in the E-step 2000*b*. Similar iterations may continue: M-Step 2030*b* producing a new belief with a most likely transform/pose $T_3$ which could then be used to identify correspondences for data at the position 2010*c*; M-Step 2030*c* producing a new belief with a most likely transform/pose $T_4$ which could then be used to identify correspondences for data at the position 2010*d*; etc. As indicated, however, as the transform relocates the depth data closer and closer to the "correct" position, the successive transforms may change very little. For example, the difference between $T_4$ and $T_3$ is much less than between $T_4$ and $T_1$. The difference between transforms may be assessed in MARs (with an appropriate R selected) and when the difference is beneath a threshold "convergence" may be said to be achieved. The most recent belief and its most likely transform/pose (e.g., $T_4$) may then be returned.

At line 9 of FIG. 21, the LFI data structure allows for fast correspondence matching and may be used in some embodiments. Without LFI (e.g., during mapping), computing correspondences for the entire model may be very costly. In these cases, some embodiments resort to alignment of the new data to a Virtual Scan of the model, which is generated from the predicted most likely camera pose $T_t^-$ as generated by line 4 of FIG. 21. For the mapper, Virtual Scan construction is described in greater detail herein, e.g., in the section with numerical identifier #20 and any corresponding subsections. For the tracker, a "virtual scan" may instead be generated in some embodiments by rendering the model mesh into an OpenGL depth buffer and then reading back the depth values. A PSA optimized to use an LFI data structure, however, may generate better results in some embodiments.

The use of a Virtual Scan may mean that the pose estimation aligns new data only to the Virtual Scan rather than the entire model. For small camera motions (as, e.g., during mapping), this may not be too significant, but for larger motions it may be suboptimal. In contrast to Virtual Scans, LFI has the advantage of aligning the data to the entire model, which may be better for larger motions that can arise during tracking.

The data scan and the virtual scan (if used) may have smooth normal computed. The model may already be smooth enough, but the data may need to be smoothed in order to obtain useful normal in some embodiments.

For efficiency reasons, the smooth normal computation may be performed on a GPU as described in greater detail herein, e.g., in the section with numerical identifier #54 and any corresponding subsections. For improved performance, the data scan can also be sub-sampled to reduce the number of point comparisons in some embodiments. During mapping, some embodiments may also remove a border of some width from the data depth scan for the purposes of Pose Update while, e.g., using the entire data scan for Map Update.

With regard to Line 8 of FIG. 21, this loop may gradually refine an estimate of $bel_t$ using expectation maximization (EM) method, specifically a hard-assignment EM version in this example. EM alternates an expectation step (E-Step) and a maximization step (M-Step). The E-Step computes correspondences and the M-Step adjusts the pose.

With regard to Line 9 of FIG. 21, (E-Step), the system may first transform the data scan into world coordinates using the most recent camera pose estimate $\{y_n\}=\{T_t^{(i)}(x_n)\}$. Then, correspondences may be computed using IB, LF, or LFI models (e.g., correspondences as depicted graphically in FIG. 20). Next, the system may compute outliers, which are data points that do not match their corresponding model points very well. A data point may be considered an outlier, e.g., if it does not match up to a valid model point, is too far from the matched model point (more than some threshold $k_{dist}$), does not have a valid normal, or its normal is too different from the model normal. If the percentage of outliers is too great, the system may fail. The tracker can either attempt to restart from the same pose for the next data scan $D_{t+1}$, or it may require re-initialization using Global Localization techniques described in greater detail herein, e.g., in the section with numerical identifier #20 and any corresponding subsections.

In some embodiments, the scan points in a frame of sensor data may come from two types of obstacles: the static obstacles and the dynamic obstacles. Static obstacles are the ones that remained in the same position since the map has been created, e.g., for, walls, etc. Dynamic obstacles are the objects that have moved since map creation. Dynamic obstacles may include people, pets, and any objects moved out of place since the previous mapping. When aligning a data scan to the map, the system, in some embodiments, may filter out dynamic obstacles as they are not on the map. Rejection of outliers is intended for filtering of dynamic obstacles. Thus, the smaller the outlier threshold $k_{dist}$ the more dynamic obstacles will be filtered. This may be desirable for very fine and accurate pose adjustment.

On the other hand, if the outlier threshold $k_{dist}$ is smaller than the error in the current pose estimate, then large portions of static obstacles may be filtered out as well. Without these obstacles, it may be difficult to converge to the correct pose. Since the pose error should gradually get smaller with EM iterations, some embodiments set $k_{dist}$ to a larger value at the start of EM and gradually reduce $k_{dist}$ towards a minimum value.

With regard to Line 10 of FIG. 21, (M-Step), the alignment of selected data points to their corresponding model points may be performed, e.g., using Scaling Series starting with the most recent estimate of the belief $bel_t^{(i)}$ and producing a new estimate $bel_t^{(i+1)}$ (resulting, e.g., in the increasing accurate mappings of states 2000a, 2000b, 2000c, and 2000d in FIG. 20). Distances between points may be computed using a Point-to-Plane metric based on the model normals. Scaling Series updates may be highly parallelized on the GPU as described in greater detail herein, e.g., in the section with numerical identifier #54 and any corresponding subsections. One will recognize that other hill climbing or optimization search techniques may also be used in place of Scaling Series.

The starting uncertainty for Scaling Series may be set to the uncertainty of the prediction distribution $\overline{bel}_t$ produced by the dynamics update. The final uncertainty $\delta^*$ may be set very small in order to achieve a highly accurate alignment. The values for most parameters of Scaling Series can be learned as described in greater detail herein, e.g., in the section with numerical identifier #44 and any corresponding subsections. A number of other considerations have to be made for Scaling Series. A more detailed discussion is provided elsewhere herein, e.g., in the section with numerical identifier #39 and any corresponding subsections.

With regard to Line 11 of FIG. 21, the improved pose estimate $T_t^{(i+1)}$ may be updated to be the maximum-a-posteriori of $bel_t^{(i+1)}$ and i is incremented for the next iteration.

With regard to Line 12 of FIG. 21, the convergence condition can be, e.g., that either the change in the estimate of $T_t^{(i)}$ becomes very small or the maximum number of EM iterations is reached. Since EM can oscillate between several local minima, some embodiments compute the distance from $T_t^{(i)}$ to all the prior iterations $T_t^{(0)}, \ldots, T_t^{(i-1)}$. If the MAR (e.g., MAR-1) distance from any of the prior iterations is below the convergence threshold, the system may assume that EM has converged and exit the EM loop.

With regard to Line 14 of FIG. 21, once the convergence condition is reached, some embodiments set $bel_t$ and $T_t$ to be the estimates from the last EM iteration i.

29. Pose Estimation—Pose Tracking—Prediction Step

In regard to the dynamics model used in the prediction step (e.g., the term $p(T_t|T_{t-1})$ in EQN. 11), some embodiments assume that the depth sensor can at most move with the speed of a human (as a human will be providing the camera motion in some embodiments) or whatever other vehicle or animal is used to maneuver the capture device. For example, given maximum linear velocity $v_{max}$ and maximum rotational $w_{max}$, some embodiments assume that the camera can translate by at most $v_{max} \Delta t$ and rotate by at most $w_{max} \Delta t$ around some axis, where $\Delta t$ is the amount of time between time steps t−1 and t.

If reliable IMU measurements are available, they can also be used to improve the dynamics model. Specifically, to apply a motion model to a set of broad particles, the particles may be moved using the motion model (e.g., based on information from the IMU or estimated velocities) and the uncertainty radius of each particle may be increased by the uncertainty of the motion. Particle weights may be updated as described in algorithm SS-DYN3 in (Chapter 2 of the PhD Thesis of Anna Petrovskaya, "Towards Dependable Robotic Perception"—one will recognize that not all embodiments are implemented using that particular implementation) in some embodiments.

In some embodiments, for mapping, it may be safer to use the prior pose as the predicted current pose, rather than to move the prediction using some estimated velocity. This may be done because the map is not yet complete, and so overestimating the velocity can move the camera to a position from which it cannot see any of the map. This may cause the tracking algorithm to get lost. For real-time tracking, it may instead be better to use a more refined prediction using estimated velocities. Since the amount of time between two data frames is very small, the IMU may provide a reasonably accurate estimate of delta rotation between the two poses. Humans can rotate the device a lot faster than they can translate it linearly. For this reason, the IMU data may be especially useful during sudden sharp turns by the user. One example of using the IMU for prediction employed in some embodiments is to compute the relative rotation (and optionally translation) IMU observed between time steps t−1 and t, then apply this rotation (and optionally translation) to each particle in the belief, and increase the uncertainty region e.g., to a constant, or based on how much uncertainty the IMU would accumulate in that period of time.

30. Pose Estimation—Pose Tracking—Scaling Series

The Scaling Series algorithm (an example PSA) may compute an approximation of the belief bel by weighted particles. A particle represents a position in the search space. For example, where the device's pose is represented as six dimensions (x, y, z, pitch, yaw, roll) then each particle may represent a potential pose across all six dimensions. The initial uncertainty may be assumed to be uniform over the starting region. If the initial uncertainty is assumed to be uniform, the belief may be proportional to the data probability. Thus, the weights can be computed via the measurement model. A more through discussion of an example Scaling Series approach is provided in the PhD Thesis of Anna Petrovskaya, "Towards Dependable Robotic Perception". However, the embodiments described herein are not limited to particularities of that example. Indeed, some embodiments employ other Hill Climbing, or Optimization Search functions in lieu of Scaling Series entirely.

Figure 22:
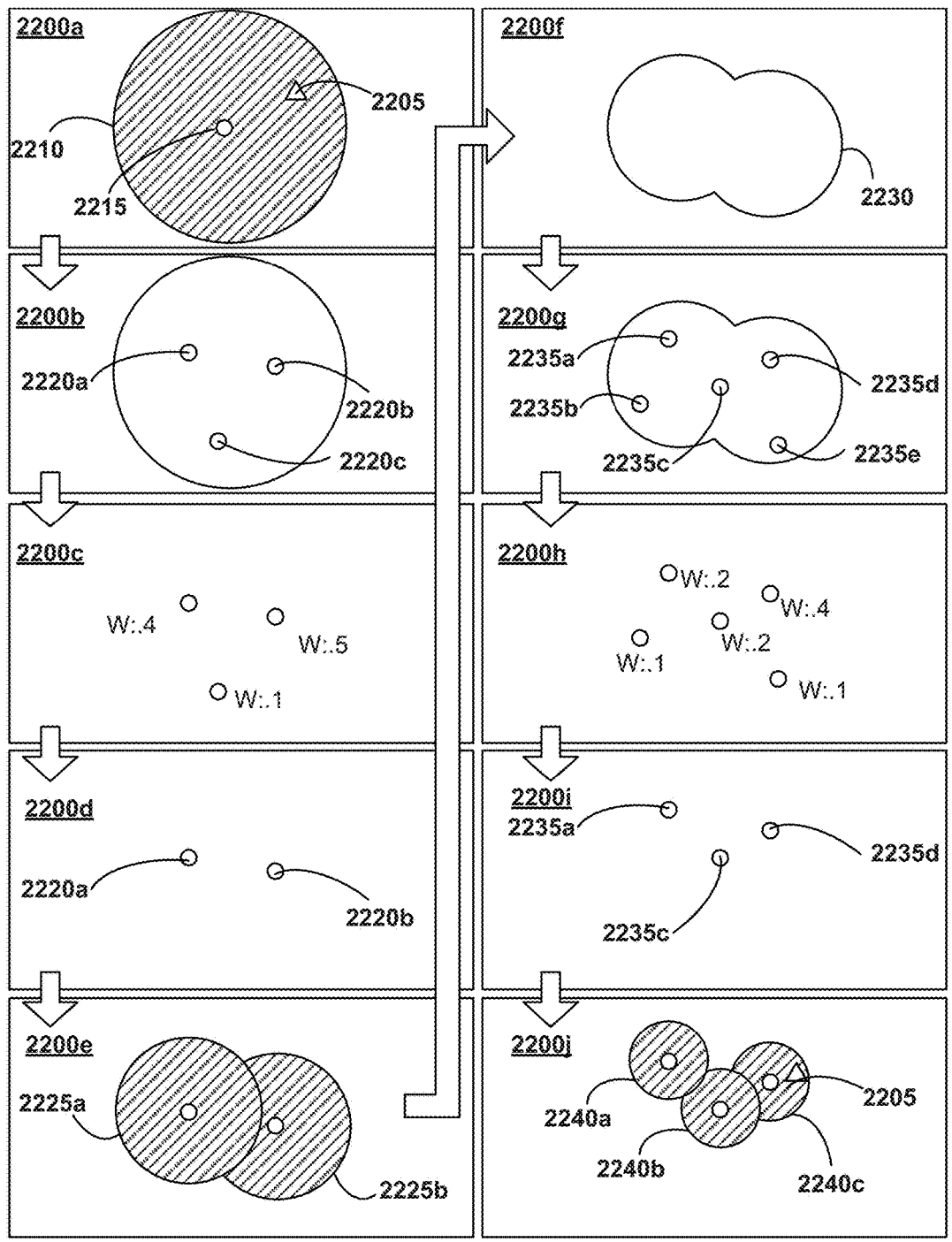
FIG. 22 is a graphical depiction of an example Scaling Series algorithm in a hypothetical two-dimensional universe to facilitate understanding of a higher-dimensional algorithm as may be implemented in some embodiments.
Figure 23:
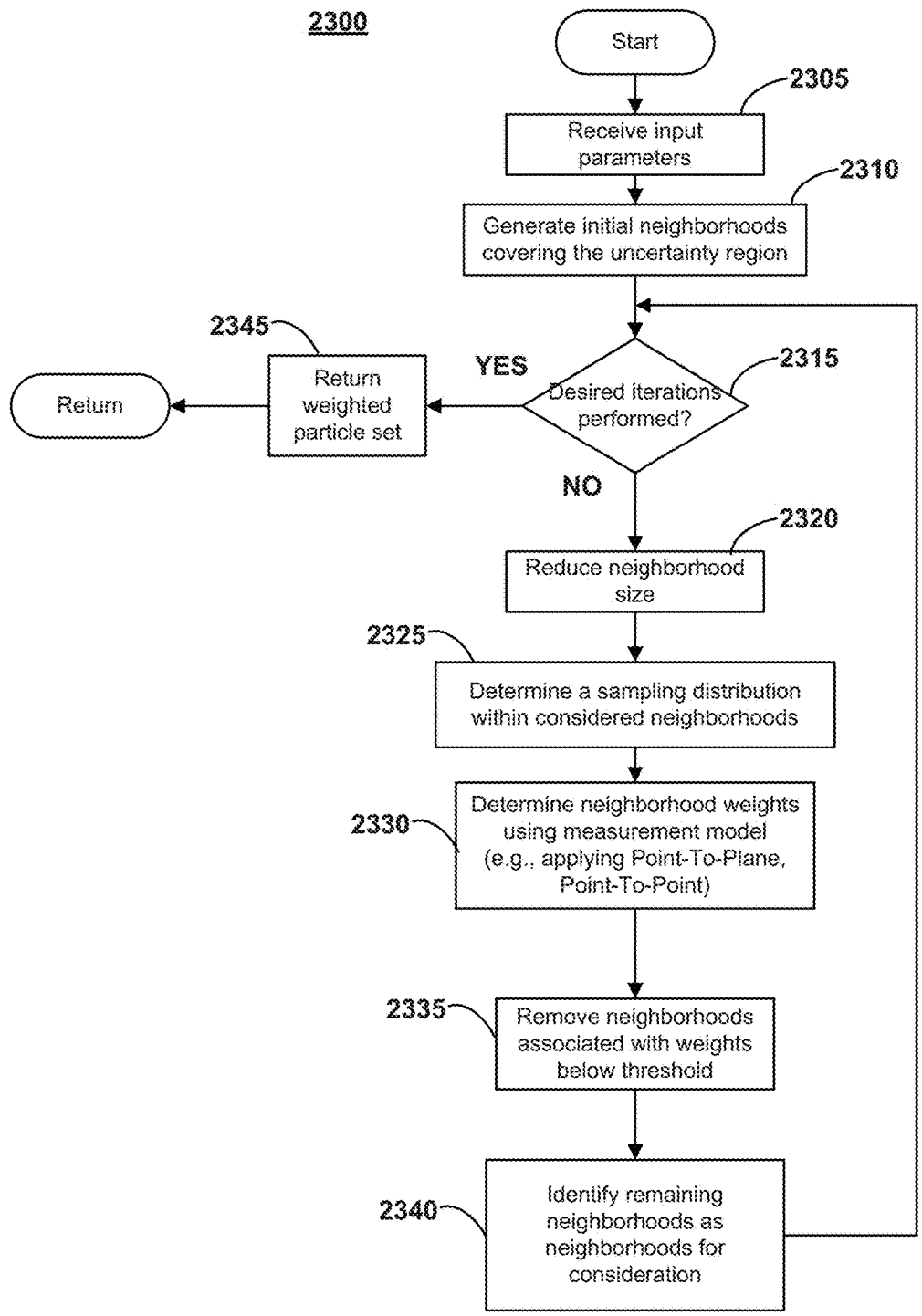
FIG. 23 is a flow diagram describing the operations of an example Scaling Series algorithm implemented in some embodiments.

FIG. 22 is a graphical depiction of a Scaling Series in a hypothetical two-dimensional universe as may be implemented in some embodiments. FIG. 23 is a flow diagram describing the operations of an example Scaling Series algorithm implemented in some embodiments. FIG. 24 is a pseudocode listing reflecting one possible scaling series algorithm as may be implemented in some embodiments. The search space in this example is depicted in each of steps 2200a-2200j as a two-dimensional rectangle (a typical search space would comprise, e.g., six rather than two dimensions). In this example, the actual position that best corresponds to the current data is the position 2205.

In this example implementation, at block 2305, the algorithm may take as input the initial uncertainty region, $V_0$, the data set, D (e.g., frame depth data), and two user-specified parameters: M and $\delta^*$. M specifies the number of particles to maintain per $\delta$-neighborhood. $\delta^*$ specifies the terminal value of $\delta$. The refinements may stop once this value is reached. At line 2 of FIG. 24 the scaling factor zoom is set so that the volume of each neighborhood is halved during scaling (though other scaling factors may be used).

At line 3 of FIG. 24, in this example algorithm, the number of iterations N is computed based upon the ratio of initial to final volume (this may be adjusted if, e.g., a different scaling factor is chosen). S denotes a neighborhood, R($\cdot$) denotes the radius, and Vol($\cdot$) denotes the volume (e.g., a six-dimensional volume) of the region.

As depicted in lines 1 of FIG. 24 the system may initialize the radius of the neighborhood to consider to be the radius of the initial uncertainty region. Accordingly, initial neighborhoods covering the uncertainty space are generated at block 2310.

Lines 4-11 of FIG. 24 depict the steps occurring at each iteration of the algorithm. The iterations may be stopped at block 2315 based, e.g., on the number of iterations performed, the size of the neighborhoods, an applied metric, etc. At block 2320 the system may reduce the neighborhood size. For example, as indicated at line 5 of FIG. 24, at each iteration n, $d_n$, is computed by applying the zooming factor to $d_{n-1}$.

Where the scaling series applies an annealing approach, at line 6 of FIG. 24, the corresponding temperature $T_n$, may also be determined assuming that $\delta^*$ correspond to the temperature of T=1.

At block 2325, the system may determine a sampling distribution within the neighborhood (e.g., which candidate poses within the space to consider). For example, at line 7 of FIG. 24 the system may draw a particle set $\overline{X}n$ uniformly from $V_{n-1}$ ensuring that the required density of M particles per $\delta$-neighborhood.

At block 2330, the system may determine measurement weights based on a measurement model. Example measurement weights are described in greater detail herein. For example, at line 8 of FIG. 24, the system may weigh the particles by the annealed data probability at temperature $T_n$, which could be, e.g., the probability provided by the measurement model raised to the power of $1/T_n$. In the example of FIG. 24, it may also serve to normalize the weights so that they add to 1, depending on the Pruning function on Line 9 (in some embodiments it may not be desirable to normalize weights to have them add up to 1). In some embodiments, the probability provided by the measurement model can be in negative-log form (i.e. not exponentiated to the negative power, e.g. total measurement error squared over 2 as in EQN. 14), also known as energy, thus allowing much better numerical stability in some embodiments when using floating point values. In some implementations, instead of exponentiating energy and raising it to the power of $1/T_n$, the energy can be multiplied by $1/T_n$ and the probability weights can be kept in negative-log form.

At block 2335, based, e.g., upon the measurement model determinations at block 2330, the system may remove neighborhoods having weights beneath a threshold, e.g., a pruning factor times the highest weight among all particles. If the weights are kept in negative-log form, in some implementations, the pruning can be determined by subtracting the lowest negative-log weight among all particles (e.g., the highest weighted particle would be the lowest energy particle), and determining that it is greater than the negative-log of pruning factor (e.g., $-\log(f)$). For example, at line 9 of FIG. 24 the system may exclude low probability regions (e.g., regions below a threshold).

At block 2340, the system may identify neighborhoods for consideration in a next iteration. For example, at line 10 of FIG. 24 the system may then determine the resulting subregion for this iteration.

FIG. 22 depicts these operations graphically. For example, after several iterations the system may identify a neighborhood in the initial step 2210 about a value 2215. They system may then perform an even density cover (Line 7 of FIG. 24) to identify the points 2220a, 2220b, 2220c ( $\overline{X}_1$). Normalized weights may then be computed for each point at step 2200c (Line 8 of FIG. 24). Based on these weight values, the points may be pruned so that only 2220a and 2220b remain (Line 9 of FIG. 24) at step 2200d. Smaller neighborhoods 2225a and 2225b (state 2200e) may appear around these points and a union 2230 of these neighborhoods (state 2200f) (Line 10 of FIG. 24). A new iteration may then be performed. Particularly, an even density cover (Line 7 of FIG. 24) may be computed across the union 2230 to yield the points 2235a, 2235b, 2235c, 2235d, 2235e ($\overline{X}_2$). Normalized weights may then be computed for each point at step 2200h (Line 8 of FIG. 24). Based on these weight values, the points may be pruned so that only points 2235a, 2235b, and 2235c remain (Line 9 of FIG. 24) at step 2200i. Smaller neighborhoods 2240a, 2240b, and 2240c (state 2220j) may appear around these points. The union may be taken of the neighborhoods and the iterations may continue.

Once N iterations have been performed (though other stop conditions may be used in some embodiments) the system may return the results at block 2345. For example, the system may prepare the output at lines 12 and 13 of FIG. 24. These lines draw the final particle set and compute weights at temperature T=1.

31. Pose Estimation—Pose Tracking—Scaling Series—Measurement Models

In some embodiments, the measurement model used to compute the normalized weights at line 8 of FIG. 24 is more complex than the dynamics model used by a Mapping or Tracking System. Generally, it's not possible to model a sensor exactly. On the other hand, this model may have a tremendous impact on accuracy of the estimate and also on the computation time required.

The measurement models applied in some embodiments may have a common structure. Generally, the measurement model may be computed as a Gaussian distribution over the total measurement error $\epsilon$. For example, $$p(D|T) := \eta \exp\left(-\frac{\varepsilon^2}{2}\right) \tag{14}$$

Where $\eta$ denotes a normalization constant. If a scan is a collection of 3D points $D := \{x_1, \ldots, x_n\}$, the total measurement error $\epsilon$ is a function of the individual measurement errors en of each scan point $x_n$. Some embodiments assume that individual scan points are independent of each other given the pose of the camera T, then $\epsilon$ is the $L_2$-norm of the individual errors $$\varepsilon := \sqrt{\sum_n \varepsilon_n^2} \tag{15}$$

In reality, though, the individual scan points may not be completely independent of each other and an L1-norm may give better results:

$$\varepsilon := \sum_n |\varepsilon_n| \tag{16}$$

where $|\cdot|$ denotes the absolute value.

Each individual measurement $x_n$ may be expressed in the camera's local coordinate frame. Taking into account the current camera pose T, these points may be expressed in the world frame $y_n := T(x_n)$. In some embodiments, each individual error is defined to be proportional to some measure of distance from the measurement $y_n$ to some corresponding point $C(y_n)$ on the 3D map:

$$\varepsilon_n := \frac{d(y_n, C(y_n))}{\sigma} \tag{17}$$

Where $\sigma$ is the standard deviation of the error, which may depend on sensor and map accuracy. The measure of distance $d(\cdot, \cdot)$ may be the Euclidean distance, though some embodiments instead apply the Point-To-Plane distance. Given the data point $y_n$, its corresponding model point $C(y_n)$ and the surface normal vector at that model point $v_n$, the point-to-plane distance is computed as the absolute value of the dot product $$d(y_n, C(y_n)) := |(C(y_n) - y_n) \cdot v_n| \tag{18}$$

where $|\cdot|$ denotes absolute value and $\cdot$ denotes the dot product operator. Particularly, as described elsewhere herein, both the Pose Update and Standard Tracking processes may determine correspondences $C(y_n)$ which may then be used to determine the distance using the above equations. Additionally, in some implementations, the corresponding point $C(y_n)$ and the normal vector $v_n$ may be provided as a plane (a, b, c, d), in such case the Point-To-Plane distance can be computed as:

$$d((x,y,z),(a,b,c,d)) := |a^*x + b^*y + c^*z + d| \tag{19}$$

where (x, y, z) is the location of $y_n$ and (a, b, c, d) is the corresponding plane representation. In some embodiments, the Global Localization process may instead use an LFF data structure to determine the distance (the LFF may provide the distance value directly without the need to compute the numerator "$d(y_n, C(y_n))$" explicitly). That is, $$\varepsilon_n = \frac{LFF(y_n)}{\sigma} \tag{20}$$

In the presence of outliers, some embodiments cap the value of en at a maximum value. The correspondence function $C(\cdot)$ may be defined differently in different measurement models as explained herein.

Figure 25:
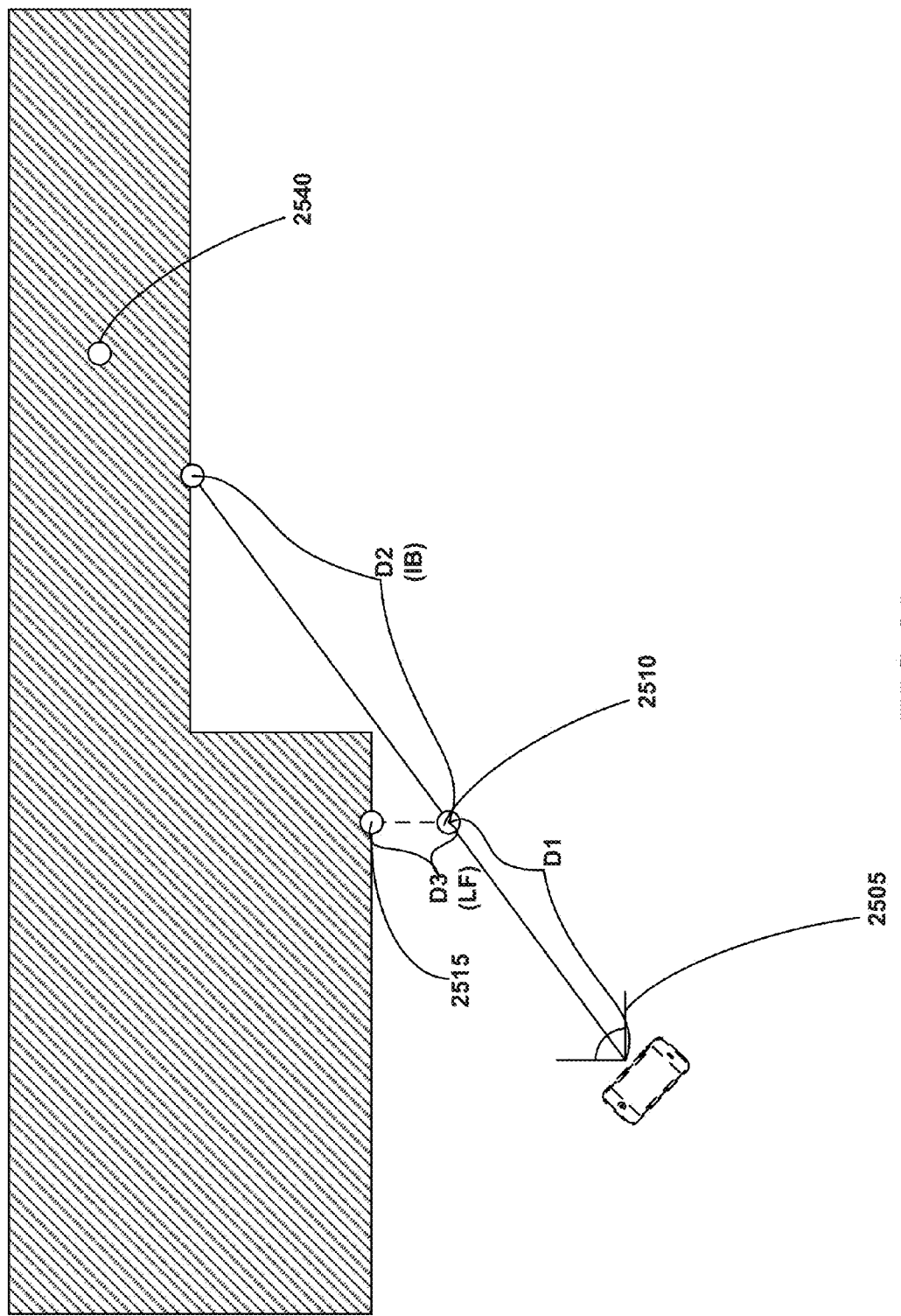
FIG. 25 is an idealized two-dimensional representation depicting LF and IB measurement metrics for correspondence determinations corresponding to higher-dimensional metrics as may be applied in some embodiments.

32. Pose Estimation—Pose Tracking—Scaling Series—Measurement Models—Independent Beam Model FIG. 25 is a block diagram generally depicting measurement metrics for correspondence determinations and for PSA measurements as may be applied in some embodiments. A capture device believed to be at the pose 2505 may return a depth value for a given ray corresponding to the point 2510.

The independent beam model (IB) is a measurement model applied in some embodiments for correspondences (e.g., in EM), which assumes that the sensor takes measurements along a single ray (beam) per pixel. For example, the IB measurement model would assess the difference between D1 and D1+D2 in FIG. 25 as the consequent error (i.e., D2). Hence, the correspondence function F may use the camera projection model CM to back-project model points into the camera image. Then each point $y_n$ may be assumed to correspond to whichever model point falls within the same pixel and is the closest to the camera (similar, e.g., to the update of the TSDF in FIG. 11). This measurement model may be most commonly used during mapping. It can be fast to compute, but can be very brittle as the smallest motion of the camera can result in large jumps in the measurement error.

The IB model can have the advantage of taking negative information into account. Positive information is information about the obstacles that are present, whereas negative information is information about absence of obstacles, i.e., free space. In other words, IB may penalize not only the measurements that fall short of the modeled obstacles, but also the measurements that are too long and go past the modeled obstacles (e.g., a depth value at 2540). For example, IB does not allow measurement rays to go through walls and be associated to obstacles in another room.

33. Pose Estimation—Pose Tracking—Scaling Series—Measurement Models—Likelihood Field Model Since brittle measurement models can be very challenging for PSAs (e.g., Scaling Series), a smoother version can be used in some embodiments (alone or in conjunction with other models). One such model is the likelihood field model (LF). LF puts each measured point $y_n$ into correspondence with the closest model point (in terms of Euclidean distance). For example, measurements near modeled obstacles may be considered more likely and measurements in free space may be considered less likely. To continue the example of FIG. 25, LF would assess the distance D3 between the reported distance (point 2510) and the nearest point on a surface (point 2515) as the error.

In some embodiments, likelihood is modeled to fall gradually away from obstacles and may be modeled as a smooth function. This model may be helpful during the mapping phase (and may be used exclusively in some embodiments). Some embodiments may employ KD trees for faster lookups of closest model points. For example, a KD tree representation of a map or a virtual scan may be generated and used during mapping or tracking. In some embodiments, the LF model ignores negative information. For example, measurements are allowed to go through walls and be matched to obstacles in another room if that happens to give a better likelihood score.

34. Pose Estimation—Pose Tracking—Scaling Series—Measurement Models—Likelihood Grid Model In some circumstances, the LF model may be far too time consuming for tracking (even when using KD trees) but it may be desirable to still use a smoother model (e.g., smoother than an IB model). Thus, in some embodiments, when mapping is complete, the mapping system may pre-compute a grid data structure (e.g., in 3 dimensions), storing the information about the closest model point in each grid cell. The Euclidean distance to a closest point on a surface may be stored as a float (the resulting data structure is referred to herein as an LFF). One will recognize other suitable data types. For example, an array of model points and their normals may be stored. An integer index of a closest point in each grid cell may then be stored. This resulting data structure is referred to herein as an LFI (likelihood field integer).

Figure 26:
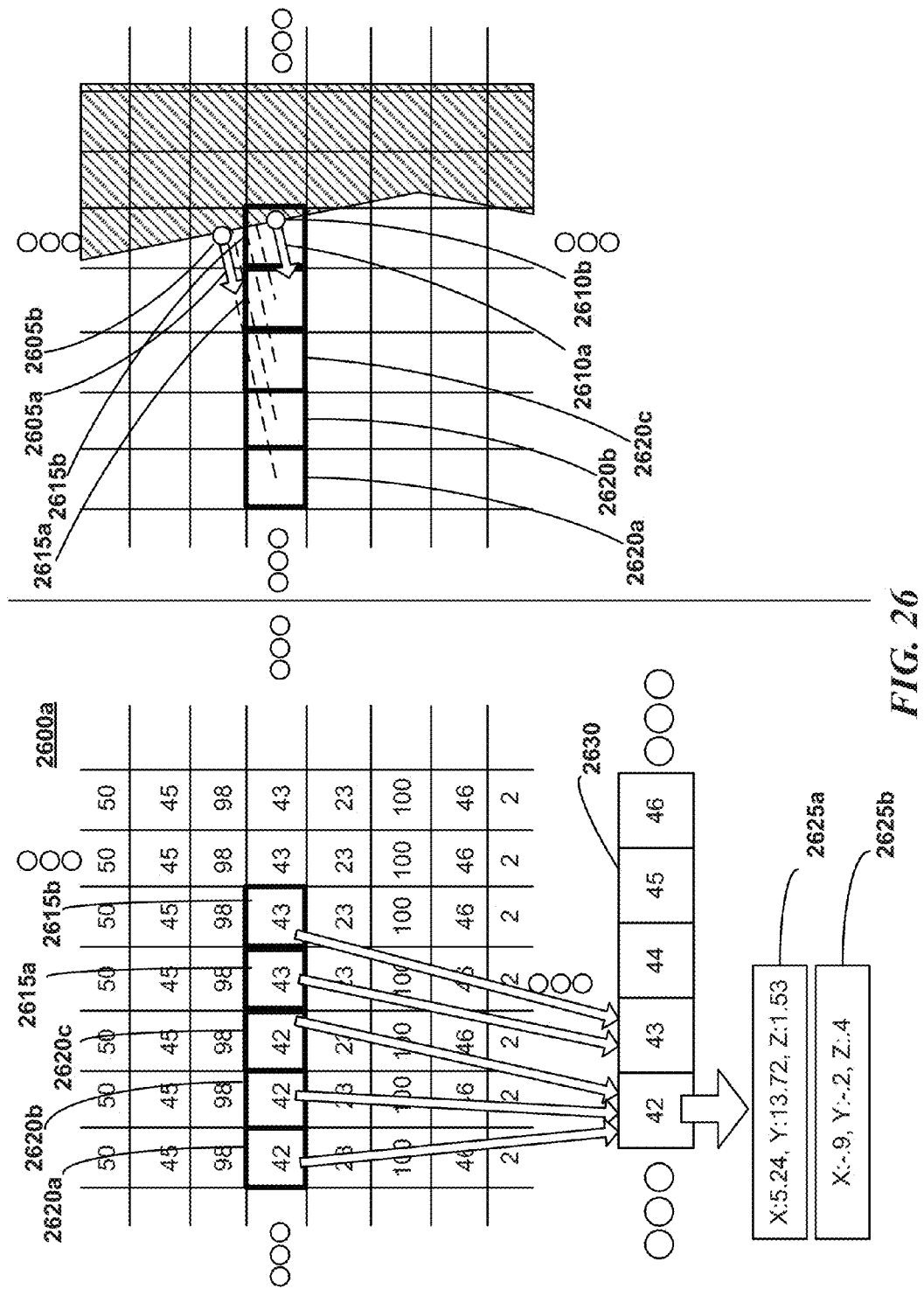
FIG. 26 is an idealized two-dimensional representation of a Likelihood Field Integer (LFI) data structure corresponding to a higher-dimensional structure in some embodiments.

FIG. 26 is an idealized two-dimensional representation of a Likelihood Field Integer (LFI) data structure as may be implemented in some embodiments. In this example, the center of cells 2615a and 2615b may be closest to the point 2610b on a surface having a normal 2610a at the point 2610b. Similarly, the center of cells 2620a, 2620b, and 2620c, may be closest to the point 2605b on a surface having a normal 2605a at the point 2605b. These same cells are highlighted in the view 2600a of the LFI cell structure to facilitate understanding. Cells 2620a, 2620b, and 2620c are assigned the same integer 42 and cells 2615a and 2615b are assigned the same integer 43. These assignments may correspond to entries in an array 2630. For example, the 42nd entry may contain position values 2625a and normal values 2625b corresponding to point 2605b and normal 2605a (more points may exist than those indicated on the surface, e.g., at discrete intervals along the surface). Note that points within the surface may also be associated with indices.

Figure 27:
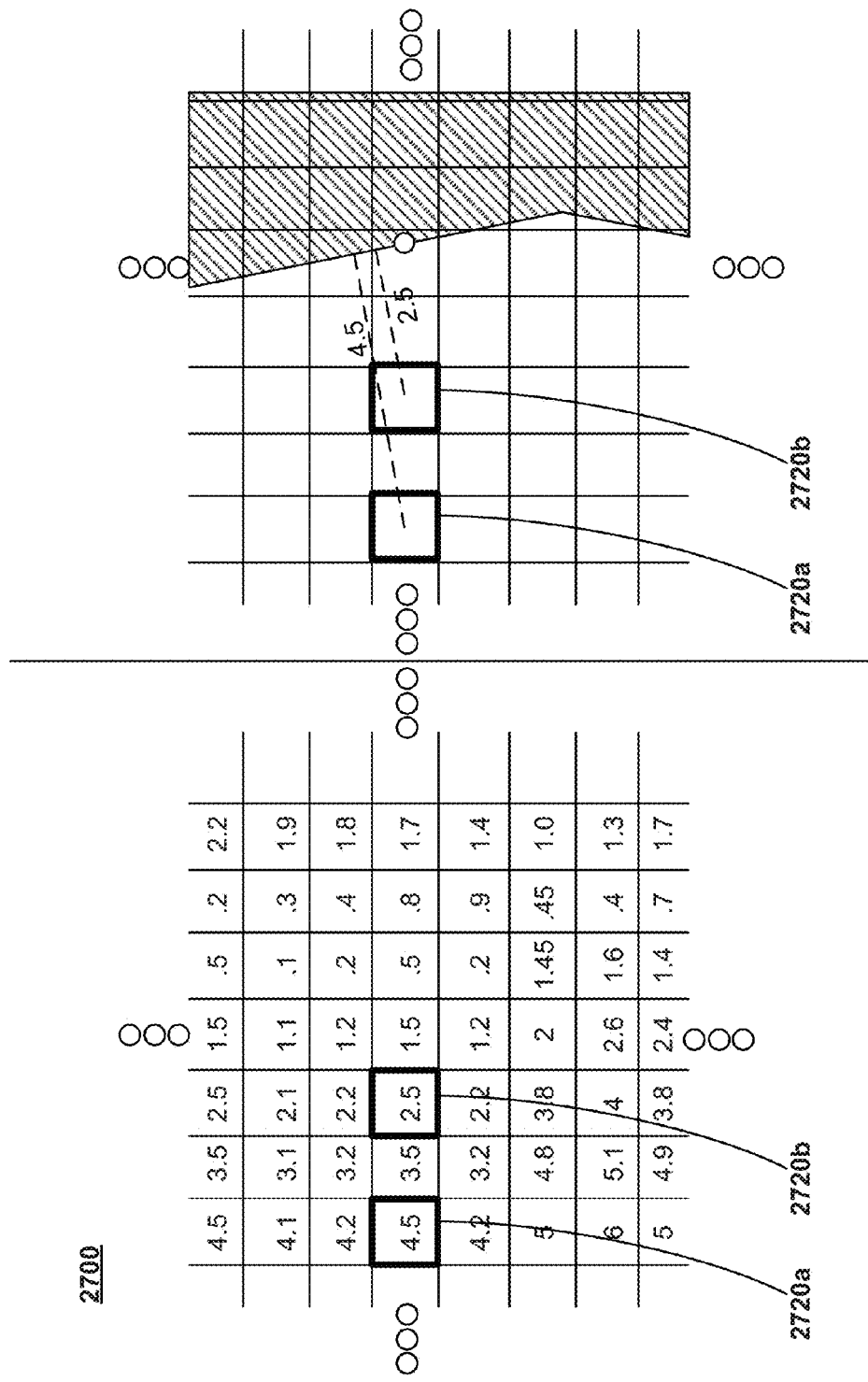
FIG. 27 is an idealized two-dimensional representation of a Likelihood Field Float (LFF) data structure corresponding to a higher-dimensional structure in some embodiments.

FIG. 27 is an idealized two-dimensional representation of a Likelihood Field Float (LFF) data structure as may be implemented in some embodiments. In this example, the center of a cell 2720a may be 4.5 units from a nearest surface and a center of a cell 2720b may be 2.5 units from a nearest surface. Accordingly, the LFF structure 2700 may include these values in the respective cells (highlighted here to facilitate understanding). Note that points within the surface may also be associated with distances to the surface (note that the distance values provided here are merely to facilitate understanding and may not be exact).

LFFs may be smaller and faster to look up than LFIs. LFIs may be slower due to double references, but may allow for point-to-plane distance computations. LFIs may also provide for more accurate matches at close distances since actual model points are used. Consequently, some embodiments use LFIs for pose tracking during regular operation of the AR device, and use LFFs for global localization.

35. Pose Estimation—Pose Tracking—Scaling Series—Measurement Models—Construction of LF Grids Both LFF and LFI may only have to be computed once for each new map and can be built right after the map construction. Construction may include putting all model points into a KD-tree, and then cycling through all grid cells and for each grid cell looking up the closest model point in the KD-tree. These KD-tree lookups can take a significant amount of time in some embodiments, especially for high-resolution LFFs and LFIs. To expedite construction, some embodiments may limit the maximum radius $\mu_r$ to be searched around each grid cell.

36. Pose Estimation—Pose Tracking—Scaling Series—Measurement Models—Maximum Cut-Off Distance Both LFF and LFI may be used to compute correspondences for data scan points. If a data scan point is too far from any model point, then either (a) the correspondence should not be made at all (this is called outlier filtering described in greater detail herein with respect to the tracking algorithm) or (b) the error value en should be capped as described herein regarding Measurement Models. In either case, beyond a certain maximum cut-off distance, in some embodiments it does not matter what model point this data point corresponds to. Various embodiments set $\mu_r$ to be this maximum cut-off distance. During tracking, outlier filtering may be used, and so $\mu_r$ can be quite small for LFI.

In fact, $\mu_r$ may only need to be larger than the outlier threshold $k_{dist}$ described herein. Some embodiments assign the value of −1 to each LFI cell for which there are no model points within $\mu_r$, to indicate that these cells do not match any model points. During global localization, LFF may be used and $\mu_r$ may be set to the error cap used in computation of $\epsilon_n$. Thus, cell values can be capped at $\mu_r$.

37. Pose Estimation—Pose Tracking—Scaling Series—Measurement Models—Comparison to TSDF Although both TSDFs and LF grids store similar information (e.g., distance to obstacles), several distinctions between the two may be taken advantage of in different embodiments. In contrast to TSDF, likelihood fields may store only the positive distance. Also, for LF grids, this distance may be computed from the center of each grid cell, whereas for TSDF, this distance may be computed from corners of grid cells. This can be an important consideration for speed in some embodiments, as the distance can simply be looked-up in an LFF, but may have to be computed via tri-linear interpolation in a TSDF. Furthermore, LFFs and LFIs may be computed after the map is already complete, and, thus, they may store the correct distance, whereas TSDFs may store an approximation (sometimes rather inaccurate) of the distance to obstacles.

38. Pose Estimation—Pose Tracking—Scaling Series—Measurement Metrics

Figure 28:
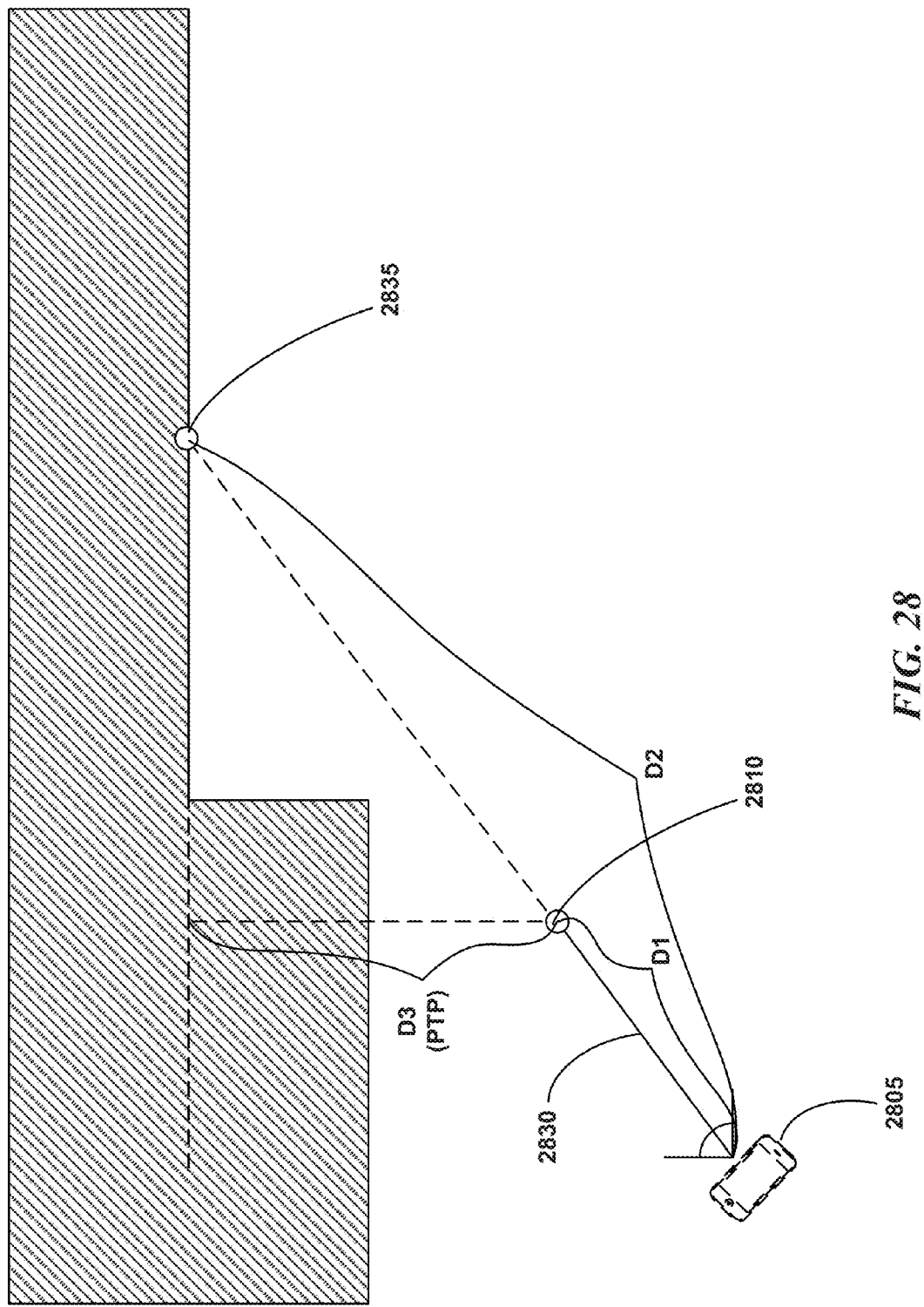
FIG. 28 is an idealized two-dimensional representation depicting a "Point-to-Plane" metric for pose assessment as may be applied in some embodiments.

FIG. 28 is a block diagram generally depicting measurement metrics (e.g., Point-to-Plane) for assessing a potential pose's quality (e.g., when determining particle weights in a Scaling Series [e.g., Line 8]) as may be applied in some embodiments. Particularly, a given ray 2830 in a current pose estimate may report a distance measurement of D1 corresponding to the point 2810. Relative to the model, the expected distance may have been D2 corresponding to the point 2835. Consequently, the point-to-plane error measurement may be D3, corresponding to the nearest intersection to the plane on which the point 2835 lies, relative to the point 2810.

39. Pose Estimation—Pose Tracking—Scaling Series—Techniques

Since Scaling Series runs inside of the tight EM loop, many embodiments seek to make Scaling Series as efficient and as accurate as possible. Various techniques which may be used alone or in combination for this purpose are detailed below. The reader is also encouraged to refer to FIG. 24 for details of the Scaling Series algorithm.

40. Pose Estimation—Pose Tracking—Scaling Series—Techniques—Center Alignment

It's typically easier to adjust fine rotations of an object you hold directly in your hand, as opposed to an object suspended at the end of a long pole. For the point cloud, the length of the "pole" is the distance between the center of the point cloud and rotation origin (e.g., coordinate frame). Additionally, for the point cloud alignment problem, it may be beneficial to align the centers of both point clouds to be at the same location, as this may reduce the amount of translation that will need to be searched. However, the most optimal "center" for a point cloud may depend on how the total measurement error $\epsilon$ is computed. If point-to-point distances are used together with the $L_2$-metric, then the most optimal "center" may be the center of mass (i.e., the first moment) of the point cloud. In embodiments applying point-to-plane distances instead of point-to-point, the optimal "center" may be difficult to compute, but the center of mass may still be used as a good estimate in some embodiments. Thus, some embodiments may offset the data and/or model points to have their center correspond to the rotation origin (e.g., their respective coordinate frames), then later incorporating this offset back into the total alignment transform. Additionally, some embodiments may align the data and model centers, this could be done, e.g. by adjusting the position component of a transform prior to running PSA, e.g. in the case of a belief represented by particles, all of the particles may be offset by the same offset, or all of the particles may be offset to have them all align with the model center, or one specific particle maybe offset to align with the model center, or a new particle may be added to align with the model center and have orientation of the predicted pose.

Figure 29:
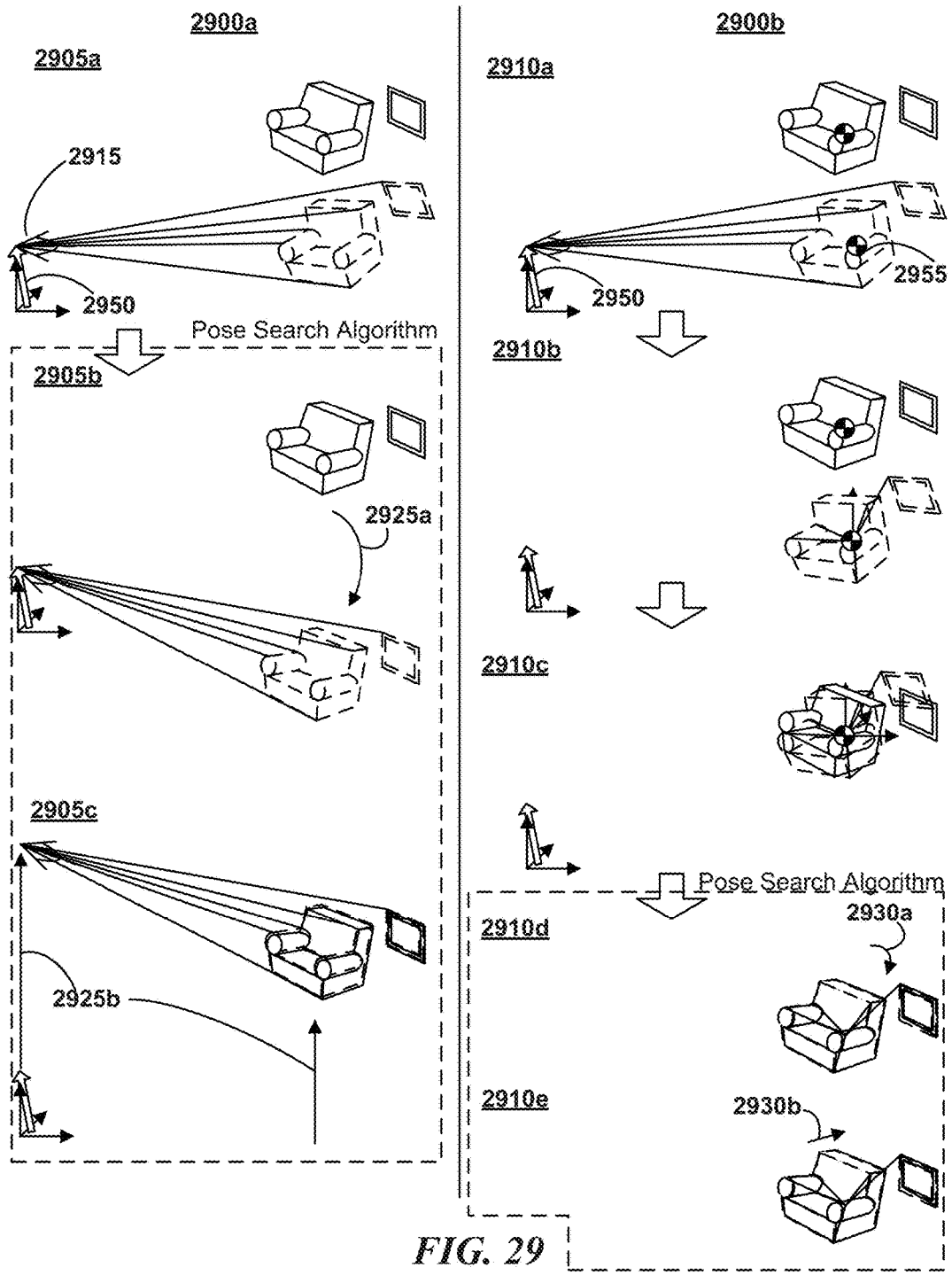
FIG. 29 is a visualization of the benefits associated with rotation origin adjustments to a frame and/or model as may be implemented in some embodiments.

FIG. 29 is a visualization of the benefits associated with rotation origin adjustments to a frame and/or model as may be implemented in some embodiments. A naïve approach, wherein depth frame data is applied directly to the pose search algorithm following application of a predicted pose 2950 is depicted in panel 2900a, while a more sophisticated approach involving center alignment as discussed with respect to some embodiments herein is presented in panel 2900b. As illustrated, the predicted pose 2950 has brought the depth frame data closer to the corresponding model points, but additional rotations and translations are needed to properly match the frame data with the model.

Particularly, as indicated in initial situation 2905a, following application of the predicted pose 2950, the data coordinate frame remains below and rotated relative to the corresponding model points. If the frame data were submitted to the PSA for analysis in this form, then a rotation 2925a and translation 2925b will be necessary to align the model and frame data. Both the rotation and translation operations 2905b, 2905c may be performed within the PSA (though rotation and translation operations 2905b, 2905c are depicted separately here to facilitate understanding, one will understand that a PSA searching the 6-dimensional pose space may make both determinations together).

Initially, in situation 2905a, the frame data is within a relatively short translation distance to the corresponding model points. However, the additional rotation 2925a relative to the camera origin required to properly orient the data introduces an additional large translation 2925b (in excess of the initial relatively short translation distance), which the PSA will also have to identify. Requiring the PSA to identify such gross displacements can impede the speed and/or quality with which the PSA identifies the improved pose.

In contrast, in situation 2900b, the data coordinate frame is relocated to the center of the data prior to submission to the PSA. Particularly, in the initial situation 2910a following application of the predicted pose, the frame data is again below and rotated relative to the corresponding model points. At step 2910b the local coordinate frame of depth data may be relocated to the first moment 2955 of the depth frame data. As indicated, following the relocation some of the depth values are pointed in all directions relative to the local origin. That is, e.g., depth data may initially have only a +z component following capture, but when the origin is relocated to the center of mass some depth data points may have −z values. At step 2910c, in some embodiments, the depth frame data may then itself be offset so that the first moment of the depth frame data coincides with the first moment of the corresponding model points (alternatively, the first moment of a virtual scan, or a portion of a model, etc.).

The PSA may then be applied to this processed depth frame data. Particularly, the PSA may identify a pose having a rotation 2930a and translation 2930b component (again, though rotation and translation operations 2910d, 2910e are depicted separately here to facilitate understanding, one will understand that a PSA searching the 6-dimensional pose space may make both determinations together). Unlike the PSA search of 2900a the PSA search of 2900b need not distinguish between as gross a disparity in translations. Consequently, a same amount of computational effort by, e.g., a Scaling Series PSA algorithm, may produce a better pose determination under the approach of 2900b rather than 2900a. One will recognize that after the PSA identifies an appropriate adjustment, the inverse of the adjustment can be applied mutatis mutandis to the estimated pose to identify the improved pose determination for output.

41. Pose Estimation—Pose Tracking—Scaling Series—Techniques—Conversion Radius Some embodiments also employ a conversion radius R for the Mahalonobis distance to use in the state space (see discussion of mar-R units elsewhere herein, e.g., in the section with numerical identifier #27 and any corresponding subsections). Again, the most optimal radius may be difficult to compute for the Point-to-Plane metric. However, some linear combination of standard deviation and maximum radius of the data point cloud could be used as an approximation. For example, given a center point, one may define the maximum radius of a point cloud as the maximum distance from the center to any of the points in the cloud. In some embodiments, the variance or other data point cloud feature may be used in addition to, or in lieu of, the standard deviation.

42. Pose Estimation—Pose Tracking—Scaling Series—Techniques—Particle Limit

Some embodiments may prioritize the generation of a pose estimate by the tracker in a timely fashion. In such situations, it can be helpful to limit the number of particles that Scaling Series will consider. This can be done inside Scaling Series during the pruning step. In addition to the regular pruning, the system may sort the particles based upon weight in decreasing order. Then, the system may retain only the first $N_{ss}$ number of particles, while pruning the rest. $N_{ss}$ may be another Scaling Series parameter that can be learned.

43. Pose Estimation—Pose Tracking—Scaling Series—Techniques—Grid and Hash Tree

Figure 30:
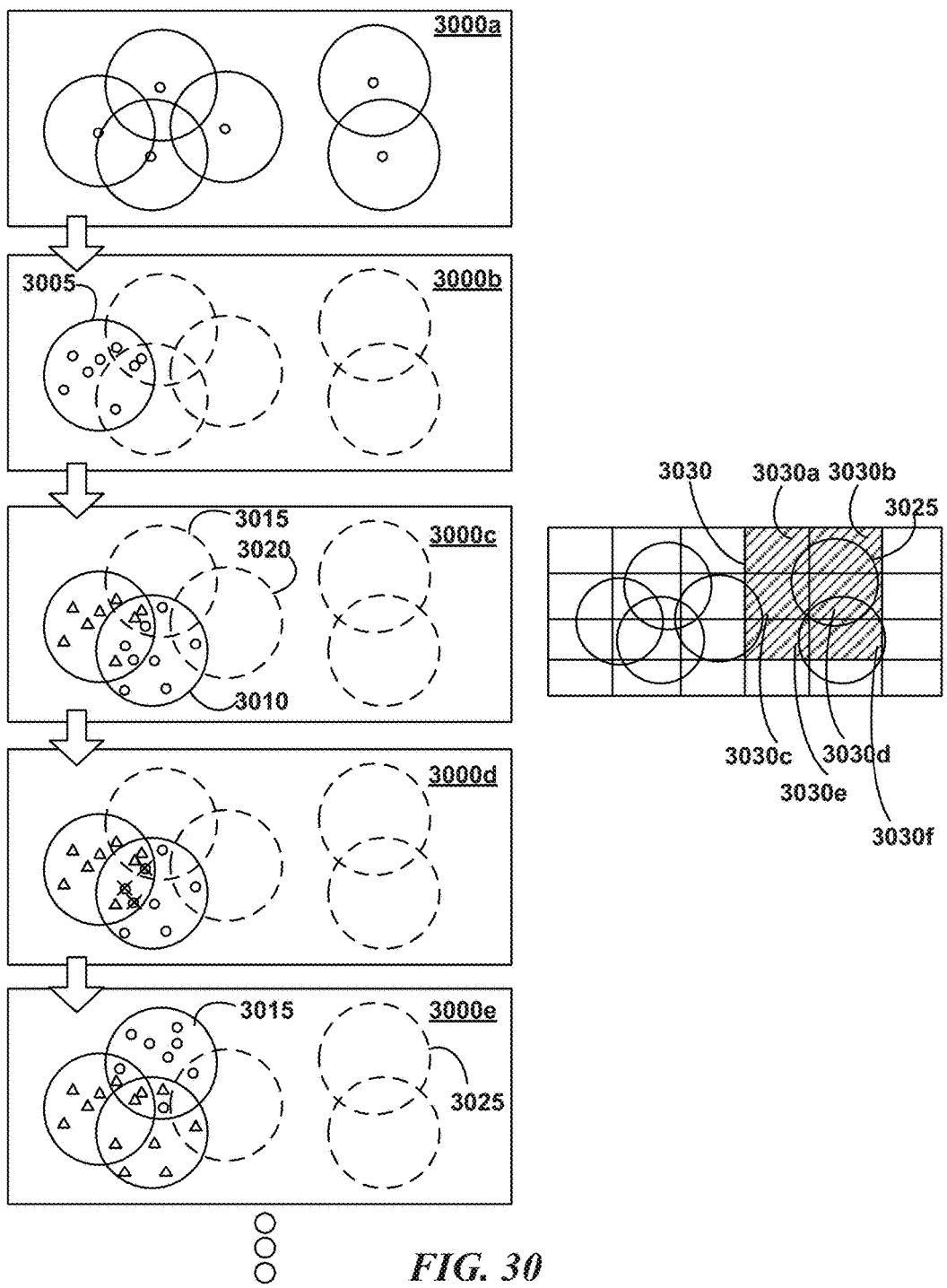
FIG. 30 is a graphical depiction of an example Even Cover Density algorithm in a hypothetical two-dimensional universe to facilitate understanding of a higher-dimensional algorithm as may be used in a Scaling Series algorithm implemented in some embodiments—the figure also depicts a Grid Hash as may be applied in some embodiments.

FIG. 30 is a graphical depiction of an example Even Cover Density algorithm in a hypothetical two-dimensional universe to facilitate understanding of a higher-dimensional algorithm as may be used in a Scaling Series algorithm implemented in some embodiments—the figure also depicts a Grid Hash as may be applied in some embodiments. As depicted in state 3000a, a plurality of neighborhoods may be under consideration (and the neighborhoods need not all be connected). The Even Cover Density algorithm may iterate through the neighborhoods to generate the new population of points.

For example, in state 3000b a neighborhood 3005 may be populated with points (reflected by small circles), ignoring the boundaries of other neighborhoods which have not yet been considered (e.g., neighborhood 3010). In state 3000c, a next neighborhood 3010 may be randomly populated with points (reflected by small circles, while previous points for neighborhood 3005 are reflected by triangles). However, the points of neighborhood 3010 will be considered in view of the previously considered neighborhoods (i.e., neighborhood 3005). That is, at state 3000d, those points in neighborhood 3010 which fall within a previously considered neighborhood (i.e., neighborhood 3005) are removed. At state 3000e the process may continue, populating neighborhood 3015 randomly and then removing points that appear in the previously considered neighborhoods 3005, 3010.

During the Even Density Cover procedure in Scaling Series (See, e.g., FIG. 24) some embodiments generate a new set of particles X from an old set $\{S_i\}$ of size N. During this process, the system may repeatedly check if a newly generated particle X falls into any of the δ-neighborhoods of the first i−1 particles $\{S_i, \ldots, S_{i-1}\}$, where i increases from 1 to N. If the system iterates over all the prior particles $\{S_i\}$, the computational complexity becomes $O(N^2)$. Some embodiments can reduce this complexity to be between $O(N)$ and $O(N \log(N))$ by using one of two special data structures considered herein, referred to as a grid hash and a grid tree.

First, the system may divide the state space (e.g., the 6D space of all possible camera poses) into a grid of cells (e.g., the grid 3030). The cell dimensions may be some factor f times the respective dimensions of the δ-neighborhood (The optimal value for f can be learned along with other tracker parameters, but some trials have indicated an optimal value between 1 and 8). For example, suppose, a particle $S \in \{S_i\}$ falls into a grid cell C. The integer coordinates of C become a multi-dimensional index, which allows for S to be stored in a hash or a tree. For the hash, the tuple of integer coordinates becomes the key for the hash map of integer tuples to bins, with each bin containing some number of particles. In the figure, e.g., an iteration considering the neighborhood 3025 would consider only the cells it intersect, i.e., cells 3030a-f. Thus, points associated, e.g., with the neighborhood 3005 would not need to be considered, even if points were previously generated for neighborhood 3005.

For the tree, some embodiments impose a total ordering on the integer tuples. The integer coordinates of C may then become the lookup key for an ordered tree of bins, where each bin contains some number of particles.

In Even Density Cover, when i is incremented to include an additional particle from $\{S_i\}$, the system may add this particle to the grid hash or grid tree. Note that there may be multiple particles added to the same bin. To test if a newly generated particle X falls within any of the prior δ-neighborhoods, $\{S_1, \ldots, S_{i-1}\}$, some embodiments check all grid cells that intersect the neighborhood of X. Each of the intersecting cells corresponds to a bin in the hash or the tree. For each particle within each one of those bins, the system may check if it falls into the δ-neighborhood of X. If this test comes up negative for all particles in all the intersecting bins, then X is not in any of the prior neighborhoods $\{S_1, \ldots, S_{i-1}\}$. Note that the distance metric used during grid hash and grid tree operations may be the Mahalonobis distance discussed in the M-Step described in greater detail herein, e.g., in the section with numerical identifier #26 and any corresponding subsections.

44. Pose Estimation—Pose Tracking—Tracker Parameter Learning

Tracker parameter learning is conceptually similar to the data-driven mapper parameter learning discussed in greater detail herein, e.g., in the section with numerical identifier #15 and any corresponding subsections. Various embodiments collect a set of representative data, compute ground truth, define an error metric, and then minimize the error and computation time by adjusting tracker parameter values.

45. Pose Estimation—Pose Tracking—Tracker Parameter Learning—Training Data

Several types of data can be collected for tracker learning and each type may have its own notion of ground truth and error metric. Some embodiments keep the AR device stationary while collecting a set of data and obtain a stationary log. While the true pose of the camera is not known, the system may still know that it did not move and, thus, frame-to-frame pose differences should be zero. This constitutes one type of training data referred to herein as "stationary training data".

The system may also collect a regular (dynamic) data log and compute the camera trajectory using a lot of resources and computation time to obtain as good an estimate as possible. This estimate can then be treated as ground truth for this data log. This constitutes a second type of training data, referred to herein as "slow-and-thorough" training data. Even if the system does not know the true camera trajectory, the system can focus on reducing variance of the tracker by running it twice on the same data log. Then, the system can compute the difference between the two poses the tracker produced for each frame, e.g., a per-frame variance. This can provide a third type of training data, referred to herein as "variance training data". The full training set can then be created as a combination (e.g., a weighted combination) of one or more of the three types.

46. Pose Estimation—Pose Tracking—Tracker Parameter Learning—Error Metric

Each type of training data may be associated with its own notion of error, which may be defined on per-frame basis. For a static log, frame error may be the deviation of pose change (e.g., from previous frame) from the identity transformation. For slow-and-thorough data, frame error may be the deviation of the frame pose from the ground truth pose estimated for this frame. For the variance training data, frame error may be the difference between the two pose estimates produced for this frame by the two separate runs of the tracker. A difference between poses may be computed in MARs (e.g., MAR-1) units. Then, to combine errors from all the training data, the system can take, e.g., the average, median, or maximum of all the frame errors to obtain the training error.

47. Pose Estimation—Pose Tracking—Tracker Parameter Learning—Optimization Objectives Some embodiments may seek to minimize two properties: the training error and the (average, median, or maximum) computation time per frame. There are several possible optimization objectives. Some embodiments can look for a trade-off between error and computation time by minimizing a weighted sum of these two properties. Some embodiments can fix the computation time to the desired (maximum) value (e.g., 33 ms), and then minimize the error. Or some embodiments can fix the error to be the desired accuracy value (e.g., 2 milli-mar-1), and then minimize computation time.

48. Pose Estimation—Pose Tracking—Tracker Parameter Learning—Learning

Given a specific optimization objective, the system can now learn optimum values of all the tracker parameters by adjusting their values and re-evaluating the training set. The optimization procedure may begin with reasonable values (e.g., set by hand) for all parameters and may perform a hill climbing search.

49. Pose Estimation—Pose Tracking—Global Localization and Failure Recovery

Global localization estimates the pose of the camera on the map. It may be performed during AR operation to initialize the tracker, which may need to be initialized in the very beginning or whenever it becomes lost. Unlike the tracker, global localization may handle the case when no initial information is available about the camera pose. This may be more challenging as there may be a very large volume of space to search (e.g., the entire map) and all possible orientations of the camera. On the other hand, global localization does not have to be as accurate as the tracker, because the tracker can refine the pose estimate produced by global localization.

Global localization may be performed for a single frame of data and, thus, there may be no motion and no need for a dynamics model. The system may use the LFF measurement model described in greater detail herein, e.g., in the section with numerical identifier #34 and any corresponding subsections. This model may be very fast and smooth but may not be as accurate as the other measurement models. The system may also cap the value of $\epsilon_n$ to some maximum value to improve performance in the presence of outliers as described in greater detail herein, e.g., in the section with numerical identifier #31 and any corresponding subsections. In addition, the system may subsample the data points significantly: e.g., ≈100 points for global localization vs. ≈100,000 for the tracker. Global localization may be performed using Scaling Series, which may be capable of searching very large volumes of space efficiently.

Figure 31:
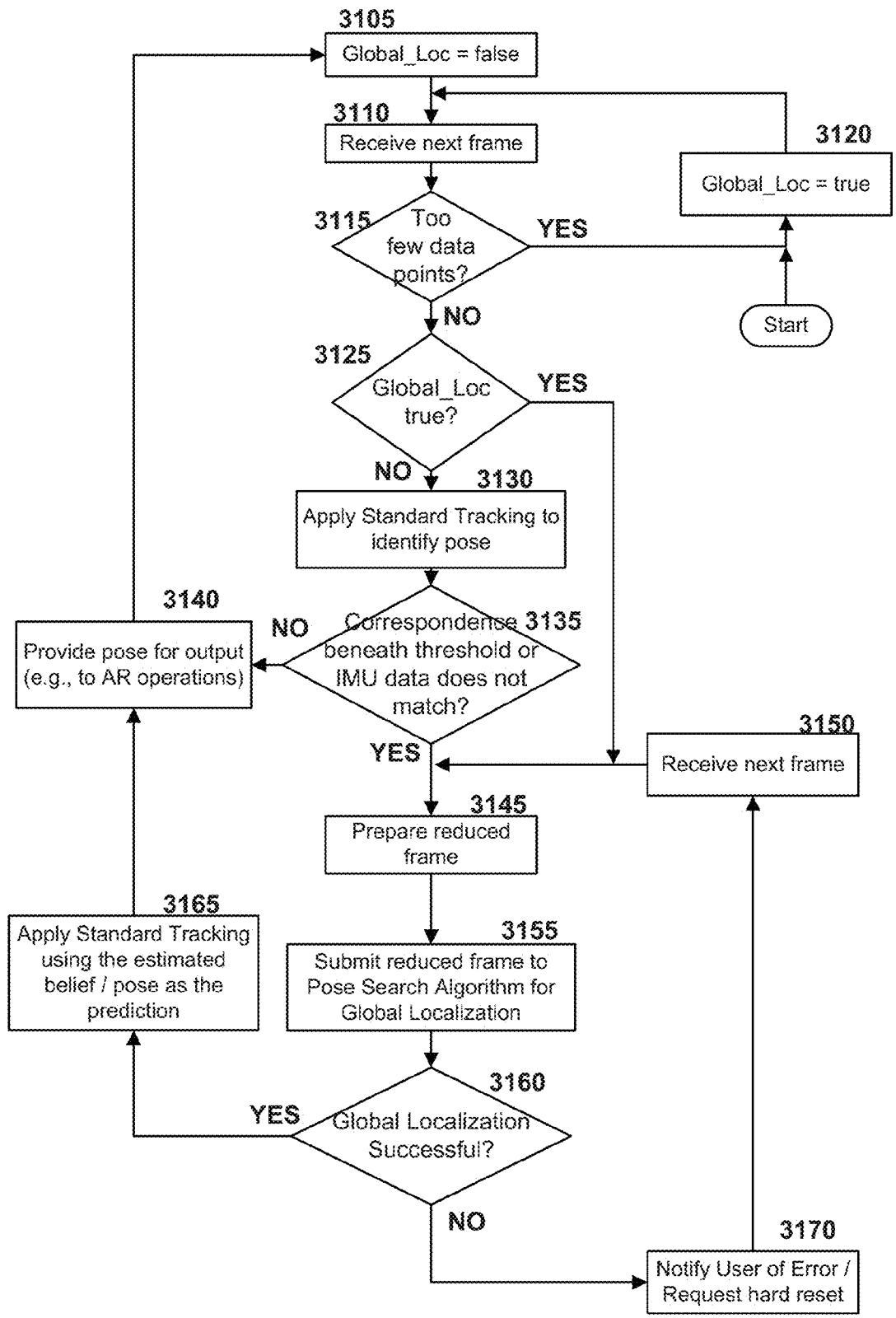
FIG. 31 is an flow diagram illustrating an example failure recovery process as may be implemented in some embodiments.

FIG. 31 is a flow diagram illustrating an example failure recovery process as may be implemented in some embodiments. At block 3105, the system may set a flag "Global_Loc" reflecting the need to perform a Global Localization to false. At block 3110 the system may receive the next frame, e.g., during an AR standard tracking. At block 3115 the system may determine whether there are too few suitable depth points with which to perform a determination. If there are too few points, the system may update the Global_Loc flag at block 3120 to reflect the need for a Global Localization to be performed once an adequate frame is received (this example depicts the process as starting at block 3120 to reflect that the initialization of a session also uses Global Localization). If the flag is true at block 3125 the system may proceed directly to block 3145, preparing the frame for Global Localization.

If the flag is not set, at block 3130, the system may perform Standard Tracking to determine a final pose. If the correspondences for the pose are satisfactory, at block 3135 and the pose agrees with the IMU data (e.g., the pose is not at the opposite end of the building from the last frame capture a few milliseconds ago, and the pose "down" vector matches the IMU "down" vector), then the system may continue to perform normal AR tracking operations, providing the final pose as output at block 3140.

However, if, e.g., there were too few tracker failure detection correspondences or the IMU data did not agree with the final pose estimated by the Standard Tracker, the system may prepare a reduced version (e.g., subsampling every 10 values) of the frame at block 3145 and submit the reduced frame for identification to the global localization system at block 3155. To determine if the global localization is successful, the system may use Global Localization failure detection parameters to check for outliers, or the system may provide the estimated pose/belief to Standard Tracking first for refinement and then use Global Localization failure detection parameters to check for outliers. If global localization is successful at block 3160 then the system may provide the new pose/belief to Standard Tracking at block 3165 for refinement. In contrast, if global localization is not successful at block 3160, the system may passively notify the user that it is experiencing an error at block 3170 (which may provide a passive status message and potentially instructions), and may automatically (e.g., without requiring the user to hit "OK" or "Try Again" button) continue making attempts with successively received frames from block 3150. In some embodiments, at any time, either during Standard Tracking, or if the device is "lost" or in failure recovery (e.g., continually executing Global Localization on successive frames), the user may be able to terminate the session, thereby causing the Pose Estimation (and the rest of the system) to, e.g., quit or go into standby mode.

50. Pose Estimation—Pose Tracking—Global Localization and Failure Recovery—Failure Detection In order to know when to re-run global localization, some embodiments detect when the pose estimator is lost. For example, given a pose of the camera and a scan of data, the system may need to determine whether this pose is correct or not. This may be done based on a percentage of failure detection outliers (based on, e.g. tracker failure detection parameters or global localization failure detection parameters), which are data points more than a certain distance away from the map. For the tracker, this percentage may be taken over all the sub-sampled points. For global localization, this percentage may be taken over all data points. Some data structure, such as, e.g. LFF or LFI may be used for correspondences between data and model for purposes of failure detection.

Another failure mode is insufficient data. This can happen when the sensor is blocked (e.g., by the user's fingers) or is too close to some obstacle (e.g., closer than a minimum range of the sensor). If the number of data points is below a certain threshold, then it may not make sense to run global localization or tracking, although for tracking the threshold data may be lower. The tracker may be able to handle data scans with fewer valid points than global localization is able to handle.

Pose estimation failure can also be detected by comparing the down vector (e.g., -z direction) to the gravity vector measured by the IMU. A large difference in the direction of the two vectors may indicate that the pose is incorrect.

51. Pose Estimation—Pose Tracking—Global Localization and Failure Recovery—4DoF Model Some embodiments make global localization more efficient by reducing the number of parameters in the camera pose representation from six to four. The system may use the gravity vector provided by the IMU to reduce the parameters to (x, y, z, α), where (x, y, z) are Cartesian coordinates as before and α is the yaw angle around the vertical (e.g., approximated by the gravity vector). Due to inaccuracy of the IMU, the 4DoF representation may not be accurate enough for the tracker, but it may be accurate enough for global localization. Since all point-wise estimators are exponential in the number of estimated parameters, a large speed-up can be obtained with the reduced state representation. Some embodiments may implement a 4DoF representation by noting with the use of, e.g., IMU, what unit vector in local coordinate system would represent down (e.g., −z direction in world coordinates). Then, some embodiments may modify the Even Density Cover algorithm such that whenever it samples a new particle it may adjust the rotation component to be the closest rotation such that the down vector in local coordinates matches the vector reported by, e.g., the IMU. Other embodiments may instead modify the Scaling Series state to be 4 dimensional (e.g., (x, y, z, α)), and use the 4 dimensional state with the down vector in local coordinates as determined by, e.g., IMU, to generate a full 6DoF transform.

52. Pose Estimation—Pose Tracking—Global Localization and Failure Recovery—Multiple Starting Poses Global localization can be parallelized over multiple processors by splitting up the full uncertainty into smaller uncertainty volumes. Multiple Scaling Series estimators can be run in parallel, one for each of the smaller uncertainty volumes. In the most general case, the uncertainty is the entire map, so the system can use the data log from which the map was built to learn a good subdivision of the uncertainty volume. The sub-volumes can be represented by their centers, which may become the starting poses for Scaling Series.

The first pose of the log may become the first center of a sub-volume. The system may then find the next pose in the log that is more than a certain separation distance away from any pose in the starting set and add it to the starting set. The system may repeat this procedure for the entire data log to obtain the full set of starting poses. During global localization, the system may run multiple Scaling Series estimators, one starting at each of the starting poses with uncertainty at least as large as the separation distance.

Thus, in these embodiments the estimation process now produces multiple estimates of the pose, one per uncertainty sub-volume. The system may then pick the pose with the least Global Localization failure detection outliers to be the final estimated pose.

53. Pose Estimation—Pose Tracking—Global Localization and Failure Recovery—Learning Parameters Besides multiple starting poses, a number of other parameters may be learned for global localization. Various parameters for Scaling Series (including final uncertainty δ*, number of particles per δ-neighborhood, etc.) can be learned by maximizing the number of successful localizations per second of computational time for a large set of data frames from a data log. If the system uses the data log from which the map was built, then ground truth poses may be readily available. Otherwise, the first frame of the log may be localized either by hand or by slow-and-thorough Scaling Series. The system can run the tracker from that pose for the rest of the log to obtain good pose estimates.

Outlier thresholds for Global Localization failure detection outliers may be a special case. The system may need to learn two parameters for Global Localization failure detection outliers (a similar process can be performed for tracker failure detection outlier parameters, or they could be set by hand): the threshold for outlier percentage ($k_{pct}$) and the distance beyond which points are considered to be outliers ($k_{dist}$). The system may learn a classifier that given a data scan and a camera pose, will classify it as localized or lost. The classier may make two types of errors: classify correct poses as lost and classify incorrect poses as localized. The first type may be called false negatives and the second type may be called false positives.

A training set of positive and negative examples can be constructed as follows. The training data log may be collected so that it contains a good number of dynamic obstacles (e.g., people moving around, objects out of place, and so on). Ground truth poses can be computed by initializing the first frame (e.g., by global localization and/or manually) and tracking from that pose for the rest of the log, making sure the pose alignment appears correct throughout. To construct the training set, some embodiments may for each data frame in the training log run global localization from the set of starting poses (described in greater detail herein, e.g., in the section with numerical identifier #52 and any corresponding subsections) to obtain a set of estimated poses (e.g., one for each starting pose). Additionally, if the system in block 3160 first provides the pose/belief to Standard Tracker to refine it prior to determining if Global Localization was successful, then the set of estimated poses may also be provided to Standard Tracker to refine these poses for this training set. For each estimated pose found in this manner, if this pose is close enough to ground truth (e.g., within the uncertainty that the tracker can handle), the pose may be considered correct and added as a positive example. Otherwise, it may be considered a negative example. The system may then select values for $k_{pct}$ and $k_{dist}$ to minimize the sum (e.g., the weighted sum) of false positives and false negatives for the resulting classifier.

54. Data Parallelization Techniques

Speed of the tracker may be crucial in some embodiments, e.g., during real-time AR device operation. However, some embodiments want to achieve real-time performance without sacrificing accuracy. This can be done in some embodiments by parallelizing the computation, e.g., across multiple CPUs and multiple GPU cores. This section describes parallelization techniques for different parts of the tracking algorithm.

55. Data Parallelization Techniques—Data Preparation

During data preparation step in Line 7 of FIG. 21, the system may seek to compute smooth normals. Before the smooth normals can be computed, the system may need to smooth the depth data. For each data point p, the system may set the smoothed depth to be a weighted average of depth values in a certain window around a pixel μ (e.g., a pixel window). Contribution from points across range discontinuities (as described in greater detail herein, e.g., in the section with numerical identifier #14 and any corresponding subsections) may be ignored. Given a point q in the window around p, let $d_{depth}$ be the depth difference between these two points and $d_{pix}$ be the pixel distance between them. The contribution weight for q may be computed as $$w_q := N(d_{pix}, \sigma_{pix}^2) N(d_{depth}, \sigma_{depth}^2) \qquad (21)$$

where $N(\cdot, \cdot)$ denotes a zero-mean normal distribution and $\sigma_{pix}^2$, $\sigma_{depth}^2$, represent variance used to pixel distance and depth distance respectively.

The depth smoothing may be carried out on the GPU by having each thread process a subset of data points. Once the depth data has been smoothed, the system can compute smooth normals. For each point p, the normal may be computed as a cross product of two vectors between neighbors of p, e.g.: left-right pair and down-up pair. If any of the four neighbors of p is separated from p by a depth discontinuity, then p may be marked as invalid.

56. Data Parallelization Techniques—Correspondence

Data-to-model correspondences may be computed during the E-step (Line 9 of FIG. 21). Since correspondences for different data points may be independent of each other, this computation can be parallelized across multiple threads, with each thread processing a separate subset of data points. When parallelizing on the GPU, the layout of the data structures can make a significant impact on performance in some embodiments.

The LFI data structure may be transformed as follows. Each model point-normal pair may be stored as two tuples (x, y, z, 0) and ($n_x$, $n_y$, $n_z$, 0) in float4 format. Data points may also be stored as 4-tuples (x, y, z, 0) in float4 format. Though suitable for some hardware devices, one will recognize that other arrangements may be more suitable in other situations. For example, on some architectures, 3-tuples (x, y, z) stored as float3 may prove more efficient. Alternatively, a structure of arrays (SoA) representation may be more efficient in some arrangements. To store data points as an SoA, some embodiments could store three separate arrays of floats, one for x, one for y, and one for z coordinates of all the data points.

There are several possibilities for storing LFI as SoA. Some embodiments store two arrays of tuples (e.g., as float3 or float4), or store six per-coordinate arrays of floats.

The set of one-to-one data-to-model correspondences may be represented as an array of float4 pairs: (x, y, z, 0) for data point and (a, b, c, d) for the corresponding model plane. Here, the tuple (a, b, c, d) represents the plane oriented according to the model normal and passing through model point. The tuple (a, b, c, d) may provide a more compact way for representing a plane than a point and normal vector. The tuple (a, b, c, d) may represent the plane consisting of points (x, y, z) satisfying the equation: $ax+by+cz+d=0$.

Figure 32:
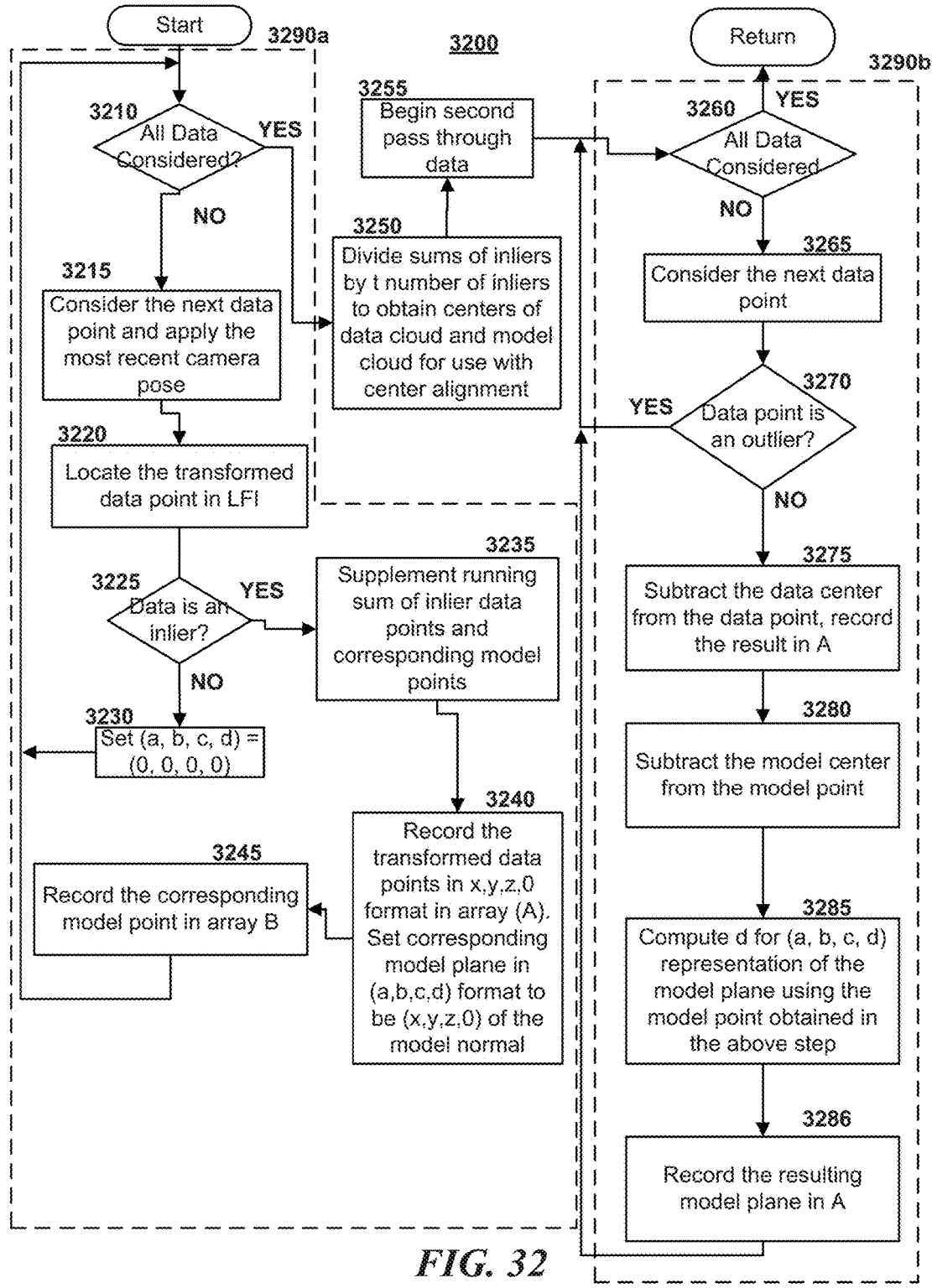
FIG. 32 is a flow diagram of a process for determining correspondences (e.g., in series or in parallel) using an LFI data structure to a structure for use by a Pose Search Algorithm (e.g., a structure of arrays) as may be implemented in some of the embodiments.

During this process, the data cloud and the model cloud may also be center-aligned as described in greater detail herein, e.g., in the section with numerical identifier #39 and any corresponding subsections. The output array may be built in two passes: FIG. 32 is a flow diagram of a process for determining correspondences (e.g., in series or in parallel) using an LFI data structure to a structure for use by a Pose Search Algorithm (e.g., a structure of arrays) as may be implemented in some of the embodiments. Note, this example may be suited for some particular systems and different optimized representations may be better suited for other systems.

In a first pass 3290a the system may cycle through all the data points and produce two new arrays: one containing the output data point/model plane pairs (A), and the other containing corresponding model points (B).

The system may iterate through the data points 3210, applying the most recent camera pose to the point that is considered at block 3215. The system may then locate the corresponding transformed data point in, e.g., the LFI at block 3220. The system may then determine if this data point is an outlier or not at block 3225. A count of inliers may be kept. The system may also keep a running sum of all inlier data points and a separate sum of all corresponding model points at block 3235.

The system may record the transformed data points in (x, y, z, 0) format in array A at block 3240. For model planes in A, the system may fill in (a, b, c, d):=($n_x$, $n_y$, $n_z$, 0), where ($n_x$, $n_y$, $n_z$) is the model normal. The system may also record the corresponding model point in array B as float4 at block 3245. For outliers, in some embodiments, instead of deleting the data-and-normal and packing or compacting the resulting arrays, which in some architectures could be an expensive operation, the system can instead set the data-and-normal to "empty" place holder values that would not affect the resulting calculation (e.g., end up equivalent to "noop" operations). Some embodiments can accomplish this by setting (a, b, c, d):=(0, 0, 0, 0) at block 3230. In some embodiments, the system may just not provide the data-and-normal pair into the resulting arrays A and B. At the end of the first pass 3290a, the system may divide sums of inliers by number of inliers at block 3250 to obtain centers of data cloud and model cloud for use with center alignment. The system may also, compute percentage of outliers and check against the outlier percent threshold $k_{pct}$. The system may exit out of EM loop if the percentage of outliers is greater than the threshold at block 3250.

During the second pass 3255, 3290b, the data and model clouds may be moved to center and model planes may be finalized. Iterating through blocks 3260, 3265, 3270 for each data-model correspondence, the system may skip processing outlier data points. For inlier points, the system may subtract the data center from data point record the result in array A at block 3275. For inlier points, the system may subtract the model center from model point at block 3280. For inlier points, at block 3285, the system may compute d for (a, b, c, d) representation of the model plane using, e.g., the model point obtained in the above step. For inlier points, at block 3286, the system may record the resulting model plane in A. The system may skip outliers at block 3270, the system may determine if a point is an outlier, e.g., points for which model normal is zero. Thus, the tuple (a, b, c, d) may remain (0, 0, 0, 0) for outliers.

The resulting array A may then be passed to the search algorithm, e.g., Scaling Series for processing. Note, that this procedure may not remove outliers from the correspondence pairs. It may be more efficient not to. Instead, all of the data points may be passed to Scaling Series, but since outliers are matched to a (0, 0, 0, 0) tuple, they do not contribute to measurement error during Scaling Series computations.

For some architectures, the most efficient representation for the output array A may be an array of pairs of float4. For some architectures, two arrays of float4, or one float3 and one float4 array could be more efficient. In some architectures, representation in SoA format as seven separate arrays of float may also prove more efficient.

57. Data Parallelization Techniques—Scaling Series

During the M-step (line 10 of FIG. 21), the alignment may be performed using Scaling Series. For each zoom level within Scaling Series, the computations may be parallelized across particles and data points simultaneously. Thus, each thread may receive a specific particle and a subset of data points to process. The thread may apply the pose transformation stored in the particle (or, e.g., adjusted pose transform based on center alignment) to all the data points in the subset to obtain their positions in world coordinates. Then, the thread may compute the distance from each transformed data point to the corresponding model plane in (a, b, c, d) format. This distance may then be summed for the entire subset of data points (e.g., either as sum of squares or sum of absolute values) and the result may be recorded in GPU memory for this particle and this thread. Once all threads finish, the resulting sums may be sum-reduced on the GPU to sum up scores of all data points for each particle.

58. Data Parallelization Techniques—Pipelining

Some steps within the tracker algorithm may be independent of the results from the previous frame. These steps may be pipelined, so that they begin executing before the prior frame has finished. While this technique may not reduce the latency of computation per frame, it may increase the throughput. To make best use of the available computational resources, some embodiments organize the computations as follows across CPU threads and GPUs.

Thread 1: receive frame data over network.

Thread 2: uncompress frame data.

Thread 3: subsample the data.

Thread 4 (e.g., GPU 1): compute smooth normals for the data.

Thread 5 (e.g., GPU 2): estimate frame pose. Note, this thread may depend on the result of the prior frame for the prediction step.

Thread 6: transmit pose estimate over the network to other devices.

Note, some of these threads can be combined (or redistributed) in some embodiments if there are fewer CPU cores or GPUs available.

59. Data Parallelization Techniques—GPU Parameters

The efficiency of parallelization may be greatly affected by the specifics of the architecture. In particular, for each procedure being parallelized on the GPU, there may be two parameters that need to be determined. In GPU terminology, the parallel threads may be organized into blocks. Denote by $n_{threads}$ the number of GPU threads per GPU block and denote by $n_{blocks}$ the total number of GPU blocks (this is also known as GPU grid size). Note, the parameters $n_{threads}$ and $n_{blocks}$ may have different values for different procedures being parallelized. For each such procedure, the optimal values of $n_{threads}$ and $n_{blocks}$ may be highly architecture-dependent, and, thus, have to be learned for each specific architecture.

60. Rendering and Augmented Reality

Traditionally, augmented reality (AR) is seen as a way to modify a video stream with some additional virtual content. However, various of the disclosed embodiments provide persistent AR, in which virtual objects persistently co-exist with real objects in time and space. Such virtual objects are referred to as persistent virtual objects herein.

61. Rendering and Augmented Reality—Persistent Augmented Reality

Persistent AR combines physical reality with persistent virtual objects. The persistent virtual objects may behave just like real objects, e.g., they may occupy real 3D space at every point in time. Persistent virtual objects may exist even when the user is not observing them (e.g., with the user's back turned). Persistent virtual objects may obey the laws of physics just like real objects, e.g., a thrown virtual object may be affected by gravity, air drag, and collisions with other real and virtual objects.

Persistent virtual objects may be affected by real world objects and events in the same way real objects are. For example, pushing a real object across a counter may push virtual objects on that counter out of the way. A virtual character may not be able to walk through a doorway if you close the door in front of him. With respect to real objects, persistent virtual objects may have the following differences: Virtual objects are not observable with a naked eye. Some device (e.g., a phone, tablet, or goggles) may be used to see them. Virtual objects cannot be felt with a bare hand. Again some device is needed to feel these objects with a sense of touch. When convenient for a specific application, virtual objects may ignore the laws of physics. For example, a large virtual piece of furniture can be as light as a feather or a thrown virtual object can pause in mid-flight.

Though virtual objects may not make real changes to the real environment, they may make virtual changes. For example, a strong virtual character may be able to virtually break a real door down. A remodeling application may virtually remove a real wall separating two rooms. Similarly, one will imagine applications wherein virtual objects are associated with real-world actuators. For example, a virtual character may laugh and speakers situated about a room may be calibrated to effect the laughter as though it were coming from the virtual character's position.

62. Rendering and Augmented Reality—Rendering

Users may observe virtual objects using a viewing device, e.g., a smart mobile device (a phone or tablet) or a head-mounted display (HMD), such as helmet or goggles (e.g., GoogleGlass®). Generally, there are two types of display technologies: a) Camera-feed displays, which show the real time feed from a camera embedded in the viewing device (in this case, both virtual and real content need to be rendered); and b) See-through displays, which allow the user to observe the real environment directly. In this case, only the virtual content needs to be rendered. This type of displays is also sometimes called an optical display.

Besides phones and tablets, examples of camera-feed displays include the Oculus Rift® helmet by Oculus VR® (now part of Facebook®) and several models by Vuzix®. Examples of see-through displays include Google Glass®, Epson Moverio®, several Vuzix® models, and products with Lumus® technology (e.g., for military purposes). For either type of display, various embodiments rely on an RGBD camera attached to the viewing device. In the case of camera-feed displays, some embodiments assume that the feed being displayed comes from the RGBD camera. Using techniques described in greater detail herein, e.g., in the section with numerical identifier #26 and any corresponding subsections, some embodiments can at any point in time estimate the pose of the RGBD camera (and thereby directly or indirectly infer the pose of the viewing device) in world coordinates. Hence, for each virtual object, the system may determine how it should be positioned within the field-of-view of the viewing device. However, it may not be sufficient to simply render the virtual object on top of the camera feed or on a see-through display.

Figure 33:
FIG. 33 is an example screenshot of shadow deformation and partial occlusions as may occur in some embodiments.
Figure 34:
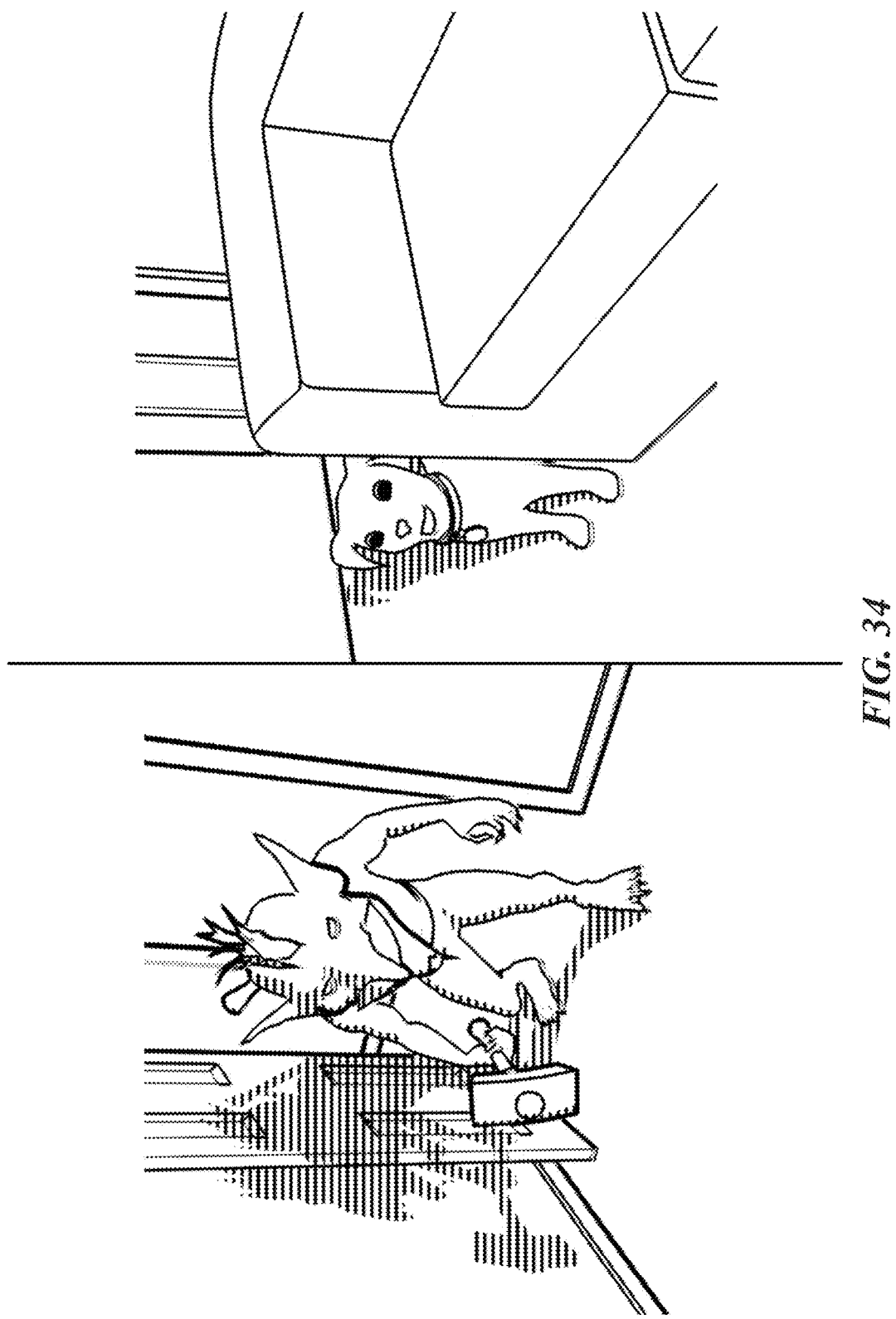
FIG. 34 is an example screenshot of shadow deformation and partial occlusions as may occur in some embodiments.

FIG. 33 is an example screenshot of shadow deformation and partial occlusions as may occur in some embodiments. FIG. 34 is an example screenshot of shadow deformation and partial occlusions as may occur in some embodiments. Two visual cues may be particularly effective as shown in FIGS. 33 and 34. Partial occlusions of virtual objects by real objects and vice-versa; and shadows being cast by virtual objects onto real objects and vice-versa. For both of these cues, the 3D shape of the real environment may be important to consider. Some embodiments can obtain the shape information from two sources: (a) from the 3D map built as described elsewhere herein (e.g., in the section with numerical identifier #5 and any corresponding subsections), and (b) from the RGBD camera.

63. Rendering and Augmented Reality—Rendering—Partial Occlusions

To achieve proper partial occlusions, various embodiments do one or more of the following techniques. For the camera-feed display, the system may first render the 3D environment (e.g., either the map, the RGBD data, or a combination) from the perspective of the viewer to both depth and color buffers of OpenGL. Then, the system may render virtual objects (again to both buffers) and OpenGL will perform proper occlusions (FIGS. 33 and 34). For see-through displays, the system may render the 3D environment to the depth buffer only (leaving color buffer unchanged). Then, the system may render the virtual objects to both depth and color buffers. This may force OpenGL to perform proper occlusions, without rendering the 3D environment in color. Thus, only the virtual objects may be rendered visibly and parts of them will be occluded by the environment.

64. Rendering and Augmented Reality—Rendering—3D Shadows

Shadows may be another important cue to relative position of objects in the environment. Simplistic AR techniques may assume that there is a floor plane and simply render flat shadows. However, in reality shadows are often deformed by the 3D shape of the environment, e.g., as shown in FIGS. 33 and 34. Shadows can also be partially occluded by the environment. Accordingly, some embodiments add two types of shadows: a) Virtual objects cast shadows onto both virtual and real content; and b) the real environment needs to cast shadows only onto virtual content. Some embodiments will not need to render additional shadows of real objects onto real objects (as these are already present in the environment), though adjustments and augmentations may be performed depending upon the application.

Taking the above two considerations into account, some embodiments can render shadows using standard 3D graphics techniques. However, in the case of see-through displays in some embodiments, only additional shadows onto real environment are rendered into the color buffer, not the environment itself.

65. Rendering and Augmented Reality—Rendering—Dynamic Data Rendering

For the purposes of rendering, the 3D map can be represented as a 3D color mesh that were constructed, e.g., in the section with numerical identifier #23 and any corresponding subsections. However, the map may not contain any information about dynamic obstacles, such as people, pets, or objects moved out of place. This information may be captured by the RGBD camera.

Figure 35:
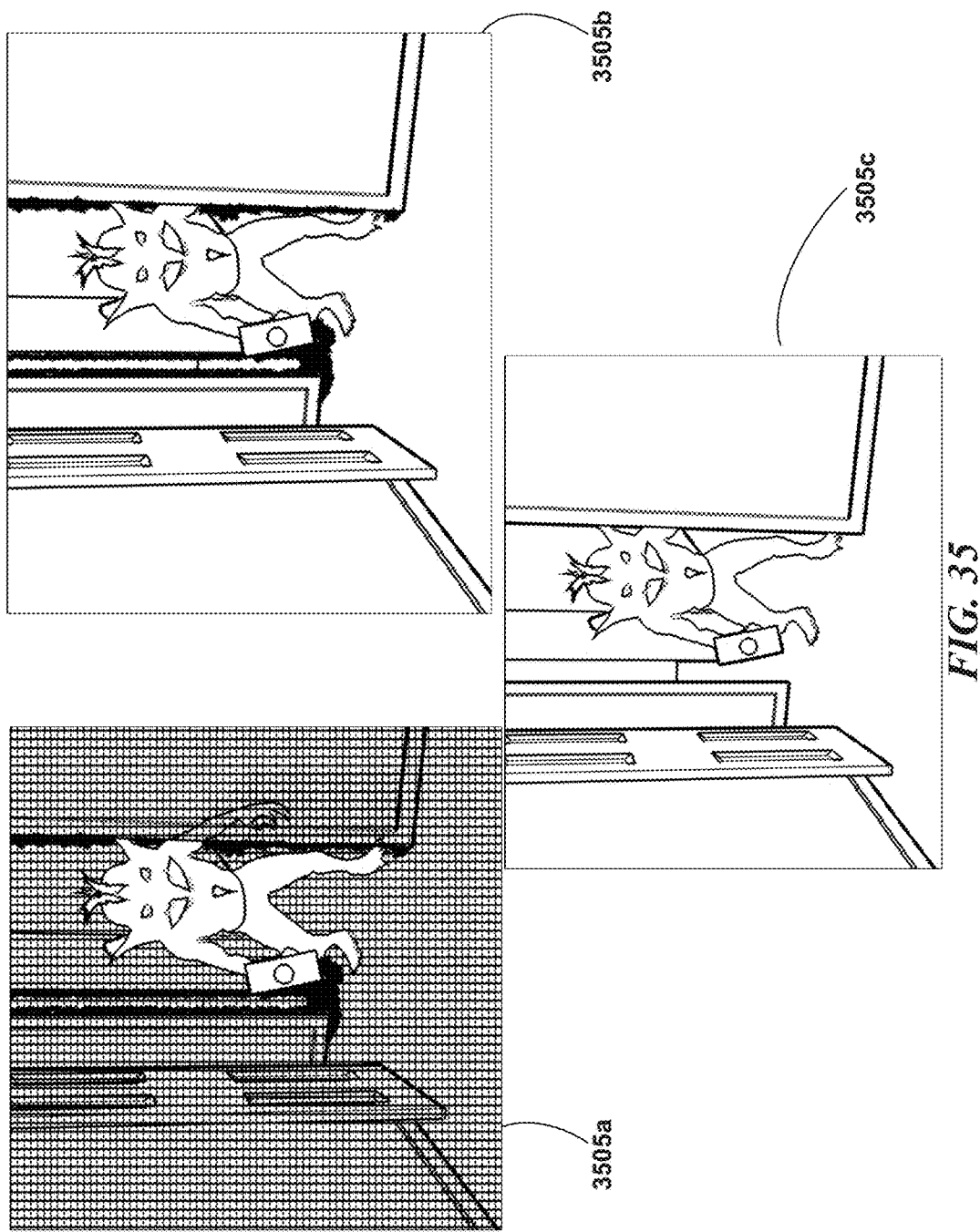
FIG. 35 is a series of screenshots depicting dynamic data rendering of a scene including a virtual character using techniques as may be implemented in some embodiments.

RGBD data can be rendered as a color point cloud, but this can cause virtual objects to show through in between the data points, especially if the view is rendered from a slightly different vantage point than the camera or if the display resolution is higher than the camera's resolution (see FIG. 35).

As shown in screenshot 3505*a*, background and virtual objects can show through between the points of the RGBD data if the display resolution is higher than the resolution of the camera on the AR device. As shown in screenshot 3505*b*, by increasing the point size or using bill-boards the show-through effect may be fixed, but occlusion shadows caused by properties of the RGBD sensor may still be visible. As shown in screenshot 3505*c*, application of a dynamic mesh technique can fix both problems.

Figure 36:
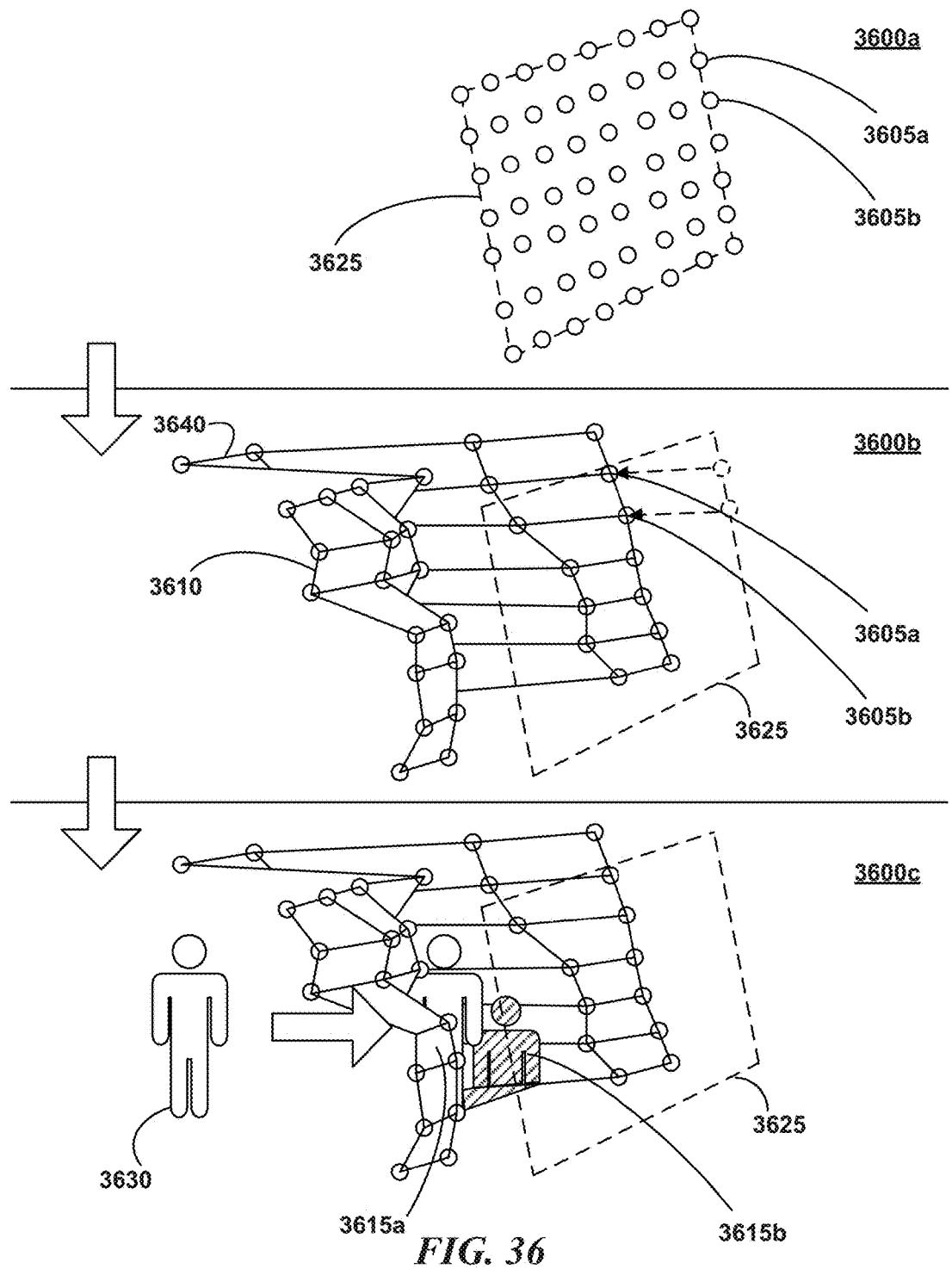
FIG. 36 is a series of conceptual depictions of dynamic mesh creation as may be implemented in some embodiments.

FIG. 36 is series of conceptual depictions of dynamic mesh creation as may be implemented in some embodiments. Initially 3600*a*, potential vertex points (including, e.g., vertices 3605*a*, 3605*b*) may be arranged in a grid in the plane 3625 of the user's display. The number of vertices may be the same as the number of depth values received from a camera at an AR device, or may be less. Given a depth frame, the vertices may be relocated as depicted in state 3600*b* away from the plane 3625 based upon the corresponding depth values and a mesh 3610 generated. In this example, the vertices 3605*a*, 3605*b* have moved backward (though in some embodiments, vertices at the edge of a mesh may stay in the plane of the plane 3625). Here, the mesh depicts the depth capture of a cavern entrance. As shown, a plane 3640 may be formed at the back of the mesh for those values determined to be beyond the capture camera's range. As described herein, the mesh may be texture mapped with the corresponding RGB image captured by the AR device.

The system may now place virtual objects, e.g., a character 3630, within the mesh 3610. This may facilitate the creation of realistic shadows 3615*b* and occlusions 3615*a* (though occlusion 3615*a* is shown here from the reader's perspective to facilitate understanding, one will recognize that occlusions will be created relative to the user's perspective looking through the plane 3625).

One way to combat this issue is to render bigger points (several pixels per data point) or to render billboards, (e.g., small textured quads that always face the viewer). This may help to prevent virtual objects showing through between data points. However, some RGBD cameras have occlusion shadows within the data (see FIG. 35). In other words, there may be missing data near range discontinuities. Big points or billboards may not help with this issue. For this reason, some embodiments construct a 3D mesh out of the RGBD data by connecting data points from adjacent pixels into triangular faces. On range discontinuities, the system may fill in depth data by taking the furthest range of the adjacent pixels. This may create a good approximation of the actual boundary of the range discontinuity.

66. Rendering and Augmented Reality—Rendering—Miscellaneous Techniques

Additional rendering techniques can be applied to improve realism of virtual content.

67. Rendering and Augmented Reality—Rendering—Miscellaneous Techniques—Lighting

A reasonably good approximation of lighting in a room can be obtained by placing a single directional light above the scene. A directional light may simulate a far-away light source, the light rays from which are parallel to each other. Although, the configuration of actual light sources may be different in the real environment, shading and shadows obtained from this single directional light may generally provide a sufficiently good approximation. Even if the shadows for a virtual object are not drawn in exactly the same direction as for real objects around it, the user's brain may not be confused by this discrepancy. In fact, most people do not even notice it. In many embodiments, it seems a shadow that is properly deformed by the environment appears to be much more important for human perception.

68. Rendering and Augmented Reality—Rendering—Miscellaneous Techniques—Anti-Aliasing Pixelation effects from virtual lines and boundaries can be removed using anti-aliasing techniques, which help make virtual object appear more realistic.

69. Rendering and Augmented Reality—Rendering—Miscellaneous Techniques—Blending

Consider a boundary between two objects of different color. Human eyes and cameras both will mix the colors on the boundary, so the objects appear slightly blended. To simulate this effect for virtual objects, a small amount of blur can be applied to the entire image after rendering both real and virtual content. This technique can also serve as an alternative to anti-aliasing in some embodiments.

Figure 37:
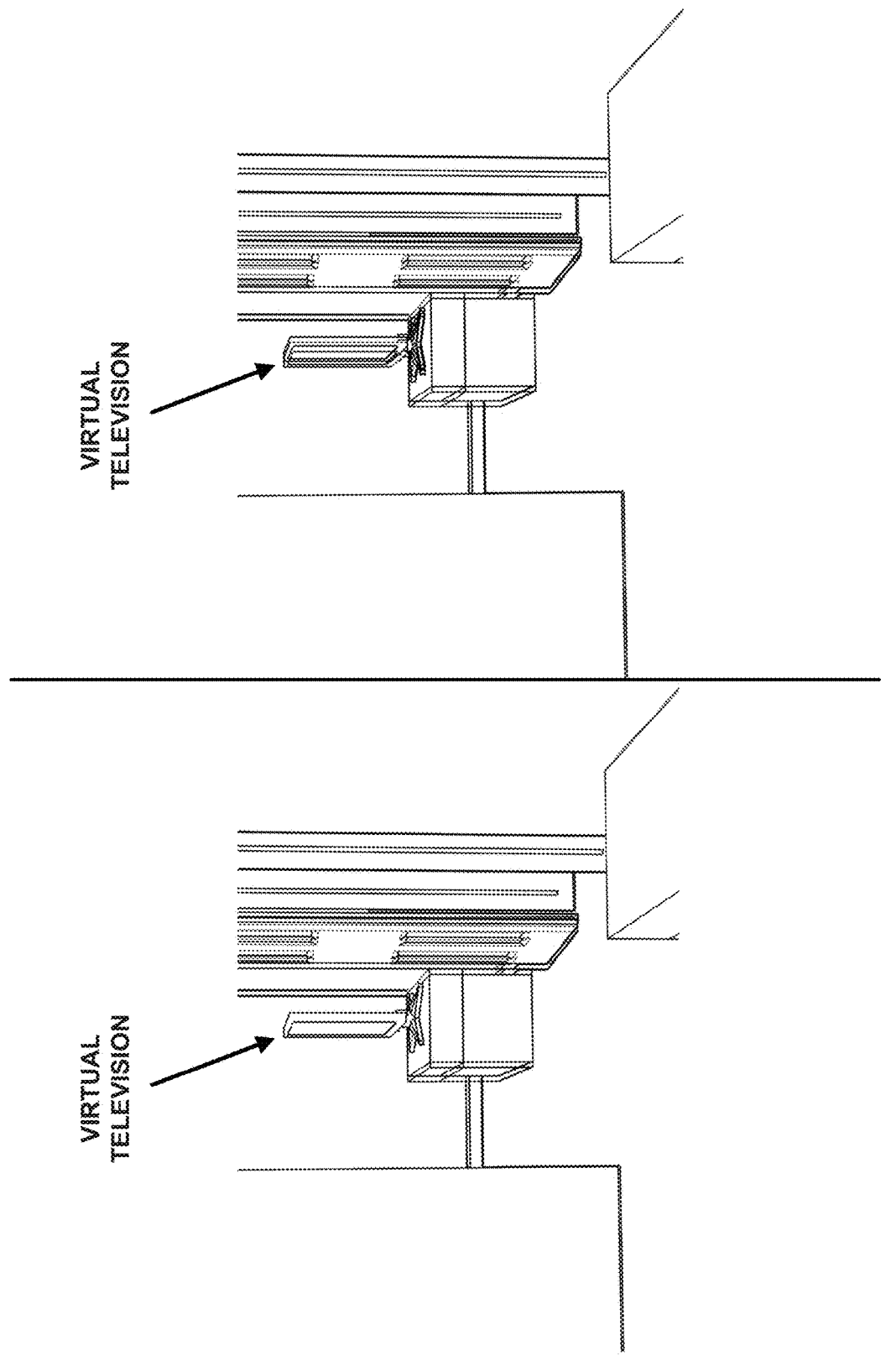
FIG. 37 is a pair of screenshots without and with a depth-of-field filter applied respectively to the virtual objects as may occur in some embodiments.

70. Rendering and Augmented Reality—Rendering—Miscellaneous Techniques—Depth-of-Field Cameras (and human eyes) will perceive objects at a distance as slightly more blurred than close-up objects. This is known as the depth-of-field effect. In some embodiments, virtual objects will always be drawn just as crisply independent of their distance from the viewer absent additional processing. To remedy this, some embodiments blur virtual objects with increased amount of blur depending on the distance from the viewer (FIG. 37).

71. Planning and Physics

In order for virtual content to react properly to the real world, some embodiments compute the effects of the real world onto virtual objects and allow virtual characters to plan their actions with respect to the real world. For example, at any given point in time, two types of information may be available: the 3D map and the latest data scan.

72. Planning and Physics—Collision Detection

Some embodiments provide interaction between virtual and real worlds via collision detection. Collisions between virtual objects can be computed using standard techniques. However, various embodiments employ an efficient way to compute collisions with a 3D map, which may be very large, and with the latest data scan, which may change with every frame.

73. Planning and Physics—Collision Detection—Collisions With Map

For 3D map collisions, some embodiments reuse the LFI data structure. Consider a virtual ball moving from point A to point B during a scene update. Some embodiments can look up the AB segment in the LFI and walk from A to B through the LFI's grid cells. For every such grid cell, the system may retrieve the corresponding map point and compute the distance from this point to the segment AB. If this distance is less than the ball radius (plus some tolerance), then the ball may be determined to have collided with this point. The system can return this point and its normal vector as the result of a collision check.

74. Planning and Physics—Collision Detection—Collisions With Data Scan

Since the data scan changes with every frame, it may be too expensive to build special look-up data structures for it. Instead, some embodiments utilize the arrangement of depth points into image pixels. For the segment AB as above, let $p_A$ and $p_B$ be the corresponding pixels for these two points. Consider the rectangle R that inscribes the pixels $p_A$ and $p_B$ with some additional padding. The amount of padding may be greater than the ball radius converted to pixels at the current range from the camera to the ball.

The system may loop over all pixels in the rectangle R and compute the distance from the 3D point for that pixel to the segment AB. As before, if this distance is less than the ball radius, then the ball may be determined to have collided with this point. The system may return the colliding pixel $p_C$ closest to $p_A$ as the first collision the ball encounters. The system can compute the normal vector for the collision point by smoothing the scan data in a small window around $p_C$ and then taking a cross product of the vectors between the neighbor pixels (e.g., up/down with left/right).

If the ball is too close and the rectangle R ends up being large, some embodiments can sub-sample points during collision search.

75. Planning and Physics—Newtonian Physics

With the above collision checks, some embodiments implement Newtonian physics. An object flying in the air may be affected by gravity and by air drag. The object may bounce from other objects based upon the angle of its velocity to the collision normal vector. If the object collides with a nearly horizontal surface (e.g., judging by collision normal) and its velocity perpendicular to the surface is too small, the object may roll on the surface. Once it reaches the end of the surface, the object may fall off.

Since some embodiments check for collision with scan data, it is possible to move virtual objects by pushing with real objects in these embodiments. For example, it is possible to kick a virtual ball with your foot, as long as the camera is able to observe this action. Omnidirectional depth sensors, distinct from the user's view, may be used in some embodiments to provide simulations extending beyond the user's immediate field of view.

76. Planning and Physics—Path Planning

In some embodiments, virtual characters may plan their actions in the real environment. In particular, the characters need to know how to navigate in this environment. This may be accomplished using path planning. At a very basic level, path planning consists of considering many different trajectories and picking the most optimal one. In some embodiments a simplified model is used, as it may be too computationally expensive to check for collisions using techniques described in greater detail herein (e.g., in the section with numerical identifier #72 and any corresponding subsections) for every step of every trajectory considered.

77. Planning and Physics—Path Planning—Occupancy Grid and Height Map

Some embodiments use an "occupancy grid" data structure that can help with navigation tasks. The occupancy grid may represent the traversable surface with a 2D grid (e.g., the floor), in which every grid cell is marked as either occupied or free. The virtual character may then walk on the free cells, but may not cross the occupied cells. This grid can be built by estimating the floor plane, and then projecting all obstacles onto this plane. Cells with obstacles may be considered "occupied" and the rest may be considered "free". It may be useful to consider obstacles only within a horizontal slice of space directly above the floor.

The height of this slice may be dictated by the height of the virtual character. Obstacles above this height (e.g., the ceiling) may not impede navigation. A slightly more advanced data structure used in some embodiments is the "height map". The height map may be similar to the occupancy grid, but instead of binary occupied/free state for every grid cell, the height map may record the maximum height of obstacles within the grid cell (possibly again within a certain horizontal slice above walkable surface). Height maps may allow for slopes to be calculated. If the slope is low, the surface may be identified as walkable, otherwise it is not. Thus, the character can walk up a ramp to a height that would otherwise be considered as "occupied" in the occupancy grid map.

Both occupancy grid maps and height maps can be built right after the 3D map construction (as described in greater detail herein, e.g., in the section with numerical identifier #5 and any corresponding subsections). A floor plane may be fit as described in greater detail herein (e.g., in the section with numerical identifier #25 and any corresponding subsections). This plane may then establish the zero height. The system may then project a horizontal slice of the 3D map onto this plane.

78. Planning and Physics—Path Planning—A*

Some embodiments pay perform planning using the A* algorithm. The cost employed may be the length of the path, but it could also encode the amount of effort it takes to traverse the path, e.g., walking up a steep slope is more difficult than walking on flat terrain. The A* algorithm may run on an A*-graph, a data structure consisting of nodes connected by edges. The nodes may represent points in space and the edges between them may represent traversable connections. Each edge may have an associated cost, which can be the distance between the nodes or a number that encodes the amount of effort it takes to traverse this edge. The A*-graph can be built from an occupancy grid or a height map. The nodes may be corners of grid cells and the edges may be connections between neighboring grid cells. For an occupancy grid, neighbors may not be connected if one of them is an obstacle. For a height map, the connection cost may depend on the slope. Edges with slope above a certain threshold may be removed (e.g., considered unwalkable).

79. Planning and Physics—Path Planning—Dynamical Obstacle Avoidance

Occupancy grids and height maps may only contain information about the static 3D map in some embodiments. During AR device operation, the system may also receive dynamic data from the sensor. This data may include information about dynamic obstacles, e.g., people and pets moving about, doors opening/closing, objects being moved out of place, etc. As the dynamic obstacles are not reflected in the 3D map, the A* implementation may be unaware of them. Consequently, virtual characters may not be able to avoid these obstacles. For each data scan, data points belonging to dynamic obstacles may be segmented out by comparing the height of each measured data point to the height map created from the 3D map. Only data points falling within the horizontal slice directly above the floor may be considered.

In some embodiments, if the data point is more than a certain height above the height map, then it can be classified as a dynamic obstacle point. In order to make A* aware of the dynamic obstacles, for each data point classified as dynamic obstacle, the system may add the measured 3D point to the A*-graph, e.g., it may modify the corresponding nodes in A*-graph, so that edges leading to them have much higher traversal costs. This operation may be performed for each new frame of data. Consequently, it may be useful to keep a copy of the original A*-graph with just the 3D map information, so that the system does not have to "undo" the changes. For each new frame, the system may make a new copy of the original A*-graph and add the data points to it. Then, for the next frame the system may start with the original again.

80. Planning and Physics—Path Planning—Jumping

Some virtual characters can jump up onto real-world objects. These transitions may be handled differently than regular walking. These transitions may not be based on slope between nodes, but on a difference in height. Also, the physics of a jump may dictate from where to where the character can jump. Typically, the length of the jump is much greater than an edge between neighboring nodes. Thus, the system may need to add new edges, rather than neighbor edges. To add these transitions, some embodiments loop through the A*-graph and for each node determine all other nodes a character can jump to. These nodes may have to be within some min/max distance and have some min/max height difference from the current node. The cost of each jump edge may be much greater than the cost of walking the length of the edge (even with slope taken into account) as jumping may take a lot more effort than simply walking.

In addition, jump edges may need to be specially marked, as the system may need to play a completely different animation for this action.

81. Planning and Physics—Path Planning—Trajectory Improvements

Although A* is guaranteed to produce the shortest (or lowest total cost) path, the resulting trajectories may not be perfect. Due to discretization of the space into grid cells, the path may include many sharp turns (e.g., 90 or 45 degrees). Thus, a virtual character following this path will not look realistic. A number of improvements can be made as discussed below.

82. Planning and Physics—Path Planning—Trajectory Improvements—Push Away From Walls Characters may look more natural if they do not get unnecessarily close to walls and other obstacles, even if that gives the shortest path. This can be achieved in several ways. The system may check each point of the path and then move it away from obstacles if it is too close. During this operation, the displacement of the path point may be in the direction perpendicular to the direction of the path at that point. Alternatively or in combination, some embodiments can modify the occupancy/height map and enlarge all obstacles by the radius of the character (or some other desired radius). However, this can make some areas on the map inaccessible for the character, e.g., where the passage between obstacles is too narrow.

Another approach is to modify the costs in the A*-graph. The system may gradually increase the cost closer to obstacles and the paths produced by A* will be moved away from obstacles whenever possible. The paths may still be able to traverse narrow passages if there are no other ways to get to the destination. In some embodiments, a combination of these methods may be used.

83. Planning and Physics—Path Planning—Trajectory Improvements—Line of Sight

The paths produced by A* may be very unsmooth. They may make 90 or 45 degree turns almost every grid cell. This may be due to the construction of the A*-graph. One way to improve the path is to use line-of-sight simplification. A path may be a collection of consecutive points $\{P_i\}$. A new path can be constructed as follows. Starting with i=0, add $P_i$ to the new path and then consecutively check points following $P_i$ (e.g., $P_{i+1}$, $P_{i+2}$, . . . ) to see if these points are visible from $P_i$. Find k such that all points $P_{k+1}$, . . . , $P_k$ are visible from $P_i$, but $P_{k+1}$ is not visible. Add $P_k$ to the new path and then repeat the same operation from $P_k$. This procedure may produce a new path with fewer points, and therefore fewer turns. The visibility check may be carried out by ray-casting from $P_i$ to $P_k$. If the ray does not hit any obstacles between these two points, $P_k$ can be considered visible.

However, this path may pass too close to obstacles, so, in fact, the system may check that the entire width of the character can pass from $P_i$ to $P_k$. Thus, instead of just checking the ray $P_i$ to $P_k$ for obstacles, some embodiments may check a rectangle of width w that inscribes this ray (and is aligned with the ray's direction), where w is the width of the character.

84. Planning and Physics—Path Planning—Trajectory Improvements—Bicycle Dynamics Model The line-of-sight simplification may produce a path with fewer turns, but the turns may still be too sharp. To smooth these sharp turns some embodiments can drive the character using some dynamics model, e.g., the bicycle dynamics model. In the bicycle model, during every motion update, the character can make a small turn and travel forward a small distance d. The character may only travel along its forward vector in some embodiments. The distance d may be dictated by the maximum allowed linear velocity of the character $v_{max}$ and the turn may be dictated by the maximum turning velocity $w_{max}$. Thus $$d \leq v_{max} \Delta t$$

$$\theta \leq w_{max} \Delta t \quad (22)$$

where Δt is the amount of time that passed from the previous update. The point around which the character turns does not necessarily have to be the center of the character, e.g., for vehicles it is more natural to turn around the center point of the rear axle. The path points may now become waypoints that the character follows using the bicycle model.

The character may start by trying to reach the first waypoint, then once it is within some threshold distance from that point, the character may drive towards the second waypoint, and so on. The threshold distance may be greater than the character's turning radius, as the character may otherwise end up driving in circles around a waypoint. The turning radius may be $$r = \frac{v_{max}}{w_{max}} \quad (23)$$

With this model, the character may now make smooth turns.

Calibration

In order to interpret the sensor data, some embodiments estimate various sensor parameters. This may be done via a calibration process. Some embodiments contemplate there are three types of calibration that may take place: (1) RGB calibration, (2) depth calibration, and (3) time calibration. All three types are discussed in turn below.

85. Calibration—RGB Calibration

A projection RGBD camera may consist of three components: RGB (e.g., color) camera, infra-red (IR) camera, and IR projector. The data scans produced by the RGBD camera may be expressed in the local coordinate frame of the RGB camera. In order to be able to transform 3D points into the camera image and vice-versa, some embodiments estimate parameters for the camera projection matrix CM (also referred to as the camera model herein). This can be done using standard RGB-calibration techniques by recording multiple images of a checker board.

86. Calibration—Depth Calibration

The depth sensor may also be calibrated using a checker board (or similar marker). The RGB camera model CM may be used to determine the pose of the checker board with respect to the RGB camera. This provides the "true" depth $T_{pix}$ for each pixel in the image that falls on the board. From the depth sensor, the system may also obtain the measured depth $d_{pix}$ for that pixel. The system may now construct a large training data set consisting of ($d_{pix}$, $T_{pix}$) pairs by recording many different positions of the checker board at different distances away from the camera. Using this data set, for each pixel, the system may run a linear regression to learn parameters $a_{pix}$ and $b_{pix}$ for a linear approximation $s_{pix}(d) := a_{pix} d + b_{pix}$ of the ratio T/d, so that for each training pair ($d_{pix}$, $T_{pix}$)

$$s_{pix}(d_{pix}) \approx \frac{T_{pix}}{d_{pix}} \quad (24)$$

Then, during data collection, the system may correct the depth of each pixel to be $$\widetilde{d_{pix}} := s_{pix}(d_{pix}) d_{pix} \quad (25)$$

where $d_{pix}$ is the original measured depth and $\widetilde{d_{pix}}$ is the corrected depth for this pixel.

87. Calibration—Time Calibration

In some embodiments, each device (CPU, RGBD camera, IMU, etc.) may have its own internal clock. In order to achieve optimum accuracy of the system, every millisecond may count. Accordingly, some embodiments synchronize the different clocks. Some of these embodiments may standardize on CPU time and convert all the other clocks to this time.

88. Calibration—Time Calibration—Speed Scaling

The speed of the internal clocks of the three devices may be slightly different. A speed scaling factor can be computed by comparing the delta time on the sensor vs. the CPU over a long period of time (e.g., several hours). For the remaining discussion, assume that speed scaling has already been applied to convert all clocks to the same time scale.

89. Calibration—Time Calibration—Time Offsets

Embodiments having two different sensors with their own clocks may seek to convert between those clocks. Various events listed below may occur in sequence.

"Sensor Events": For a given sensor, suppose A is the time a real world event actually happened (e.g., camera shutter closed). The sensor may then put a timestamp on the newly collected data at time B:=A+Δ and may send the timestamp to the CPU. Let C:=B+m be the time the CPU receives the message. Some embodiments assume that the time stamp delay Δ is an unknown constant. The message transmission time m is also unknown, but it is not considered to be constant in some embodiments due, e.g., to thread scheduling and other OS events.

"Transmission Time": Although transmission time m varies, it may have a stable average. In other words, if the system were to compute average m over 1 minute at one point in time, it would be very close to the average the system would obtain at another point in time. Let m̂ denote the average transmission time. The value of m̂ may also be unknown, but constant. Let E:=B+m̂ denote the estimated time the CPU receives the message.

Let o be the time offset between the sensor clock and the CPU clock. Then, o may be an unknown constant. Although, the system may not be able to estimate m̂ directly, the system may compute the average of o+m. To do this, the system may collect data over a period of time. For each frame of sensor data received during this period, the system may have two timestamps: the sensor time and the time the CPU received the message. The sensor time may be given by the sensor's clock or estimated based on frame rate and frame number. By averaging the difference between these two time stamps over all frames in the data set, the system can compute the value of o+m̂.

In the above, it was assumed that o is a constant. This may be true if the scale of the two clocks can be synchronized exactly. Unfortunately, this is not always possible in practice and the clocks may drift with respect to one another over time. For this reason, some embodiments periodically recompute the value of o+m̂.

"Different Clocks": Since some embodiments have two sensors (RGBD and IMU), the subscript "r" will be used in the following terms to refer to the RGBD sensor events and "i" for IMU sensor events. In the example embodiments described here, the system may have three different clocks on which these times could be expressed. The second subscripts "r", "i", and "c" are used here to denote RGBD, IMU, and CPU clock timeframes respectively. For example, the CPU sensor may provide time relative to the UTC epoch (Jan. 1, 1970) while the RGBD (or just depth sensor) may provide time in milliseconds since boot, and the IMU sensor provides time in milliseconds since activation (following the computer's boot). Thus, $A_{rr}$ is the time of RGBD data frame in the RGBD clock's representation, whereas $A_{rc}$ is the same event expressed in the CPU clock's representation.

Figure 38:
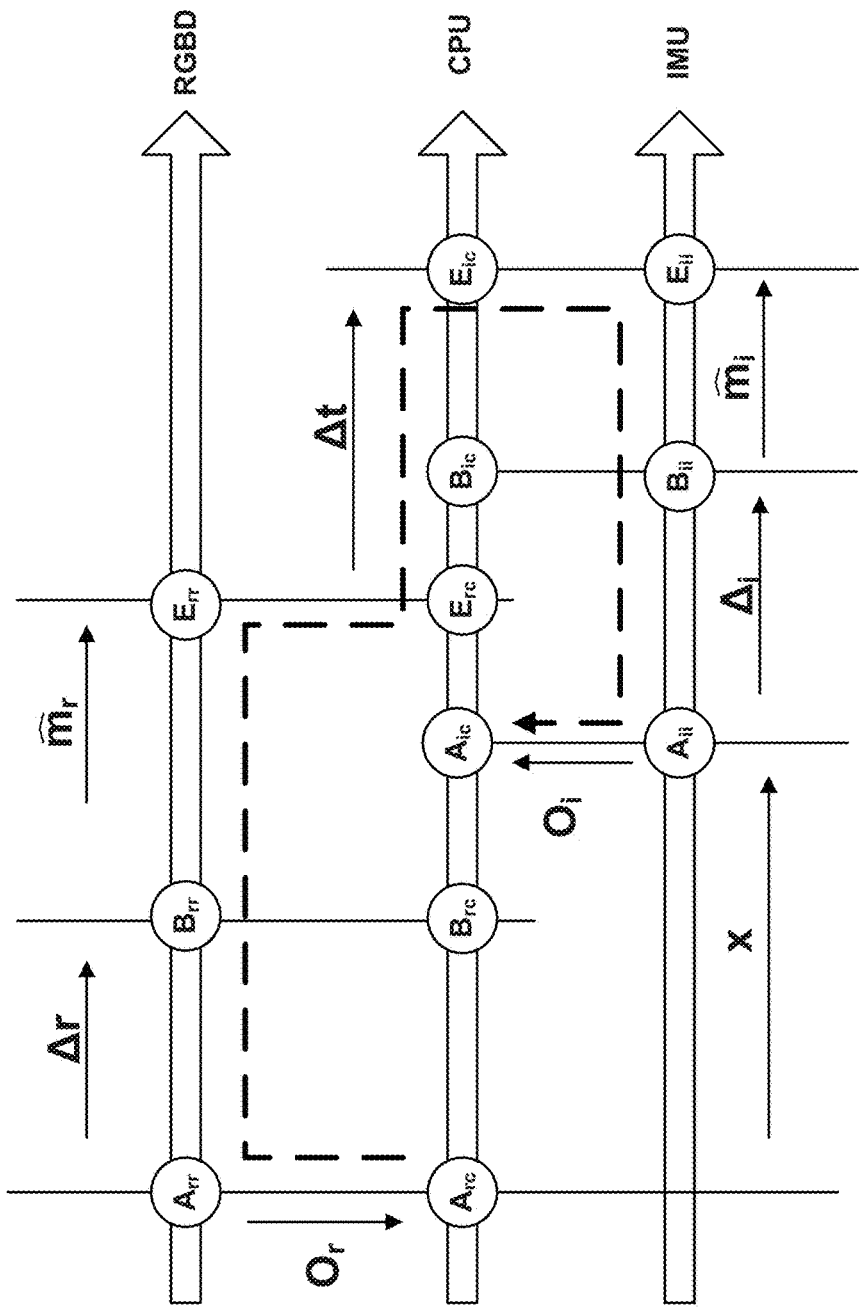
FIG. 38 illustrates a timing diagram for three different device clocks (CPU, RGBD, and IMU), sensor events, and the corresponding offsets as may be determined in some embodiments.

"Comparing Sensor Frames": Consider an example situation with two data frames: $A_r$ from the RGBD camera and A from the IMU. Some embodiments seek to determine how much time has passed between these two events (e.g., so that IMU data may be correlated with the appropriate depth and/or texture frame). For example, with reference to FIG. 38, the system may want to know $x := A_{ic} - A_{rc}$. Here, $A_{ic}$ reflects the actual time at which the IMU data capture occurred (in the CPU's time format) at the IMU device and $A_{rc}$ reflects the actual time at which the RGBD data capture occurred (in the CPU's time format. The term x may be positive or negative depending upon whether the RGBD data capture precedes or succeeds the IMU data capture. Unfortunately, the capture/tracking system may know neither $A_{rc}$ nor $A_{ic}$, so these may need to be expressed in terms of other quantities that can be known. The events $A_{rr}$ and $A_{rc}$ lie on the same vertical line since they occur in the same absolute time. In this diagram, the offsets $o_r$ and $o_i$ are shown as "costs" incurred in traveling a path.

Let $\Delta t := E_{ic} - E_{rc}$. That is, $\Delta t$ is the difference between the estimated time the CPU receives the IMU message and the estimated time the CPU receives the RGBD message. By following the dashed line path from $A_{rc}$ to $A_{ic}$ in the diagram in FIG. 38, we obtain $$x = -o_r + \Delta_r + \hat{m}_r + o_r + \Delta t - o_i \hat{m}_i - \Delta_i + o_i \quad (26)$$

The o's cancel out and thus present $$x = (\Delta_r + \hat{m}_r) - (\Delta_i + \hat{m}_i) + \Delta t \quad (27)$$

In this equation, $\Delta t$ can be represented as $$\Delta t = B_{rr} + (o_r + \hat{m}_r) - B_{ii} - (o_i + \hat{m}_i) \quad (28)$$

As mentioned previously, each o+m term may be a constant inferred by observing the system in operation over time. The timestamps may thus be used to infer $\Delta t$. That is, as all the quantities in EQN. 28 are known in some embodiments, $\Delta t$ may be determined. However, the system may still need the unknown quantity $$c := (\Delta_r + \hat{m}_r) - (\Delta_i + \hat{m}_i) \quad (29)$$

to compute x from EQ. 27. Although c is unknown, it is constant. Thus, c can be a parameter either set by hand or learned from data.

90. Networking and Communications

Time consuming computations may not have to take place on the AR device itself in some embodiments. Instead, the data can be sent wirelessly to a computer server, e.g., either locally or on the cloud. During data log recording for mapping, the data can also be sent to the computer server rather than stored on the AR device. In order to send the data via network, it may be represented in a more compact form. For a given data scan, instead of storing 3D points, the system may store just the z-coordinate of each pixel. Then, on the server, camera projection model CM can be used to calculate the 3D points in some embodiments. Further, both depth and color data can be compressed using standard compression techniques in some embodiments.

During real-time AR operation, the server may receive scan data from the AR device, compute the camera pose for each scan, and send it back to the AR device. During mapping, the server may compute the whole map, and then send it to the AR device. In fact, in some embodiments, most data structures can remain on the server, as tracking and global localization may be performed on the server. In such embodiments, the AR device only needs to receive a low resolution map for display purposes.

91. User Interface and Applications

Persistent AR has a multitude of useful applications. A few examples are described below in this section, but it is only a small sampling of what is possible. While most of today's computer applications take the user away from the real world into virtual reality (e.g., via games, social websites, or even email), persistent AR actually connects the user to the real environment. It allows physical reality to be enriched with useful information, instead of keeping all useful information in a separate place disjoint from reality.

Persistent AR is also a completely new mode of interaction with the real surroundings and computer applications. In fact, it allows far more natural interaction than what most consumers are used to with today's computing devices. For this reason, persistent AR leads to many new user interface (UI) techniques, which were not possible before because persistent AR did not exist. It is easiest to describe these new techniques on the examples of actual applications, although many of these techniques are applicable for many other uses. Accordingly, the following examples are provided to facilitate comprehension of the underlying functionality and application components, rather than simply to reflect isolated instances of the disclosed features.

92. User Interface and Applications—Real Estate

Various of the disclosed techniques may have a huge impact on how people shop for, purchase, and rent, e.g., in a real estate context. Users may view several perspective homes, arrange furniture in those homes, and receive input from friends and family, before even setting foot on the premises. This would save a tremendous amount of time during house-hunting and help people make much more informed and considered decisions.

When users visit these homes in person, the AR representation of the home may be (virtually) furnished with the user's own furniture as they walk through (providing them with the ability to assess the furniture's placement following the future relocation). This may also allow realtors to stage homes with virtual furniture rather than rent real pieces (thereby saving cost and time). The commitment required on the part of realtors may be minimal. The realtor may only have to walk through the home with the AR device to generate a full 3D color model that can be posted online (FIG. 39). Image 3905 is of an orthographic, top-down view of the map. Image 3910 is a projection view of the map. Image 3915 is shaded mesh view of the map. Image 3920 is a color by surface normal view of the map.

3D models of the user's furniture pieces can also be easily built using the same mapping technology in some embodiments, by simply walking around each piece with the AR device (FIG. 40). Moreover, today many objects may be manufactured based on 3D CAD models. These models have generally not been distributed to consumers as there was no demand for them in the past. However, as the need for 3D models of furniture and other objects rises with the increased accessibility of 3D printing, AR applications, etc., the models will be more frequently created, exchanged, and provided. Users can both generate their models using the disclosed techniques and experiment with third party models.

Figure 41:
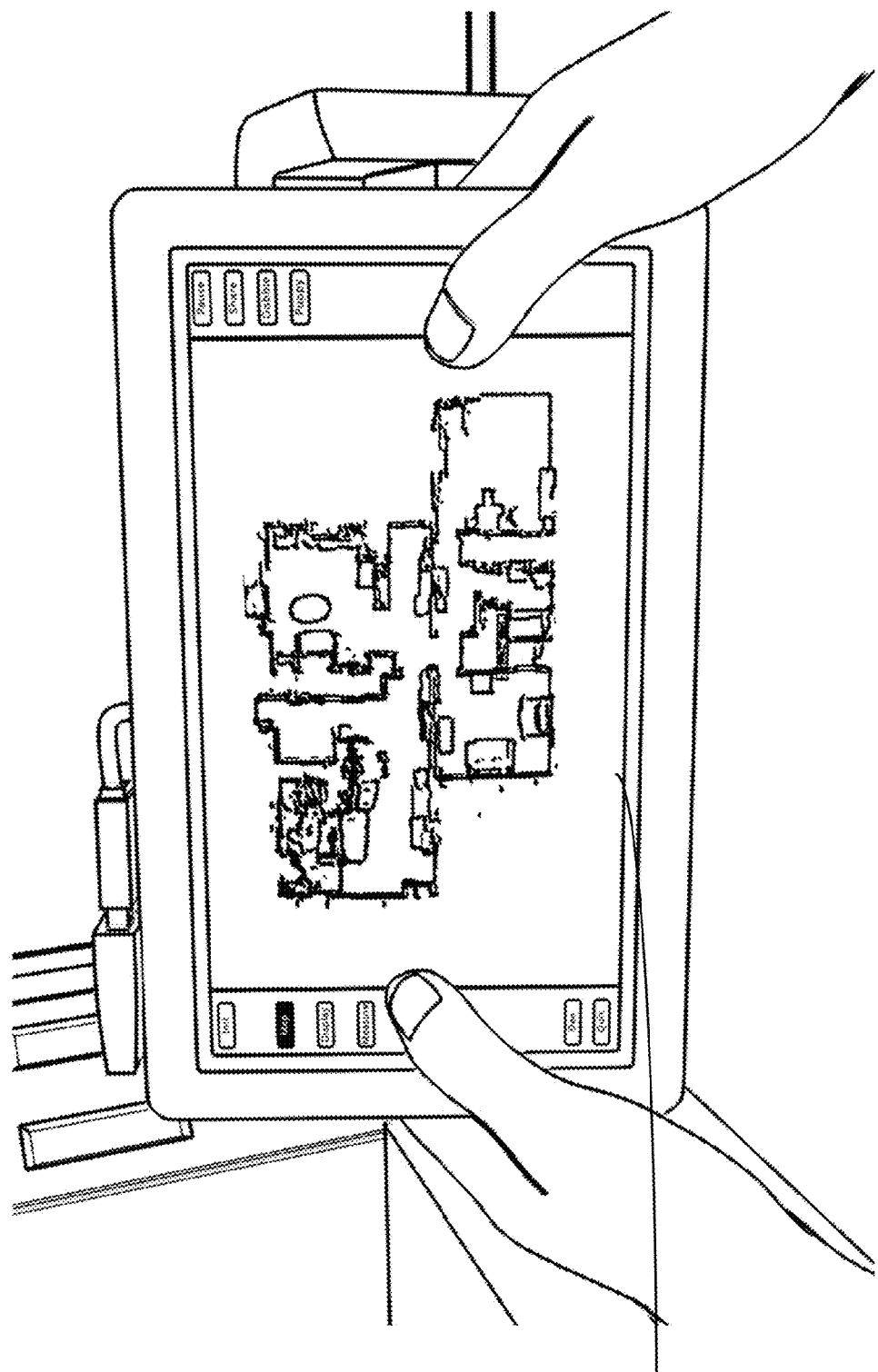
FIG. 41 is a photographic image of an example application running on the example device of FIG. 5, the example application presenting an example top-down map generated from a model of an environment as may be implemented in some embodiments.

FIG. 41 is a photographic image of an example application running on the example device of FIG. 5, the example application presenting an example top-down map generated from a model of an environment as may be implemented in some embodiments;

FIG. 41 is a photographic image of an example application running on the example device of FIG. 5, the example application presenting an example top-down map generated from a model of an environment as may be implemented in some embodiments. In this example, a user has completed the mapping process. The 3D model may be translated and/or rotated to provide different perspective views, e.g., a top down view. The width of various planes in the model (e.g., walls) may be extruded to facilitate views such as the one depicted here. Other model post-processing operations may also be performed and model variations may be generated. Some embodiment may back-cull the polygons of the 3D model to not render polygons facing away from the user, to allow a user to look "into the model" from outside. Other embodiments (or some embodiments with a flag for this option) may decide not to back-cull the polygons so that the 3D model presents a complete solid from all or most angles.

Figure 43:
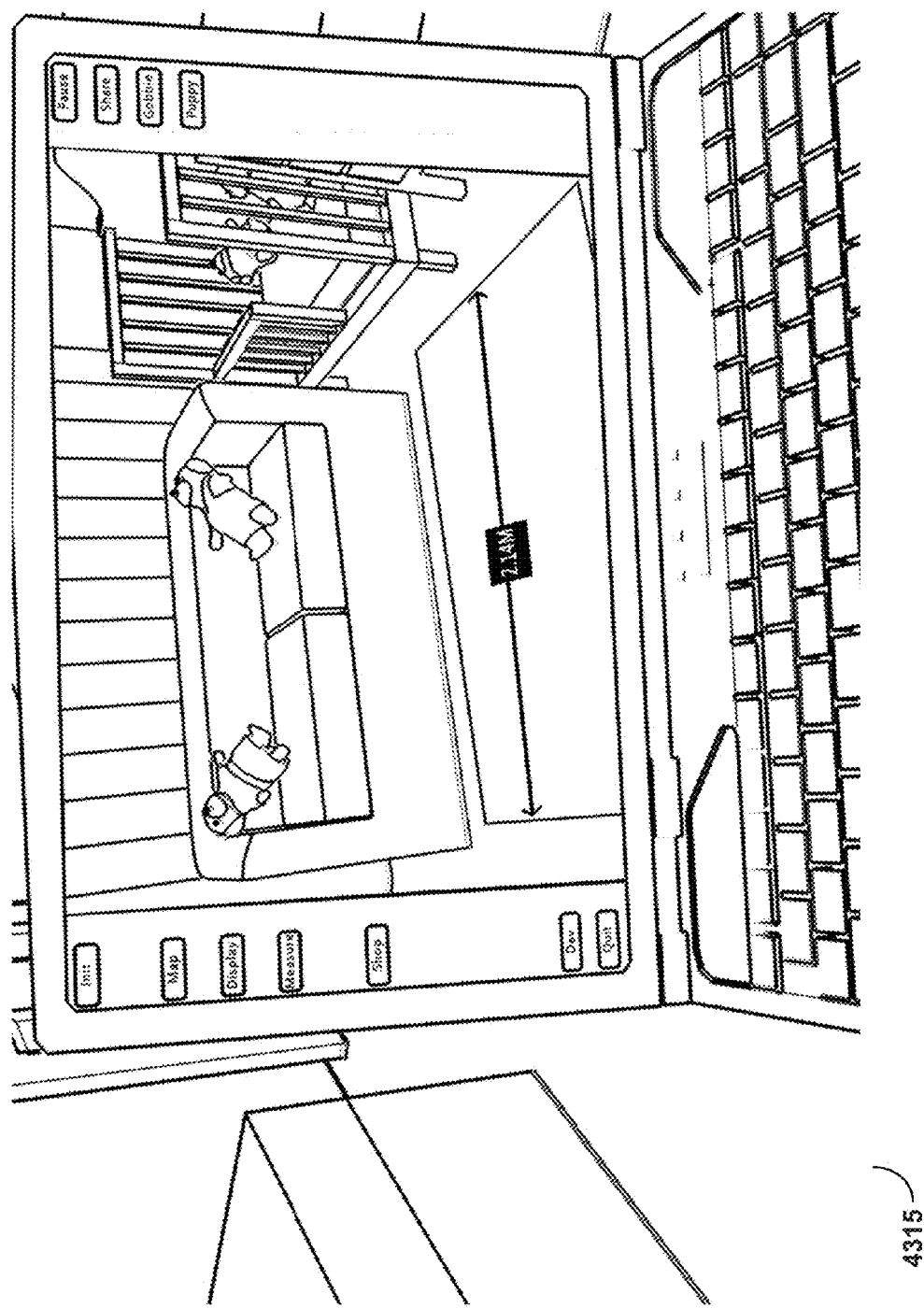
FIG. 43 is a photographic image of an example application providing a 3D representation of the model and tools for assessing relationships within the model on a personal computer as may be implemented in some embodiments.

FIG. 43 is a photographic image of an example application running on the example device of FIG. 5, the example application providing a 3D representation of the model and tools for assessing relationships within the model as may be implemented in some embodiments.

Figure 42:
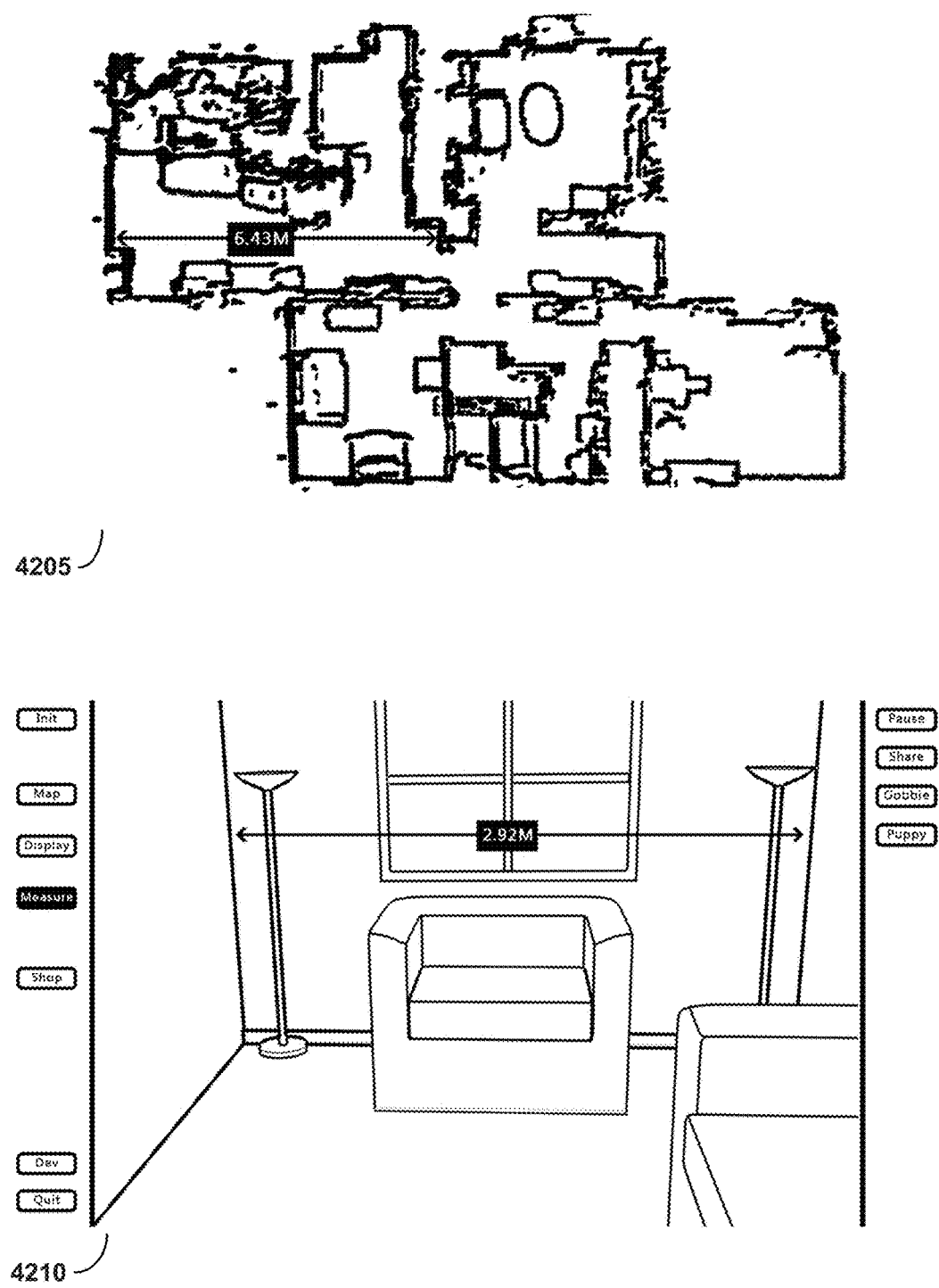
FIG. 42 is a pair of screenshots illustrating measurement techniques implemented in some of the disclosed embodiments.

The 3D maps produced using the disclosed techniques may be metrically accurate, allowing the user to easily measure dimensions of rooms (FIG. 42). Using the floor extraction techniques described herein (e.g., in the section with numerical identifier #25 and any corresponding subsections), square footage of a home can be computed automatically. Presented in a top-down orthographic view, the 3D map provides a much more informative floor plan than one can typically build by hand (see FIG. 42).

Thus, one can measure distances both on the map as shown in screenshot 4205 and during a real-time walkthrough as shown in screenshot 4210. The orthographic top-down view of screenshot 4205 can make for a very informative floor plan.

The 3D maps built may be metrically accurate in some embodiments. FIG. 43 is a photographic image of an example application providing a 3D representation of the model and tools for assessing relationships within the model on a personal computer as may be implemented in some embodiments;

93. User Interface and Applications—Shopping

Figure 44:
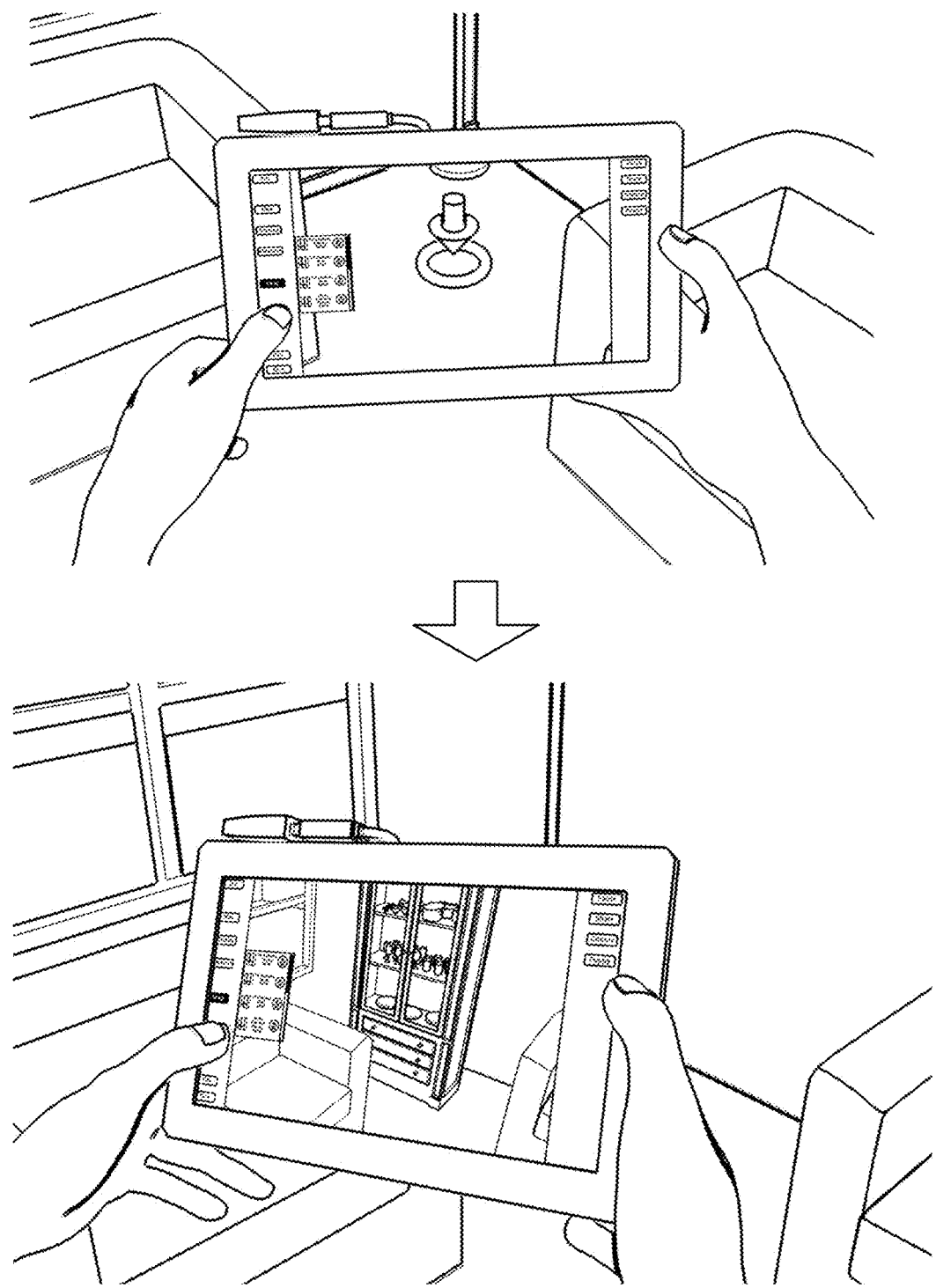
FIG. 44 is a pair of photographic images of an example application running on the example device of FIG. 5, the example application presenting a cursor for placing a synthetic object, e.g., synthetic furniture (e.g., a synthetic cabinet), as may be implemented in some embodiments.

FIG. 44 is a photographic image of an example application running on the example device of FIG. 5, the example application presenting a cursor for placing a synthetic object, e.g., synthetic furniture, as may be implemented in some embodiments.

Figure 45:
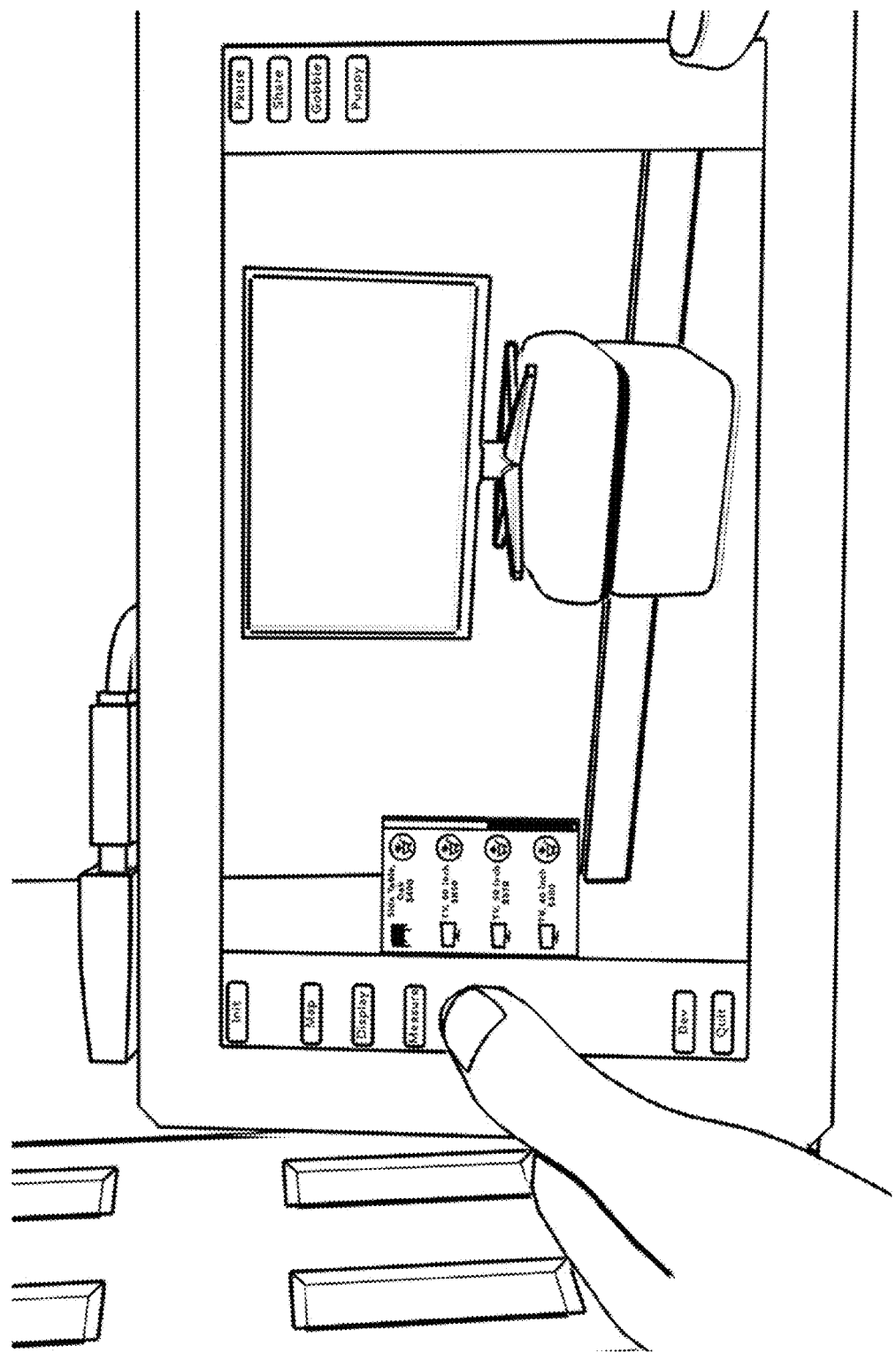
FIG. 45 is a photographic image of an example application running on the example device of FIG. 5, the example application presenting a toolbar for substituting or adjusting characteristics of a synthetic object (e.g., a television screen) as may be implemented in some embodiments.

FIG. 45 is a photographic image of an example application running on the example device of FIG. 5, the example application presenting a toolbar for substituting or adjusting characteristics of a synthetic object (e.g., a television screen) as may be implemented in some embodiments.

Figure 46:
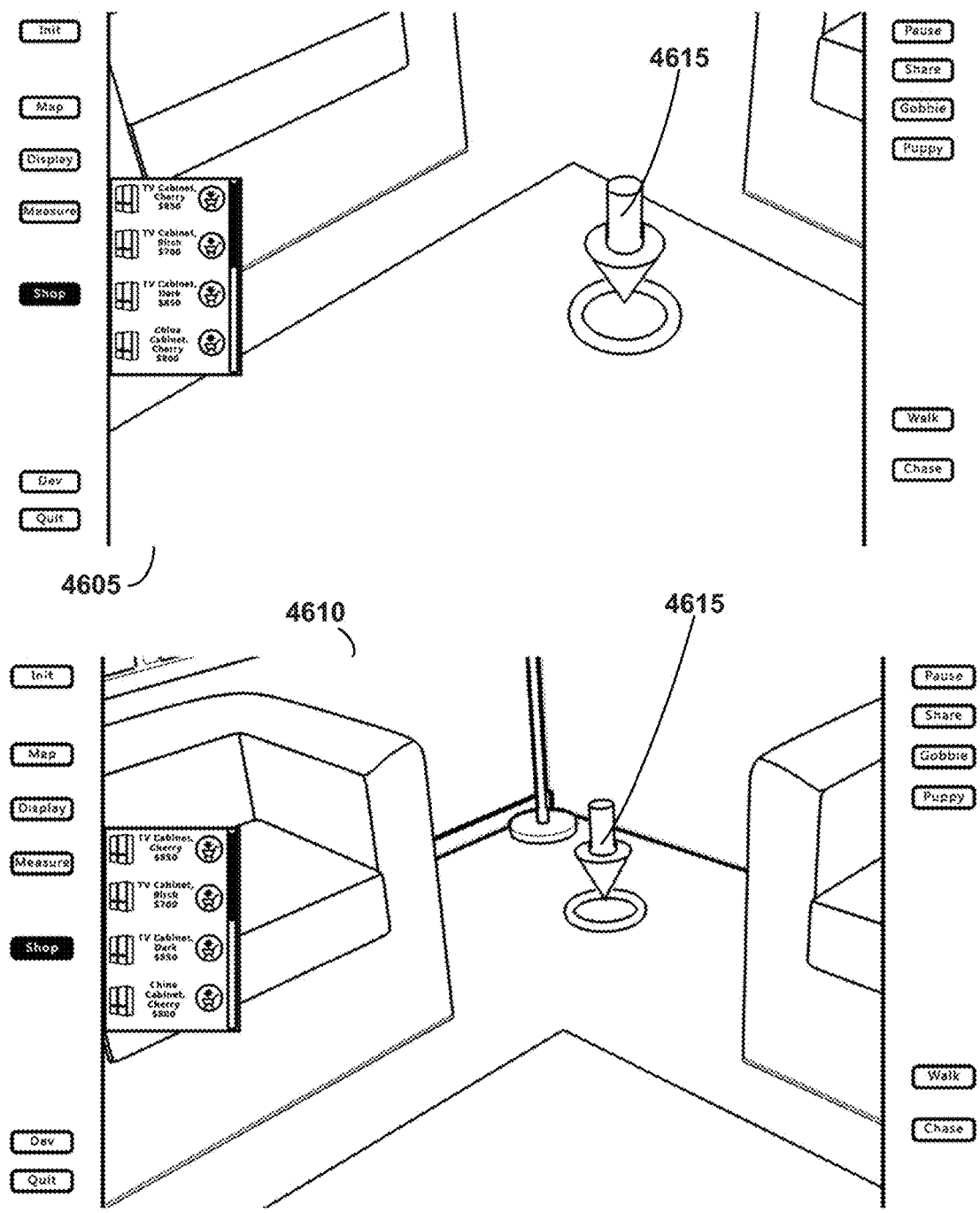
FIGS. 46, 47, and 48 are a collection of screenshots illustrating a shopping application as may be implemented in some embodiments.
Figure 47:
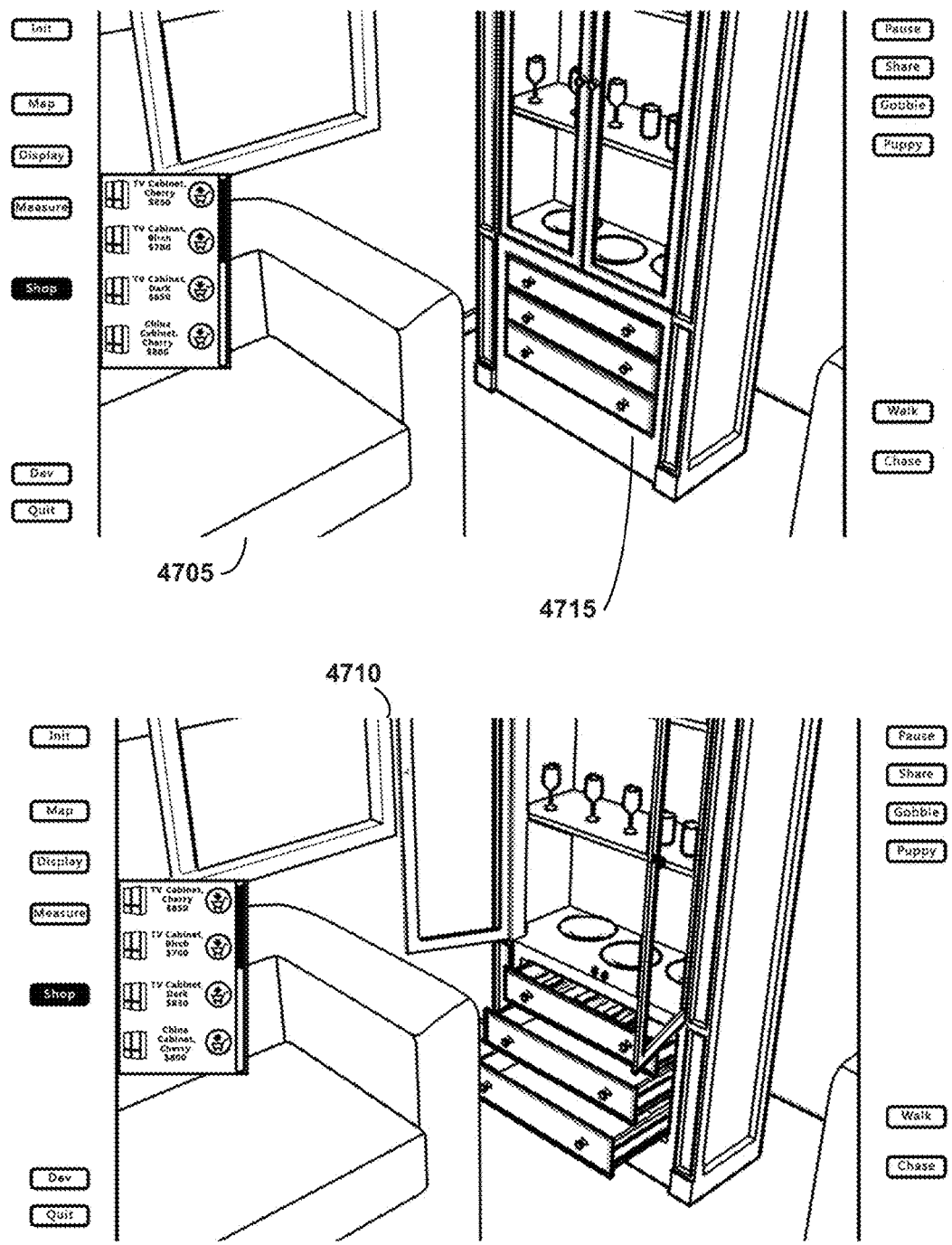
Figure 48:
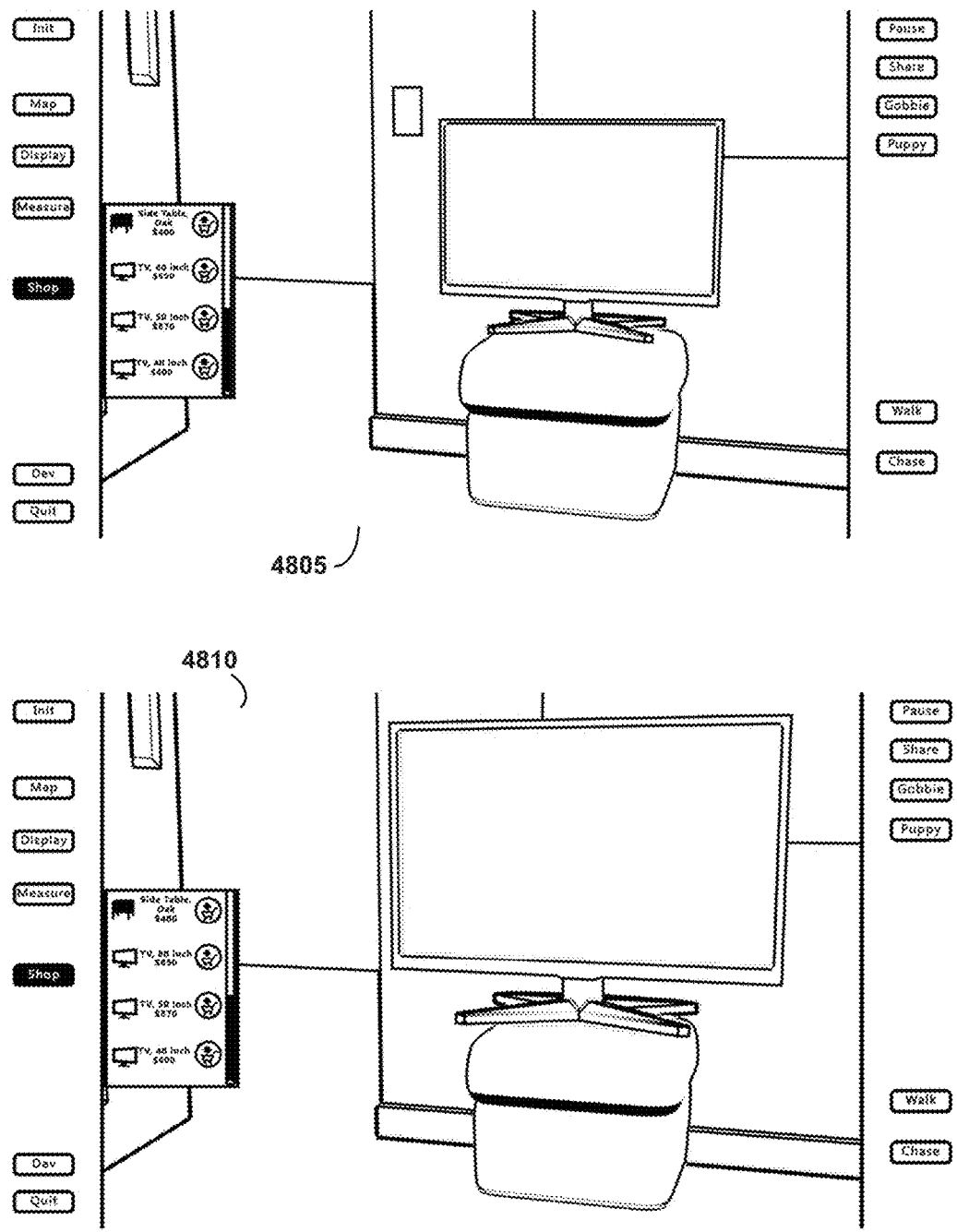

Various of the disclosed Persistent AR techniques can also take the guesswork out of shopping for furniture, electronics, decorations, home appliances and other household items. Instead of trying to measure by hand the space into which a furniture piece should fit, the user can simply place a virtual model of the piece into the environment (see FIGS. 46, 47, 48 for illustration).

As shown in screenshots 4605 and 4610, a virtual marker 4615 moves along surfaces in the environment (e.g., the floor and/or other furniture, stairs, etc.). The marker 4615 may be controlled by the motion of the AR device. The user may make a selection and a cabinet 4715 may be placed at the marker position as shown in screenshot 4705. The user can press and hold a "Grab" button to reposition the cabinet (e.g., translating the cabinet across the floor). Constraints may be based on different furniture so that its repositioning occurs naturally in the environment. For example, a large item, like a dresser, may translate along the floor, while a desktop lamp may be allowed to translate across the surfaces of desks, chairs, etc. In this example, clicking the cabinet may open it up, e.g., so the user can judge clearance for doors and drawers as shown in screenshot 4710. (e),(f) It is easy to switch between different TV sizes to see which one will fit best.

If the piece has movable parts (e.g., a wardrobe), then clicking on the wardrobe may open the wardrobe up, e.g., to allow user to judge the amount of clearance needed and ease of use for this item. When shopping for a TV, it may be difficult to imagine exactly how much space a 60' TV will take up (as well as to assess the aesthetic quality of the TV once in place). With persistent AR, the user can cycle through different sizes, colors, dimensions, form factors, etc. of furniture to pick the optimal one for the room as shown in screenshots 4805 (a smaller TV model) and 4810 (a larger TV model).

In order to view any item in the environment, some embodiments provide an interface to easily place and manipulate a new virtual object. In particular, the following UI operations may be used during shopping, but can be easily generalized to other applications:

"Item Placement": Some embodiments display a 3D arrow marker at, e.g., the center of the screen placed on the surface of the environment. Moving the AR device naturally moves the marker and it keeps following the 3D shape of the environment (e.g., the marker may reorient across the normals of the environment surfaces it traverses—in some embodiments the arrow may instead remain in a fixed orientation). Pressing a button for a particular piece of furniture may place that piece at the marker's position.

"Adjusting Position": To adjust the object's position, in some embodiments, a user may press a "Grab" button. As long as that button is pressed, the object may move with the AR device, as if the user actually physically holding the object (e.g., at an offset distance from the user device corresponding to the object position). The object's vertical placement may be dictated by the environment, e.g., moving a wardrobe on the floor may keep it on the floor and moving a TV on a counter may keep it on the counter. In some embodiments, the objects can also be pushed by the environment, e.g., pushing a wardrobe into a corner will straighten it out and align it with the walls.

"Rotating": Pressing a "Rotate" button may fix the item's position and rotate the item in-place as the user walks around the item. Some embodiments also rotate the AR device like a steering wheel and have that rotation translate into rotation of the object.

"Operating": Clicking on a placed item (e.g., using a touch screen or gesture within the sensor field of view, the gesture being recognized using techniques disclosed herein) may allow the user to operate the item. For example, the system may turn a TV on or off, open up or close a wardrobe, open/close curtains, etc. Some embodiments also allow for more detailed operation, e.g., clicking on a drawer in a cabinet will open/close just that one drawer. If the item has knobs and buttons, then pressing these buttons can have the virtual item perform the respective functions like the real item would, e.g., switch channels on a TV.

"Swapping": Clicking on a different item on a shopping list may replace the current item with the new item. This may allow the user to easily switch between different colors or sizes of the same item.

"Top View": To aid the user in positioning the item, some embodiments display a small window (or full screen) with top-down view around the item being placed. This may be similar to the top-down floor plan discussed in greater detail herein, e.g., in the section with numerical identifier #92 and any corresponding subsections, but may only capture a small area of interest, so that the user can easily see how the object fits into the surroundings. The user's position may also be marked on the top-down view, so that the user can easily see his/her position with respect to the object and environment.

"Purchasing": In some embodiments, once the user places an item, he/she can press the "Add to cart" button to begin the purchase of the item.

"Delivery": Since it is known at purchase time how the user wants the item positioned in the user's house, it is possible to order a special type of delivery service that will not only deliver and assemble the item, but will also place it exactly like the user wanted. Once robotics becomes advanced enough, it is even possible for robots to carry out this type of service, thereby automating substantially all of the process following the user selection. In some embodiments, assembly instructions for a piece of furniture may be adjusted based upon the preferred orientation and placement selected by the user (e.g., furniture need no longer be a fixed structure, but variations may be possible to accommodate different user's accommodations).

FIG. 49 is a sequence of conceptual block diagrams (illustrating real and virtual points of view simultaneously for comprehension) illustrating a position of a furniture marker as may be implemented in some embodiments. As illustrated the orientation of the AR device 4910 may determine the placement of the marker 4905. The marker may be projected onto the environment surface based, e.g., on the center of the user's field of view through the AR device (e.g., whether the marker is near or far from the user it may remain in the center of the AR device's field of view—thus moving the device will move the marker). Translation/rotation of the AR device may consequently result in translation of the marker 4905 or virtual furniture 4915 (following a selection) across the floor plane.

94. User Interface and Applications—Interior Design and Remodeling

Extending on the ideas in real estate and shopping applications, persistent AR can be used for home remodeling and interior design. By placing new furniture and decorations, replacing carpet and curtains, changing the color of walls and floor cover, the home can get a complete makeover, which can be previewed without making a single real modification to the environment.

The plane extraction techniques described in greater detail herein, e.g., in the section with numerical identifier #25 and any corresponding subsections, can be used to extract floor, walls, and ceiling. Thus, objects standing on the floor (or other horizontal surfaces) may be segmented from each other and removed or repositioned as desired in some embodiments. For example, wall separators between rooms can be partially or completely removed, so the user can get a preview of what the home would look like with those changes. In addition, it is possible to give the user "x-ray" vision that shows outlines of objects behind walls and other obstacles.

The user may be able to answer a number of questions about the new design, which are very difficult to ascertain without persistent AR. For example, will the new layout of the kitchen be convenient? Will there be enough clearance to open doors? Are the passageways too narrow? Will a room feel too small or too large? Will the different colors of walls, or, decorations go well together? Today, one has to look at a small sample of flooring or curtains, and somehow imagine what it will look like in reality (a nearly impossible task). Yet, remodeling often costs a lot of money, so these decisions should be approached with as much information as possible.

Various embodiments of the system can be used for design and remodeling by both professionals and consumers. Users can create and share the new designs online, and collaborate with friends and family. The most promising designs can be previewed by walking through the home with the AR device, so the user can see what the newly redesigned space will look like. Then, the system may take measurements and estimate how much of each material will be required to implement the changes and may also determine what the cost will be. Thus different applications may be downloaded to the user device to accomplish different environment assessments.

95. User Interface and Applications—Home Organization and Inventory

Today people accumulate large amounts of items in their homes and it is becoming difficult to keep track of it all. For this reason, home inventory applications have become very popular. These applications require you to either manually enter an item's details, or scan a bar code on its packaging. These apps also require users to manually set where each item belongs in the house. The 3D map may provide a tremendous amount of information to the system, which can be used to greatly simplify and improve home inventory apps. The system may segment and recognize objects in a home or office without any manual entry. The system may also remember where it last saw each item, or which locations are common for a certain item. With this information, the system may act as a 3D search engine, helping users to locate items in their home, office, warehouse, laboratory, operating room, etc. The system may also keep track of item inventory and alert the user when supplies run low (e.g., of bottled water or paper towels). Thus scanning data may be consolidated across devices (e.g., an employee and a managers separate temporal scans may be used to assess the environment). Further, for each item, the system may help users identify the item's place in the environment, and thus help users to organize, e.g., their house.

Figure 50:
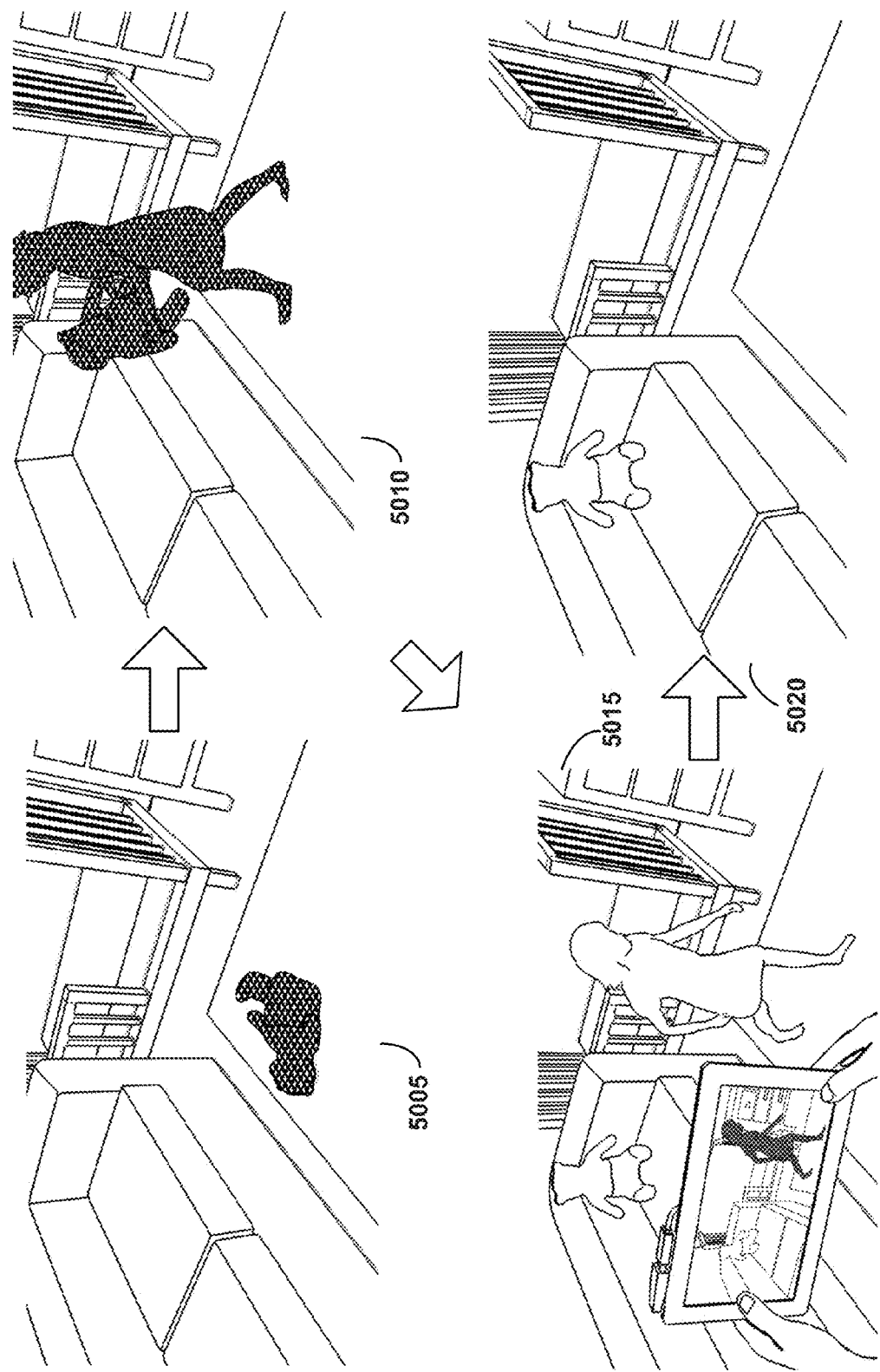
FIG. 50 is a sequence of screenshots and photographs illustrating features of a "clean-up mode" encouraging children to keep their rooms clean as may be implemented in some embodiments.

Some embodiments can detect when items are out of place using the 3D model. With this information, the system may, e.g., encourage children to clean-up their rooms as illustrated in FIG. 50. An application (e.g., running on a tablet device serving as an AR device) may award "points" once the child has cleaned-up his/her room (points may be used, e.g., to unlock games or other desirable features for the child). As shown in screenshot 5005 one toy (a teddy bear) is out of place. The toy and the place where it belongs are highlighted in red. For example, the pixels identified as corresponding to discrepancies in the map may be highlighted. As shown in screenshots 5010 and 5015 a child is cleaning up her room. After clean-up, as shown in screenshot 5020 the system may recognize the room as clean. For example, every evening a child (or parent) may scan the room with the AR device. The device will highlight all items out of place. By cleaning-up these items, the child may earn points, which he/she can later use to purchase games, toys, or other items. The system may also be configured to display advertisements to the child (e.g., upon replacing a doll to its proper location the system may inform the child of a newer version of the doll now available). Since more than one configuration of the child's room may be acceptable, embodiments of the system may allow the parent to approve several configurations. The room may be considered clean whenever any one of these configurations is achieved to a desired degree.

To implement the clean-up mode, some embodiments reuse the LFI data structure from described in greater detail herein, e.g., in the section with numerical identifier #34 and any corresponding subsections. Given a data scan, each scan point may be classified as "cleaned-up" or "out-of-place" based on the distance to the map using the LFI data structure. The threshold, beyond which a scan point may be considered to be "out-of-place", can be the same as the range discontinuity threshold described in greater detail herein, e.g., in the section with numerical identifier #14 and any corresponding subsections.

Some embodiments mark "out-of-place" points red (e.g., as an overlay on the real-world image presented in the user device). The system may then split the red points into connected components by proximity. Clusters with very small number of points may be filtered out, e.g., as they may constitute outliers caused by sensor errors. The remaining clusters may be considered objects which are out of place. To mark a specific configuration of the room as acceptable, the user may point the camera at a part of the room and press a "Mark as Clean" button. Points from the red clusters found in the data scan may be added to the LFI. Then, the system may recompute LFI cells within some radius around these newly added points.

96. User Interface and Applications—Gaming and Entertainment

Persistent AR has a huge potential for gaming and entertainment applications. In this section, a number of example gaming uses of various embodiments are presented details provided for several of these games.

Many of the discussed applications focus upon inanimate virtual objects. However, the system may be able to embed animated virtual characters just as well. Using techniques described in greater detail herein, e.g., in the section with numerical identifier #71 and any corresponding subsections, these characters may be "aware" of the real surroundings and can react to real-world events in the same way real characters would. The virtual characters may take advantage of other sensors in the environment (e.g., a microphone on the user device) to couple their reactions to the 3D model with sensory input from the other environment sensors (e.g., detected another user's voice in a doorway via a microphone, turning, and walking to the doorway to acknowledge the presence of the other user).

Interaction with these characters may be much more natural than in today's games. Therefore, persistent AR may allow for games that are much more immersive and life-like. Instead of taking the user to a far away virtual world, gaming characters may now inhabit the user's home.

97. User Interface and Applications—Gaming and Entertainment—Virtual Pet

Many children today cannot have pets, although they would really like to. Persistent AR may facilitate the introduction of virtual pets into the child's home (e.g., a pet to which the child is allergic, or which is fanciful, such as a lion). These pets can act exactly like real ones, e.g.: greet the user at the door, curl-up by the bed when a child is sleeping, chase a ball around the house, play hide-and-seek with a child, etc. Taking care of the pet can also be much more realistic. The interactions may be environment specific, e.g., the user may feed the pet in the kitchen, wash them in the bath tub, etc. Since the system allows for a much more natural interaction with the pet, a number of new UI and gaming techniques can be implemented:

"Feeding": To feed the pet, a user can pour virtual food into a real or virtual bowl in the kitchen.

"Petting": A user may stroke the pet by pressing on the screen and moving the device gently along the pet's back or tummy. In some embodiments, gestures performed within the depth sensor's field of view may also produce a reaction at the pet. Multiple depth sensors (e.g., outside the user device, fixed in the environment) may be integrated so that the pet may react and operate outside the user device's immediate field of view in some embodiments.

"Play Ball": In some embodiments, a user can aim a ball throw with the AR device (in some embodiments the ball may instead be tracked to fit in a user's cupped hand). The ball may obey the laws of physics in-flight (e.g., gravity, air drag) and may bounce off the obstacles in the environment (both real and virtual). The ball may also roll on horizontal surfaces like a real ball would. The pet may catch the ball and bring it back to you (e.g., for tennis balls), or it may hit the ball back to you (e.g., for beach balls). To hit the ball back to the pet, the user may "hit" the ball with the AR device.

Figure 51:
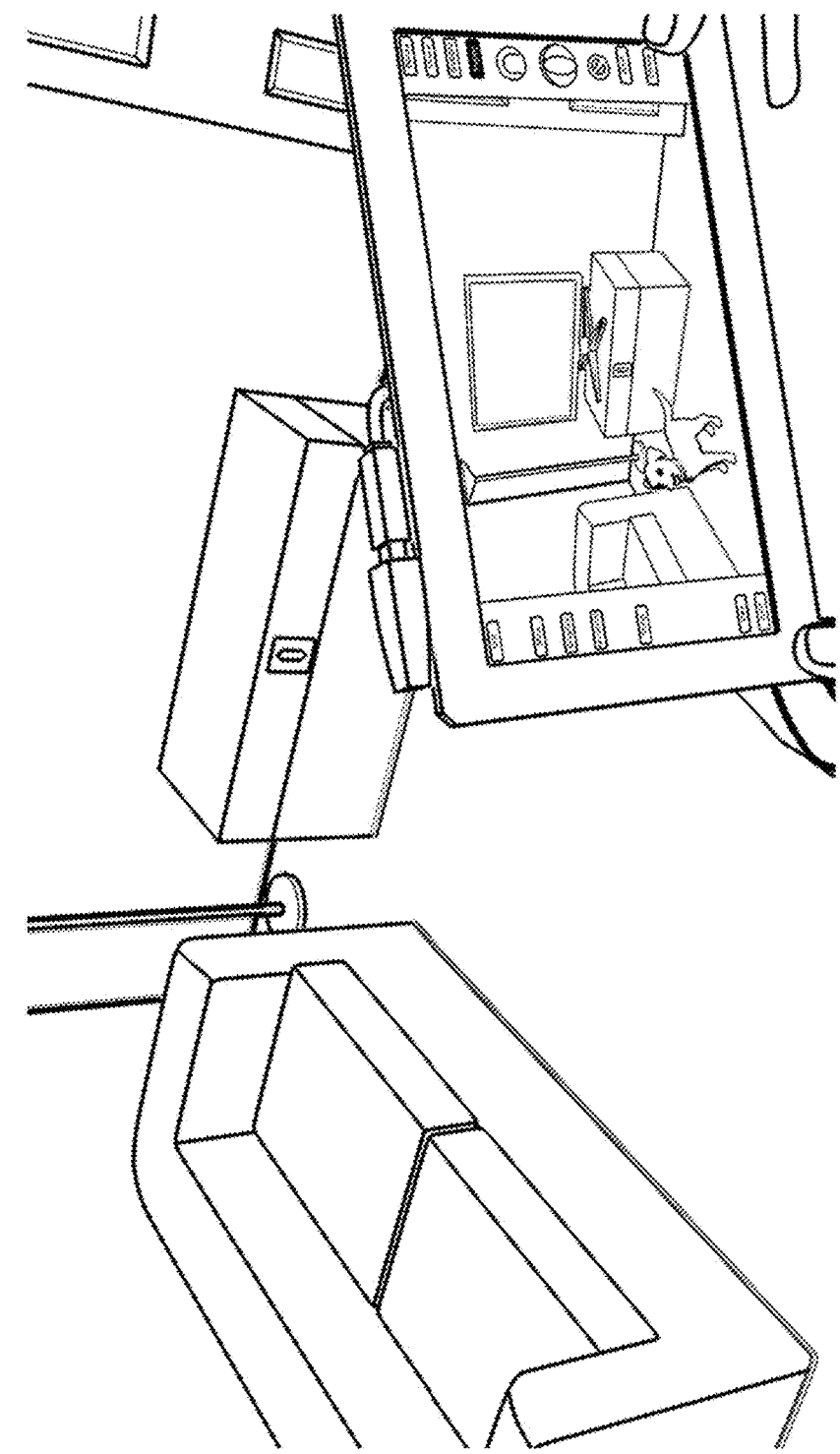
FIG. 51 is a photographic image of an example application running on the example device of FIG. 5, the example application presenting a synthetic character (e.g., a pet dog) in situ as may be implemented in some embodiments.

FIG. 51 is a photographic image of an example application running on the example device of FIG. 5, the example application presenting a synthetic character (e.g., a pet dog) in situ as may be implemented in some embodiments.

Figure 52:
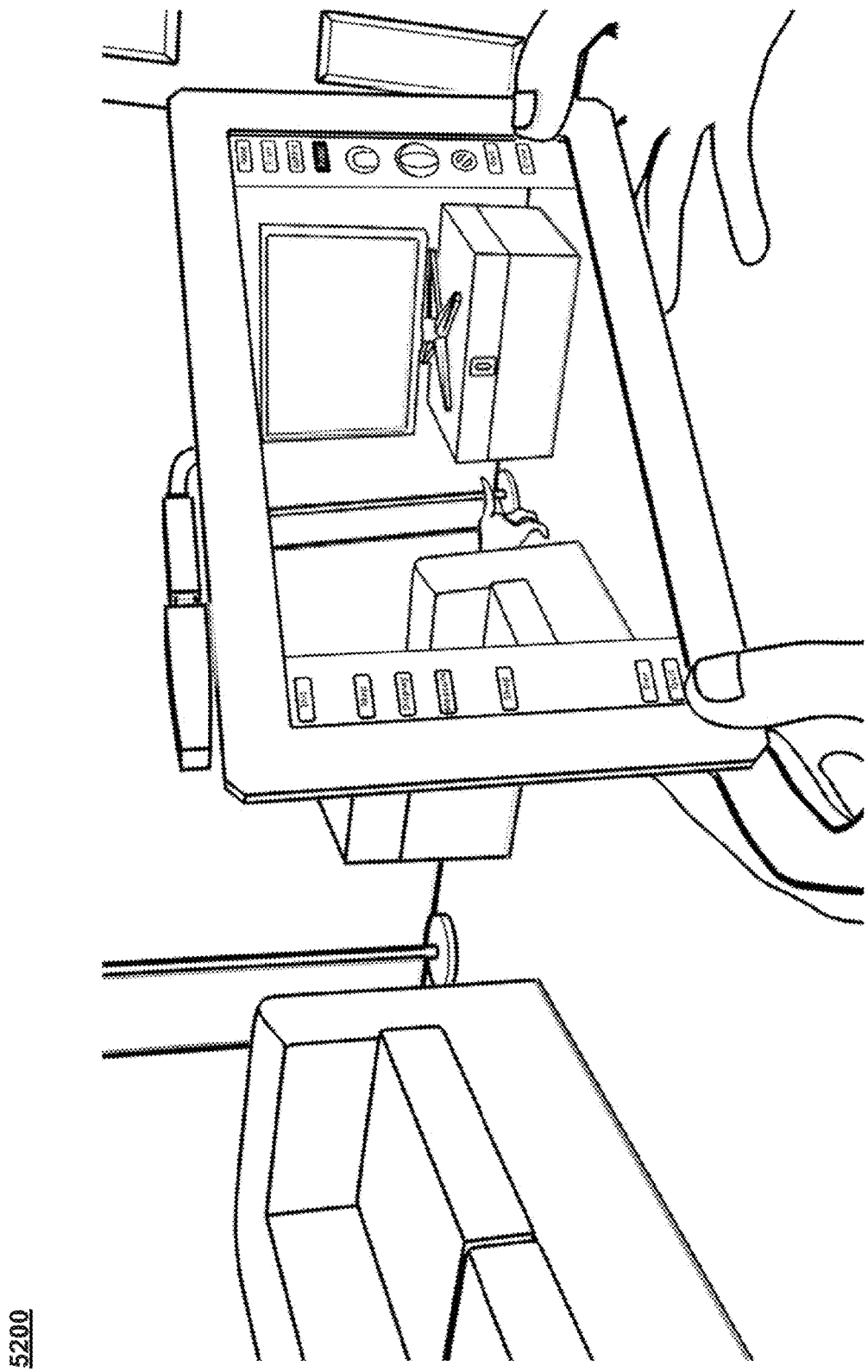
FIG. 52 is a photographic image of an example application running on the example device of FIG. 5, the example application presenting a synthetic character (e.g., a pet dog) in situ occluded by a real-world object (e.g., a sofa) in the environment as may be implemented in some embodiments.

FIG. 52 is a photographic image of an example application running on the example device of FIG. 5, the example application presenting a synthetic character (e.g., a pet dog) in situ occluded by a real-world object (e.g., a sofa) in the environment as may be implemented in some embodiments.

Figure 53:
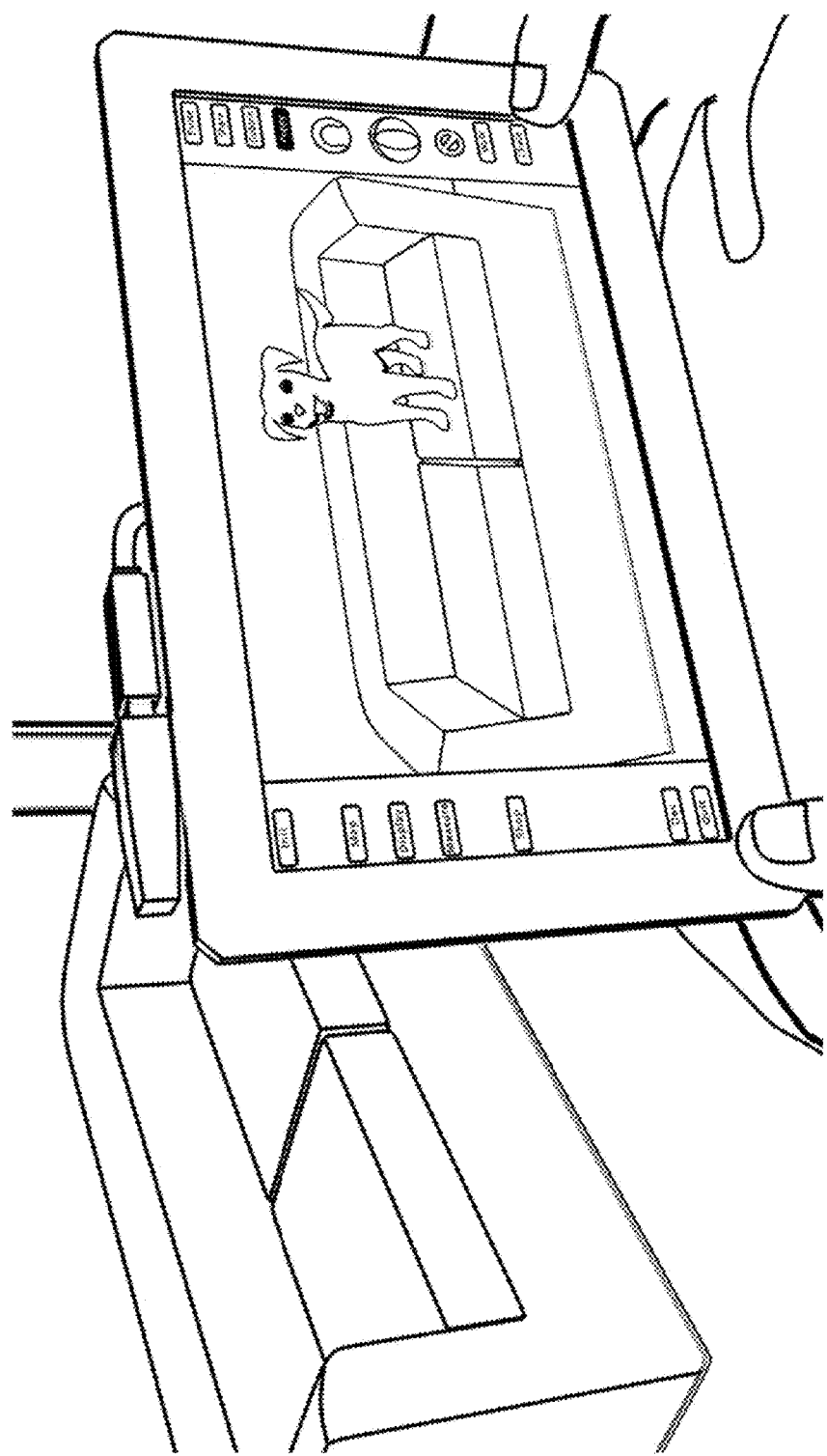
FIG. 53 is a photographic image of an example application running on the example device of FIG. 5, the example application presenting a synthetic character (e.g., a pet dog) in situ operating upon one of several available real-world surfaces (e.g., a sofa seat) as may be implemented in some embodiments.

FIG. 53 is a photographic image of an example application running on the example device of FIG. 5, the example application presenting a synthetic character (e.g., a pet dog) in situ operating upon one of several available real-world surfaces (e.g., a sofa seat) as may be implemented in some embodiments.

Figure 54:
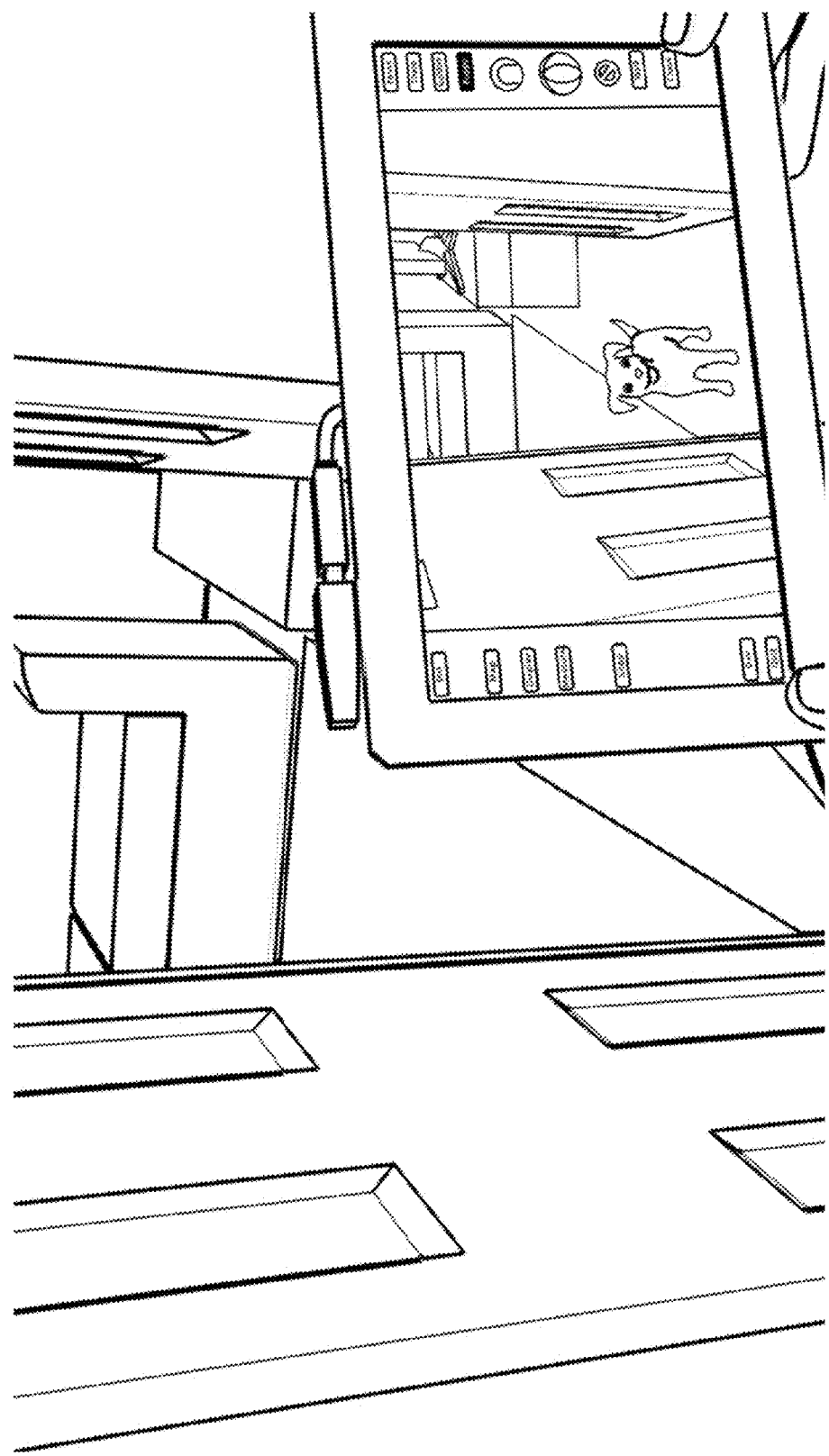
FIG. 54 is a photographic image of an example application running on the example device of FIG. 5, the example application presenting a synthetic character (e.g., a pet dog) in situ performing a user path following algorithm as may be implemented in some embodiments.

FIG. 54 is a photographic image of an example application running on the example device of FIG. 5, the example application presenting a synthetic character (e.g., a pet dog) in situ performing a user path following algorithm as may be implemented in some embodiments.

Figure 55:
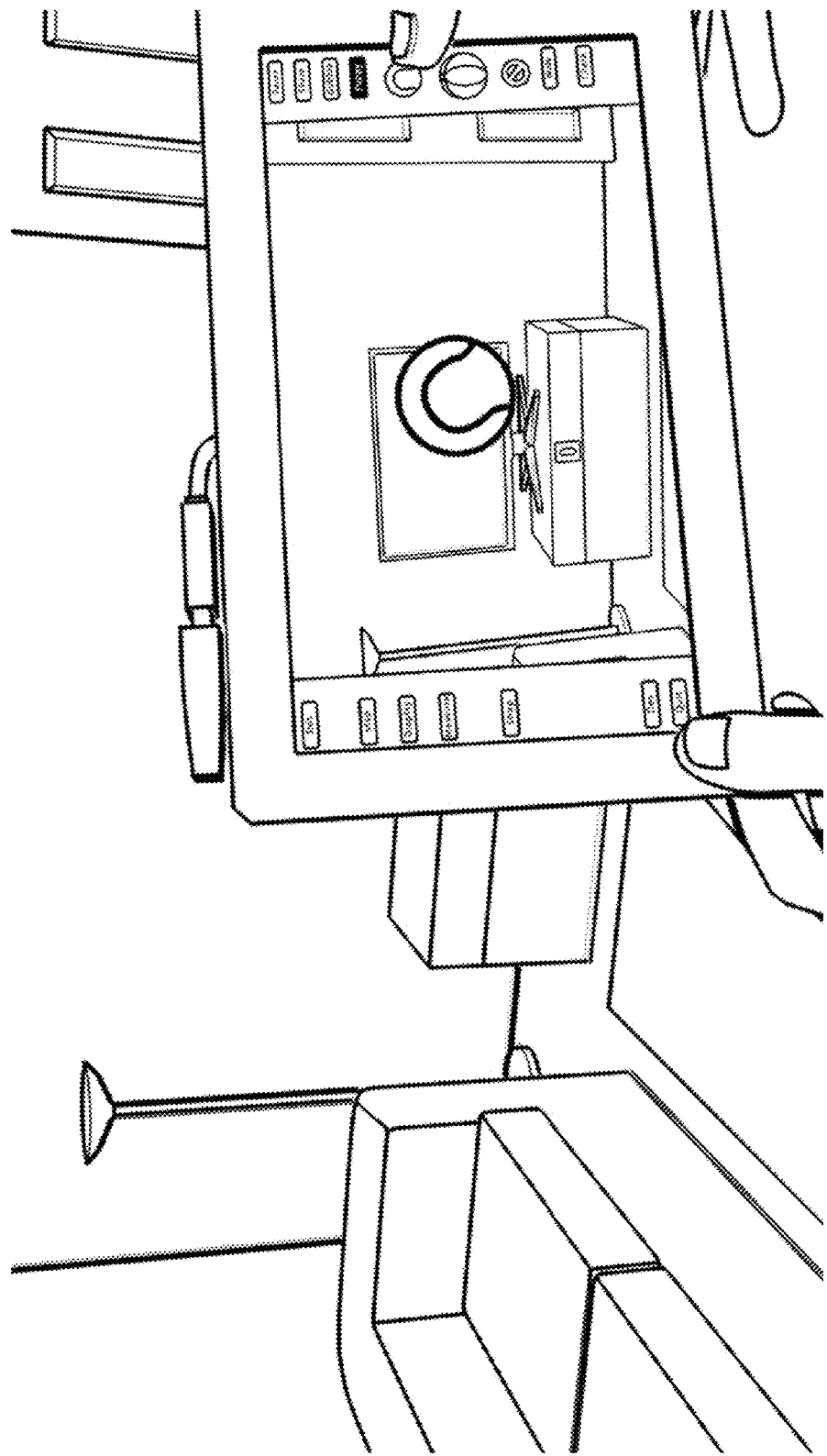
FIG. 55 is a photographic image of an example application running on the example device of FIG. 5, the example application presenting additional example synthetic objects (e.g., a television and a tennis ball) which may interact with the model of the real-world environment as may be implemented in some embodiments.

FIG. 55 is a photographic image of an example application running on the example device of FIG. 5, the example application presenting additional example synthetic objects (e.g., a television and a tennis ball) which may interact with the model of the real-world environment as may be implemented in some embodiments.

Figure 56:
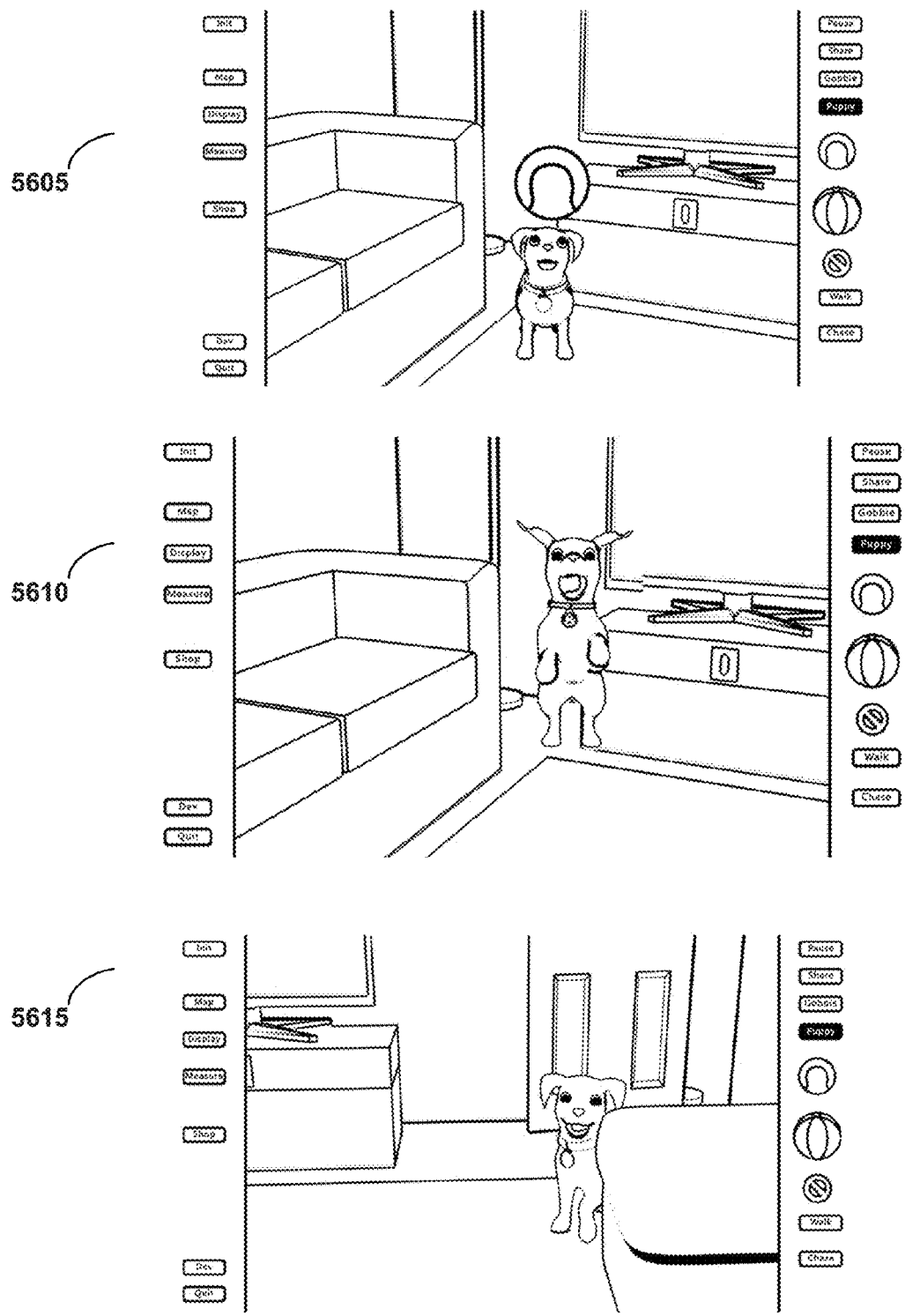
FIG. 56 and FIG. 57 are a collection of screenshots illustrating a virtual pet game, including ball interactions, as may be implemented in some embodiments.
Figure 57:
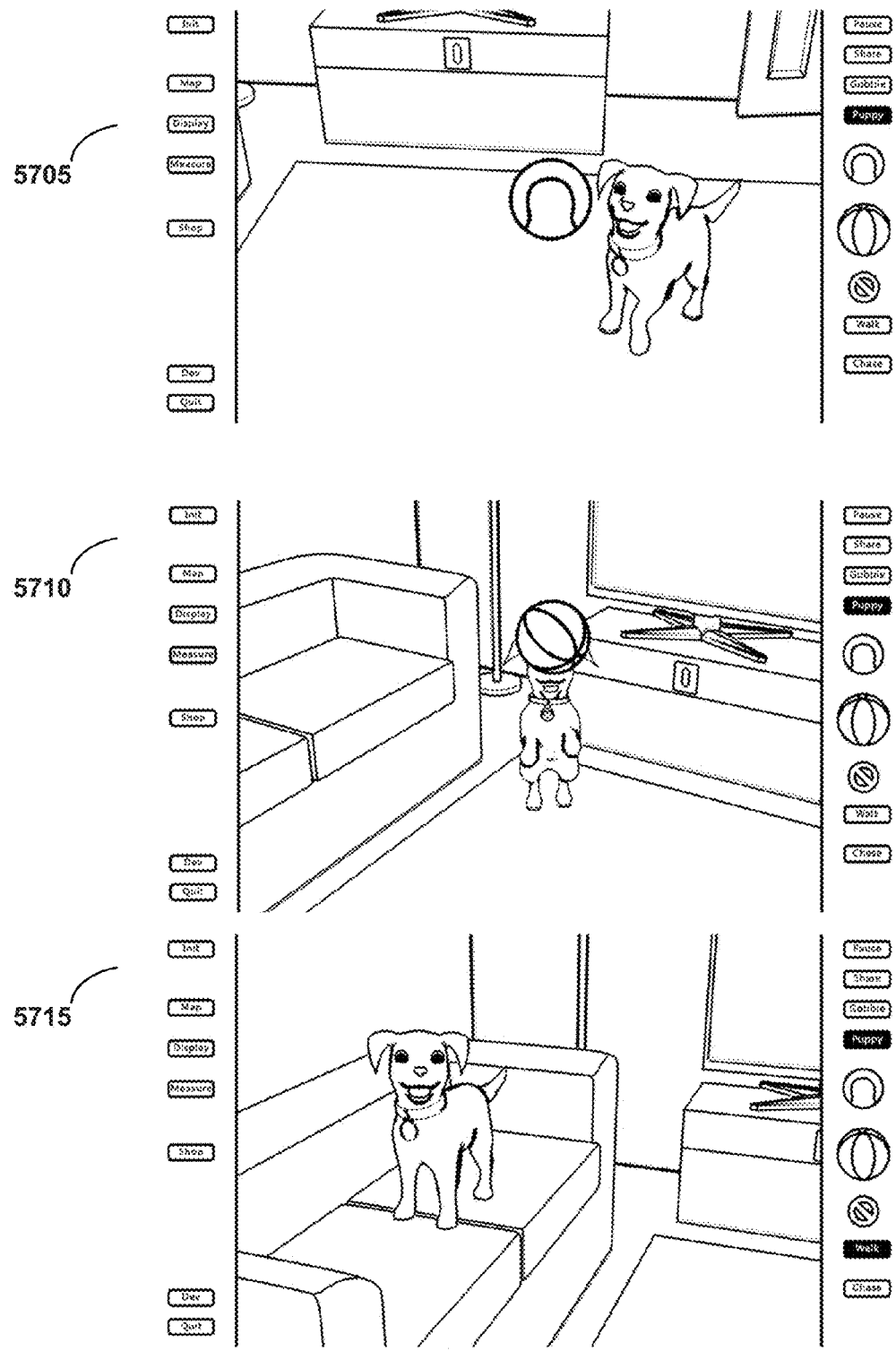

FIG. 56 and FIG. 57 include a collection of screenshots illustrating a virtual pet game, including ball interactions, as may be implemented in some embodiments;

At screen 5605, the virtual pet is ready to play. The user may, e.g., tap on a tablet screen to throw the ball. A thrown ball may be affected by gravity and air drag. The ball may also bounce off walls and other obstacles. At screen 5610, the pet may attempt to catch the ball when thrown. At screen 5615, once the pet catches the ball, he may bring it back to the user. At screen 5705, the pet may return the ball to the user's hand. At screen 5710, the pet can also play with balls having different physics dynamics, e.g., a beach ball. The pet may attempt to hit the ball back to the user. At screen 5715, the pet may also jump up on furniture in the environment.

"Operation with Prior Games": the pet may come from one of your prior pet games (e.g., on the console) by jumping right off the TV screen into your living room. For example, characters in a video game may "enter" a TV to perform their functions therein (e.g., running in a platformer game).

Once TV-based operations are complete, the character may appear to "step out" of the television to resume the AR experience.

98. User Interface and Applications—Gaming and Entertainment—First Person Shooter In some example first person shooter (FPS) game applications, the user may operate in their home or office environment (e.g., defending the home from invaders). This may add a degree or realism and immersion never seen in games before. It may also provide a very natural motivation as it is your own home that you have to rid of the bad guys.

In an example implementation, bad guys can spawn in different locations throughout the house and go looking for the user (e.g., the system may know the user's position but the AI logic may implement a search algorithm independent of that knowledge). The AI may "stalk" the user, taking advantage of the environment. The user may have to run, hide, take cover from their projectiles, and shoot various objects. Multiple players can play cooperatively or competitively in the same home. To take the best advantage of newly available realism, a number of gaming and UI techniques can be implemented:

"Aiming": In some embodiments, the user may aim their gun by aiming with the AR device. The center of the device may display cross-hairs, which shows the point that is targeted. Tapping anywhere on the screen (or on a specific button) may reload and/or fire the weapon. One will recognize that a peripheral may be used instead of a user device cross-hair in some embodiments.

"Bullets": Bullets may leave virtual bullet holes in walls, furniture, and other real and virtual objects (e.g., by manipulating their corresponding textures, producing overlays, etc.). Shells from bullets can follow the laws of physics and bounce on the different objects in the environment or roll on them.

"Blood": Blood splatters (and debris) from the enemies killed can disperse throughout the room following the laws of physics and can end up on walls, floor, or other objects in your environment. Splatters can also land on the screen of the AR device. A cloth tool could be provided for wiping the screen. Blood trails may also be used to track virtual characters.

"Doors": Shutting the door in front of virtual bad guys may prevent them from moving through the doorway. However, they may be able to virtually break down all or part of the door, and then enter the room.

Figure 58:
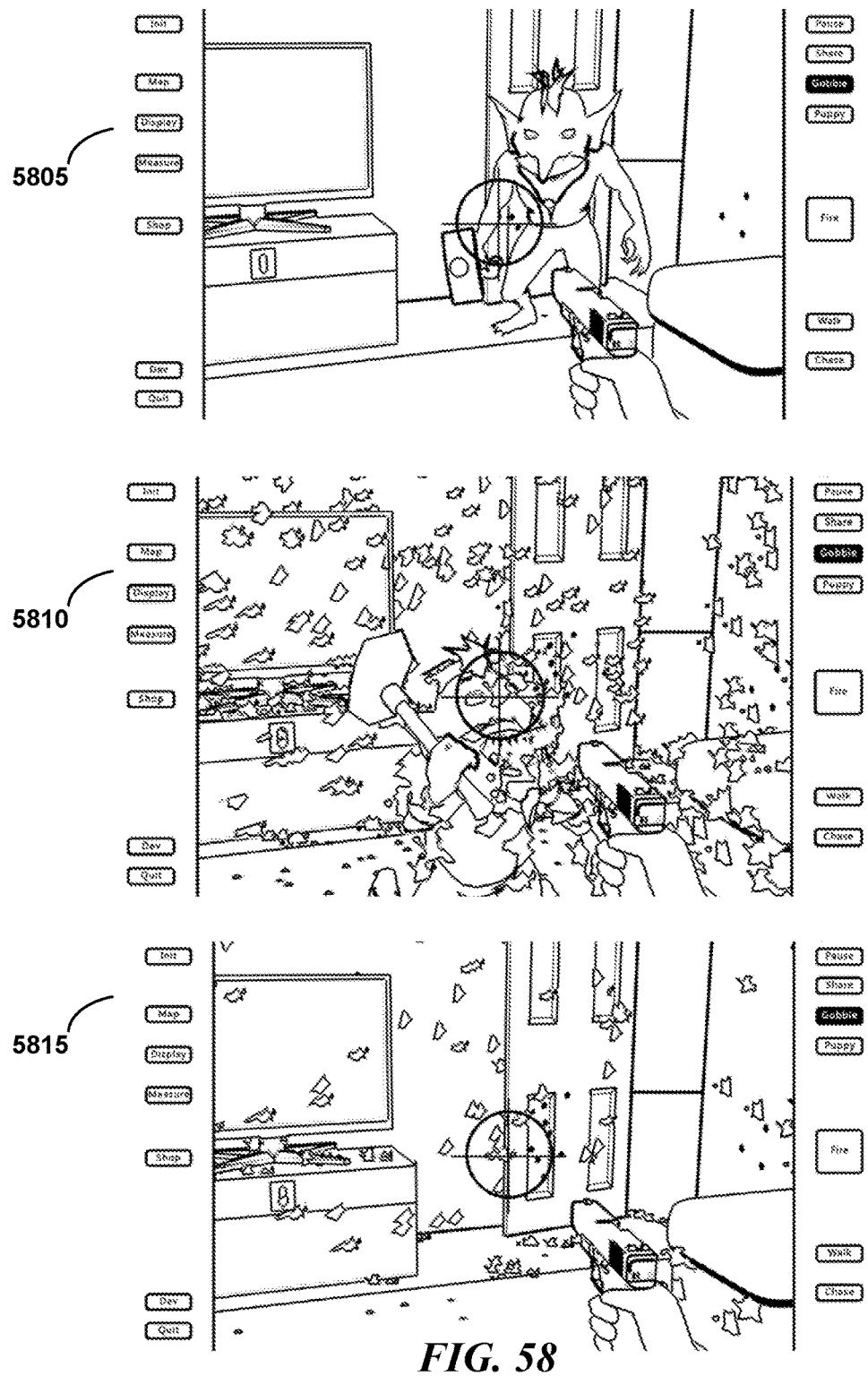
FIG. 58 and FIG. 59 include a collection of screenshots illustrating a goblin first person shooter game, as may be implemented in some embodiments.
Figure 59:
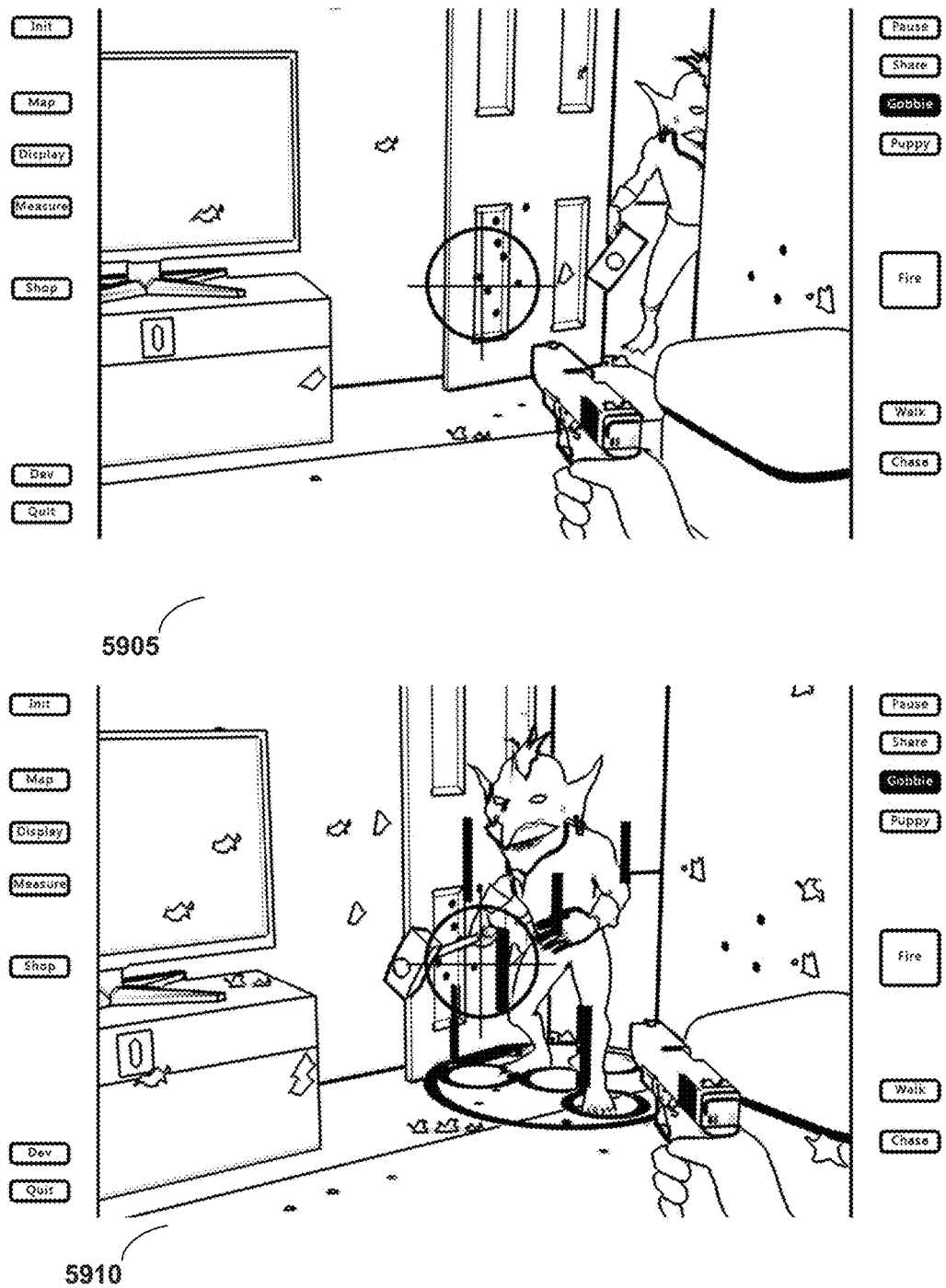

FIG. 58 and FIG. 59 Screenshots illustrating the goblin first person shooter game, as may be implemented in some embodiments.

At screen 5805, a user defends their home from goblins. The weapon can be aimed with the cross hairs of the AR device. Tapping on the screen can cause the weapon to fire and/or reload. At screen 5810, a goblin death causes an explosion of blood splatters, some of which end up on camera lens. At screen 5815, blood splatters land on the environment and slowly fade over time. Some blood splatters remain on the camera lens. At screen 5905, bullet holes remain persistently in the environment and follow its geometric shape. At screen 5910, goblins can spawn in different rooms of the house, but in some embodiments, they may find the user wherever the user is.

99. User Interface and Applications—Gaming and Entertainment—Real-Time Strategy

In real-time strategy (RTS) games, the user may control large groups of small characters (also called units). The characters may be soldiers, civilians, magical creatures, vehicles, etc. The objective may be to grow and develop your population, build a strong army, then conquer the rest of the game world. Typically, resources may need to be gathered, new technologies researched, new buildings constructed, and new units built.

RTS games have been around for decades, but with persistent AR, they can become much more personal, because now the game world that needs to be captured may be your own home. You might start in your bedroom, then once your tribe is strong enough capture the living room and then kitchen. As every good general knows, logistics wins wars. You need to carefully plan and defend your supply routes and take over strategic locations (e.g., your home's hall-ways) to keep those resources secured. The environment may be used to strategic advantage, e.g., tables and chairs may serve as high ground on which to place missile units. Users visiting other users homes and offices may trade map models to facilitate quick participation in one another's environment. Such an application may cause users to reevaluate their furniture in a whole new light (similarly, in racing applications the potential to perform tricks on furniture may be considered).

For RTS, there are several UI elements that some embodiments may implement:

"Selecting": The user may select single units or buildings. This may be done by pointing the AR device in the direction of the object to be selected, and then tapping on the object. Holding down an additional button (e.g., with another finger) may allow for objects to be added/removed from the current list of selected objects.

"Setting Goal": Similarly, the goal for units or buildings can be set by pointing the AR device towards the goal location and then tapping to set the goal.

"Group Selection": Groups of units may be selected by left-clicking and dragging a rectangle around the group in many existing RTS games. For persistent AR, the AR device may be pointed towards the group to be selected. Then, the user may press two thumbs to denote the vertices of the rectangle. All units within the trapezoid in front of the camera and within this rectangle may be selected.

"Group Shortcuts": The user may remember a selected group by assigning it to a shortcut button. Tapping this button later may select the same group again.

"Overhead Map": The top-down view of the entire 3D map may be used as an overhead map of the world with or without fog of war. The overhead map may be shown in a small window, so the user can click on locations on that map to set goals for units.

100. User Interface and Applications—Gaming and Entertainment—Miscellaneous

The following is a list of a number of additional ideas for gaming and entertainment with a brief description for each: "Lego® City": Combine real and virtual LEGOs® to build a bustling LEGO® city that sprawls across the whole house. A virtual railroad with trains may connect the different districts without adults tripping over it. Figures may be animated. Airplanes can fly through the environment. Figures with superpowers may exercise their abilities virtually, etc. "Celebrity Sleepover": A user may have tea with a Disney princess using a toy tea set. The princess can sleep, e.g., on a pull-out bed or in a castle tent. "Ball Game": Unlike in current games, the ball no longer flies directly to you every time. You have to move around the room and intercept the ball before it reaches other players like in physical ball games. The user may team up with other virtual or real players. This may bring a new degree of realism to virtual ball games. "Fairytale Land": A user may make a new window in any wall of their house and have it open up into fairytale land. They may watch fairytale creatures go about their business. Alternatively, the user's entire house may be transformed into fairytale land. "Party Game": A user or the system may hide virtual objects around their house and have guests go looking for them. "Investigator": The user may solve a mystery in their home. For example, the user may have obtained a special device from an advanced civilization. This device may allow them to see things not visible with the naked eye. The user may decipher mysterious signs on their walls, search for clues, hunt ghosts, time-travel to the past or future to view events unfold in different parts of their house. "Nightmare": Special effects may be created, e.g., a ceiling may "swell" and then burst open to present giant spiders. "Rube Goldberg Devices": Users may build incredible machine puzzles in their house (incorporating both real and virtual components). They may then invite their friends to solve it or just show it off. Resetting the puzzle and clean up may be a snap. "The Sims® in Your House": Life-sized simulated persons (e.g., famous historical or popular figures) may live in your house. Some may serve as personal assistants while others may serve as life-simulators for entertainment purposes. "Movie Director": A toolkit may be provided to make movies with animated characters (e.g., an extension of Sims® idea above). It may be similar to other authoring tools, e.g., a Garage Band®, but for shooting movies. Script/control the characters to do what the user wants and control the camera may be provided. The user may also add voice-over and sounds.

101. User Interface and Applications—Education

There are many educational uses of persistent AR as discussed in various embodiments herein. The mapping techniques described in greater detail herein, e.g., in the section with numerical identifier #5 and any corresponding subsections, can be used to scan museums and other locations of interest. Users may then virtually visit these locations, or these scenes may be re-created around the user in his/her own home. Crime scenes may also be captured and the criminal incident simulated or replayed to validate the statements of witnesses. Physics based models may be used in conjunction with the simulated and real-world environment to verify the proffered course of events.

Education can become much more immersive with persistent AR. Imagine if, e.g., Julius Caesar came to your house to tell you about his greatest battle as armies of tiny soldiers re-enact the battle on your living room floor. Or, e.g., Isaac Newton could visit you to teach you about Newtonian laws of physics and show you experiments right in your house. Thus, persistent AR may allow you to take part in historical events and scientific discoveries, instead of you just being a passive reader/listener.

102. User Interface and Applications—Advertising

Persistent AR allows for an entirely new form of advertising: reality advertising. For example, a steaming virtual cup of coffee on a counter in the morning could encourage a user to stop by Starbucks™ on their way to work. Nondescript cups and other utensils may have logos and real-time advertisements projected upon their surface textures. At dinner time a user may see mouth-watering virtual dishes on their table. Simply clicking a dish may suffice to have it delivered to the user's home.

If done correctly, this advertising could be extremely helpful to users. For example, as users walk through their house, the system may suggest a side table next to their couch or a different design for their carpet. Animated advertisements involving virtual people, animals, or cartoon characters are also possible.

103. User Interface and Applications—3D Printing

Figure 60:
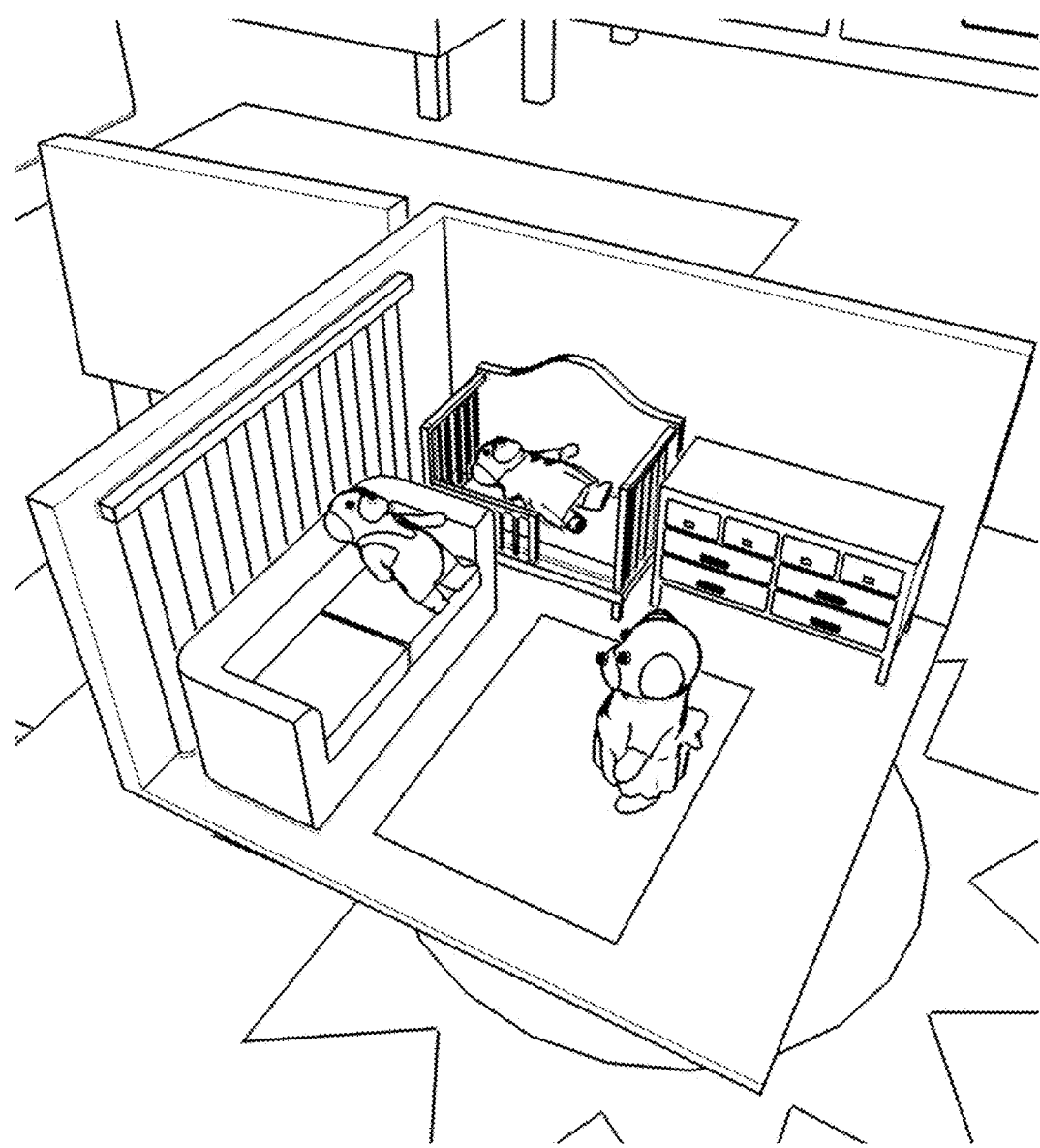
FIG. 60 is a photographic image of a 3D-color-printed doll-house generated from an environmental model as may be implemented in some embodiments.
Figure 61:
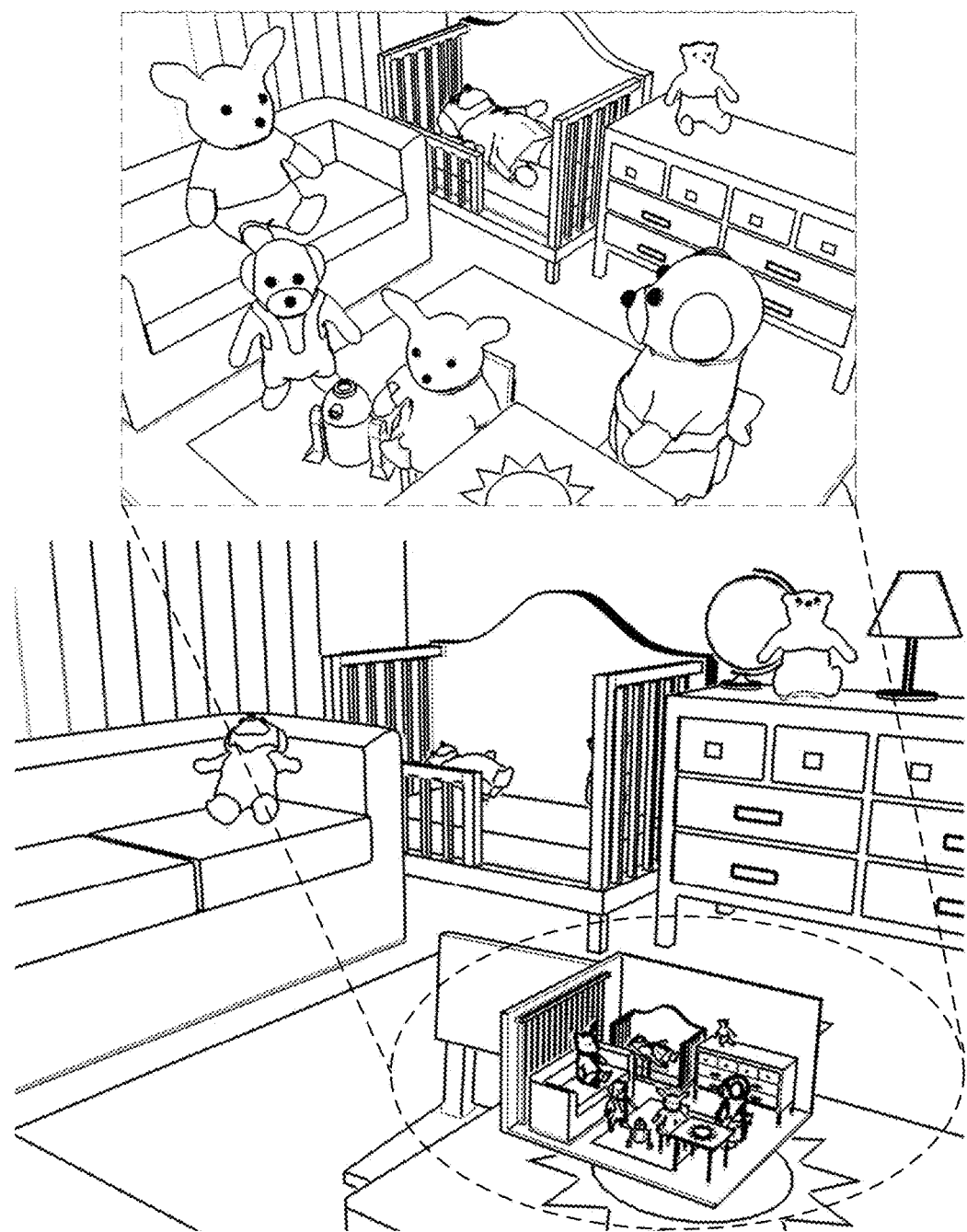
FIG. 61 is a pair of photographs depicting a child's room and its 3D printed counterpart, customized as a doll house, based on data captured using various of the disclosed embodiments.

FIG. 60 is a photographic image of a 3D-color-printed doll-house generated from an environmental model as may be implemented in some embodiments. The 3D mapping technology described in greater detail herein, e.g., in the section with numerical identifier #5 and any corresponding subsections, may allow scaled-down versions of a building to be printed. Small table-top items as well as large scale environments spanning entire buildings may be scanned, optionally scaled down, and printed. In some embodiments, the 3D mesh produced by the mapper may be modified for 3D printing. The same techniques can be used for large and small objects. 3D printed models of buildings can be useful for architecture and remodeling. They can also serve as doll houses, which are identical to the child's own home. See FIG. 61 for an example.

104. User Interface and Applications—Data Mining

Since building a 3D map may be computationally intensive, it may be easiest to do this on the computer cloud (e.g., a large collection of processing systems). In this case, 3D models of multiple users' homes may be available to a vendor providing this service. While privacy of users may be a priority, the immense amount of information contained in these 3D models may be mined in aggregate. For example, by examining common color schemes in people's homes, a rug manufacturer may decide on particular pallets and patterns when designing the next rug. A furniture manufacturer may use this information to guide decisions about optimal furniture dimensions. Thus, advertisements and selections made by users using the application described herein may be monitored and recorded to facilitate subsequent analytics.

There is a tremendous amount of information in how different objects are spatially distributed in our homes, and which objects end up next to each other. This information could be used to create new useful furniture pieces, suggest home organization ideas to the user, suggest other items that may be useful to the user, and many other purposes.

105. User Interface and Applications—Robotics

The mapping and pose estimation technologies described in greater detail herein, e.g., in the sections with numerical identifier #5 and #26 and any corresponding subsections (collectively METL) may be very useful for many robotics applications. If an RGBD camera (and optionally an IMU) are fitted onto a robot, METL can be used for robotic perception, which allows robots to understand the surrounding environment. The path planning techniques described in greater detail herein, e.g., in the section with numerical identifier #76 and any corresponding subsections, for virtual characters, e.g., may be used equally well for robots, thus, enabling robot navigation. Today, the number of robotic applications is growing quickly. Robots can serve as autonomous vacuum cleaners at home, robotic tour guides at a museum, telepresence robots in the office, autonomous vehicles, and even security guards.

All of these applications may employ robotic perception and navigation and could greatly benefit from METL technologies. With METL, robots may autonomously build 3D maps of homes, museums, office buildings, and other structures (e.g., while performing some other function such as cleaning). These 3D models may then be used for presentation to the user, education, architecture, and other purposes. Many of the applications discussed in, e.g., sections with numerical identifier #92 through #104 may also benefit from the use of robots. For example, robots may autonomously build 3D maps of homes for real estate applications (e.g., the section with numerical identifier #92). Robots may also help with delivery and installation of purchased items in shopping applications (e.g., as discussed in the section with numerical identifier #93). Robots can also help with home organization (e.g., as discussed in the section with numerical identifier #95), e.g., continuously monitor the home to keep track of where objects are and even autonomously move objects to their correct locations.

106. Calibration Following Sensor Outages

Sometimes during data log recording, it is possible to get a sensor outage. Sensor outages can happen for a variety of reasons: sensor malfunction, wiring problem, OS delay (e.g., due to swapping), etc. Sensor outages are very difficult for the mapper to cope with, because effectively the camera jumps from one location to another (possibly quite far away) instantaneously, and there is no way to recover from this jump. Therefore, sensor outages need to be handled during data collection. When the data recording tool detects an outage (by looking at sensor data time stamps), it alerts the user and provides a method for re-recording from the place where the outage started. To do this, some embodiments pause recording until the camera pose has been recovered. To assist the user with camera pose alignment, some embodiments display a mix of two images: (1) the last image before the outage began and (2) the latest camera image (see FIG. 62). This allows the user to move the camera around until the two images line up. Once the camera pose is aligned with where the data log left of, the user pushes a button to re-start recording.

FIG. 62 is a screenshot of a calibration transparency applied following a data connection disruption as may be implemented in accordance with some embodiments. These operations may also be performed, e.g., at block 3140 of FIG. 31.

Computer System

Figure 63:
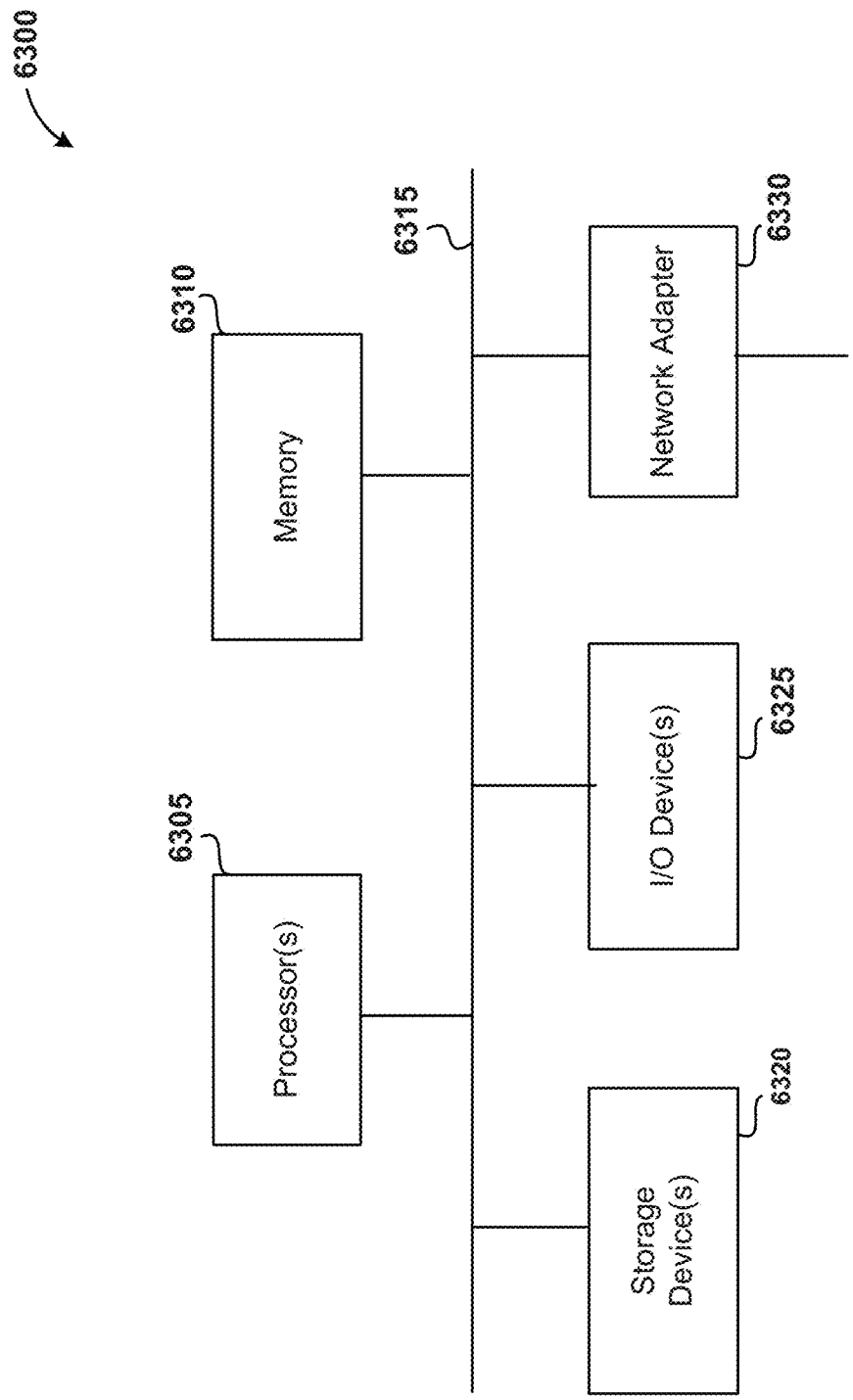
FIG. 63 is a block diagram of a computer system as may be used to implement features of some of the embodiments.

FIG. 63 is a block diagram of a computer system as may be used to implement features of some of the embodiments. The computing system 6300 may include one or more central processing units ("processors") 6305, memory 6310, input/output devices 6325 (e.g., keyboard and/or pointing devices and/or touchscreen devices, display devices, etc.), storage devices 6320 (e.g., disk drives), and network adapters 6330 (e.g., network interfaces) that are connected to an interconnect 6315. The interconnect 6315 is illustrated as an abstraction that represents any one or more separate physical buses, point to point connections, or both connected by appropriate bridges, adapters, or controllers. The interconnect 6315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 6310 and storage devices 6320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 6310 can be implemented as software and/or firmware to program the processor(s) 6305 to carry out actions described above. In some embodiments, such software or firmware may be initially provided to the processing system 6300 by downloading it from a remote system through the computing system 6300 (e.g., via network adapter 6330).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A device to facilitate an augmented reality (AR) experience, the device comprising:
    a depth sensor;
    at least one processor;
    at least one memory comprising instructions configured to cause the at least one processor to perform a method comprising:
        receiving depth information, the depth information comprising distances from the depth sensor to surfaces in a real-world environment;
        determining a final pose, wherein determining the final pose comprises:
            determining a first pose;
            determining at least one neighborhood based upon the first pose; and
            iteratively, through two or more iterations:
                selecting a new pose from a plurality of poses within a neighborhood of a plurality of neighborhoods, each neighborhood of the plurality of neighborhoods covering a portion of a search space associated with a virtual model of the real-world environment;
                pruning a neighborhood from the plurality of neighborhoods, at least in part, by determining correspondences between the depth information oriented using a pose from the pruned neighborhood and at least a portion of the virtual model of the real-world environment; and
                setting a size of at least one neighborhood in a subsequent iteration to be smaller than a size of at least one neighborhood in a preceding iteration, wherein
                the final pose is the new pose so iteratively determined to more closely correspond to the virtual model than a pose of a previous iteration; and
        making the final pose available to an AR application.

2. The device of claim 1, wherein the first pose is a predicted pose associated with a belief determined based, at least in part, upon the depth information.

3. The device of claim 2, further comprising an inertial measurement unit (IMU), and wherein the predicted pose is determined, at least in part, based upon IMU data acquired in conjunction with the acquisition of the depth information, wherein the device applies one or more offsets to relate a clock of the at least one processor, a clock of the depth sensor, and a clock of the IMU, to a common reference at substantially the time when the IMU data is acquired.

4. The device of claim 1, wherein the iterations cease when successively determined poses resemble one another within a threshold, the threshold measured in meters-and-radians (MARs).

5. The device of claim 1, wherein the virtual model comprises a Likelihood Field-Float (LFF) model or a Likelihood Field-Integer (LFI) model.

6. The device of claim 1, wherein determining a final pose based upon the correspondences comprises applying a Pose Search Algorithm (PSA).

7. The device of claim 6, wherein the PSA comprises a Scaling Series algorithm.

8. The device of claim 7, further comprising an inertial measurement unit (IMU), wherein the first pose is a predicted pose, the predicted pose based upon inertial measurement unit (IMU) data acquired in conjunction with the acquisition of the depth information.

9. The device of claim 2, further comprising:
    an inertial measurement unit (IMU), and wherein
    the two or more iterations comprise operations in a Scaling Series algorithm, the Scaling Series Algorithm further comprising a division of a state space corresponding to the virtual model into a plurality of cells in accordance with either a grid hash or a grid tree,
    selecting a new pose from a plurality of poses comprises selecting a new pose based upon the grid hash or the grid tree,
    the iterations cease when successively determined poses resemble one another within a threshold, the threshold measured in meters-and-radians (MARs),
    the virtual model comprises a Likelihood Field-Float (LFF) model or a Likelihood Field- Integer (LFI) model,
    the predicted pose is determined, at least in part, based upon IMU data acquired from the IMU in conjunction with the acquisition of the depth information,
    the device is further configured to apply one or more offsets to relate a clock of the at least one processor, a clock of the depth sensor, and a clock of the IMU, to a common reference at substantially the time when the IMU data is acquired, and wherein
    the belief comprises a distribution of probabilities across a corpus of candidate pose transforms determined based, at least in part, upon the depth information.

10. The device of claim 5, wherein the virtual model is a LFF Model when performing a global localization and an LFI Model when performing a standard tracking operation.

11. A device to determine a final pose, the device comprising:
    an interface configured to receive data from an augmented reality (AR) experience device;
    at least one processor;
    at least one memory comprising instructions configured to cause the at least one processor to perform a method comprising:
        receiving depth information from the AR experience device via the interface, the depth information comprising distances from a depth sensor to surfaces in a real-world environment;
        determining a final pose, wherein determining the final pose comprises:
            determining a first pose;
            determining at least one neighborhood based upon the first pose; and
            iteratively, through two or more iterations:
                selecting a new pose from a plurality of poses within a neighborhood of a plurality of neighborhoods, each neighborhood of the plurality of neighborhoods covering a portion of a search space associated with a virtual model of the real-world environment;
                pruning a neighborhood from the plurality of neighborhoods, at least in part, by determining correspondences between the depth information oriented using a pose from the pruned neighborhood and at least a portion of the virtual model of the real-world environment; and
                setting a size of at least one neighborhood in a subsequent iteration to be smaller than a size of at least one neighborhood in a preceding iteration, wherein the final pose is the new pose so iteratively determined to more closely correspond to the virtual model than a pose of a previous iteration; and making the final pose available to the AR experience device.

12. The device of claim 11, wherein the first pose is a predicted pose associated with a belief determined based, at least in part, upon the depth information.

13. The device of claim 11, wherein the iterations cease when successively determined poses resemble one another within a threshold, the threshold measured in meters-and-radians (MARs).

14. The device of claim 11, wherein determining a final pose based upon the correspondences comprises applying a Pose Search Algorithm (PSA).

15. The device of claim 14, wherein the PSA comprises a Scaling Series algorithm.

16. The non-transitory computer-readable medium of claim 11, wherein the interface is a network interface.

17. A computer-implemented method for determining a pose of a device relative to a real-world environment, comprising:

receiving depth information associated with the device, the depth information comprising distances from the device to surfaces in a real-world environment; and determining a final pose, wherein determining the final pose comprises applying a Pose Search Algorithm (PSA) to a virtual model of the real-world environment and a first pose determined from the depth information, wherein the PSA comprises:

determining at least one neighborhood based upon the first pose; and iteratively, through two or more iterations:

selecting a new pose from a plurality of poses within a neighborhood of a plurality of neighborhoods, each neighborhood of the plurality of neighborhoods covering a portion of a search space associated with the virtual model of the real-world environment;

pruning a neighborhood from the plurality of neighborhoods, at least in part, by determining correspondences between the depth information oriented using a pose from the pruned neighborhood and at least a portion of the virtual model of the real-world environment; and setting a size of at least one neighborhood in a subsequent iteration to be smaller than a size of at least one neighborhood in a preceding iteration, and wherein the final pose is the new pose so iteratively determined to more closely correspond to the virtual model than a pose of a previous iteration.

18. The computer-implemented method of claim 17, wherein the first pose is a predicted pose associated with a belief determined based, at least in part, upon the depth information and upon inertial measurement unit (IMU) data acquired in conjunction with the acquisition of the depth information.

19. The computer-implemented method of claim 17, wherein the PSA comprises a Scaling Series algorithm.

20. A non-transitory computer-readable medium comprising instructions configured to cause a device to perform a method, the method comprising:

receiving depth information associated with the device, the depth information comprising distances from the device to surfaces in a real-world environment; and determining a final pose, wherein determining the final pose comprises applying a Pose Search Algorithm (PSA) to a virtual model of the real-world environment and a first pose determined from the depth information, wherein the PSA comprises:

determining at least one neighborhood based upon the first pose; and iteratively, through two or more iterations:

selecting a new pose from a plurality of poses within a neighborhood of a plurality of neighborhoods, each neighborhood of the plurality of neighborhoods covering a portion of a search space associated with the virtual model of the real-world environment;

pruning a neighborhood from the plurality of neighborhoods, at least in part, by determining correspondences between the depth information oriented using a pose from the pruned neighborhood and at least a portion of the virtual model of the real-world environment; and setting a size of at least one neighborhood in a subsequent iteration to be smaller than a size of at least one neighborhood in a preceding iteration, wherein the final pose is the new pose so iteratively determined to more closely correspond to the virtual model than a pose of a previous iteration.

21. The non-transitory computer-readable medium of claim 20, wherein the first pose is a predicted pose associated with a belief determined based, at least in part, upon the depth information and upon inertial measurement unit (IMU) data acquired in conjunction with the acquisition of the depth information.

22. The non-transitory computer-readable medium of claim 20, wherein the PSA comprises a Scaling Series algorithm.

* * * * *